US008577760B2

(12) United States Patent
Rutsch et al.

(10) Patent No.: US 8,577,760 B2
(45) Date of Patent: Nov. 5, 2013

(54) MANAGING CONSISTENT INTERFACES FOR TAX AUTHORITY BUSINESS OBJECTS ACROSS HETEROGENEOUS SYSTEMS

(75) Inventors: Hans-Joerg Rutsch, Walldorf (DE); Oliver Kroneisen, Frankfurt (DE); Tilo Eggeling, Shanghai (CN); Stephan Schlicker, Heidelberg (DE); Jerome Monteu Nana, Leimen (DE)

(73) Assignee: SAP AG, Walldorf (DE)

( * ) Notice: Subject to any disclaimer, the term of this patent is extended or adjusted under 35 U.S.C. 154(b) by 728 days.

(21) Appl. No.: 12/323,116

(22) Filed: Nov. 25, 2008

(65) Prior Publication Data

US 2010/0131394 A1 May 27, 2010

(51) Int. Cl.
*G06F 17/22* (2006.01)
*G07F 19/00* (2006.01)

(52) U.S. Cl.
USPC ............ 705/31; 705/36 T; 719/315; 715/234

(58) Field of Classification Search
None
See application file for complete search history.

(56) References Cited

U.S. PATENT DOCUMENTS 3,223,321 A 12/1965 Baumgartner
5,126,936 A 6/1992 Champion et al.
5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,058,378 A 5/2000 Clark et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.

(Continued)

FOREIGN PATENT DOCUMENTS

CN 1501296 6/2004
CN 1609866 4/2005

(Continued)

OTHER PUBLICATIONS

Baker, Stacy; "Benefits of Assortment Planning"; Assortment Planning for Apparel Retailers—2005 Management Briefing; Just Style; Jun. 2005; 3 pages.

(Continued)

*Primary Examiner* — Luna Champagne
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a tax assessment notice, a tax form, a tax object, a tax obligation and/or a tax return business object.

7 Claims, 282 Drawing Sheets

(56) References Cited

U.S. PATENT DOCUMENTS

| | | | |
|---|---|---|---|
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwarzhoff et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,249,195 | B2 | 7/2007 | Panec et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,426,520 | B2 | 9/2008 | Gorelik et al. |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,689,711 | B2 | 3/2010 | Brouk et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 8,082,243 | B2 | 12/2011 | Gorelik et al. |
| 8,150,798 | B2 | 4/2012 | Ma et al. |
| 2001/0042032 | A1 | 11/2001 | Crawshaw et al. |
| 2001/0047372 | A1 | 11/2001 | Gorelik et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0041178 | A1 | 2/2003 | Brouk et al. |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1* | 11/2003 | Sweeney et al. ................ 705/30 |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0186891 | A1 | 9/2004 | Panec et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0055369 | A1 | 3/2005 | Gorelik et al. |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |

(56) References Cited

U.S. PATENT DOCUMENTS

| | | | |
|---|---|---|---|
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 * | 4/2006 | Seubert et al. ............... 707/100 |
| 2006/0089885 | A1 | 4/2006 | Finke et al. |
| 2006/0095373 | A1 | 5/2006 | Venkatasubramanian et al. |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0067411 | A1 | 3/2007 | Angelov |
| 2007/0078799 | A1 | 4/2007 | Huber-Buschbeck et al. |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0214065 | A1 | 9/2007 | Kahlon et al. |
| 2007/0225949 | A1 | 9/2007 | Sundararajan et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0288250 | A1 | 12/2007 | Lemcke et al. |
| 2007/0294159 | A1 | 12/2007 | Cottle |
| 2008/0005012 | A1 | 1/2008 | Deneef |
| 2008/0016242 | A1 | 1/2008 | Panec et al. |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0120313 | A1 | 5/2008 | O'Brien et al. |
| 2008/0133303 | A1 | 6/2008 | Singh et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0094274 | A1 | 4/2009 | Gorelik et al. |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248429 | A1 | 10/2009 | Doenig et al. |
| 2009/0248430 | A1 | 10/2009 | Hubert et al. |
| 2009/0248431 | A1 | 10/2009 | Schoknecht et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |
| 2009/0248547 | A1 | 10/2009 | Doenig et al. |
| 2009/0248558 | A1 | 10/2009 | Hollberg et al. |
| 2009/0248586 | A1 | 10/2009 | Kaisermayr et al. |
| 2009/0248698 | A1 | 10/2009 | Rehmann |
| 2009/0249358 | A1 | 10/2009 | Schuette |
| 2009/0249362 | A1 | 10/2009 | Lindemann et al. |
| 2009/0271245 | A1 | 10/2009 | Joshi et al. |
| 2009/0300578 | A1 | 12/2009 | Neil |
| 2009/0326988 | A1 | 12/2009 | Barth et al. |
| 2009/0327009 | A1 | 12/2009 | Schmitt et al. |
| 2009/0327105 | A1 | 12/2009 | Moussa et al. |
| 2009/0327106 | A1 | 12/2009 | Bartelt et al. |
| 2010/0001834 | A1 | 1/2010 | Brunswig et al. |
| 2010/0014510 | A1 | 1/2010 | Boreli et al. |
| 2010/0070391 | A1 * | 3/2010 | Storr et al. ...................... 705/30 |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161425 | A1 | 6/2010 | Sideman |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0153767 | A1 | 6/2011 | Coldicott et al. |
| 2011/0276636 | A1 | 11/2011 | Cheng et al. |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |

OTHER PUBLICATIONS

"Visual and Quantitative Assortment Planning Applications Drive Partnership and Profit"; PR Newswire; Jan. 12, 2006; 3 pages.

"DOTS Inc. Selects Compass Software's smartmerchandising for Merchandise Planning and Assortment Planning"; PR Newswire; Dec. 11, 2002; 2 pages.

SAP; "BC-Central Maintenance and Transport Objects"; Release 4.6C; Apr. 200; 15 pages.

Annevelink et al.; "Heterogeneous Database Intergration in a Physician Workstation"; 1992; 5 pages.

Ketabchi et al.; "Object-Oriented Database Management Support for Software Maintenance and Reverse Engineering"; Department of Electrical Engineering and Computer Science, Santa Clara University; 1989; 4 pages.

Diehl et al.; "Service Architecture for an Object-Oriented Next Generation Profile Register"; 8 pages.

International Search Report and Written Opinion of the International Searching Authority issued in International Application No. PCT/CN2010/073856 on Mar. 17, 2011; 8 pages.

International Search Report and Written Opinion of the International Searching Authority issued in International Application No. PCT/CN2010/073864 on Mar. 3, 2011; 8 pages.

International Search Report and Written Opinion of the International Searching Authority issued in International Application No. PCT/CN2010/073868 on Mar. 17, 2011; 10 pages.

(56) References Cited

OTHER PUBLICATIONS

Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
"UML in the .com Enterprise: Modeling CORBA, Components, XML/XMI and Metadata Workshop"; http://www.omg.org/news/meetings/workshops/uml_presentations.htm.
Born, Marc et al.; "Customizing UML for Component Design"; www.dot-profile.de; UML Workshop, Palm Springs, CA; Nov. 2000.
Levi, Keith et al.; "A Goal-Driven Approach to Enterprise Component Identification and Specification"; Communications of the ACM; vol. 45, No. 10, Oct. 2002; pp. 45-52.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".

(56) References Cited

OTHER PUBLICATIONS

Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Application No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Communication Pursuant to Article 94(3) issued in European Application No. 05766672.9 on Jul. 14, 2011; 4 pages.
Office Action issued in U.S. Appl. No. 12/147,414 on Oct. 26, 2011; 27 pages.
Office Action issued in U.S. Appl. No. 12/571,140 on Sep. 26, 2011; 14 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,155 on Oct. 31, 2011; 15 pages.
Notice of Allowance issued in U.S. Appl. No. 11/775,821 on Sep. 21, 2011; 5 pages.
Notice of Allowance issued in U.S. Appl. No. 11/640,422 on Sep. 29, 2011; 7 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Notice of Allowance issued in related U.S. Appl. No. 11/731,857 on Dec. 14, 2011; 7 pages.
Notice of Allowance issued in U.S. Appl. No. 12/147,378 on Nov. 9, 2011; 16 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Jan. 23, 2012; 16 pages.
Notice of Allowance issued in U.S. Appl. No. 11/155,368 on Nov. 8, 2011; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Office Action issued in related U.S. Appl. No. 11/864,863 on Dec. 22, 2011; 20 pages.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/060,192 on Mar. 2, 2012; 18 pages.
Notice of Allowance issued in U.S. Appl. No. 12/060,062 on Mar. 20, 2012; 16 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.

(56) References Cited

OTHER PUBLICATIONS

Notice of Allowance issued in U.S. Appl. No. 11/166,065 on Feb. 15, 2012; 7 pages.
Notice of Allowance issued in related U.S. Appl. No. 11/864,866 on Mar. 13, 2012; 7 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012;12 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Boetterweck, Goetz; "A Model-Driven Approach to the Engineering of Multiple User Interfaces"; Lecture Notes in Computer Science; 2007; vol. 4364/2007; pp. 106-115.
SAP 2008 Annual Report; 256 pages.
International Search Report and Written Opinion issued in International Application No. PCT/CN2011/001238 on May 3, 2012; 9 pages.
Communication Pursuant to Article 94(3) EPC issued in European Application No. 07835755.5 on Feb. 22, 2012; 7 pages.
Notice of Allowance issued in related U.S. Appl. No. 11/364,538 on Jul. 13, 2012; 7 pages.
Notice of Allowance issued in related U.S. Appl. No. 11/864,832 on Jul. 30, 2012; 12 pages.
Notice of Allowance issued in U.S. Appl. No. 11/640,422 on May 22, 2012; 7 pages.
Notice of Allowance issued in U.S. Appl. No. 12/059,971 on Jun. 28, 2012; 12 pages.
Notice of Allowance issued in U.S. Appl. No. 12/060,155 on Apr. 24, 2012; 15 pages.
Notice of Allowance issued in U.S. Appl. No. 12/815,618 on May 10, 2012; 7 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,639 on May 24, 2012; 7 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise. Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.

(56) References Cited

OTHER PUBLICATIONS

Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages (Ref.: 23067-0049001).
International Search Report and Written Opinion of the International Searching Authority issued in International Application No. PCT/US2007/011378 on Apr. 30, 2008; 17 pages (Ref.: 200170045W01).
International Preliminary Report on Patentability under Chapter I issued in International Application No. PCT/US2007/011378 on Nov. 17, 2008; 11 pages (Ref.: 20017-0045WO1).
International Search Report and Written Opinion of the International Searching Authority issued in International Application No. PCT/IB2006/001401 on Aug. 27, 2008; 8 pages (Ref.: 200170120WO1).
International Search Report and Written Opinion of the International Searching Authority issued in International Application No. PCT/US2005/019961 on Sep. 22, 2005; 8 pages (Ref.: 20017-0121WO1).
International Preliminary Report on Patentability under Chapter I issued in International Application No. PCT/US2005/019961 on Dec. 4, 2006; 6 pages (Ref.: 20017-0121WO1).
International Search Report and Written Opinion of the International Searching Authority issued in International Application No. PCT/US2005/021481 on Apr. 11, 2006; 7 pages (Ref.: 20017-0121WO2).
International Search Report and Written Opinion of the International Searching Authority issued in International Application No. PCT/US2005/021481 on May 29, 2007; 6 pages (Ref.: 20017-0121WO2).
International Preliminary Report on Patentability under Chapter I issued in International Application No. PCT/US2005/021481 on Dec. 20, 2006; 6 pages (Ref.: 20017-0121WO2).
International Preliminary Report on Patentability under Chapter I issued in International Application No. PCT/US2005/021481 on Jul. 15, 2008; 5 pages (Ref.: 20017-0121WO2).
International Search Report and Written Opinion of the International Searching Authority issued in International Application No. PCT/US2005/022137 on Sep. 23, 2005; 7 pages (Ref.: 20017-0121WO3).
International Search Report and Written Opinion of the International Searching Authority issued in International Application No. PCT/US2005/022137 on May 12, 2006; 7 pages (Ref.: 20017-0121WO3).
International Preliminary Report on Patentability under Chapter I issued in International Application No. PCT/US2005/022137 on Dec. 28, 2006; 5 pages (Ref.: 20017-0121WO3).

* cited by examiner

FIG. 33-1

| Package | level1 | level2 | level3 | level4 | Data Type Name |
|---|---|---|---|---|---|
| TaxAssessmentNoticeERPMessage_sync 33000 | TaxAssessmentNoticeERPMessage_sync 33002 | | | | TxAssmtNtcERPMsg 33004 |
| MessageHeader 33006 | | MessageHeader 33008 | | | BasicBusinessDocumentMessageHeader 33010 |
| TaxAssessmentNotice 33012 | | TaxAssessmentNotice 33014 | | | |
| | | | TaxPayerPartyID 33016 | | PartyInternalID 33018 |
| | | | BillingPeriodID 33020 | | BillingPeriodID 33022 |
| | | | LevyTypeCode 33024 | | LevyTypeCode 33026 |

FIG. 33-2

| Package | level1 | level2 | level3 | level4 | Data Type Name |
|---|---|---|---|---|---|
| | | | BinaryObject 33028 | | BinaryObject 33030 |
| | | | BillingPeriodName 33032 | | MEDIUM_Name 33034 |
| | | | LevyTypeName 33036 | | MEDIUM_Name 33038 |
| ContractAccountInvoiceRequestAssignment 33040 | | | ContractAccountInvoiceRequestAssignment 33042 | | |
| | | | | ID 33044 | Numeric 33046 |
| Log 33048 | | Log 33050 | | | Log 33052 |

FIG. 34

| Package | level1 | level2 | level3 | Cardinality |
|---|---|---|---|---|
| TaxAssessmentNoticeERPByBusinessPartnerQueryMessage_sync 34000 | TaxAssessmentNoticeERPByBusinessPartnerQueryMessage_sync 34002 | | | MDT 34004 |
| MessageHeader 34006 | | MessageHeader 34008 | | 1 34010 |
| Selection 34012 | | TaxAssessmentNoticeSelectionByBusinessPartner 34014 | | 1 34016 |
| | | | TaxPayerPartyID 34018 | 1 34020 |
| | | | BillingPeriodID 34022 | 1 34024 |
| | | | LevyTypeCode 34026 | 1 34028 |

FIG. 35-1

| Package | level1 | level2 | level3 | level4 | Cardinality |
|---|---|---|---|---|---|
| TaxAssessmentNoticeERPByBusinessPartnerMessage_sync 35000 | TaxAssessmentNoticeERPByBusinessPartnerMessage_sync 35002 | | | | |
| TaxAssessmentNotice 35004 | | TaxAssessmentNotice 35006 | | | 0..1 35008 |
| | | | TaxPayerPartyID 35010 | | 1 35012 |
| | | | BillingPeriodID 35014 | | 1 35016 |
| | | | LevyTypeCode 35018 | | 1 35020 |
| | | | BinaryObject 35022 | | 1 35024 |

FIG. 35-2

| Package | level1 | level2 | level3 | level4 | Cardinality |
|---|---|---|---|---|---|
| | | | BillingPeriodName 35026 | | 0..1 35028 |
| | | | LevyTypeName 35030 | | 0..1 35032 |
| ContractAccountInvoiceRequestAssignment 35034 | | | ContractAccountInvoiceRequestAssignment 35036 | | 0..1 35038 |
| | | | | BillingDocumentNumber 35040 | 1 35042 |
| Log 35044 | | Log 35046 | | | 1 35048 |

FIG. 36-1

| Package | level1 | level2 | level3 | level4 | level5 | Data Type Name |
|---|---|---|---|---|---|---|
| TaxFormERPMessage_Sync 36000 | TaxFormERP-Message_Sync 36002 | | | | | |
| MessageHeader 36004 | | Message-Header 36006 | | | | BusinessDocument-MessageHeader 36008 |
| TaxForm 36010 | | TaxForm 36012 | | | | |
| | | | ID 36014 | | | Identifier 36016 |
| | | | TemplateID 36018 | | | InternalServiceRequestTemplateID 36020 |
| | | | TypeCode 36022 | | | Code 36024 |

FIG. 36-2

| Package | level1 | level2 | level3 | level4 | level5 | Data Type Name |
|---|---|---|---|---|---|---|
| | | | ValidFromDate 36026 | | | Date 36028 |
| | | | ValidToDate 36030 | | | Date 36032 |
| | | | BinaryObject 36034 | | | BinaryObject 36036 |
| | | | TemplateName 36038 | | | MEDIUM_Name 36040 |
| Usagedata 36042 | | | Usagedata 36044 | | | |
| | | | | UsageCode 36046 | | Code 36048 |

FIG. 36-3

| Package | level1 | level2 | level3 | level4 | level5 | Data Type Name |
|---|---|---|---|---|---|---|
| | | | | LevyTypeCode 36050 | | LevyTypeCode 36052 |
| | | | | CoverFormIndicator 36054 | | Indicator 36056 |
| | | | | MinimumNumberValue 36058 | | NumberValue 36060 |
| | | | | MaximumNumberValue 36062 | | NumberValue 36064 |
| | | | | LevyTypeName 36066 | | MEDIUM_Name 36068 |
| | | | | BillingPeriod 36070 | | |

FIG. 36-4

| Package | level1 | level2 | level3 | level4 | level5 | Data Type Name |
|---|---|---|---|---|---|---|
| | | | | | BillingPeriodID 36072 | BillingPeriodID 36074 |
| | | | | | BillingPeriodName 36076 | MEDIUM_Name 36078 |
| PropertyValua-tion 36080 | | | PropertyValuation 36082 | | | |
| | | | | PropertyValuation 36084 | | PropertyValuation 36086 |
| Log 36088 | | Log 36090 | | | | Log 36092 |

FIG. 37

| Package | level1 | level2 | level3 | Cardinality |
|---|---|---|---|---|
| TaxFormERPByLevyType-QueryMessage_sync 37000 | TaxFormERPByLevyType-QueryMessage_sync 37002 | | | |
| MessageHeader 37004 | | MessageHeader 37006 | | 0..1 37008 |
| Selection 37010 | | TaxFormSelectionByLevyType 37012 | | 1 37014 |
| | | | LevyTypeCode 37016 | 1 37018 |
| | | | BillingPeriodID 37020 | 0..1 37022 |
| | | | TaxFormUsageCode 37024 | 1 37026 |

FIG. 38-1

| Package | level1 | level2 | level3 | level4 | level5 | Cardinality |
|---|---|---|---|---|---|---|
| TaxFormERPBy-LevyTypeResponse-Message_Sync 38000 | TaxFormERPBy-LevyTypeRespon-seMessage_Sync 38002 | | | | | |
| TaxForm 38004 | | TaxForm 38006 | | | | 0..n 38008 |
| | | | ID 38010 | | | 1 38012 |
| | | | TemplateID 38014 | | | 1 38016 |
| | | | TypeCode 38018 | | | 0..1 38020 |
| | | | ValidFromDate 38022 | | | 1 38024 |

FIG. 38-2

| Package | level1 | level2 | level3 | level4 | level5 | Cardinality |
|---|---|---|---|---|---|---|
| | | | ValidToDate 38026 | | | 1 38028 |
| | | | BinaryObject 38030 | | | 1 38032 |
| | | | TemplateName 38034 | | | 0..1 38036 |
| UsageData 38038 | | | UsageData 38040 | | | 0..1 38042 |
| | | | | UsageCode 38044 | | 0..1 38046 |
| | | | | LevyTypeCode 38048 | | 1 38050 |

FIG. 38-3

| Package | level1 | level2 | level3 | level4 | level5 | Cardinality |
|---|---|---|---|---|---|---|
| | | | | CoverFormIndicator 38052 | | 1 38054 |
| | | | | MinimumNumberValue 38056 | | 0..1 38058 |
| | | | | MaximumNumberValue 38060 | | 0..1 38062 |
| | | | | LevyTypeName 38064 | | 0..1 38066 |
| | | | | BillingPeriod 38068 | | 0..n 38070 |
| | | | | | BillingPeriodID 38072 | 1 38074 |

FIG. 38-4

| Package | level1 | level2 | level3 | level4 | level5 | Cardinality |
|---|---|---|---|---|---|---|
| | | | | | BillingPeriodName 38076 | 0..1 38078 |
| PropertyValuation 38080 | | | PropertyValuation 38082 | | | 0..1 38084 |
| | | | | PropertyValuation 38086 | | 1..n 38088 |
| Log 38090 | | Log 38092 | | | | 1 38094 |

FIG. 39

| Package | level1 | level2 | level3 | Cardinality |
|---|---|---|---|---|
| TaxFormERPByID-QueryMessage_sync 39000 | TaxFormERPByID-QueryMessage_sync 39002 | | | |
| MessageHeader 39004 | | MessageHeader 39006 | | 0..1 39008 |
| Selection 39010 | | TaxFormSelectionByID 39012 | | 1 39014 |
| | | | ID 39016 | 1 39018 |

FIG. 40-1

| Package | level1 | level2 | level3 | level4 | level5 | Cardinality |
|---|---|---|---|---|---|---|
| TaxFormERPBy-IDResponseMes-sage_Sync 40000 | TaxFormERPBy-IDResponse-Message_Sync 40002 | | | | | |
| TaxForm 40004 | | TaxForm 40006 | | | | 0..1 40008 |
| | | | ID 40010 | | | 1 40012 |
| | | | TemplateID 40014 | | | 1 40016 |
| | | | TypeCode 40018 | | | 0..1 40020 |
| | | | ValidFromDate 40022 | | | 1 40024 |

FIG. 40-2

| Package | level1 | level2 | level3 | level4 | level5 | Cardinality |
|---|---|---|---|---|---|---|
| | | | ValidToDate 40026 | | | 1 40028 |
| | | | BinaryObject 40030 | | | 1 40032 |
| | | | TemplateName 40034 | | | 0..1 40036 |
| | | | TypeName 40038 | | | 0..1 40040 |
| UsageData 40042 | | | UsageData 40044 | | | 0..n 40046 |
| | | | | UsageCode 40048 | | 0..1 40050 |

FIG. 40-3

| Package | level1 | level2 | level3 | level4 | level5 | Cardinality |
|---|---|---|---|---|---|---|
| | | | | LevyTypeCode 40052 | | 1 40054 |
| | | | | CoverFormIndicator 40056 | | 1 40058 |
| | | | | MinimumNumberValue 40060 | | 0..1 40062 |
| | | | | MaximumNumberValue 40064 | | 0..1 40066 |
| | | | | LevyTypeName 40068 | | 0..1 40070 |
| | | | | BillingPeriod 40072 | | 0..n 40074 |

FIG. 40-4

| Package | level1 | level2 | level3 | level4 | level5 | Cardinality |
|---|---|---|---|---|---|---|
| | | | | | BillingPeriodID 40076 | 1 40078 |
| | | | | | BillingPeriodName 40080 | 0..1 40082 |
| Property-Valuation 40084 | | | PropertyValuation 40086 | | | 0..1 40088 |
| | | | | PropertyValuation 40090 | | 1..n 40092 |
| Log 40094 | | Log 40096 | | | | 1 40098 |

FIG. 42-1

| Package | level1 | level2 | level3 | level4 | Data Type Name |
|---|---|---|---|---|---|
| TaxObjectERPMessage_sync 42000 | TaxObjectERPMessage_sync 42002 | | | | TxObjERPMsg 42004 |
| MessageHeader 42006 | | MessageHeader 42008 | | | BasicBusinessDocumentMessageHeader 42010 |
| TaxObject 42012 | | TaxObject 42014 | | | TxObj 42016 |
| | | | propertyGroupListCompleteTransmissionIndicator 42018 | | Indicator 42020 |
| | | | taxObligationAssignmentListCompleteTransmissionIndicator 42022 | | Indicator 42024 |

FIG. 42-2

| Package | level1 | level2 | level3 | level4 | Data Type Name |
|---|---|---|---|---|---|
| | | | TaxObjectID 42026 | | Identifier 42028 |
| | | | ChangeStateID 42030 | | ChangeStateID 42032 |
| | | | ObjectTypeCode 42034 | | Code 42036 |
| | | | ObjectTypeName 42038 | | MEDIUM_Name 42040 |
| | | | TaxObjectName 42042 | | MEDIUM_Name 42044 |
| | | | SubapplicationCode 42046 | | Code 42048 |

FIG. 42-3

| Package | level1 | level2 | level3 | level4 | Data Type Name |
|---|---|---|---|---|---|
| BusinessLicen-seAssignment 42050 | | | BusinessLicenseAssignment 42052 | | TxObjERPBusLi-cAssgmt 42054 |
| | | | | | Identifier 42056 |
| PropertyGroup 42058 | | | PropertyGroup 42060 | | TxObjERPProptyGrp 42062 |
| PropertyValuation 42064 | | | PropertyValuation 42066 | | TxObjERPProptyValn 42068 |
| | | | | PropertyValuation 42070 | PropertyValuation 42072 |
| LocationData 42074 | | | LocationData 42076 | | TxObjERPLocData 42078 |

FIG. 42-4

| Package | level1 | level2 | level3 | level4 | Data Type Name |
|---|---|---|---|---|---|
| | | | | IdentificationNumber 42080 | |
| | | | | IndustryCode 42082 | |
| | | | | PhysicalAddress 42084 | |
| TaxObligationAs-signment 42086 | | | TaxObligationAssignment 42088 | | TxObjERP-TxOblgnAssgmt 42090 |
| | | | | actionCode 42092 | ActionCode 42094 |
| | | | | TaxObligationID 42096 | Identifier 42098 |

FIG. 42-5

| Package | level1 | level2 | level3 | level4 | Data Type Name |
|---|---|---|---|---|---|
| | | | | LevyTypeCode 42100 | LevyTypeCode 42102 |
| | | | | LevyTypeName 42104 | MEDIUM_Name 42106 |
| | | | | StartBillingPeriodID 42108 | BillingPeriodID 42110 |
| | | | | StartBillingPeriodName 42112 | MEDIUM_Name 42114 |
| | | | | TaxPayerPartyID 42116 | PartyInternalID 42118 |
| ProcessingConditions 42120 | | QueryProcessingConditions 42122 | | | QueryProcessing-Conditions 42124 |

FIG. 42-6

| Package | level1 | level2 | level3 | level4 | Data Type Name |
|---|---|---|---|---|---|
| | | ResponseProc-essingConditions 42126 | | | ResponseProcess-ingConditions 42128 |
| Log 42130 | | Log 42132 | | | Log 42134 |

FIG. 43-1

| Package | level1 | level2 | level3 | Cardinality |
| --- | --- | --- | --- | --- |
| TaxObjectERPByBusiness-PartnerQueryMessage_sync 43000 | TaxObjectERPByBusiness-PartnerQueryMessage_sync 43002 | | | |
| Selection 43004 | | TaxObjectSelection-ByTaxPayerPartyID 43006 | | 1 43008 |
| | | | InclusionExclusionCode 43010 | 0..1 43012 |
| | | | IntervalBoundaryTypeCode 43014 | 0..1 43016 |
| | | | LowerBoundaryTaxPayerPartyID 43018 | 1 43020 |
| | | | UpperBoundaryTaxPayerPartyID 43022 | 0..1 43024 |

FIG. 43-2

| Package | level1 | level2 | level3 | Cardinality |
|---|---|---|---|---|
| ProcessingConditions 43026 | | QueryProcessing-Conditions 43028 | | |
| | | | QueryHitsMaximumNumberValue 43030 | 0..1 43032 |
| | | | UnlimitedQueryHitsIndicator 43034 | 1 43036 |

FIG. 44-1

| Package | level1 | level2 | level3 | level4 | Cardinality |
|---|---|---|---|---|---|
| TaxObjectERPByBusinessPartnerResponseMessage_sync 44000 | TaxObjectERPByBusinessPartnerResponseMessage_sync 44002 | | | | |
| TaxObject 44004 | | TaxObject 44006 | | | 0..n 44008 |
| | | | TaxObjectID 44010 | | 1 44012 |
| | | | ObjectTypeCode 44014 | | 1 44016 |
| | | | ObjectTypeName 44018 | | 0..1 44020 |
| | | | TaxObjectName 44022 | | 0..1 44024 |

FIG. 44-2

| Package | level1 | level2 | level3 | level4 | Cardinality |
|---|---|---|---|---|---|
| BusinessLicenseAssignment 44026 | | | BusinessLicense-Assignment 44028 | | 0..1 44030 |
| PropertyGroup 44032 | | | PropertyGroup 44034 | | 0..n 44036 |
| PropertyValuation 44038 | | | PropertyValuation 44040 | | 0..1 44042 |
| | | | | PropertyValuation 44044 | 0..n 44046 |
| TaxObligationAssignment 44048 | | | TaxObligationAs-signment 44050 | | 1..n 44052 |
| | | | | TaxObligationID 44054 | 1 44056 |

FIG. 44-3

| Package | level1 | level2 | level3 | level4 | Cardinality |
|---|---|---|---|---|---|
| | | | | LevyTypeCode 44058 | 0..1 44060 |
| | | | | LevyTypeName 44062 | 0..1 44064 |
| | | | | StartBillingPeriodID 44066 | 0..1 44068 |
| | | | | StartBillingPeriodName 44070 | 0..1 44072 |
| | | | | TaxPayerPartyID 44074 | 1 44076 |
| ProcessingConditions 44078 | | Response-Processing-Conditions 44080 | | | 1 44082 |

FIG. 44-4

| Package | level1 | level2 | level3 | level4 | Cardinality |
|---|---|---|---|---|---|
| | | | ReturnedQuery-HitsNumberValue 44084 | | 1 44086 |
| | | | MoreElement-sAvailableIndicator 44088 | | 1 44090 |
| Log 44092 | | Log 44094 | | | 1 44096 |

FIG. 45

| Package | level1 | level2 | level3 | Cardinality |
|---|---|---|---|---|
| TaxObjectERPByIdQuery-Message_sync 45000 | TaxObjectERPByIdQuery-Message_sync 45002 | | | |
| Selection 45004 | | TaxObjectSelectionById 45006 | | 1 45008 |
| | | | TaxObjectID 45010 | 1 45012 |

FIG. 46-1

| Package | level1 | level2 | level3 | level4 | Cardinality |
|---|---|---|---|---|---|
| TaxObjectERPByIdResponse-Message_sync 46000 | TaxObjectERPBy-IdResponseMes-sage_sync 46002 | | | | |
| TaxObject 46004 | | TaxObject 46006 | | | 0..1 46008 |
| | | | TaxObjectID 46010 | | 1 46012 |
| | | | ChangeStateID 46014 | | 0..1 46016 |
| | | | ObjectTypeCode 46018 | | 1 46020 |
| | | | ObjectTypeName 46022 | | 0..1 46024 |

FIG. 46-2

| Package | level1 | level2 | level3 | level4 | Cardinality |
|---|---|---|---|---|---|
| | | | TaxObjectName 46026 | | 0..1 46028 |
| BusinessLicenseAssignment 46030 | | | BusinessLicenseAssignment 46032 | | 0..1 46034 |
| PropertyGroup 46036 | | | PropertyGroup 46038 | | 0..n 46040 |
| PropertyValuation 46042 | | | PropertyValuation 46044 | | 0..1 46046 |
| | | | | PropertyValuation 46048 | 0..n 46050 |
| TaxObligationAssignment 46052 | | | TaxObligationAssignment 46054 | | 1..n 46056 |

FIG. 46-3

| Package | level1 | level2 | level3 | level4 | Cardinality |
|---|---|---|---|---|---|
| | | | | TaxObligationID 46058 | 1 46060 |
| | | | | LevyTypeCode 46062 | 0..1 46064 |
| | | | | LevyTypeName 46066 | 0..1 46068 |
| | | | | StartBillingPeriodID 46070 | 0..1 46072 |
| | | | | StartBillingPeriodName 46074 | 0..1 46076 |
| Log 46078 | | Log 46080 | | | 1 46082 |

FIG. 47-1

| Package | level1 | level2 | level3 | level4 | Cardinality |
|---|---|---|---|---|---|
| TaxObjectERPCreateRequestMessage_sync 47000 | TaxObjectERPCreateRequestMessage_sync 47002 | | | | |
| MessageHeader 47004 | | MessageHeader 47006 | | | 0..1 47008 |
| TaxObject 47010 | | TaxObject 47012 | | | 1 47014 |
| | | | TaxObjectName 47016 | | 0..1 47018 |
| BusinessLicenseAssignment 47020 | | | BusinessLicenseAssignment 47022 | | 0..1 47024 |
| PropertyGroup 47026 | | | PropertyGroup 47028 | | 0..n 47030 |

FIG. 47-2

| Package | level1 | level2 | level3 | level4 | Cardinality |
|---|---|---|---|---|---|
| PropertyValuation 47032 | | | PropertyValuation 47034 | | 0..1 47036 |
| | | | | PropertyValuation 47038 | 0..n 47040 |
| TaxObligationAssignment 47042 | | | TaxObligationAssign-ment 47044 | | 1..n 47046 |
| | | | | TaxObligationID 47048 | 1 47050 |

FIG. 48-1

| Package | level1 | level2 | level3 | level4 | Cardinality |
|---|---|---|---|---|---|
| TaxObjectERPCreateConfirmationMessage_sync 48000 | TaxObjectERPCreateConfirmationMessage_sync 48002 | | | | |
| MessageHeader 48004 | | MessageHeader 48006 | | | 0..1 48008 |
| TaxObject 48010 | | TaxObject 48012 | | | 0..1 48014 |
| | | | TaxObjectID 48016 | | 1 48018 |
| | | | ObjectTypeCode 48020 | | 1 48022 |
| | | | ObjectTypeName 48024 | | 0..1 48026 |

FIG. 48-2

| Package | level1 | level2 | level3 | level4 | Cardinality |
|---|---|---|---|---|---|
| | | | TaxObjectName 48028 | | 0..1 48030 |
| BusinessLicenseAssignment 48032 | | | BusinessLicense-Assignment 48034 | | 0..1 48036 |
| PropertyGroup 48038 | | | PropertyGroup 48040 | | 0..n 48042 |
| PropertyValuation 48044 | | | PropertyValuation 48046 | | 0..1 48048 |
| | | | | PropertyValuation 48050 | 0..n 48052 |
| TaxObligationAssignment 48054 | | | TaxObligationAs-signment 48056 | | 1..n 48058 |

FIG. 48-3

| Package | level1 | level2 | level3 | level4 | Cardinality |
|---|---|---|---|---|---|
| | | | | TaxObligationID 48060 | 1 48062 |
| | | | | LevyTypeCode 48064 | 0..1 48066 |
| | | | | LevyTypeName 48068 | 0..1 48070 |
| | | | | StartBillingPeriodID 48072 | 0..1 48074 |
| | | | | StartBillingPeriodName 48076 | 0..1 48078 |
| Log 48080 | | Log 48082 | | | 1 48084 |

FIG. 49-1

| Package | level1 | level2 | level3 | level4 | Cardinality |
| --- | --- | --- | --- | --- | --- |
| TaxObjectERPUpdateRequest-Message_sync 49000 | TaxObjectERPUpdateRequestMessage_sync 49002 | | | | |
| MessageHeader 49004 | | Message-Header 49006 | | | 0..1 49008 |
| TaxObject 49010 | | TaxObject 49012 | | | 0..1 49014 |
| | | | propertyGroupListCompleteTransmissionIndicator 49016 | | 1 49018 |
| | | | taxObligationAssignmentList-CompleteTransmissionIndicator 49020 | | 1 49022 |

FIG. 49-2

| Package | level1 | level2 | level3 | level4 | Cardinality |
|---|---|---|---|---|---|
| | | | TaxObjectID 49024 | | 1 49026 |
| | | | ChangeStateID 49028 | | 1 49030 |
| | | | TaxObjectName 49032 | | 0..1 49034 |
| BusinessLicenseAssignment 49036 | | | BusinessLicenseAssignment 49038 | | 0..1 49040 |
| | | | | | 1 49042 |
| PropertyGroup 49044 | | | PropertyGroup 49046 | | 0..n 49048 |

FIG. 49-3

| Package | level1 | level2 | level3 | level4 | Cardinality |
|---|---|---|---|---|---|
| PropertyValuation 49050 | | | PropertyValuation 49052 | | 0..1 49054 |
| | | | | PropertyValuation 49056 | 0..n 49058 |
| TaxObligationAssignment 49060 | | | TaxObligationAssignment 49062 | | 0..n 49064 |
| | | | | actionCode 49066 | 1 49068 |
| | | | | TaxObligationID 49070 | 1 49072 |

FIG. 50-1

| Package | level1 | level2 | level3 | level4 | Cardinality |
|---|---|---|---|---|---|
| TaxObjectERPUpdateConfirmationMessage_sync 50000 | TaxObjectERPUpdateConfirmationMessage_sync 50002 | | | | |
| MessageHeader 50004 | | MessageHeader 50006 | | | 0..1 50008 |
| TaxObject 50010 | | TaxObject 50012 | | | 0..1 50014 |
| | | | TaxObjectID 50016 | | 1 50018 |
| | | | ObjectTypeCode 50020 | | 1 50022 |
| | | | ObjectTypeName 50024 | | 0..1 50026 |

FIG. 50-2

| Package | level1 | level2 | level3 | level4 | Cardinality |
|---|---|---|---|---|---|
| | | | TaxObjectName 50028 | | 0..1 50030 |
| BusinessLicenseAssignment 50032 | | | BusinessLicenseAssignment 50034 | | 0..1 50036 |
| PropertyGroup 50038 | | | PropertyGroup 50040 | | 0..n 50042 |
| PropertyValuation 50044 | | | PropertyValuation 50046 | | 0..1 50048 |
| | | | | PropertyValuation 50050 | 0..n 50052 |
| TaxObligationAssignment 50054 | | | TaxObligationAssignment 50056 | | 0..n 50058 |

FIG. 50-3

| Package | level1 | level2 | level3 | level4 | Cardinality |
|---|---|---|---|---|---|
| | | | | TaxObligationID 50060 | 1 50062 |
| | | | | LevyTypCode 50064 | 0..1 50066 |
| | | | | LevyTypName 50068 | 0..1 50070 |
| | | | | StartBillingPeriodID 50072 | 0..1 50074 |
| | | | | StartBillingPeriodName 50076 | 0..1 50078 |
| Log 50080 | | Log 50082 | | | 1 50084 |

FIG. 51-1

| Package | level1 | level2 | level3 | level4 | Cardinality |
|---|---|---|---|---|---|
| TaxObjectERPCheckQueryMessage_sync 51000 | TaxObjectERPCheckQueryMessage_sync 51002 | | | | |
| TaxObject 51004 | | TaxObject 51006 | | | 1 51008 |
| | | | TaxObjectID 51010 | | 1 51012 |
| | | | ChangeStateID 51014 | | 0..1 51016 |
| | | | ObjectTypeCode 51018 | | 1 51020 |
| | | | TaxObjectName 51022 | | 0..1 51024 |
| BusinessLicenseAssignment 51026 | | | BusinessLicenseAssignment 51028 | | 0..1 51030 |

FIG. 51-2

| Package | level1 | level2 | level3 | level4 | Cardinality |
|---|---|---|---|---|---|
| PropertyGroup 51032 | | | PropertyGroup 51034 | | 0..n 51036 |
| PropertyValuation 51038 | | | PropertyValuation 51040 | | 0..1 51042 |
| | | | | PropertyValuation 51044 | 0..n 51046 |
| TaxObligationAssignment 51048 | | | TaxObligationAssignment 51050 | | 0..n 51052 |
| | | | | TaxObligationID 51054 | 1 51056 |
| | | | | RevenueTypeCode 51058 | 0..1 51060 |
| | | | | PeriodAssignmentCode 51062 | 0..1 51064 |

FIG. 52-1

| Package | level1 | level2 | level3 | level4 | Cardinality |
|---|---|---|---|---|---|
| TaxObjectERPCheckResponseMessage_sync 52000 | TaxObjectERPCheckResponseMessage_sync 52002 | | | | |
| TaxObject 52004 | | TaxObject 52006 | | | 0..1 52008 |
| | | | TaxObjectID 52010 | | 1 52012 |
| | | | ObjectTypeCode 52014 | | 0..1 52016 |
| | | | ObjectTypeName 52018 | | 0..1 52020 |
| | | | TaxObjectName 52022 | | 0..1 52024 |

FIG. 52-2

| Package | level1 | level2 | level3 | level4 | Cardinality |
|---|---|---|---|---|---|
| BusinessLicenseAssignment 52026 | | | BusinessLicenseAs-signment 52028 | | 0..1 52030 |
| PropertyGroup 52032 | | | PropertyGroup 52034 | | 0..n 52036 |
| PropertyValuation 52038 | | | PropertyValuation 52040 | | 0..1 52042 |
| | | | | PropertyValuation 52044 | 0..n 52046 |
| TaxObligationAssignment 52048 | | | TaxObligationAssign-ment 52050 | | 0..n 52052 |
| | | | | TaxObligationID 52054 | 1 52056 |

FIG. 52-3

| Package | level1 | level2 | level3 | level4 | Cardinality |
|---|---|---|---|---|---|
| | | | | LevyTypCode 52058 | 0..1 52060 |
| | | | | LevyTypName 52062 | 0..1 52064 |
| | | | | StartBillingPeriodID 52066 | 0..1 52068 |
| | | | | StartBillingPeriodName 52070 | 0..1 52072 |
| Log 52074 | | Log 52076 | | | 1 52078 |

FIG. 54-1

| Package | level1 | level2 | level3 | level4 | Level5 | Data Type Name |
|---|---|---|---|---|---|---|
| TaxObligation-ERPMessage_sync 54000 | TaxObligationERPMessage_sync 54002 | | | | | TxOblgnERPMsg 54004 |
| Message-Header 54006 | | MessageHeader 54008 | | | | BusinessDocument-MessageHeader 54010 |
| TaxObligation 54012 | | TaxObligation 54014 | | | | TxOblgn 54016 |
| | | | @filingObligationListCompleteTransmissionIndicator 54018 | | | Indicator 54020 |
| | | | @filingRuleListCompleteTransmission-Indicator 54022 | | | Indicator 54024 |

FIG. 54-2

| Package | level1 | level2 | level3 | level4 | Level5 | Data Type Name |
|---|---|---|---|---|---|---|
| | | | @filingExemptionListCompleteTrans-missionIndicator 54026 | | | Indicator 54028 |
| | | | @registrationFormListCompleteTrans-missionIndicator 54030 | | | Indicator 54032 |
| | | | TaxObligationID 54034 | | | Identifier 54036 |
| | | | TaxPayerPartyID 54038 | | | PartyInternalID 54040 |
| | | | LevyTypeCode 54042 | | | LevyTypeCode 54044 |
| | | | LevyTypeName 54046 | | | MEDIUM_Name 54048 |

FIG. 54-3

| Package | level1 | level2 | level3 | level4 | Level5 | Data Type Name |
|---|---|---|---|---|---|---|
| | | | StartBillingPeriodID 54050 | | | BillingPeriodID 54052 |
| | | | StartBillingPeriod-Name 54054 | | | MEDIUM_Name 54056 |
| | | | EndBillingPeriodID 54058 | | | BillingPeriodID 54060 |
| | | | EndBillingPeriod-Name 54062 | | | MEDIUM_Name 54064 |
| | | | ValidityStartDate 54066 | | | Date 54068 |
| | | | ValidityEndDate 54070 | | | Date 54072 |

FIG. 54-4

| Package | level1 | level2 | level3 | level4 | Level5 | Data Type Name |
| --- | --- | --- | --- | --- | --- | --- |
| | | | TaxObjectID 54074 | | | Identifier 54076 |
| | | | ContractAccountID 54078 | | | ContractAccountID 54080 |
| | | | RegistrationStatus-Code 54082 | | | Code 54084 |
| | | | RegistrationStatus-Name 54086 | | | MEDIUM_Name 54088 |
| | | | ContactPartyID 54090 | | | PartyInternalID 54092 |
| | | | ElectronicFiling-Code 54094 | | | Code 54096 |

FIG. 54-5

| Package | level1 | level2 | level3 | level4 | Level5 | Data Type Name |
|---|---|---|---|---|---|---|
| | | | EmailReminderIndicator 54098 | | | Indicator 54100 |
| FilingObligation 54102 | | | FilingObligation 54104 | | | TxOblgnFilngOblgn 54106 |
| | | | | @actionCode 54108 | | ActionCode 54110 |
| | | | | InboundCorrespondenceCategoryCode 54112 | | Code 54114 |
| | | | | InboundCorrespondenceCategoryName 54116 | | MEDIUM_Name 54118 |

FIG. 54-6

| Package | level1 | level2 | level3 | level4 | Level5 | Data Type Name |
|---|---|---|---|---|---|---|
| | | | | BillingPeriodID 54120 | | BillingPeriodID 54122 |
| | | | | BillingPeriodName 54124 | | MEDIUM_Name 54126 |
| | | | | BillingStartDate 54128 | | Date 54130 |
| | | | | CorrespondenceS-tatusCode 54132 | | Code 54134 |
| | | | | CorrespondenceS-tatusName 54136 | | MEDIUM_Name 54138 |
| | | | | InboundCorrespon-denceDueDate 54140 | | Date 54142 |

FIG. 54-7

| Package | level1 | level2 | level3 | level4 | Level5 | Data Type Name |
|---|---|---|---|---|---|---|
| | | | | InboundCorrespondenceReceived-Date 54144 | | Date 54146 |
| | | | | InboundCorrespondenceDeferralDate 54148 | | Date 54150 |
| | | | | BillingEndDate 54152 | | Date 54154 |
| | | | | ClearingReason-Code 54156 | | Code 54158 |
| | | | | ClearingReason-Name 54160 | | MEDIUM_Name 54162 |

FIG. 54-8

| Package | level1 | level2 | level3 | level4 | Level5 | Data Type Name |
|---|---|---|---|---|---|---|
| | | | | Amount 54164 | | Amount 54166 |
| | | | | CurrencyCode 54168 | | CurrencyCode 54170 |
| | | | | CurrencyName 54172 | | MEDIUM_Name 54174 |
| | | | | Corresponding-TaxReturnID 54176 | | Identifier 54178 |
| FilingRule 54180 | | | FilingRule 54182 | | | TxOblgnFilngRule 54184 |
| | | | | @deviatingPeriodListCompleteTrans-missionIndicator 54186 | | Indicator 54188 |

FIG. 54-9

| Package | level1 | level2 | level3 | level4 | Level5 | Data Type Name |
|---|---|---|---|---|---|---|
| | | | | @standardPeriodListCompleteTransmissionIndicator 54190 | | Indicator 54192 |
| | | | | @actionCode 54194 | | ActionCode 54196 |
| | | | | InboundCorrespondenceCategoryCode 54198 | | Code 54200 |
| | | | | InboundCorrespondenceFirstBillingPeriodID 54202 | | BillingPeriodID 54204 |
| | | | | GenerationStatusCode 54206 | | Code 54208 |

FIG. 54-10

| Package | level1 | level2 | level3 | level4 | Level5 | Data Type Name |
|---|---|---|---|---|---|---|
| | | | | GenerationStatus-Name 54210 | | MEDIUM_Name 54212 |
| | | | | InboundCorrespon-denceLastBillingPe-riodID 54214 | | BillingPeriodID 54216 |
| Periodicity 54218 | | | | DeviatingPeriod 54220 | | TxOblgnFilngRule-DevtngPer 54222 |
| | | | | | @actionCode 54224 | ActionCode 54226 |
| | | | | | StartDate 54228 | Date 54230 |
| | | | | | EndDate 54232 | Date 54234 |

FIG. 54-11

| Package | level1 | level2 | level3 | level4 | Level5 | Data Type Name |
|---|---|---|---|---|---|---|
| | | | | | DueDate 54236 | Date 54238 |
| | | | | | BillingPeriodID 54240 | BillingPeriodID 54242 |
| | | | | | BillingPeriod-Name 54244 | MEDIUM_Name 54246 |
| | | | | StandardPeriod 54248 | | TxOblgnFilngRul-eStdrdPer 54250 |
| | | | | | @actionCode 54252 | ActionCode 54254 |
| | | | | | StartDate 54256 | Date 54258 |

FIG. 54-12

| Package | level1 | level2 | level3 | level4 | Level5 | Data Type Name |
|---|---|---|---|---|---|---|
| | | | | | EndDate 54260 | Date 54262 |
| | | | | | DueDate 54264 | Date 54266 |
| | | | | | BillingPeriodID 54268 | BillingPeriodID 54270 |
| | | | | | BillingPeriod-Name 54272 | MEDIUM_Name 54274 |
| FilingExemp-tion 54276 | | | FilingExemption 54278 | | | TxOblgnFilngExmp 54280 |
| | | | | @actionCode 54282 | | ActionCode 54284 |

FIG. 54-13

| Package | level1 | level2 | level3 | level4 | Level5 | Data Type Name |
|---|---|---|---|---|---|---|
| | | | | StartDay 54286 | | DayOfMonth 54288 |
| | | | | StartMonth 54290 | | Month 54292 |
| | | | | EndDay 54294 | | DayOfMonth 54296 |
| | | | | EndMonth 54298 | | Month 54300 |
| Invoicing-Terms 54302 | | | InvoicingTerms 54304 | | | TxOblgnInvcgTrms 54306 |
| | | | | ContractAccount-ContractReferen-ceID 54308 | | Numeric 54310 |

FIG. 54-14

| Package | level1 | level2 | level3 | level4 | Level5 | Data Type Name |
|---|---|---|---|---|---|---|
| | | | | ChargePercent 54312 | | Percent 54314 |
| Registra-tionForm 54316 | | | RegistrationForm 54318 | | | TxOblgnRegistnForm 54320 |
| | | | | @actionCode 54322 | | ActionCode 54324 |
| | | | | FormTemplateID 54326 | | Identifier 54328 |
| | | | | FormVersionID 54330 | | Identifier 54332 |
| | | | | FormStatusCode 54334 | | Code 54336 |

FIG. 54-15

| Package | level1 | level2 | level3 | level4 | Level5 | Data Type Name |
|---|---|---|---|---|---|---|
| Property-Valuation 54338 | | | | PropertyValuation 54340 | | TxOblgnReg-istnFormProptyValn 54342 |
| | | | | | PropertyValuation 54344 | PropertyValuation 54346 |
| Processing-Conditions 54348 | | QueryProcess-ingConditions 54350 | | | | QueryProcessing-Conditions 54352 |
| | | ResponseProc-essingConditions 54354 | | | | ResponseProcess-ingConditions 54356 |
| Log 54358 | | Log 54360 | | | | Log 54362 |

FIG. 55-1

| Package | level1 | level2 | level3 | level4 | level5 | Cardinality |
|---|---|---|---|---|---|---|
| TaxObligation-ERPChangeRequestMessage_Sync 55000 | TaxObligation-ERPChangeRequestMessage_Sync 55002 | | | | | |
| MessageHeader 55004 | | Message-Header 55006 | | | | 1 55008 |
| TaxObligation 55010 | | TaxObligation 55012 | | | | 1 55014 |
| | | | @filingRuleListCompleteTransmissionIndicator 55016 | | | 1 55018 |
| | | | @filingExemptionListCompleteTransmissionIndicator 55020 | | | 1 55022 |

FIG. 55-2

| Package | level1 | level2 | level3 | level4 | level5 | Cardinality |
|---|---|---|---|---|---|---|
| | | | @registrationFormListCompleteTransmissionIndicator 55024 | | | 1 55026 |
| | | | TaxObligationID 55028 | | | 1 55030 |
| | | | RegistrationStatusName 55032 | | | 0..1 55034 |
| | | | ContactPartyID 55036 | | | 0..n 55038 |
| | | | ElectronicFilingCode 55040 | | | 0..1 55042 |
| | | | EmailReminderIndicator 55044 | | | 0..1 55046 |

FIG. 55-3

| Package | level1 | level2 | level3 | level4 | level5 | Cardinality |
|---|---|---|---|---|---|---|
| FilingRule 55048 | | | FilingRule 55050 | | | 0..n 55052 |
| | | | | @deviatingPeriodListCompleteTransmissionIndicator 55054 | | 1 55056 |
| | | | | @actionCode 55058 | | 1 55060 |
| | | | | InboundCorrespondence-CategoryCode 55062 | | 1 55064 |
| | | | | InboundCorrespondence-FirstBillingPeriodID 55066 | | 1 55068 |
| | | | | GenerationStatusCode 55070 | | 0..1 55072 |

FIG. 55-4

| Package | level1 | level2 | level3 | level4 | level5 | Cardinality |
|---|---|---|---|---|---|---|
| | | | | InboundCorrespondence-LastBillingPeriodID 55074 | | 0..1 55076 |
| Periodicity 55078 | | | | DeviatingPeriod 55080 | | 0..n 55082 |
| | | | | | @actionCode 55084 | 1 55086 |
| | | | | | StartDate 55088 | 1 55090 |
| | | | | | EndDate 55092 | 0..1 55094 |
| | | | | | DueDate 55096 | 0..1 55098 |

FIG. 55-5

| Package | level1 | level2 | level3 | level4 | level5 | Cardinality |
|---|---|---|---|---|---|---|
| | | | | | BillingPerio-dID 55100 | 1 55102 |
| FilingExemp-tion 55104 | | | FilingExemption 55106 | | | 0..n 55108 |
| | | | | @actionCode 55110 | | 1 55112 |
| | | | | StartDay 55114 | | 1 55116 |
| | | | | StartMonth 55118 | | 1 55120 |
| | | | | EndDay 55122 | | 1 55124 |

FIG. 55-6

| Package | level1 | level2 | level3 | level4 | level5 | Cardinality |
|---|---|---|---|---|---|---|
| | | | | EndMonth 55126 | | 1 55128 |
| InvoicingTerms 55130 | | | InvoicingTerms 55132 | | | 0..1 55134 |
| | | | | ContractAccountContrac-tReferenceID 55136 | | 0..1 55138 |
| | | | | ChargePercent 55140 | | 1 55142 |
| Registration-Form 55144 | | | RegistrationForm 55146 | | | 0..n 55148 |
| | | | | @actionCode 55150 | | 1 55152 |

FIG. 55-7

| Package | level1 | level2 | level3 | level4 | level5 | Cardinality |
|---|---|---|---|---|---|---|
| | | | | FormTemplateID 55154 | | 1 55156 |
| | | | | FormVersionID 55158 | | 1 55160 |
| | | | | FormStatusCode 55162 | | 0..1 55164 |
| Property-Valuation 55166 | | | | PropertyValuation 55168 | | 1..n 55170 |
| | | | | | Property-Valuation 55172 | 0..1 55174 |

FIG. 56-1

| Package | level1 | level2 | level3 | level4 | level5 | Cardinality |
|---|---|---|---|---|---|---|
| TaxObligation-ERPChangeConfirmationMessage_Sync 56000 | TaxObligation-ERPChange-Confirmation-Message_Sync 56002 | | | | | |
| Message-Header 56004 | | MessageHeader 56006 | | | | 1 56008 |
| TaxObligation 56010 | | TaxObligation 56012 | | | | 0..1 56014 |
| | | | TaxObligationID 56016 | | | 1 56018 |
| | | | TaxPayerPartyID 56020 | | | 1 56022 |
| | | | LevyTypeCode 56024 | | | 1 56026 |

FIG. 56-2

| Package | level1 | level2 | level3 | level4 | level5 | Cardinality |
|---|---|---|---|---|---|---|
| | | | LevyTypeName 56028 | | | 0..1 56030 |
| | | | StartBillingPeriodID 56032 | | | 1 56034 |
| | | | StartBillingPeriodName 56036 | | | 0..1 56038 |
| | | | EndBillingPeriodID 56040 | | | 0..1 56042 |
| | | | EndBillingPeriodName 56044 | | | 0..1 56046 |
| | | | ValidityStartDate 56048 | | | 0..1 56050 |

FIG. 56-3

| Package | level1 | level2 | level3 | level4 | level5 | Cardinality |
|---|---|---|---|---|---|---|
| | | | ValidityEndDate 56052 | | | 0..1 56054 |
| | | | ContractAccountID 56056 | | | 1 56058 |
| | | | RegistrationStatusCode 56060 | | | 1 56062 |
| | | | RegistrationStatusName 56064 | | | 0..1 56066 |
| | | | ContactPartyID 56068 | | | 0..n 56070 |
| | | | ElectronicFilingCode 56072 | | | 0..1 56074 |

FIG. 56-4

| Package | level1 | level2 | level3 | level4 | level5 | Cardinality |
|---|---|---|---|---|---|---|
| | | | EmailReminderIndicator 56076 | | | 1 56078 |
| FilingRule 56080 | | | FilingRule 56082 | | | 0..n 56084 |
| | | | | InboundCorrespondence-CategoryCode 56086 | | 1 56088 |
| | | | | InboundCorrespondence-FirstBillingPeriodID 56090 | | 1 56092 |
| | | | | GenerationStatusCode 56094 | | 1 56096 |
| | | | | GenerationStatusName 56098 | | 0..1 56100 |

FIG. 56-5

| Package | level1 | level2 | level3 | level4 | level5 | Cardinality |
|---|---|---|---|---|---|---|
| | | | | InboundCorrespondence-LastBillingPeriodID 56102 | | 0..1 56104 |
| Periodicity 56106 | | | | DeviatingPeriod 56108 | | 0..n 56110 |
| | | | | | StartDate 56112 | 1 56114 |
| | | | | | EndDate 56116 | 1 56118 |
| | | | | | DueDate 56120 | 0..1 56122 |
| | | | | | BillingPeriodID 56124 | 1 56126 |

FIG. 56-6

| Package | level1 | level2 | level3 | level4 | level5 | Cardinality |
|---|---|---|---|---|---|---|
| | | | | | BillingPeriod-Name 56128 | 0..1 56130 |
| | | | | StandardPeriod 56132 | | 1..n 56134 |
| | | | | | StartDate 56136 | 1 56138 |
| | | | | | EndDate 56140 | 1 56142 |
| | | | | | DueDate 56144 | 0..1 56146 |
| | | | | | BillingPeriodID 56148 | 1 56150 |

FIG. 56-7

| Package | level1 | level2 | level3 | level4 | level5 | Cardinality |
|---|---|---|---|---|---|---|
| | | | | | BillingPeriod-Name 56152 | 0..1 56154 |
| FilingExemp-tion 56156 | | | FilingExemption 56158 | | | 0..n 56160 |
| | | | | StartDay 56162 | | 1 56164 |
| | | | | StartMonth 56166 | | 1 56168 |
| | | | | EndDay 56170 | | 1 56172 |
| | | | | EndMonth 56174 | | 1 56176 |

FIG. 56-8

| Package | level1 | level2 | level3 | level4 | level5 | Cardinality |
|---|---|---|---|---|---|---|
| Invoicing-Terms 56178 | | | InvoicingTerms 56180 | | | 1 56182 |
| | | | | ContractAccountContract-ReferenceID 56184 | | 0..1 56186 |
| | | | | ChargePercent 56188 | | 1 56190 |
| Registration-Form 56192 | | | RegistrationForm 56194 | | | 0..n 56196 |
| | | | | FormTemplateID 56198 | | 1 56200 |
| | | | | FormVersionID 56202 | | 1 56204 |

FIG. 56-9

| Package | level1 | level2 | level3 | level4 | level5 | Cardinality |
|---|---|---|---|---|---|---|
| | | | | FormStatusCode 56206 | | 0..1 56208 |
| Property-Valuation 56210 | | | | PropertyValuation 56212 | | 1..n 56214 |
| | | | | | PropertyValua-tion 56216 | 0..1 56218 |
| Log 56220 | | Log 56222 | | | | 1 56224 |

FIG. 57-1

| Package | level1 | level2 | level3 | level4 | level5 | Cardinality |
|---|---|---|---|---|---|---|
| TaxObligationERPFilingObligationChangeRequestMessage_Sync 57000 | | TaxObligationERPFilingObligationChangeRequestMessage_Sync 57002 | | | | |
| MessageHeader 57004 | | | MessageHeader 57006 | | | 1 57008 |
| TaxObligation 57010 | | | TaxObligation 57012 | | | 1 57014 |
| | | | | @filingObligationListCompleteTransmissionIndicator 57016 | | 1 57018 |
| | | | | TaxObligationID 57020 | | 1 57022 |

FIG. 57-2

| Package | level1 | level2 | level3 | level4 | level5 | Cardinality |
|---|---|---|---|---|---|---|
| FilingObligation 57024 | | | | FilingObligation 57026 | | 0..n 57028 |
| | | | | | @actionCode 57030 | 1 57032 |
| | | | | | InboundCorrespondenceCategoryCode 57034 | 1 57036 |
| | | | | | BillingPeriodID 57038 | 1 57040 |
| | | | | | BillingStartDate 57042 | 1 57044 |
| | | | | | CorrespondenceStatusCode 57046 | 0..1 57048 |
| | | | | | InboundCorrespondenceDueDate 57050 | 0..1 57052 |

FIG. 57-3

| Package | level1 | level2 | level3 | level4 | level5 | Cardinality |
|---|---|---|---|---|---|---|
| | | | | | InboundCorrespondenceReceivedDate 57054 | 0..1 57056 |
| | | | | | InboundCorrespondenceDeferralDate 57058 | 0..1 57060 |
| | | | | | ClearingReasonCode 57062 | 0..1 57064 |
| | | | | | Amount 57066 | 0..1 57068 |
| | | | | | CurrencyCode 57070 | 0..1 57072 |
| | | | | | CorrespondingTaxReturnID 57074 | 0..1 57076 |

FIG. 58-1

| Package | level1 | level2 | level3 | level4 | level5 | Cardinality |
|---|---|---|---|---|---|---|
| TaxObligation-ERPFilingObligationChangeConfirmationMessage_Sync 58000 | TaxObligationERPFilingObligationChangeConfirmationMessage_Sync 58002 | | | | | |
| MessageHeader 58004 | | | MessageHeader 58006 | | | 1 58008 |
| TaxObligation 58010 | | | TaxObligation 58012 | | | 0..1 58014 |
| | | | | TaxObligationID 58016 | | 1 58018 |
| | | | | TaxPayerPartyID 58020 | | 1 58022 |

FIG. 58-2

| Package | level1 | level2 | level3 | level4 | level5 | Cardinality |
|---|---|---|---|---|---|---|
| | | | | LevyTypeCode 58024 | | 1 58026 |
| | | | | LevyTypeName 58028 | | 0..1 58030 |
| | | | | StartBillingPeriodID 58032 | | 1 58034 |
| | | | | StartBillingPeriodName 58036 | | 0..1 58038 |
| | | | | EndBillingPeriodID 58040 | | 0..1 58042 |
| | | | | EndBillingPeriodName 58044 | | 0..1 58046 |

FIG. 58-3

| Package | level1 | level2 | level3 | level4 | level5 | Cardinality |
|---|---|---|---|---|---|---|
| FilingObligation 58048 | | | | FilingObligation 58050 | | 0..n 58052 |
| | | | | | InboundCorrespondenceCategoryCode 58054 | 1 58056 |
| | | | | | InboundCorrespondenceCategoryName 58058 | 0..1 58060 |
| | | | | | BillingPeriodID 58062 | 1 58064 |
| | | | | | BillingPeriodName 58066 | 0..1 58068 |
| | | | | | BillingStartDate 58070 | 1 58072 |

FIG. 58-4

| Package | level1 | level2 | level3 | level4 | level5 | Cardinality |
|---|---|---|---|---|---|---|
| | | | | | CorrespondenceStatusCode 58074 | 0..1 58076 |
| | | | | | CorrespondenceStatusName 58078 | 0..1 58080 |
| | | | | | InboundCorrespondenceDueDate 58082 | 1 58084 |
| | | | | | InboundCorrespondenceReceivedDate 58086 | 0..1 58088 |
| | | | | | InboundCorrespondenceDeferralDate 58090 | 0..1 58092 |
| | | | | | BillingEndDate 58094 | 0..1 58096 |
| | | | | | ClearingReasonCode 58098 | 0..1 58100 |

FIG. 58-5

| Package | level1 | level2 | level3 | level4 | level5 | Cardinality |
|---|---|---|---|---|---|---|
| | | | | | ClearingReasonName 58102 | 0..1 58104 |
| | | | | | Amount 58106 | 1 58108 |
| | | | | | CurrencyCode 58110 | 1 58112 |
| | | | | | CurrencyName 58114 | 0..1 58116 |
| | | | | | CorrespondingTaxReturnID 58118 | 0..1 58120 |
| Log 58122 | | | Log 58124 | | | 1 58126 |

FIG. 59-1

| Package | level1 | level2 | level3 | level4 | level5 | Cardinality |
|---|---|---|---|---|---|---|
| TaxObligation-ERPCheckQue-ryMessage_Sync 59000 | TaxObligation-ERPCheckQue-ryMessage_Sync 59002 | | | | | |
| Message-Header 59004 | | Message-Header 59006 | | | | 1 59008 |
| TaxObligation 59010 | | TaxObligation 59012 | | | | 1 59014 |
| | | | TaxObligationID 59016 | | | 0..1 59018 |
| | | | TaxPayerPartyID 59020 | | | 0..1 59022 |
| | | | LevyTypeCode 59024 | | | 0..1 59026 |

FIG. 59-2

| Package | level1 | level2 | level3 | level4 | level5 | Cardinality |
|---|---|---|---|---|---|---|
| | | | StartBillingPeriodID 59028 | | | 0..1 59030 |
| | | | EndBillingPeriodID 59032 | | | 0..1 59034 |
| | | | TaxObjectID 59036 | | | 0..1 59038 |
| | | | ContractAccountID 59040 | | | 0..1 59042 |
| | | | RegistrationStatusCode 59044 | | | 0..1 59046 |
| | | | ContactPartyID 59048 | | | 0..n 59050 |

FIG. 59-3

| Package | level1 | level2 | level3 | level4 | level5 | Cardinality |
|---|---|---|---|---|---|---|
| | | | ElectronicFilingCode 59052 | | | 0..1 59054 |
| | | | EmailReminderIndicator 59056 | | | 0..1 59058 |
| FilingRule 59060 | | | FilingRule 59062 | | | 0..n 59064 |
| | | | | InboundCorrespondence-CategoryCode 59066 | | 1 59068 |
| | | | | InboundCorrespondence-FirstBillingPeriodID 59070 | | 1 59072 |
| | | | | GenerationStatusCode 59074 | | 0..1 59076 |

FIG. 59-4

| Package | level1 | level2 | level3 | level4 | level5 | Cardinality |
|---|---|---|---|---|---|---|
| | | | | InboundCorrespondence-LastBillingPeriodID 59078 | | 0..1 59080 |
| Periodicity 59082 | | | | DeviatingPeriod 59084 | | 0..n 59086 |
| | | | | | StartDate 59088 | 1 59090 |
| | | | | | EndDate 59092 | 0..1 59094 |
| | | | | | DueDate 59096 | 0..1 59098 |
| | | | | | BillingPe-riodID 59100 | 1 59102 |

FIG. 59-5

| Package | level1 | level2 | level3 | level4 | level5 | Cardinality |
|---|---|---|---|---|---|---|
| FilingExemp-tion 59104 | | | FilingExemption 59106 | | | 0..n 59108 |
| | | | | StartDay 59110 | | 1 59112 |
| | | | | StartMonth 59114 | | 1 59116 |
| | | | | EndDay 59118 | | 1 59120 |
| | | | | EndMonth 59122 | | 1 59124 |
| Invoicing-Terms 59126 | | | InvoicingTerms 59128 | | | 0..1 59130 |

FIG. 59-6

| Package | level1 | level2 | level3 | level4 | level5 | Cardinality |
|---|---|---|---|---|---|---|
| | | | | ContractAccountContractReferenceID 59132 | | 0..1 59134 |
| | | | | ChargePercent 59136 | | 1 59138 |
| Registration-Form 59140 | | | RegistrationForm 59142 | | | 0..n 59144 |
| | | | | FormTemplateID 59146 | | 1 59148 |
| | | | | FormVersionID 59150 | | 1 59152 |
| | | | | FormStatusCode 59154 | | 0..1 59156 |

FIG. 59-7

| Package | level1 | level2 | level3 | level4 | level5 | Cardinality |
|---|---|---|---|---|---|---|
| Property-Valuation 59158 | | | | PropertyValuation 59160 | | 1..n 59162 |
| | | | | | Property-Valuation 59164 | 0..1 59166 |

FIG. 60-1

| Package | level1 | level2 | level3 | level4 | level5 | Cardinality |
|---|---|---|---|---|---|---|
| TaxObligation-ERPCheckResponseMessage 60000 | TaxObligation-ERPCheckResponseMessage 60002 | | | | | |
| MessageHeader 60004 | | MessageHeader 60006 | | | | 1 60008 |
| TaxObligation 60010 | | TaxObligation 60012 | | | | 0..1 60014 |
| | | | TaxObligationID 60016 | | | 0..1 60018 |
| | | | TaxPayerPartyID 60020 | | | 1 60022 |
| | | | LevyTypeCode 60024 | | | 1 60026 |

FIG. 60-2

| Package | level1 | level2 | level3 | level4 | level5 | Cardinality |
|---|---|---|---|---|---|---|
| | | | LevyTypeName 60028 | | | 0..1 60030 |
| | | | StartBillingPeriodID 60032 | | | 1 60034 |
| | | | StartBillingPeriodName 60036 | | | 0..1 60038 |
| | | | EndBillingPeriodID 60040 | | | 0..1 60042 |
| | | | EndBillingPeriodName 60044 | | | 0..1 60046 |
| | | | ValidityStartDate 60048 | | | 0..1 60050 |

FIG. 60-3

| Package | level1 | level2 | level3 | level4 | level5 | Cardinality |
|---|---|---|---|---|---|---|
| | | | ValidityEndDate 60052 | | | 0..1 60054 |
| | | | ContractAccountID 60056 | | | 1 60058 |
| | | | RegistrationStatusCode 60060 | | | 0..1 60062 |
| | | | RegistrationStatusName 60064 | | | 0..1 60066 |
| | | | ContactPartyID 60068 | | | 0..n 60070 |
| | | | ElectronicFilingCode 60072 | | | 0..1 60074 |

FIG. 60-4

| Package | level1 | level2 | level3 | level4 | level5 | Cardinality |
|---|---|---|---|---|---|---|
| | | | EmailReminderIndicator 60076 | | | 1 60078 |
| FilingRule 60080 | | | FilingRule 60082 | | | 0..n 60084 |
| | | | | InboundCorrespondenceCategoryCode 60086 | | 1 60088 |
| | | | | InboundCorrespondenceFirstBillingPeriodID 60090 | | 1 60092 |
| | | | | GenerationStatusCode 60094 | | 1 60096 |
| | | | | GenerationStatusName 60098 | | 0..1 60100 |

FIG. 60-5

| Package | level1 | level2 | level3 | level4 | level5 | Cardinality |
|---|---|---|---|---|---|---|
| | | | | InboundCorrespondence-LastBillingPeriodID 60102 | | 0..1 60104 |
| Periodicity 60106 | | | | DeviatingPeriod 60108 | | 0..n 60110 |
| | | | | | StartDate 60112 | 1 60114 |
| | | | | | EndDate 60116 | 1 60118 |
| | | | | | DueDate 60120 | 0..1 60122 |
| | | | | | BillingPeriodID 60124 | 1 60126 |

FIG. 60-6

| Package | level1 | level2 | level3 | level4 | level5 | Cardinality |
|---|---|---|---|---|---|---|
| | | | | | BillingPeriod-Name 60128 | 0..1 60130 |
| | | | | StandardPeriod 60132 | | 0..n 60134 |
| | | | | | StartDate 60136 | 1 60138 |
| | | | | | EndDate 60140 | 1 60142 |
| | | | | | DueDate 60144 | 0..1 60146 |
| | | | | | BillingPeriodID 60148 | 1 60150 |

FIG. 60-7

| Package | level1 | level2 | level3 | level4 | level5 | Cardinality |
|---|---|---|---|---|---|---|
| | | | | | BillingPeriod-Name 60152 | 0..1 60154 |
| FilingExemp-tion 60156 | | | FilingExemption 60158 | | | 0..n 60160 |
| | | | | StartDay 60162 | | 1 60164 |
| | | | | StartMonth 60166 | | 1 60168 |
| | | | | EndDay 60170 | | 1 60172 |
| | | | | EndMonth 60174 | | 1 60176 |

FIG. 60-8

| Package | level1 | level2 | level3 | level4 | level5 | Cardinality |
|---|---|---|---|---|---|---|
| InvoicingTerms 60178 | | | InvoicingTerms 60180 | | | 1 60182 |
| | | | | ContractAccountContrac-tReferenceID 60184 | | 0..1 60186 |
| | | | | ChargePercent 60188 | | 1 60190 |
| Registration-Form 60192 | | | RegistrationForm 60194 | | | 0..n 60196 |
| | | | | FormTemplateID 60198 | | 1 60200 |
| | | | | FormVersionID 60202 | | 1 60204 |

FIG. 60-9

| Package | level1 | level2 | level3 | level4 | level5 | Cardinality |
|---|---|---|---|---|---|---|
| | | | | FormStatusCode 60206 | | 0..1 60208 |
| Property-Valuation 60210 | | | | PropertyValuation 60212 | | 1..n 60214 |
| | | | | | PropertyValua-tion 60216 | 0..1 60218 |
| Log 60220 | | Log 60222 | | | | 1 60224 |

FIG. 61-1

| Package | level1 | level2 | level3 | level4 | Cardinality |
|---|---|---|---|---|---|
| TaxObligation-ERPFilingObligationCheckQuery-Message_Sync 61000 | TaxObligationERPFilingObligationCheckQueryMessage_Sync 61002 | | | | |
| MessageHeader 61004 | | MessageHeader 61006 | | | 1 61008 |
| TaxObligation 61010 | | TaxObligation 61012 | | | 1 61014 |
| | | | TaxObligationID 61016 | | 1 61018 |
| FilingObligation 61020 | | | FilingObligation 61022 | | 0..n 61024 |

FIG. 61-2

| Package | level1 | level2 | level3 | level4 | Cardinality |
|---|---|---|---|---|---|
| | | | | InboundCorrespondenceCategoryCode 61026 | 1 61028 |
| | | | | BillingPeriodID 61030 | 1 61032 |
| | | | | BillingStartDate 61034 | 1 61036 |
| | | | | CorrespondenceStatusCode 61038 | 0..1 61040 |
| | | | | InboundCorrespondenceDueDate 61042 | 0..1 61044 |
| | | | | InboundCorrespondenceReceivedDate 61046 | 0..1 61048 |

FIG. 61-3

| Package | level1 | level2 | level3 | level4 | Cardinality |
|---|---|---|---|---|---|
| | | | | InboundCorrespondenceDeferralDate 61050 | 0..1 61052 |
| | | | | ClearingReasonCode 61054 | 0..1 61056 |
| | | | | Amount 61058 | 0..1 61060 |
| | | | | CurrencyCode 61062 | 0..1 61064 |
| | | | | CorrespondingTaxReturnID 61066 | 0..1 61068 |

FIG. 62-1

| Package | level1 | level2 | level3 | level4 | level5 | Cardinality |
|---|---|---|---|---|---|---|
| TaxObligation-ERPFilingObligationCheckResponseMessage_Sync 62000 | | TaxObligationERPFilingObligationCheckResponseMessage_Sync 62002 | | | | |
| MessageHeader 62004 | | | MessageHeader 62006 | | | 1 62008 |
| TaxObligation 62010 | | | TaxObligation 62012 | | | 0..1 62014 |
| | | | | TaxObligationID 62016 | | 1 62018 |
| | | | | TaxPayerPartyID 62020 | | 1 62022 |

FIG. 62-2

| Package | level1 | level2 | level3 | level4 | level5 | Cardinality |
|---|---|---|---|---|---|---|
| | | | | LevyTypeCode 62024 | | 1 62026 |
| | | | | LevyTypeName 62028 | | 0..1 62030 |
| | | | | StartBillingPeriodID 62032 | | 1 62034 |
| | | | | StartBillingPeriodName 62036 | | 0..1 62038 |
| | | | | EndBillingPeriodID 62040 | | 0..1 62042 |
| | | | | EndBillingPeriodName 62044 | | 0..1 62046 |

FIG. 62-3

| Package | level1 | level2 | level3 | level4 | level5 | Cardinality |
|---|---|---|---|---|---|---|
| FilingObligation 62048 | | | | FilingObligation 62050 | | 0..n 62052 |
| | | | | | InboundCorrespondenceCategoryCode 62054 | 1 62056 |
| | | | | | InboundCorrespondenceCategoryName 62058 | 0..1 62060 |
| | | | | | BillingPeriodID 62062 | 1 62064 |
| | | | | | BillingPeriodName 62066 | 0..1 62068 |
| | | | | | BillingStartDate 62070 | 1 62072 |

FIG. 62-4

| Package | level1 | level2 | level3 | level4 | level5 | Cardinality |
|---|---|---|---|---|---|---|
| | | | | | CorrespondenceStatusCode 62074 | 0..1 62076 |
| | | | | | CorrespondenceStatusName 62078 | 0..1 62080 |
| | | | | | InboundCorrespondenceDueDate 62082 | 1 62084 |
| | | | | | InboundCorrespondenceReceivedDate 62086 | 0..1 62088 |
| | | | | | InboundCorrespondenceDeferralDate 62090 | 0..1 62092 |
| | | | | | BillingEndDate 62094 | 0..1 62096 |

FIG. 62-5

| Package | level1 | level2 | level3 | level4 | level5 | Cardinality |
|---|---|---|---|---|---|---|
| | | | | | ClearingReasonCode 62098 | 0..1 62100 |
| | | | | | ClearingReasonName 62102 | 0..1 62104 |
| | | | | | Amount 62106 | 1 62108 |
| | | | | | CurrencyCode 62110 | 1 62112 |
| | | | | | CurrencyName 62114 | 0..1 62116 |
| | | | | | CorrespondingTaxReturnID 62118 | 0..1 62120 |
| Log 62122 | | | Log 62124 | | | 1 62126 |

FIG. 63-1

| Package | level1 | level2 | level3 | level4 | level5 | Cardinality |
|---|---|---|---|---|---|---|
| TaxObligation-ERPCreateRe-questMes-sage_Sync 63000 | TaxObligation-ERPCreateRe-questMes-sage_Sync 63002 | | | | | |
| MessageHeader 63004 | | Message-Header 63006 | | | | 1 63008 |
| TaxObligation 63010 | | TaxObligation 63012 | | | | 1 63014 |
| | | | TaxPayerPartyID 63016 | | | 1 63018 |
| | | | LevyTypeCode 63020 | | | 1 63022 |
| | | | StartBillingPeriodID 63024 | | | 1 63026 |

FIG. 63-2

| Package | level1 | level2 | level3 | level4 | level5 | Cardinality |
|---|---|---|---|---|---|---|
| | | | EndBillingPeriodID 63028 | | | 0..1 63030 |
| | | | TaxObjectID 63032 | | | 0..1 63034 |
| | | | ContractAccountID 63036 | | | 0..1 63038 |
| | | | ContactPartyID 63040 | | | 0..n 63042 |
| | | | ElectronicFilingCode 63044 | | | 0..1 63046 |
| | | | EmailReminderIndicator 63048 | | | 0..1 63050 |

FIG. 63-3

| Package | level1 | level2 | level3 | level4 | level5 | Cardinality |
|---|---|---|---|---|---|---|
| FilingRule 63052 | | | FilingRule 63054 | | | 0..n 63056 |
| | | | | InboundCorrespondence-CategoryCode 63058 | | 1 63060 |
| | | | | InboundCorrespondence-FirstBillingPeriodID 63062 | | 1 63064 |
| | | | | GenerationStatusCode 63066 | | 1 63068 |
| | | | | InboundCorrespondence-LastBillingPeriodID 63070 | | 0..1 63072 |
| Periodicity 63074 | | | | DeviatingPeriod 63076 | | 0..n 63078 |

FIG. 63-4

| Package | level1 | level2 | level3 | level4 | level5 | Cardinality |
|---|---|---|---|---|---|---|
| | | | | | StartDate 63080 | 1 63082 |
| | | | | | EndDate 63084 | 0..1 63086 |
| | | | | | DueDate 63088 | 0..1 63090 |
| | | | | | BillingPeriodID 63092 | 1 63094 |
| FilingExemption 63096 | | | FilingExemption 63098 | | | 0..n 63100 |
| | | | | StartDay 63102 | | 1 63104 |

FIG. 63-5

| Package | level1 | level2 | level3 | level4 | level5 | Cardinality |
|---|---|---|---|---|---|---|
| | | | | StartMonth 63106 | | 1 63108 |
| | | | | EndDay 63110 | | 1 63112 |
| | | | | EndMonth 63114 | | 1 63116 |
| InvoicingTerms 63118 | | | InvoicingTerms 63120 | | | 1 63122 |
| | | | | ContractAccountContrac-tReferenceID 63124 | | 0..1 63126 |
| | | | | ChargePercent 63128 | | 1 63130 |

FIG. 63-6

| Package | level1 | level2 | level3 | level4 | level5 | Cardinality |
|---|---|---|---|---|---|---|
| Registration-Form 63132 | | | RegistrationForm 63134 | | | 0..n 63136 |
| | | | | FormTemplateID 63138 | | 1 63140 |
| | | | | FormVersionID 63142 | | 1 63144 |
| | | | | FormStatusCode 63146 | | 0..1 63148 |
| Property-Valuation 63150 | | | | PropertyValuation 63152 | | 1..n 63154 |
| | | | | | PropertyValua-tion 63156 | 0..1 63158 |

FIG. 64-1

| Package | level1 | level2 | level3 | level4 | level5 | Cardinality |
|---|---|---|---|---|---|---|
| TaxObligation-ERPCreateCon-firmationMes-sage_Sync 64000 | TaxObligation-ERPCreate-Confirmation-Message_Sync 64002 | | | | | |
| Message-Header 64004 | | Message-Header 64006 | | | | 1 64008 |
| TaxObligation 64010 | | TaxObligation 64012 | | | | 1 64014 |
| | | | TaxObligationID 64016 | | | 1 64018 |
| | | | TaxPayerPartyID 64020 | | | 1 64022 |
| | | | LevyTypeCode 64024 | | | 1 64026 |

FIG. 64-2

| Package | level1 | level2 | level3 | level4 | level5 | Cardinality |
|---|---|---|---|---|---|---|
| | | | LevyTypeName 64028 | | | 0..1 64030 |
| | | | StartBillingPeriodID 64032 | | | 1 64034 |
| | | | StartBillingPeriodName 64036 | | | 0..1 64038 |
| | | | EndBillingPeriodID 64040 | | | 0..1 64042 |
| | | | EndBillingPeriodName 64044 | | | 0..1 64046 |
| | | | ValidityStartDate 64048 | | | 0..1 64050 |

FIG. 64-3

| Package | level1 | level2 | level3 | level4 | level5 | Cardinality |
|---|---|---|---|---|---|---|
| | | | ValidityEndDate 64052 | | | 0..1 64054 |
| | | | ContractAccountID 64056 | | | 1 64058 |
| | | | RegistrationStatusCode 64060 | | | 1 64062 |
| | | | RegistrationStatusName 64064 | | | 0..1 64066 |
| | | | ContactPartyID 64068 | | | 0..n 64070 |
| | | | ElectronicFilingCode 64072 | | | 0..1 64074 |

FIG. 64-4

| Package | level1 | level2 | level3 | level4 | level5 | Cardinality |
|---|---|---|---|---|---|---|
| | | | EmailReminderIndicator 64076 | | | 1 64078 |
| FilingRule 64080 | | | FilingRule 64082 | | | 0..n 64084 |
| | | | | InboundCorrespondenceCategoryCode 64086 | | 1 64088 |
| | | | | InboundCorrespondenceFirstBillingPeriodID 64090 | | 1 64092 |
| | | | | GenerationStatusCode 64094 | | 1 64096 |
| | | | | GenerationStatusName 64098 | | 0..1 64100 |

FIG. 64-5

| Package | level1 | level2 | level3 | level4 | level5 | Cardinality |
|---|---|---|---|---|---|---|
| | | | | InboundCorrespondence-LastBillingPeriodID 64102 | | 0..1 64104 |
| Periodicity 64106 | | | | DeviatingPeriod 64108 | | 0..n 64110 |
| | | | | | StartDate 64112 | 1 64114 |
| | | | | | EndDate 64116 | 1 64118 |
| | | | | | DueDate 64120 | 0..1 64122 |
| | | | | | BillingPeriodID 64124 | 1 64126 |

FIG. 64-6

| Package | level1 | level2 | level3 | level4 | level5 | Cardinality |
|---|---|---|---|---|---|---|
| | | | | | BillingPeriodName 64128 | 0..1 64130 |
| | | | | StandardPeriod 64132 | | 1..n 64134 |
| | | | | | StartDate 64136 | 1 64138 |
| | | | | | EndDate 64140 | 1 64142 |
| | | | | | DueDate 64144 | 0..1 64146 |
| | | | | | BillingPeriodID 64148 | 1 64150 |

FIG. 64-7

| Package | level1 | level2 | level3 | level4 | level5 | Cardinality |
|---|---|---|---|---|---|---|
| | | | | | BillingPeriodName 64152 | 0..1 64154 |
| FilingExemption 64156 | | | FilingExemption 64158 | | | 0..n 64160 |
| | | | | StartDay 64162 | | 1 64164 |
| | | | | StartMonth 64166 | | 1 64168 |
| | | | | EndDay 64170 | | 1 64172 |
| | | | | EndMonth 64174 | | 1 64176 |

FIG. 64-8

| Package | level1 | level2 | level3 | level4 | level5 | Cardinality |
|---|---|---|---|---|---|---|
| Invoicing-Terms 64178 | | | InvoicingTerms 64180 | | | 1 64182 |
| | | | | ContractAccountContrac-tReferenceID 64184 | | 0..1 64186 |
| | | | | ChargePercent 64188 | | 1 64190 |
| Registration-Form 64192 | | | RegistrationForm 64194 | | | 0..n 64196 |
| | | | | FormTemplateID 64198 | | 1 64200 |
| | | | | FormVersionID 64202 | | 1 64204 |

FIG. 64-9

| Package | level1 | level2 | level3 | level4 | level5 | Cardinality |
|---|---|---|---|---|---|---|
| | | | | FormStatusCode 64206 | | 0..1 64208 |
| Property-Valuation 64210 | | | | PropertyValuation 64212 | | 1..n 64214 |
| | | | | | PropertyValuation 64216 | 0..1 64218 |
| Log 64220 | | Log 64222 | | | | 1 64224 |

FIG. 65-1

| Package | level1 | level2 | level3 | level4 | Cardinality |
|---|---|---|---|---|---|
| TaxObligationERPByBusinessPartnerQueryMessage_Sync 65000 | TaxObligationERPByBusinessPartnerQueryMessage_Sync 65002 | | | | |
| MessageHeader 65004 | | MessageHeader 65006 | | | 1 65008 |
| Selection 65010 | | Selection 65012 | | | 1 65014 |
| SelectionByTaxPayerPartyID 65016 | | | SelectionByTaxPayerPartyID 65018 | | 0..n 65020 |
| | | | | InclusionExclusionCode 65022 | 1 65024 |

FIG. 65-2

| Package | level1 | level2 | level3 | level4 | Cardinality |
|---|---|---|---|---|---|
| | | | | IntervalBoundaryTypeCode 65026 | 1 65028 |
| | | | | LowerBoundaryTaxPayerPartyID 65030 | 0..1 65032 |
| | | | | UpperBoundaryTaxPayerPartyID 65034 | 0..1 65036 |
| ProcessingConditions 65038 | | QueryProcess-ingConditions 65040 | | | 0..1 65042 |

FIG. 66-1

| Package | Level1 | level2 | level3 | Level4 | Cardinality |
|---|---|---|---|---|---|
| TaxObligationERPByBusinessPartnerResponseMessage_Sync 66000 | TaxObligationERPByBusinessPartnerResponseMessage_Sync 66002 | | | | |
| MessageHeader 66004 | | MessageHeader 66006 | | | 1 66008 |
| TaxObligation 66010 | | TaxObligation 66012 | | | 0..n 66014 |
| | | | TaxObligationID 66016 | | 1 66018 |
| | | | TaxPayerPartyID 66020 | | 1 66022 |

FIG. 66-2

| Package | Level1 | level2 | level3 | Level4 | Cardinality |
|---|---|---|---|---|---|
| | | | LevyTypeCode 66024 | | 1 66026 |
| | | | LevyTypeName 66028 | | 0..1 66030 |
| | | | StartBillingPeriodID 66032 | | 1 66034 |
| | | | StartBillingPeriodName 66036 | | 0..1 66038 |
| | | | EndBillingPeriodID 66040 | | 0..1 66042 |
| | | | EndBillingPeriodName 66044 | | 0..1 66046 |

FIG. 66-3

| Package | Level1 | level2 | level3 | Level4 | Cardinality |
|---|---|---|---|---|---|
| | | | ValidityStartDate 66048 | | 0..1 66050 |
| | | | ValidityEndDate 66052 | | 0..1 66054 |
| | | | ContractAccountID 66056 | | 1 66058 |
| | | | RegistrationStatusCode 66060 | | 1 66062 |
| | | | RegistrationStatusName 66064 | | 0..1 66066 |
| | | | ContactPartyID 66068 | | 0..n 70070 |

FIG. 66-4

| Package | Level1 | level2 | level3 | Level4 | Cardinality |
|---|---|---|---|---|---|
| | | | ElectronicFilingCode 66072 | | 0..1 66074 |
| | | | EmailReminderIndicator 66076 | | 1 66078 |
| FilingObligation 66080 | | | FilingObligation 66082 | | 0..n 66084 |
| | | | | FilingObligationUUID 66086 | 1 66088 |
| | | | | InboundCorrespondenceCategory-Code 66090 | 1 66092 |
| | | | | InboundCorrespondenceCategory-Name 66094 | 0..1 66096 |

FIG. 66-5

| Package | Level1 | level2 | level3 | Level4 | Cardinality |
|---|---|---|---|---|---|
| | | | | BillingPeriodID 66098 | 1 66100 |
| | | | | BillingPeriodName 66102 | 0..1 66104 |
| | | | | BillingStartDate 66106 | 1 66108 |
| | | | | CorrespondenceStatusCode 66110 | 0..1 66112 |
| | | | | CorrespondenceStatusName 66114 | 0..1 66116 |
| | | | | InboundCorrespondenceDueDate 66118 | 1 66120 |

FIG. 66-6

| Package | Level1 | level2 | level3 | Level4 | Cardinality |
|---|---|---|---|---|---|
| | | | | InboundCorrespondenceReceived-Date 66122 | 0..1 66124 |
| | | | | InboundCorrespondenceDeferralDate 66126 | 0..1 66128 |
| | | | | BillingEndDate 66130 | 1 66132 |
| | | | | ClearingReasonCode 66134 | 0..1 66136 |
| | | | | ClearingReasonName 66138 | 0..1 66140 |
| | | | | LeadingObjectID 66142 | 0..1 66144 |

FIG. 66-7

| Package | Level1 | level2 | level3 | Level4 | Cardinality |
|---|---|---|---|---|---|
| | | | | ConsolidationStatusCode 66146 | 0..1 66148 |
| | | | | ConsolidationStatusName 66150 | 0..1 66152 |
| | | | | Amount 66154 | 0..1 66156 |
| | | | | CurrencyCode 66158 | 0..1 66160 |
| | | | | CurrencyName 66162 | 0..1 66164 |
| FilingExemption 66166 | | | FilingExemption 66168 | | 0..n 66170 |

FIG. 66-8

| Package | Level1 | level2 | level3 | Level4 | Cardinality |
|---|---|---|---|---|---|
| | | | | StartDay 66172 | 1 66174 |
| | | | | StartMonth 66176 | 1 66178 |
| | | | | EndDay 66180 | 1 66182 |
| | | | | EndMonth 66184 | 1 66186 |
| ProcessingConditions 66188 | | Response-Processing-Conditions 66190 | | | 1 66192 |
| Log 66194 | | Log 66196 | | | 1 66198 |

FIG. 67-1

| Package | level1 | level2 | level3 | Level4 | Cardinality |
|---|---|---|---|---|---|
| TaxObligationER-PLevyTypeByBusiness-PartnerQueryMes-sage_Sync 67000 | TaxObligation-ERPLevyType-ByBusiness-PartnerQuery-Message_Sync 67002 | | | | |
| MessageHeader 67004 | | MessageHeader 67006 | | | 1 67008 |
| Selection 67010 | | TaxObligationLevyTypeSe-lectionByBusinessPartner 67012 | | | 1 67014 |
| SelectionByTax-PayerPartyID 67016 | | | SelectionByTax-PayerPartyID 67018 | | 0..n 67020 |

FIG. 67-2

| Package | level1 | level2 | level3 | Level4 | Cardinality |
|---|---|---|---|---|---|
| | | | | InclusionExclusionCode 67022 | 1 67024 |
| | | | | IntervalBoundaryTypeCode 67026 | 1 67028 |
| | | | | LowerBoundaryTaxPayer-PartyID 67030 | 0..1 67032 |
| | | | | UpperBoundaryTaxPayer-PartyID 67034 | 0..1 67036 |
| ProcessingConditions 67038 | | QueryProcessingConditions 67040 | | | 0..1 67042 |

FIG. 68-1

| Package | level1 | level2 | level3 | Cardinality |
|---|---|---|---|---|
| TaxObligationERPLevyTypeByBusinessPartnerResponseMessage_Sync 68000 | TaxObligationERPLevyTypeByBusinessPartnerResponseMessage_Sync 68002 | | | |
| MessageHeader 68004 | | MessageHeader 68006 | | 1 68008 |
| TaxObligation 68010 | | TaxObligation 68012 | | 0..n 68014 |
| | | | TaxObligationID 68016 | 1 68018 |
| | | | TaxPayerPartyID 68020 | 1 68022 |
| | | | LevyTypeCode 68024 | 1 68026 |

FIG. 68-2

| Package | level1 | level2 | level3 | Cardinality |
|---|---|---|---|---|
| | | | LevyTypeName 68028 | 0..1 68030 |
| | | | StartBillingPeriodID 68032 | 1 68034 |
| | | | StartBillingPeriodName 68036 | 0..1 68038 |
| Processing-Conditions 68040 | | ResponseProc-essingConditions 68042 | | 1 68044 |
| Log 68046 | | Log 68048 | | 1 68050 |

FIG. 69

| Package | level1 | level2 | level3 | Cardinality |
|---|---|---|---|---|
| TaxObligationERPRegistrationFormByIdQueryMessage_Sync 69000 | TaxObligationERPRegistrationFormByIdQueryMessage_Sync 69002 | | | |
| MessageHeader 69004 | | MessageHeader 69006 | | 1 69008 |
| Selection 69010 | | TaxObligationRegistrationFormSelectionById 69012 | | 1 69014 |
| | | | TaxObligationID 69016 | 1 69018 |

FIG. 70-1

| Package | level1 | level2 | level3 | level4 | level5 | level6 | Cardinality |
|---|---|---|---|---|---|---|---|
| TaxObligationER-PRegistration-FormByIdResponseMessage_Sync 70000 | TaxObligationER-PRegistration-FormByIdResponseMessage_Sync 70002 | | | | | | |
| MessageHeader 70004 | | | Message-Header 70006 | | | | 1 70008 |
| TaxObligation 70010 | | | TaxObligation 70012 | | | | 0..1 70014 |
| | | | | TaxObligationID 70016 | | | 1 70018 |
| | | | | TaxPayerPartyID 70020 | | | 1 70022 |
| | | | | LevyTypeCode 70024 | | | 1 70026 |

FIG. 70-2

| Package | level1 | level2 | level3 | level4 | level5 | level6 | Cardinality |
|---|---|---|---|---|---|---|---|
| | | | | LevyTypeName 70028 | | | 0..1 70030 |
| | | | | StartBillingPeriodID 70032 | | | 1 70034 |
| | | | | StartBillingPeriodName 70036 | | | 0..1 70038 |
| Registration-Form 70040 | | | | RegistrationForm 70042 | | | 0..n 70044 |
| | | | | | FormTemplateID 70046 | | 1 70048 |
| | | | | | FormVersionID 70050 | | 1 70052 |

FIG. 70-3

| Package | level1 | level2 | level3 | level4 | level5 | level6 | Cardinality |
|---|---|---|---|---|---|---|---|
| | | | | | FormStatusCode 70054 | | 0..1 70056 |
| Property-Valuation 70058 | | | | | PropertyValuation 70060 | | 0..1 70062 |
| | | | | | | Property-Valuation 70064 | 0..1 70066 |
| Log 70068 | | | Log 70070 | | | | 1 70072 |

FIG. 71

| Package | level1 | level2 | level3 | Cardinality |
|---|---|---|---|---|
| TaxObligationERPFilingObligationByIdQueryMessage_Sync 71000 | TaxObligationERPFilingObligationByIdQueryMessage_Sync 71002 | | | |
| MessageHeader 71004 | | MessageHeader 71006 | | 1 71008 |
| Selection 71010 | | TaxObligationFilingObligationById 71012 | | 1 71014 |
| | | | TaxObligationID 71016 | 1 71018 |

FIG. 72-1

| Package | level1 | level2 | level3 | level4 | level5 | Cardinality |
|---|---|---|---|---|---|---|
| TaxObligation-ERPFilingObligationByIdResponseMessage_Sync 72000 | TaxObligation-ERPFilingObligationByIdResponseMessage_Sync 72002 | | | | | |
| Message-Header 72004 | | | MessageHeader 72006 | | | 1 72008 |
| TaxObligation 72010 | | | TaxObligation 72012 | | | 0..1 72014 |
| | | | | TaxObligationID 72016 | | 1 72018 |
| | | | | LevyTypeCode 72020 | | 1 72022 |

FIG. 72-2

| Package | level1 | level2 | level3 | level4 | level5 | Cardinality |
| --- | --- | --- | --- | --- | --- | --- |
| | | | | LevyTypeName 72024 | | 0..1 72026 |
| | | | | StartBillingPeriodID 72028 | | 1 72030 |
| | | | | StartBillingPeriodName 72032 | | 0..1 72034 |
| FilingObliga-tion 72036 | | | | FilingObligation 72038 | | 0..n 72040 |
| | | | | | FilingObligationUUID 72042 | 0..1 72044 |
| | | | | | InboundCorrespon-denceCategoryCode 72046 | 0..1 72048 |

FIG. 72-3

| Package | level1 | level2 | level3 | level4 | level5 | Cardinality |
|---|---|---|---|---|---|---|
| | | | | | InboundCorrespon-denceCategoryName 72050 | 0..1 72052 |
| | | | | | BillingPeriodID 72054 | 0..1 72056 |
| | | | | | BillingPeriodName 72058 | 0..1 72060 |
| | | | | | BillingStartDate 72062 | 0..1 72064 |
| | | | | | CorrespondenceS-tatusCode 72066 | 0..1 72068 |
| | | | | | CorrespondenceS-tatusName 72070 | 0..1 72072 |

FIG. 72-4

| Package | level1 | level2 | level3 | level4 | level5 | Cardinality |
|---|---|---|---|---|---|---|
| | | | | | InboundCorrespondenceDueDate 72074 | 1 72076 |
| | | | | | InboundCorrespondenceReceivedDate 72078 | 0..1 72080 |
| | | | | | InboundCorrespondenceDeferralDate 72082 | 0..1 72084 |
| | | | | | BillingEndDate 72086 | 0..1 72088 |
| | | | | | ClearingReasonCode 72090 | 0..1 72092 |
| | | | | | ClearingReasonName 72094 | 0..1 72096 |

FIG. 72-5

| Package | level1 | level2 | level3 | level4 | level5 | Cardinality |
|---|---|---|---|---|---|---|
| | | | | | Amount 72098 | 1 72100 |
| | | | | | CurrencyCode 72102 | 1 72104 |
| | | | | | CurrencyName 72106 | 0..1 72108 |
| Log 72110 | | | Log 72112 | | | 1 72114 |

FIG. 73

| Package | level1 | level2 | level3 | Cardinality |
|---|---|---|---|---|
| TaxObligationERPByIdQuery-Message_Sync 73000 | TaxObligationERPByIdQuery-Message_Sync 73002 | | | |
| MessageHeader 73004 | | MessageHeader 73006 | | 1 73008 |
| Selection 73010 | | TaxObligationSelectionById 73012 | | 1 73014 |
| | | | TaxObligationID 73016 | 1 73018 |

FIG. 74-1

| Package | level1 | level2 | level3 | level4 | level5 | Cardinality |
|---|---|---|---|---|---|---|
| TaxObligation-ERPByIdResponseMessage_Sync 74000 | TaxObligationERPByIdResponseMessage_Sync 74002 | | | | | |
| MessageHeader 74004 | | MessageHeader 74006 | | | | 1 74008 |
| TaxObligation 74010 | | TaxObligation 74012 | | | | 0..1 74014 |
| | | | TaxObligationID 74016 | | | 1 74018 |
| | | | TaxPayerPartyID 74020 | | | 1 74022 |

FIG. 74-2

| Package | level1 | level2 | level3 | level4 | level5 | Cardinality |
|---|---|---|---|---|---|---|
| | | | LevyTypeCode 74024 | | | 1 74026 |
| | | | LevyTypeName 74028 | | | 0..1 74030 |
| | | | ContractAccountID 74032 | | | 1 74034 |
| | | | RegistrationStatus-Code 74036 | | | 1 74038 |
| | | | RegistrationStatus-Name 74040 | | | 0..1 74042 |
| | | | StartBillingPeriodID 74044 | | | 1 74046 |

FIG. 74-3

| Package | level1 | level2 | level3 | level4 | level5 | Cardinality |
|---|---|---|---|---|---|---|
| | | | StartBillingPeriod-Name 74048 | | | 0..1 74050 |
| | | | EndBillingPeriodID 74052 | | | 0..1 74054 |
| | | | EndBillingPeriod-Name 74056 | | | 0..1 74058 |
| | | | ValidityStartDate 74060 | | | 0..1 74062 |
| | | | ValidityEndDate 74064 | | | 0..1 74066 |
| | | | ContactPartyID 74068 | | | 0..n 74070 |

FIG. 74-4

| Package | level1 | level2 | level3 | level4 | level5 | Cardinality |
|---|---|---|---|---|---|---|
| | | | ElectronicFiling-Code 74072 | | | 0..1 74074 |
| | | | EmailReminderIndi-cator 74076 | | | 1 74078 |
| FilingObligation 74080 | | | FilingObligation 74082 | | | 0..n 74084 |
| | | | | FilingObligationUUID 74086 | | 1 74088 |
| | | | | InboundCorrespondenceCate-goryCode 74090 | | 1 74092 |
| | | | | InboundCorrespondenceCate-goryName 74094 | | 0..1 74096 |

FIG. 74-5

| Package | level1 | level2 | level3 | level4 | level5 | Cardinality |
|---|---|---|---|---|---|---|
| | | | | BillingPeriodID 74098 | | 1 74100 |
| | | | | BillingPeriodName 74102 | | 0..1 74104 |
| | | | | BillingStartDate 74106 | | 1 74108 |
| | | | | CorrespondenceStatusCode 74110 | | 0..1 74112 |
| | | | | CorrespondenceStatusName 74114 | | 0..1 74116 |
| | | | | InboundCorrespondenceDueDate 74118 | | 1 74120 |

FIG. 74-6

| Package | level1 | level2 | level3 | level4 | level5 | Cardinality |
|---|---|---|---|---|---|---|
| | | | | InboundCorrespondenceReceivedDate 74122 | | 0..1 74124 |
| | | | | InboundCorrespondenceDeferralDate 74126 | | 0..1 74128 |
| | | | | BillingEndDate 74130 | | 1 74132 |
| | | | | ClearingReasonCode 74134 | | 0..1 74136 |
| | | | | ClearingReasonName 74138 | | 0..1 74140 |
| | | | | Amount 74142 | | 0..1 74144 |

FIG. 74-7

| Package | level1 | level2 | level3 | level4 | level5 | Cardinality |
|---|---|---|---|---|---|---|
| | | | | CurrencyCode 74146 | | 0..1 74148 |
| | | | | CurrencyName 74150 | | 0..1 74152 |
| FilingRule 74154 | | | FilingRule 74156 | | | 0..n 74158 |
| | | | | InboundCorrespondenceCategoryCode 74160 | | 1 74162 |
| | | | | InboundCorrespondenceFirstBillingPeriodID 74164 | | 1 74166 |
| | | | | GenerationMode 74168 | | 1 74170 |

FIG. 74-8

| Package | level1 | level2 | level3 | level4 | level5 | Cardinality |
|---|---|---|---|---|---|---|
| | | | | InboundCorrespondenceLastBillingPeriodID 74172 | | 0..1 74174 |
| Periodicity 74176 | | | | DeviatingPeriod 74178 | | 0..n 74180 |
| | | | | | StartDate 74182 | 1 74184 |
| | | | | | EndDate 74186 | 1 74188 |
| | | | | | DueDate 74190 | 0..1 74192 |
| | | | | | BillingPeriodID 74194 | 1 74196 |

FIG. 74-9

| Package | level1 | level2 | level3 | level4 | level5 | Cardinality |
|---|---|---|---|---|---|---|
| | | | | | BillingPeriodName 74198 | 0..1 74200 |
| | | | | StandardPeriod 74202 | | 1..n 74204 |
| | | | | | StartDate 74206 | 1 74208 |
| | | | | | EndDate 74210 | 1 74212 |
| | | | | | DueDate 74214 | 0..1 74216 |
| | | | | | BillingPeriodID 74218 | 1 74220 |

FIG. 74-10

| Package | level1 | level2 | level3 | level4 | level5 | Cardinality |
|---|---|---|---|---|---|---|
| | | | | | BillingPeriodName 74222 | 0..1 74224 |
| FilingExemption 74226 | | | FilingExemption 74228 | | | 0..n 74230 |
| | | | | StartDay 74232 | | 1 74234 |
| | | | | StartMonth 74236 | | 1 74238 |
| | | | | EndDay 74240 | | 1 74242 |
| | | | | EndMonth 74244 | | 1 74246 |

FIG. 74-11

| Package | level1 | level2 | level3 | level4 | level5 | Cardinality |
|---|---|---|---|---|---|---|
| InvoicingTerms 74248 | | | InvoicingTerms 74250 | | | 1 74252 |
| | | | | ContractAccountContractReferen-ceID 74254 | | 0..1 74256 |
| | | | | ChargePercent 74258 | | 1 74260 |
| Registration-Form 74262 | | | RegistrationForm 74264 | | | 0..n 74266 |
| | | | | FormTemplateID 74268 | | 1 74270 |
| | | | | FormVersionID 74272 | | 1 74274 |

FIG. 74-12

| Package | level1 | level2 | level3 | level4 | level5 | Cardinality |
|---|---|---|---|---|---|---|
| | | | | FormStatus 74276 | | 0..1 74278 |
| Property-Valuation 74280 | | | | PropertyValuation 74282 | | 1..n 74284 |
| | | | | | PropertyValuation 74286 | 0..1 74288 |
| Log 74290 | | Log 74292 | | | | 1 74294 |

FIG. 76-1

| Package | level1 | level2 | level3 | level4 | Level5 | Data Type Name |
|---|---|---|---|---|---|---|
| TaxReturnERP-Message_Sync 76000 | TaxRe-turnERP-Mes-sage_Sync 76002 | | | | | TxRtrnERPMsg 76004 |
| Message-Header 76006 | | Message-Header 76008 | | | | BasicBusinessDocument-MessageHeader 76010 |
| TaxReturn 76012 | | TaxReturn 76014 | | | | TxRtrn 76016 |
| | | | @formListCom-pleteTransmis-sionIndicator 76018 | | | Indicator 76020 |
| | | | TaxReturnID 76022 | | | Identifier 76024 |

FIG. 76-2

| Package | level1 | level2 | level3 | level4 | Level5 | Data Type Name |
|---|---|---|---|---|---|---|
| | | | LevyTypeCode 76026 | | | Code 76028 |
| | | | LevyType-CodeName 76030 | | | MEDIUM_Name 76032 |
| | | | ContractAc-countID 76034 | | | ContractAccountID 76036 |
| | | | PeriodAssign-mentCode 76038 | | | Code 76040 |
| | | | PeriodAssign-mentCode-Name 76042 | | | MEDIUM_Name 76044 |

FIG. 76-3

| Package | level1 | level2 | level3 | level4 | Level5 | Data Type Name |
|---|---|---|---|---|---|---|
| | | | TaxObligationID 76046 | | | Identifier 76048 |
| | | | TaxAmount 76050 | | | Amount 76052 |
| | | | InterestAmount 76054 | | | Amount 76056 |
| | | | AdditionalRe-ceivable-sAmount 76058 | | | Amount 76060 |
| | | | SystemStatus 76062 | | | |
| | | | | Code 76064 | | Code 76066 |

FIG. 76-4

| Package | level1 | level2 | level3 | level4 | Level5 | Data Type Name |
|---|---|---|---|---|---|---|
| | | | | CodeName 76068 | | MEDIUM_Name 76070 |
| | | | | InactiveIndicator 76072 | | Indicator 76074 |
| | | | | ChangeTime-Point 76076 | | LOCALOFFSET_DateTime 76078 |
| | | | | ProcessorParty-InternalID 76080 | | PartyInternalID 76082 |
| | | | UserStatus 76084 | | | |
| | | | | Code 76086 | | Code 76088 |

FIG. 76-5

| Package | level1 | level2 | level3 | level4 | Level5 | Data Type Name |
|---|---|---|---|---|---|---|
| | | | | Name 76090 | | MEDIUM_Name 76092 |
| | | | DraftIndicator 76094 | | | Indicator 76096 |
| Form 76098 | | | Form 76100 | | | TxRtrnForm 76102 |
| | | | | @propertyGroupListCompleteTransmissionIndicator 76104 | | Indicator 76106 |
| | | | | @actionCode 76108 | | ActionCode 76110 |
| | | | | FormUUID 76112 | | UUID 76114 |

FIG. 76-6

| Package | level1 | level2 | level3 | level4 | Level5 | Data Type Name |
|---|---|---|---|---|---|---|
| | | | | VersionID 76116 | | VersionID 76118 |
| | | | | FormTemplateID 76120 | | InternalServiceRequest-TemplateID 76122 |
| | | | | FormTem-plateName 76124 | | MEDIUM_Name 76126 |
| | | | | FormTypeCode 76128 | | Code 76130 |
| | | | | FormTypeCode-Name 76132 | | MEDIUM_Name 76134 |
| Property-Valuation 76136 | | | | PropertyValua-tion 76138 | | TxRtrnFormPrptyValn 76140 |

FIG. 76-7

| Package | level1 | level2 | level3 | level4 | Level5 | Data Type Name |
|---|---|---|---|---|---|---|
| | | | | | PropertyValuation 76142 | PropertyValuation 76144 |
| TaxPayer 76146 | | | TaxPayer 76148 | | | TxRtrnTxPyr 76150 |
| | | | | TaxPayerPartyID 76152 | | PartyInternalID 76154 |
| | | | | Identification 76156 | | TxRtrnTxPyrId 76158 |
| | | | | | PartyIdentifier-TypeCode 76160 | PartyIdentifierTypeCode 76162 |
| | | | | | PartyIdentifierID 76164 | PartyID 76166 |

FIG. 76-8

| Package | level1 | level2 | level3 | level4 | Level5 | Data Type Name |
|---|---|---|---|---|---|---|
| | | | | | IdentifierIssuin-gAgencyName 76168 | LANGUAGEINDEPENDENT_MEDIUM_Name 76170 |
| | | | | | EntryDate 76172 | Date 76174 |
| | | | | | AreaOfValidity-CountryCode 76176 | CountryCode 76178 |
| | | | | | AreaOfValidityRe-gionCode 76180 | RegionCode 76182 |
| | | | | | ValidityPeriod 76184 | CLOSED_DatePeriod 76186 |
| TaxPreparer 76188 | | | TaxPreparer 76190 | | | TxRtrnTxPrpr 76192 |

FIG. 76-9

| Package | level1 | level2 | level3 | level4 | Level5 | Data Type Name |
|---|---|---|---|---|---|---|
| | | | | TaxPreparer-PartyID 76194 | | PartyInternalID 76196 |
| | | | | Identification 76198 | | TxRtrnTxPrprId 76200 |
| | | | | | PartyIdentifier-TypeCode 76202 | PartyIdentifierTypeCode 76204 |
| | | | | | PartyIdentifierID 76206 | PartyID 76208 |
| | | | | | IdentifierIssuin-gAgencyName 76210 | LANGUAGEINDEPENDENT_MEDIUM_Name 76212 |
| | | | | | EntryDate 76214 | Date 76216 |

FIG. 76-10

| Package | level1 | level2 | level3 | level4 | Level5 | Data Type Name |
|---|---|---|---|---|---|---|
| | | | | | AreaOfValidity-CountryCode 76218 | CountryCode 76220 |
| | | | | | AreaOfValidityRe-gionCode 76222 | RegionCode 76224 |
| | | | | | ValidityPeriod 76226 | CLOSED_DatePeriod 76228 |
| JointFiler 76230 | | | JointFiler 76232 | | | |
| | | | | JointFilerPartyID 76234 | | PartyInternalID 76236 |
| | | | | Identification 76238 | | |

FIG. 76-11

| Package | level1 | level2 | level3 | level4 | Level5 | Data Type Name |
|---|---|---|---|---|---|---|
| | | | | | PartyIdentifier-TypeCode 76240 | PartyIdentifierTypeCode 76242 |
| | | | | | PartyIdentifierID 76244 | PartyID 76246 |
| | | | | | IdentifierIssuin-gAgencyName 76248 | LANGUAGEINDEPENDENT_MEDIUM_Name 76250 |
| | | | | | EntryDate 76252 | Date 76254 |
| | | | | | AreaOfValidity-CountryCode 76256 | CountryCode 76258 |
| | | | | | AreaOfValidityRe-gionCode 76260 | RegionCode 76262 |

FIG. 76-12

| Package | level1 | level2 | level3 | level4 | Level5 | Data Type Name |
|---|---|---|---|---|---|---|
| | | | | | ValidityPeriod 76264 | CLOSED_DatePeriod 76266 |
| Processing-Conditions 76268 | | QueryProcess-ingConditions 76270 | | | | QueryProcessingConditions 76272 |
| | | Response-Processing-Conditions 76274 | | | | ResponseProcessingCondi-tions 76276 |
| Log 76278 | | Log 76280 | | | | Log 76282 |

FIG. 77-1

| Package | level1 | level2 | level3 | level4 | Cardinality |
|---|---|---|---|---|---|
| TaxReturnERPByBusinessPartnerQueryMessage_Sync 77000 | TaxReturnERPByBusinessPartnerQueryMessage_Sync 77002 | | | | |
| MessageHeader 77004 | | MessageHeader 77006 | | | 1 77008 |
| Selection 77010 | | TaxReturnSelectionByBusinessPartnerID 77012 | | | 1 77014 |
| SelectionByTaxPayerPartyID 77016 | | | SelectionByTaxPayerPartyID 77018 | | 0..n 77020 |

FIG. 77-2

| Package | level1 | level2 | level3 | level4 | Cardinality |
|---|---|---|---|---|---|
| | | | | InclusionExclusionCode 77022 | 1 77024 |
| | | | | IntervalBoundaryTypeCode 77026 | 1 77028 |
| | | | | LowerBoundaryTaxPayerPartyID 77030 | 0..1 77032 |
| | | | | UpperBoundaryTaxPayerPartyID 77034 | 0..1 77036 |
| SelectionByTaxPayerParty-IdentifierID 77038 | | | SelectionByTaxPayerParty-IdentifierID 77040 | | 0..n 77042 |
| | | | | InclusionExclusionCode 77044 | 1 77046 |

FIG. 77-3

| Package | level1 | level2 | level3 | level4 | Cardinality |
|---|---|---|---|---|---|
| | | | | IntervalBoundaryTypeCode 77048 | 1 77050 |
| | | | | LowerBoundaryPartyIdentifierID 77052 | 0..1 77054 |
| | | | | UpperBoundaryPartyIdentifierID 77056 | 0..1 77058 |
| | | | | PartyIdentifierTypeCode 77060 | 1 77062 |
| SelectionByTaxPreparer-PartyID 77064 | | | SelectionByTaxPreparer-PartyID 77066 | | 0..n 77068 |
| | | | | InclusionExclusionCode 77070 | 1 77072 |

FIG. 77-4

| Package | level1 | level2 | level3 | level4 | Cardinality |
|---|---|---|---|---|---|
| | | | | IntervalBoundaryTypeCode 77074 | 1 77076 |
| | | | | LowerBoundaryTaxPreparerPartyID 77078 | 0..1 77080 |
| | | | | UpperBoundaryTaxPreparerPartyID 77082 | 0..1 77084 |
| SelectionByTaxPreparer-PartyIdentifierID 77086 | | | SelectionByTaxPreparer-PartyIdentifierID 77088 | | 0..n 77090 |
| | | | | InclusionExclusionCode 77092 | 1 77094 |
| | | | | IntervalBoundaryTypeCode 77096 | 1 77098 |

FIG. 77-5

| Package | level1 | level2 | level3 | level4 | Cardinality |
|---|---|---|---|---|---|
| | | | | LowerBoundaryPartyIdentifierID 77100 | 0..1 77102 |
| | | | | UpperBoundaryPartyIdentifierID 77104 | 0..1 77106 |
| | | | | PartyIdentifierTypeCode 77108 | 1 77110 |
| SelectionByJointFiler-PartyID 77112 | | | SelectionByJointFiler-PartyID 77114 | | 0..n 77116 |
| | | | | InclusionExclusionCode 77118 | 1 77120 |
| | | | | IntervalBoundaryTypeCode 77122 | 1 77124 |

FIG. 77-6

| Package | level1 | level2 | level3 | level4 | Cardinality |
|---|---|---|---|---|---|
| | | | | LowerBoundaryJointFilerPartyID 77126 | 0..1 77128 |
| | | | | UpperBoundaryJointFilerPartyID 77130 | 0..1 77132 |
| SelectionByJointFilerParty-IdentifierID 77134 | | | SelectionByJointFilerParty-IdentifierID 77136 | | 0..n 77138 |
| | | | | InclusionExclusionCode 77140 | 1 77142 |
| | | | | IntervalBoundaryTypeCode 77144 | 1 77146 |
| | | | | LowerBoundaryPartyIdentifierID 77148 | 0..1 77150 |

FIG. 77-7

| Package | level1 | level2 | level3 | level4 | Cardinality |
|---|---|---|---|---|---|
| | | | | UpperBoundaryPartyIdentifierID 77152 | 0..1 77154 |
| | | | | PartyIdentifierTypeCode 77156 | 1 77158 |
| SelectionByBillingPeriodID 77160 | | | SelectionByBillingPeriodID 77162 | | 0..n 77164 |
| | | | | InclusionExclusionCode 77166 | 1 77168 |
| | | | | IntervalBoundaryTypeCode 77170 | 1 77172 |
| | | | | LowerBoundaryBillingPeriodID 77174 | 0..1 77176 |

FIG. 77-8

| Package | level1 | level2 | level3 | level4 | Cardinality |
|---|---|---|---|---|---|
| | | | | UpperBoundaryBillingPeriodID 77178 | 0..1 77180 |
| SelectionByLevyTypeCode 77182 | | | SelectionByLevyTypeCode 77184 | | 0..n 77186 |
| | | | | InclusionExclusionCode 77188 | 1 77190 |
| | | | | IntervalBoundaryTypeCode 77192 | 1 77194 |
| | | | | LowerBoundaryLevyTypeCode 77196 | 0..1 77198 |
| | | | | UpperBoundaryLevyTypeCodeID 77200 | 0..1 77202 |

FIG. 77-9

| Package | level1 | level2 | level3 | level4 | Cardinality |
|---|---|---|---|---|---|
| SelectionByDate 77204 | | | SelectionByDate 77206 | | 0..1 77208 |
| | | | | LowerBoundaryDate 77210 | 1 77212 |
| | | | | UpperBoundaryDate 77214 | 0..1 77216 |
| ProcessingConditions 77218 | | QueryProcessingConditions 77220 | | | 0..1 77222 |

FIG. 78-1

| Package | level1 | level2 | level3 | level4 | Cardinality |
|---|---|---|---|---|---|
| TaxReturnERPByBusinessPartnerResponseMessage_Sync 78000 | TaxReturnERPByBusinessPartnerResponseMessage_Sync 78002 | | | | |
| TaxReturn 78004 | | TaxReturn 78006 | | | 0..n 78008 |
| | | | TaxReturnID 78010 | | 1 78012 |
| | | | LevyTypeCode 78014 | | 1 78016 |
| | | | LevyTypeCodeName 78018 | | 0..1 78020 |
| | | | PeriodAssignmentCode 78022 | | 1 78024 |

FIG. 78-2

| Package | level1 | level2 | level3 | level4 | Cardinality |
|---|---|---|---|---|---|
| | | | PeriodAssignment-CodeName 78026 | | 0..1 78028 |
| | | | ReceiptDateTime 78030 | | 0..1 78032 |
| | | | SystemStatus 78034 | | 1..n 78036 |
| | | | | Code 78038 | 1 78040 |
| | | | | CodeName 78042 | 0..1 78044 |
| | | | | InactiveIndicator 78046 | 1 78048 |

FIG. 78-3

| Package | level1 | level2 | level3 | level4 | Cardinality |
|---|---|---|---|---|---|
| | | | | ChangeTimePoint 78050 | 1 78052 |
| | | | | ProcessorPartyInternalID 78054 | 1 78056 |
| | | | UserStatus 78058 | | 0..n 78060 |
| | | | | Code 78062 | 1 78064 |
| | | | | Name 78066 | 0..1 78068 |
| | | | DraftIndicator 78070 | | 1 78072 |
| Log 78074 | | Log 78076 | | | 1 78078 |

FIG. 79

| Package | level1 | level2 | level3 | Cardinality |
|---|---|---|---|---|
| TaxReturnERPByIdQuery-Message_Sync 79000 | TaxReturnERPByIdQuery-Message_Sync 79002 | | | |
| MessageHeader 79004 | | MessageHeader 79006 | | 1 79008 |
| Selection 79010 | | TaxReturnSelectionById 79012 | | 1 79014 |
| | | | TaxReturnID 79016 | 1 79018 |

FIG. 80-1

| Package | level1 | level2 | level3 | Level4 | Level5 | Cardinality |
|---|---|---|---|---|---|---|
| TaxReturnERPByIdResponseMessage_Sync 80000 | TaxReturnERPByIdResponseMessage_Sync 80002 | | | | | |
| TaxReturn 80004 | | TaxReturn 80006 | | | | 0..1 80008 |
| | | | TaxReturnID 80010 | | | 1 80012 |
| | | | LevyTypeCode 80014 | | | 1 80016 |
| | | | LevyTypeCodeName 80018 | | | 0..1 80020 |

FIG. 80-2

| Package | level1 | level2 | level3 | Level4 | Level5 | Cardinality |
|---|---|---|---|---|---|---|
| | | | ContractAccountID 80022 | | | 0..1 80024 |
| | | | PeriodAssignment-Code 80026 | | | 1 80028 |
| | | | PeriodAssignment-CodeName 80030 | | | 0..1 80032 |
| | | | TaxObligationID 80034 | | | 1 80036 |
| | | | SystemStatus 80038 | | | 1..n 80040 |
| | | | | Code 80042 | | 1 80044 |

FIG. 80-3

| Package | level1 | level2 | level3 | Level4 | Level5 | Cardinality |
|---|---|---|---|---|---|---|
| | | | | CodeName 80046 | | 0..1 80048 |
| | | | | InactiveIndicator 80050 | | 1 80052 |
| | | | | ChangeTimePoint 80054 | | 1 80056 |
| | | | | ProcessorPartyInternalID 80058 | | 1 80060 |
| | | | UserStatus 80062 | | | 0..n 80064 |
| | | | | Code 80066 | | 1 80068 |

FIG. 80-4

| Package | level1 | level2 | level3 | Level4 | Level5 | Cardinality |
|---|---|---|---|---|---|---|
| | | | | Name 80070 | | 0..1 80072 |
| | | | DraftIndicator 80074 | | | 1 80076 |
| Form 80078 | | | Form 80080 | | | 1..n 80082 |
| | | | | FormUUID 80084 | | 1 80086 |
| | | | | FormTemplateID 80088 | | 1 80090 |
| | | | | FormTemplateName 80092 | | 0..1 80094 |

FIG. 80-5

| Package | level1 | level2 | level3 | Level4 | Level5 | Cardinality |
|---|---|---|---|---|---|---|
| | | | | FormVersionID 80096 | | 1 80098 |
| | | | | FormTypeCode 80100 | | 1 80102 |
| | | | | FormTypeCodeName 80104 | | 0..1 80106 |
| Property-Valuation 80108 | | | | PropertyValuation 80110 | | 0..1 80112 |
| | | | | | PropertyValuation 80114 | 1..n 80116 |
| TaxPayer 80118 | | | TaxPayer 80120 | | | 1..1 80122 |

FIG. 80-6

| Package | level1 | level2 | level3 | Level4 | Level5 | Cardinality |
|---|---|---|---|---|---|---|
| | | | | TaxPayerPartyID 80124 | | 1 80126 |
| | | | | Identification 80128 | | 0..n 80130 |
| | | | | | PartyIdentifierTypeCode 80132 | 1 80134 |
| | | | | | PartyIdentifierID 80136 | 1 80138 |
| | | | | | IdentifierIssuingAgencyName 80140 | 0..1 80142 |
| | | | | | EntryDate 80144 | 0..1 80146 |

FIG. 80-7

| Package | level1 | level2 | level3 | Level4 | Level5 | Cardinality |
|---|---|---|---|---|---|---|
| | | | | | AreaOfValidityCountryCode 80148 | 0..1 80150 |
| | | | | | AreaOfValidityRegionCode 80152 | 0..1 80154 |
| | | | | | ValidityPeriod 80156 | 0..1 80158 |
| TaxPreparer 80160 | | | TaxPreparer 80162 | | | 0..1 80164 |
| | | | | TaxPreparerPartyID 80166 | | 1 80168 |
| | | | | Identification 80170 | | 0..n 80172 |

FIG. 80-8

| Package | level1 | level2 | level3 | Level4 | Level5 | Cardinality |
|---|---|---|---|---|---|---|
| | | | | | PartyIdentifierTypeCode 80174 | 1 80176 |
| | | | | | PartyIdentifierID 80178 | 1 80180 |
| | | | | | IdentifierIssuingAgencyName 80182 | 0..1 80184 |
| | | | | | EntryDate 80186 | 0..1 80188 |
| | | | | | AreaOfValidityCountryCode 80190 | 0..1 80192 |
| | | | | | AreaOfValidityRegionCode 80194 | 0..1 80196 |

FIG. 80-9

| Package | level1 | level2 | level3 | Level4 | Level5 | Cardinality |
|---|---|---|---|---|---|---|
| | | | | | ValidityPeriod 80198 | 0..1 80200 |
| JointFiler 80202 | | | JointFiler 80204 | | | 0..1 80206 |
| | | | | JointFilerPartyID 80208 | | 1 80210 |
| | | | | Identification 80212 | | 0..n 80214 |
| | | | | | PartyIdentifierTypeCode 80216 | 1 80218 |
| | | | | | PartyIdentifierID 80220 | 1 80222 |

FIG. 80-10

| Package | level1 | level2 | level3 | Level4 | Level5 | Cardinality |
|---|---|---|---|---|---|---|
| | | | | | IdentifierIssuingAgencyName 80224 | 0..1 80226 |
| | | | | | EntryDate 80228 | 0..1 80230 |
| | | | | | AreaOfValidityCountryCode 80232 | 0..1 80234 |
| | | | | | AreaOfValidityRegionCode 80236 | 0..1 80238 |
| | | | | | ValidityPeriod 80240 | 0..1 80242 |
| Log 80244 | | Log 80246 | | | | 1 80248 |

FIG. 81-1

| Package | level1 | level2 | level3 | level4 | level5 | Cardinality |
|---|---|---|---|---|---|---|
| TaxReturnERPCreateRequestMessage_Sync 81000 | TaxReturnERPCreateRequestMessage_Sync 81002 | | | | | |
| MessageHeader 81004 | | MessageHeader 81006 | | | | 1 81008 |
| TaxReturn 81010 | | TaxReturn 81012 | | | | 1 81014 |
| | | | LevyTypeCode 81016 | | | 1 81018 |
| | | | ContractAccountID 81020 | | | 0..1 81022 |
| | | | PeriodAssignmentCode 81024 | | | 1 81026 |

FIG. 81-2

| Package | level1 | level2 | level3 | level4 | level5 | Cardinality |
|---|---|---|---|---|---|---|
| | | | TaxObligationID 81028 | | | 1 81030 |
| | | | DraftIndicator 81032 | | | 0..1 81034 |
| Form 81036 | | | Form 81038 | | | 1..n 81040 |
| | | | | FormUUID 81042 | | 0..1 81044 |
| | | | | FormTemplateID 81046 | | 1 81048 |
| | | | | FormVersionID 81050 | | 1 81052 |

FIG. 81-3

| Package | level1 | level2 | level3 | level4 | level5 | Cardinality |
|---|---|---|---|---|---|---|
| PropertyValuation 81054 | | | | PropertyValuation 81056 | | 0..1 81058 |
| | | | | | Property-Valuation 81060 | 1..n 81062 |
| TaxPayer 81064 | | | TaxPayer 81066 | | | 1..1 81068 |
| | | | | TaxPayerPartyID 81070 | | 1 81072 |
| TaxPreparer 81074 | | | TaxPreparer 81076 | | | 0..1 81078 |
| | | | | TaxPreparerPartyID 81080 | | 1 81082 |

FIG. 81-4

| Package | level1 | level2 | level3 | level4 | level5 | Cardinality |
|---|---|---|---|---|---|---|
| JointFiler 81084 | | | JointFiler 81086 | | | 0..1 81088 |
| | | | | JointFilerPartyID 81090 | | 1 81092 |

FIG. 82-1

| Package | level1 | level2 | level3 | level4 | level5 | Cardinality |
|---|---|---|---|---|---|---|
| TaxReturnERPCreateConfirmationMessage_Sync 82000 | TaxReturnERPCreateConfirmationMessage_Sync 82002 | | | | | |
| MessageHeader 82004 | | MessageHeader 82006 | | | | 0..1 82008 |
| TaxReturn 82010 | | TaxReturn 82012 | | | | 1 82014 |
| | | | TaxReturnID 82016 | | | 1 82018 |
| | | | LevyTypeCode 82020 | | | 1 82022 |

FIG. 82-2

| Package | level1 | level2 | level3 | level4 | level5 | Cardinality |
|---|---|---|---|---|---|---|
| | | | LevyTypeCode-Name 82024 | | | 0..1 82026 |
| | | | ContractAccountID 82028 | | | 0..1 82030 |
| | | | PeriodAssign-mentCode 82032 | | | 1 82034 |
| | | | PeriodAssign-mentCodeName 82036 | | | 0..1 82038 |
| | | | TaxObligationID 82040 | | | 1 82042 |
| | | | SystemStatus 82044 | | | 1..n 82046 |

FIG. 82-3

| Package | level1 | level2 | level3 | level4 | level5 | Cardinality |
|---|---|---|---|---|---|---|
| | | | | Code 82048 | | 1 82050 |
| | | | | Name 82052 | | 0..1 82054 |
| | | | | InactiveIndicator 82056 | | 1 82058 |
| | | | | ChangeTimePoint 82060 | | 1 82062 |
| | | | | ProcessorPartyInternalID 82064 | | 1 82066 |
| | | | UserStatus 82068 | | | 0..n 82070 |

FIG. 82-4

| Package | level1 | level2 | level3 | level4 | level5 | Cardinality |
|---|---|---|---|---|---|---|
| | | | | Code 82072 | | 1 82074 |
| | | | | Name 82076 | | 0..1 82078 |
| | | | DraftIndicator 82080 | | | 1 82082 |
| Form 82084 | | | Form 82086 | | | 1..n 82088 |
| | | | | FormUUID 82090 | | 1 82092 |
| | | | | FormTemplateID 82094 | | 1 82096 |

FIG. 82-5

| Package | level1 | level2 | level3 | level4 | level5 | Cardinality |
|---|---|---|---|---|---|---|
| | | | | FormTemplateName 82098 | | 0..1 82100 |
| | | | | FormVersionID 82102 | | 1 82104 |
| | | | | FormTypeCode 82106 | | 1 82108 |
| | | | | FormTypeCodeName 82110 | | 0..1 82112 |
| Property-Valuation 82114 | | | | PropertyValuation 82116 | | 0..1 82118 |
| | | | | | PropertyValuation 82120 | 1..n 82122 |

FIG. 82-6

| Package | level1 | level2 | level3 | level4 | level5 | Cardinality |
|---|---|---|---|---|---|---|
| TaxPayer 82124 | | | TaxPayer 82126 | | | 1..1 82128 |
| | | | | TaxPayerPartyID 82130 | | 1 82132 |
| | | | | Identification 82134 | | 0..n 82136 |
| | | | | | PartyIdentifierTypeCode 82138 | 1 82140 |
| | | | | | PartyIdentifierID 82142 | 1 82144 |
| | | | | | IdentifierIssuingAgencyName 82146 | 0..1 82148 |

FIG. 82-7

| Package | level1 | level2 | level3 | level4 | level5 | Cardinality |
|---|---|---|---|---|---|---|
| | | | | | EntryDate 82150 | 0..1 82152 |
| | | | | | AreaOfValidityCountryCode 82154 | 0..1 82156 |
| | | | | | AreaOfValidityRegionCode 82158 | 0..1 82160 |
| | | | | | ValidityPeriod 82162 | 0..1 82164 |
| TaxPreparer 82166 | | | TaxPreparer 82168 | | | 0..1 82170 |
| | | | | TaxPreparerPartyID 82172 | | 1 82174 |

FIG. 82-8

| Package | level1 | level2 | level3 | level4 | level5 | Cardinality |
|---|---|---|---|---|---|---|
| | | | | Identification 82176 | | 0..n 82178 |
| | | | | | PartyIdentifierTypeCode 82180 | 1 82182 |
| | | | | | PartyIdentifierID 82184 | 1 82186 |
| | | | | | IdentifierIssuingAgencyName 82188 | 0..1 82190 |
| | | | | | EntryDate 82192 | 0..1 82194 |
| | | | | | AreaOfValidityCountryCode 82196 | 0..1 82198 |

FIG. 82-9

| Package | level1 | level2 | level3 | level4 | level5 | Cardinality |
|---|---|---|---|---|---|---|
| | | | | | AreaOfValidityRegionCode 82200 | 0..1 82202 |
| | | | | | ValidityPeriod 82204 | 0..1 82206 |
| JointFiler 82208 | | | JointFiler 82210 | | | 0..1 82212 |
| | | | | JointFilerPartyID 82214 | | 1 82216 |
| | | | | Identification 82218 | | 0..n 82220 |
| | | | | | PartyIdentifierTypeCode 82222 | 1 82224 |
| | | | | | PartyIdentifierID 82226 | 1 82228 |

FIG. 82-10

| Package | level1 | level2 | level3 | level4 | level5 | Cardinality |
|---|---|---|---|---|---|---|
| | | | | | IdentifierIssuingAgencyName 82230 | 0..1 82232 |
| | | | | | EntryDate 82234 | 0..1 82236 |
| | | | | | AreaOfValidityCountryCode 82238 | 0..1 82240 |
| | | | | | AreaOfValidityRegionCode 82242 | 0..1 82244 |
| | | | | | ValidityPeriod 82246 | 0..1 82248 |
| Log 82250 | | Log 82252 | | | | 1 82254 |

FIG. 83-1

| Package | level1 | level2 | level3 | level4 | level5 | Cardinality |
|---|---|---|---|---|---|---|
| TaxReturnERPValidateRequestMessage_Sync 83000 | TaxReturnERPValidateRequestMessage_Sync 83002 | | | | | |
| MessageHeader 83004 | | MessageHeader 83006 | | | | 1 83008 |
| TaxReturn 83010 | | TaxReturn 83012 | | | | 1 83014 |
| | | | TaxReturnID 83016 | | | 0..1 83018 |
| | | | LevyTypeCode 83020 | | | 1 83022 |
| | | | ContractAccountID 83024 | | | 0..1 83026 |
| | | | PeriodAssignmentCode 83028 | | | 0..1 83030 |

FIG. 83-2

| Package | level1 | level2 | level3 | level4 | level5 | Cardinality |
|---|---|---|---|---|---|---|
| | | | TaxObligationID 83032 | | | 1 83034 |
| Form 83036 | | | Form 83038 | | | 1..n 83040 |
| | | | | FormUUID 83042 | | 0..1 83044 |
| | | | | FormTemplateID 83046 | | 1 83048 |
| | | | | FormVersionID 83050 | | 1 83052 |
| Property-Valuation 83054 | | | | PropertyValuation 83056 | | 0..1 83058 |
| | | | | | Property-Valuation 83060 | 1..n 83062 |

FIG. 83-3

| Package | level1 | level2 | level3 | level4 | level5 | Cardinality |
|---|---|---|---|---|---|---|
| TaxPayer 83064 | | | TaxPayer 83066 | | | 1..1 83068 |
| | | | | TaxPayerPartyID 83070 | | 1 83072 |
| TaxPreparer 83074 | | | TaxPreparer 83076 | | | 0..1 83078 |
| | | | | TaxPreparerPartyID 83080 | | 1 83082 |
| JointFiler 83084 | | | JointFiler 83086 | | | 0..1 83088 |
| | | | | JointFilerPartyID 83090 | | 1 83092 |

FIG. 84-1

| Package | level1 | level2 | level3 | level4 | level5 | Cardinality |
|---|---|---|---|---|---|---|
| TaxReturnERPValidateConfirmationMessage_Sync 84000 | TaxReturnERPValidateConfirmationMessage_Sync 84002 | | | | | |
| TaxReturn 84004 | | TaxReturn 84006 | | | | 0..1 84008 |
| | | | TaxReturnID 84010 | | | 0..1 84012 |
| | | | LevyTypeCode 84014 | | | 1 84016 |
| | | | LevyTypeCodeName 84018 | | | 0..1 84020 |
| | | | ContractAccountID 84022 | | | 0..1 84024 |

FIG. 84-2

| Package | level1 | level2 | level3 | level4 | level5 | Cardinality |
|---|---|---|---|---|---|---|
| | | | PeriodAssignmentCode 84026 | | | 0..1 84028 |
| | | | PeriodAssignmentCode-Name 84030 | | | 0..1 84032 |
| | | | TaxObligationID 84034 | | | 1 84036 |
| | | | TaxAmount 84038 | | | 0..1 84040 |
| | | | InterestAmount 84042 | | | 0..1 84044 |
| | | | AdditionalReceivable-sAmount 84046 | | | 0..1 84048 |

FIG. 84-3

| Package | level1 | level2 | level3 | level4 | level5 | Cardinality |
|---|---|---|---|---|---|---|
| | | | SystemStatus 84050 | | | 1..n 84052 |
| | | | | SystemStatusCode 84054 | | 1 84056 |
| | | | | SystemStatusCodeName 84058 | | 0..1 84060 |
| | | | | InactiveIndicator 84062 | | 1 84064 |
| | | | | ChangeTimePoint 84066 | | 1 84068 |
| | | | | ProcessorPartyInternalID 84070 | | 1 84072 |

FIG. 84-4

| Package | level1 | level2 | level3 | level4 | level5 | Cardinality |
|---|---|---|---|---|---|---|
| | | | UserStatus 84074 | | | 0..n 84076 |
| | | | | UserStatusCode 84078 | | 1 84080 |
| | | | | UserStatusCodeName 84082 | | 0..1 84084 |
| | | | DraftIndicator 84086 | | | 1 84088 |
| Form 84090 | | | Form 84092 | | | 1..n 84094 |
| | | | | FormUUID 84096 | | 0..1 84098 |

FIG. 84-5

| Package | level1 | level2 | level3 | level4 | level5 | Cardinality |
|---|---|---|---|---|---|---|
| | | | | FormTemplateID 84100 | | 1 84102 |
| | | | | FormTemplateName 84104 | | 0..1 84106 |
| | | | | FormVersionID 84108 | | 1 84110 |
| | | | | FormTypeCode 84112 | | 1 84114 |
| | | | | FormTypeCodeName 84116 | | 0..1 84118 |
| Property-Valuation 84120 | | | | PropertyValuation 84122 | | 0..1 84124 |

FIG. 84-6

| Package | level1 | level2 | level3 | level4 | level5 | Cardinality |
|---|---|---|---|---|---|---|
| | | | | | PropertyValuation 84126 | 1..n 84128 |
| TaxPayer 84130 | | | TaxPayer 84132 | | | 1..1 84134 |
| | | | | TaxPayerPartyID 84136 | | 1 84138 |
| | | | | Identification 84140 | | 0..n 84142 |
| | | | | | PartyIdentifierTypeCode 84144 | 0..1 84146 |
| | | | | | PartyIdentifierID 84148 | 1 84150 |

FIG. 84-7

| Package | level1 | level2 | level3 | level4 | level5 | Cardinality |
|---|---|---|---|---|---|---|
| | | | | | IdentifierIssuingAgency-Name 84152 | 0..1 84154 |
| | | | | | EntryDate 84156 | 0..1 84158 |
| | | | | | AreaOfValidityCountry-Code 84160 | 0..1 84162 |
| | | | | | AreaOfValidityRegion-Code 84164 | 0..1 84166 |
| | | | | | ValidityPeriod 84168 | 0..1 84170 |
| TaxPreparer 84172 | | | TaxPreparer 84174 | | | 0..1 84176 |

FIG. 84-8

| Package | level1 | level2 | level3 | level4 | level5 | Cardinality |
|---|---|---|---|---|---|---|
| | | | | TaxPreparerPartyID 84178 | | 1 84180 |
| | | | | Identification 84182 | | 0..n 84184 |
| | | | | | PartyIdentifierTypeCode 84186 | 0..1 84188 |
| | | | | | PartyIdentifierID 84190 | 1 84192 |
| | | | | | IdentifierIssuingAgency-Name 84194 | 0..1 84196 |
| | | | | | EntryDate 84198 | 0..1 84200 |
| | | | | | AreaOfValidityCountry-Code 84202 | 0..1 84204 |

FIG. 84-9

| Package | level1 | level2 | level3 | level4 | level5 | Cardinality |
|---|---|---|---|---|---|---|
| | | | | | AreaOfValidityRegion-Code 84206 | 0..1 84208 |
| | | | | | ValidityPeriod 84210 | 0..1 84212 |
| JointFiler 84214 | | | JointFiler 84216 | | | 0..1 84218 |
| | | | | JointFilerPartyID 84220 | | 1 84222 |
| | | | | Identification 84224 | | 0..n 84226 |
| | | | | | PartyIdentifierTypeCode 84228 | 0..1 84230 |
| | | | | | PartyIdentifierID 84232 | 1 84234 |

FIG. 84-10

| Package | level1 | level2 | level3 | level4 | level5 | Cardinality |
|---|---|---|---|---|---|---|
| | | | | | IdentifierIssuingAgency-Name 84236 | 0..1 84238 |
| | | | | | EntryDate 84240 | 0..1 84242 |
| | | | | | AreaOfValidityCountry-Code 84244 | 0..1 84246 |
| | | | | | AreaOfValidityRegion-Code 84248 | 0..1 84250 |
| | | | | | ValidityPeriod 84252 | 0..1 84254 |
| Log 84256 | | Log 84258 | | | | 1 84260 |

FIG. 85-1

| Package | level1 | level2 | level3 | level4 | level5 | Cardinality |
|---|---|---|---|---|---|---|
| TaxReturnERPChangeRequestMessage_Sync 85000 | TaxReturnERPChangeRequestMessage_Sync 85002 | | | | | |
| MessageHeader 85004 | | MessageHeader 85006 | | | | 1 85008 |
| TaxReturn 85010 | | TaxReturn 85012 | | | | 1 85014 |
| | | | @formListCompleteTransmissionIndicator 85016 | | | 0..1 85018 |
| | | | TaxReturnID 85020 | | | 1 85022 |
| | | | LevyTypeCode 85024 | | | 1 85026 |

FIG. 85-2

| Package | level1 | level2 | level3 | level4 | level5 | Cardinality |
|---|---|---|---|---|---|---|
| | | | ContractAccountID 85028 | | | 0..1 85030 |
| | | | PeriodAssignmentCode 85032 | | | 1 85034 |
| | | | TaxObligationID 85036 | | | 1 85038 |
| | | | DraftIndicator 85040 | | | 0..1 85042 |
| Form 85044 | | | Form 85046 | | | 1..n 85048 |
| | | | | @propertyGroupList CompleteTransmis- sionIndicator 85050 | | 0..1 85052 |

FIG. 85-3

| Package | level1 | level2 | level3 | level4 | level5 | Cardinality |
|---|---|---|---|---|---|---|
| | | | | @actionCode 85054 | | 0..1 85056 |
| | | | | FormUUID 85058 | | 0..1 85060 |
| | | | | FormTemplateID 85062 | | 1 85064 |
| | | | | FormVersionID 85066 | | 1 85068 |
| PropertyValua-tion 85070 | | | | PropertyValuation 85072 | | 0..1 85074 |
| | | | | | Property-Valuation 85076 | 1..n 85078 |

FIG. 85-4

| Package | level1 | level2 | level3 | level4 | level5 | Cardinality |
|---|---|---|---|---|---|---|
| TaxPayer 85080 | | | TaxPayer 85082 | | | 1..1 85084 |
| | | | | TaxPayerPartyID 85086 | | 1 85088 |
| TaxPreparer 85090 | | | TaxPreparer 85092 | | | 0..1 85094 |
| | | | | TaxPreparerPartyID 85096 | | 1 85098 |
| JointFiler 85100 | | | JointFiler 85102 | | | 0..1 85104 |
| | | | | JointFilerPartyID 85106 | | 1 85108 |

FIG. 86-1

| Package | level1 | level2 | level3 | level4 | level5 | Cardinality |
|---|---|---|---|---|---|---|
| TaxRe-turnERPChange Confirmation-Message_Sync 86000 | TaxRe-turnERPChangeConfir-mationMes-sage_Sync 86002 | | | | | |
| Message-Header 86004 | | Message-Header 86006 | | | | 0..1 86008 |
| TaxReturn 86010 | | TaxReturn 86012 | | | | 1 86014 |
| | | | TaxReturnID 86016 | | | 1 86018 |
| | | | LevyTypeCode 86020 | | | 1 86022 |

FIG. 86-2

| Package | level1 | level2 | level3 | level4 | level5 | Cardinality |
|---|---|---|---|---|---|---|
| | | | LevyTypeCodeName 86024 | | | 0..1 86026 |
| | | | ContractAccountID 86028 | | | 0..1 86030 |
| | | | PeriodAssignmentCode 86032 | | | 1 86034 |
| | | | PeriodAssignmentCode-Name 86036 | | | 0..1 86038 |
| | | | TaxObligationID 86040 | | | 1 86042 |
| | | | SystemStatus 86044 | | | 1..n 86046 |

FIG. 86-3

| Package | level1 | level2 | level3 | level4 | level5 | Cardinality |
|---|---|---|---|---|---|---|
| | | | | SystemStatusCode 86048 | | 1 86050 |
| | | | | SystemStatusCode-Name 86052 | | 0..1 86054 |
| | | | | ActiveIndicator 86056 | | 1 86058 |
| | | | | ChangeTimePoint 86060 | | 1 86062 |
| | | | | ProcessorPartyInter-nalID 86064 | | 1 86066 |
| | | | UserStatus 86068 | | | 0..n 86070 |

FIG. 86-4

| Package | level1 | level2 | level3 | level4 | level5 | Cardinality |
|---|---|---|---|---|---|---|
| | | | | UserStatusCode 86072 | | 1 86074 |
| | | | | UserStatusCode-Name 86076 | | 0..1 86078 |
| | | | DraftIndicator 86080 | | | 1 86082 |
| Form 86084 | | | Form 86086 | | | 0..n 86088 |
| | | | | FormUUID 86090 | | 1 86092 |
| | | | | FormTemplateID 86094 | | 1 86096 |

FIG. 86-5

| Package | level1 | level2 | level3 | level4 | level5 | Cardinality |
|---|---|---|---|---|---|---|
| | | | | FormTemplateName 86098 | | 0..1 86100 |
| | | | | FormVersionID 86102 | | 1 86104 |
| | | | | FormTypeCode 86106 | | 1 86108 |
| | | | | FormTypeCodeName 86110 | | 0..1 86112 |
| Property-Valuation 86114 | | | | PropertyValuation 86116 | | 0..1 86118 |
| | | | | | PropertyValuation 86120 | 1..n 86122 |

FIG. 86-6

| Package | level1 | level2 | level3 | level4 | level5 | Cardinality |
|---|---|---|---|---|---|---|
| TaxPayer 86124 | | | TaxPayer 86126 | | | 1..1 86128 |
| | | | | TaxPayerPartyID 86130 | | 1 86132 |
| | | | | Identification 86134 | | 0..n 86136 |
| | | | | | PartyIdentifierTypeCode 86138 | 1 86140 |
| | | | | | PartyIdentifierID 86142 | 1 86144 |
| | | | | | IdentifierIssuingAgencyName 86146 | 0..1 86148 |

FIG. 86-7

| Package | level1 | level2 | level3 | level4 | level5 | Cardinality |
|---|---|---|---|---|---|---|
| | | | | | EntryDate 86150 | 0..1 86152 |
| | | | | | AreaOfValidityCountryCode 86154 | 0..1 86156 |
| | | | | | AreaOfValidityRegionCode 86158 | 0..1 86160 |
| | | | | | ValidityPeriod 86162 | 0..1 86164 |
| TaxPreparer 86166 | | | TaxPreparer 86168 | | | 0..1 86170 |
| | | | | TaxPreparerPartyID 86172 | | 1 86174 |

FIG. 86-8

| Package | level1 | level2 | level3 | level4 | level5 | Cardinality |
|---|---|---|---|---|---|---|
| | | | | Identification 86176 | | 0..n 86178 |
| | | | | | PartyIdentifierTypeCode 86180 | 1 86182 |
| | | | | | PartyIdentifierID 86184 | 1 86186 |
| | | | | | IdentifierIssuingAgencyName 86188 | 0..1 86190 |
| | | | | | EntryDate 86192 | 0..1 86194 |
| | | | | | AreaOfValidityCountryCode 86196 | 0..1 86198 |

FIG. 86-9

| Package | level1 | level2 | level3 | level4 | level5 | Cardinality |
|---|---|---|---|---|---|---|
| | | | | | AreaOfValidityRegionCode 86200 | 0..1 86202 |
| | | | | | ValidityPeriod 86204 | 0..1 86206 |
| JointFiler 86208 | | | JointFiler 86210 | | | 0..1 86212 |
| | | | | JointFilerPartyID 86214 | | 1 86216 |
| | | | | Identification 86218 | | 0..n 86220 |
| | | | | | PartyIdentifierTypeCode 86222 | 1 86224 |
| | | | | | PartyIdentifierID 86226 | 1 86228 |

FIG. 86-10

| Package | level1 | level2 | level3 | level4 | level5 | Cardinality |
|---|---|---|---|---|---|---|
| | | | | | IdentifierIssuingAgencyName 86230 | 0..1 86232 |
| | | | | | EntryDate 86234 | 0..1 86236 |
| | | | | | AreaOfValidityCountryCode 86238 | 0..1 86240 |
| | | | | | AreaOfValidityRegionCode 86242 | 0..1 86244 |
| | | | | | ValidityPeriod 86246 | 0..1 86248 |
| Log 86250 | | Log 86252 | | | | 1 86254 |

MANAGING CONSISTENT INTERFACES FOR TAX AUTHORITY BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for performing a tax assessment notice service. The service exposes at least one service as defined in a service registry. Upon execution, the program code executes in an environment of computer systems providing message-based services. The program code receives, from a service consumer, a first message for processing a notice of a tax authority to a taxpayer which states that the taxpayer owes taxes or has a refund. The program code invokes a tax assessment notice business object. The business object is a logically centralized, semantically disjointed object representing a notice of a tax authority to a taxpayer which states that the taxpayer owes taxes or has a refund. The business object includes data logically organized as a tax assessment notice root node and a contract account invoice request assignment subordinate node. The program code initiates transmission of a message to a heterogeneous second application, executing in the environment of computer systems providing message-based services. The message is based on the data in the tax assessment notice business object. The message includes a tax assessment notice enterprise resource planning message entity, a message header package, a tax assessment notice package, and a log package.

In a second aspect, a tangible computer readable medium includes program code for providing a message-based interface for performing a tax assessment notice service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a tax assessment notice business object invoked by the second application. The business object is a logically centralized, semantically disjointed object representing a notice of a tax authority to a taxpayer which states that the taxpayer owes taxes or has a refund. The business object includes data logically organized as a tax assessment notice root node and a contract account invoice request assignment subordinate node. The message includes a tax assessment notice enterprise resource planning message entity, a message header package, a tax assessment notice package, and a log package. The program code receives a second message from the second application. The second message is associated with the invoked tax assessment notice business object and is in response to the first message.

In a third aspect, a distributed system operates in a landscape of computer systems providing message-based services. The system processes business objects involving processing a notice of a tax authority to a taxpayer which states that the taxpayer owes taxes or has a refund. The system includes memory and a graphical user interface remote from the memory. The memory stores a business object repository storing a plurality of business objects. Each business object is a logically centralized, semantically disjointed object of a particular business object type. At least one of the business objects represents a notice of a tax authority to a taxpayer which states that the taxpayer owes taxes or has a refund. The business object includes data logically organized as a tax assessment notice root node and a contract account invoice request assignment subordinate node. The graphical user interface presents data associated with an invoked instance of the tax assessment notice business object. The user interface includes computer readable instructions embodied on tangible media.

In a fourth aspect, a tangible computer readable medium includes program code for providing a message-based interface for performing a tax form service. The service exposes at least one service as defined in a service registry. Upon execution, the program code executes in an environment of computer systems providing message-based services. The program code receives, from a service consumer, a first message for processing a form that may be filed by the taxpayer or the taxpayer's representative. The program code invokes a tax form business object. The business object is a logically centralized, semantically disjointed object representing a form that may be filed by the taxpayer or the taxpayer's representative. The business object includes data logically organized as a tax form root node, a usage data subordinate node, and a property valuation subordinate node. The usage data node contains a billing period subordinate node. The program code initiates transmission of a message to a heterogeneous second application, executing in the environment of computer systems providing message-based services. The message is based on the data in the tax form business object. The message includes a tax form enterprise resource planning message entity, a message header package, a tax form package, and a log package.

In a fifth aspect, a tangible computer readable medium includes program code for providing a message-based interface for performing a tax form service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a tax form business object invoked by the second application. The business object is a logically centralized, semantically disjointed object representing a form that may be filed by the taxpayer or the taxpayer's representative. The business object includes data logically organized as a tax form root node, a usage data subordinate node, and a property valuation subordinate node. The usage data node contains a billing period subordinate node. The message includes a tax form enterprise resource planning message entity, a message header package, a tax form package, and a log package. The program code receives a second message from the second application. The second message is associated with the invoked tax form business object and is in response to the first message.

In a sixth aspect, a distributed system operates in a landscape of computer systems providing message-based services. The system processes business objects involving processing a form that may be filed by the taxpayer or the taxpayer's representative. The system includes memory and a graphical user interface remote from the memory. The memory stores a business object repository storing a plurality of business objects. Each business object is a logically centralized, semantically disjointed object of a particular business object type. At least one of the business objects represents a form that may be filed by the taxpayer or the taxpayer's representative. The business object includes data logically organized as a tax form root node, a usage data subordinate node, and a property valuation subordinate node. The usage data node contains a billing period subordinate node. The graphical user interface presents data associated with an invoked instance of the tax form business object. The user interface includes computer readable instructions embodied on tangible media.

In a seventh aspect, a tangible computer readable medium includes program code for providing a message-based interface for performing a tax object service. The service exposes at least one service as defined in a service registry. Upon execution, the program code executes in an environment of computer systems providing message-based services. The program code receives, from a service consumer, a first message for processing a subject of a tax assessment, including attributes which are a basis for a tax calculation. The program code invokes a tax object business object. The business object is a logically centralized, semantically disjointed object representing a subject of a tax assessment, including attributes which are a basis for a tax calculation. The business object includes data logically organized as a tax object root node, a business license assignment subordinate node, a property group subordinate node, a property valuation subordinate node, a location data subordinate node, and a tax obligation assignment subordinate node. The program code initiates transmission of a message to a heterogeneous second application, executing in the environment of computer systems providing message-based services. The message is based on the data in the tax object business object. The message includes a tax object enterprise resource planning by business partner query message entity, a message header package, a tax object selection by tax payer party ID package, and a query processing conditions package.

In an eighth aspect, a tangible computer readable medium includes program code for providing a message-based interface for performing a tax object service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a tax object business object invoked by the second application. The business object is a logically centralized, semantically disjointed object representing a subject of a tax assessment, including attributes which are a basis for a tax calculation. The business object includes data logically organized as a tax object root node, a business license assignment subordinate node, a property group subordinate node, a property valuation subordinate node, a location data subordinate node, and a tax obligation assignment subordinate node. The message includes a tax object enterprise resource planning by business partner query message entity, a message header package, a tax object selection by tax payer party ID package, and a query processing conditions package. The program code receives a second message from the second application. The second message is associated with the invoked tax object business object and is in response to the first message.

In a ninth aspect, a distributed system operates in a landscape of computer systems providing message-based services. The system processes business objects involving processing a subject of a tax assessment, including attributes which are a basis for a tax calculation. The system includes memory and a graphical user interface remote from the memory. The memory stores a business object repository storing a plurality of business objects. Each business object is a logically centralized, semantically disjointed object of a particular business object type. At least one of the business objects represents a subject of a tax assessment, including attributes which are a basis for a tax calculation. The business object includes data logically organized as a tax object root node, a business license assignment subordinate node, a property group subordinate node, a property valuation subordinate node, a location data subordinate node, and a tax obligation assignment subordinate node. The graphical user interface presents data associated with an invoked instance of the tax object business object. The user interface includes computer readable instructions embodied on tangible media.

In a tenth aspect, a tangible computer readable medium includes program code for providing a message-based interface for performing a tax obligation service. The service exposes at least one service as defined in a service registry. Upon execution, the program code executes in an environment of computer systems providing message-based services. The program code receives, from a service consumer, a first message for processing a legal requirement that may be fulfilled by a taxpayer, including obligations to file tax returns, pay taxes at defined due dates, and pay penalties for lack of fulfillment. The program code invokes a tax obligation business object. The business object is a logically centralized, semantically disjointed object representing a legal requirement that may be fulfilled by a taxpayer, including obligations to file tax returns, pay taxes at defined due dates, and pay penalties for lack of fulfillment. The business object includes data logically organized as a tax obligation root node, a filing obligation subordinate node, a filing rule subordinate node, a filing exemption subordinate node, an invoicing terms subordinate node, and a registration form subordinate node. The filing rule node contains a deviating period subordinate node and a standard period subordinate node. The registration form node contains a property valuation subordinate node The program code initiates transmission of a message to a heterogeneous second application, executing in the environment of computer systems providing message-based services. The message is based on the data in the tax obligation business object. The message includes a tax obligation enterprise resource planning message entity, a message header package, a tax obligation package, and a log package.

In an eleventh aspect, a tangible computer readable medium includes program code for providing a message-based interface for performing a tax obligation service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a tax obligation business object invoked by the second application. The business object is a logically centralized, semantically disjointed object representing a legal requirement that may be fulfilled by a taxpayer, including obligations to file tax returns, pay taxes at defined due dates, and pay penalties for lack of fulfillment. The business object includes data logically organized as a tax obligation root node, a filing obligation subordinate node, a filing rule subordinate node, a filing exemption subordinate node, an invoicing terms subordinate node, and a registration form subordinate node. The filing rule node contains a deviating period subordinate node and a standard period subordinate node. The registration form node contains a property valuation subordinate node. The message includes a tax obligation enterprise resource planning message entity, a message header package, a tax obligation package, and a log package. The program code receives a second message from the second application. The second message is associated with the invoked tax obligation business object and is in response to the first message.

In a twelfth aspect, a distributed system operates in a landscape of computer systems providing message-based services. The system processes business objects involving processing a legal requirement that may be fulfilled by a taxpayer, including obligations to file tax returns, pay taxes at defined due dates, and pay penalties for lack of fulfillment. The system includes memory and a graphical user interface remote from the memory. The memory stores a business object repository storing a plurality of business objects. Each business object is a logically centralized, semantically disjointed object of a particular business object type. At least one of the business objects represents a legal requirement that may be fulfilled by a taxpayer, including obligations to file tax returns, pay taxes at defined due dates, and pay penalties for lack of fulfillment. The business object includes data logically organized as a tax obligation root node, a filing obligation subordinate node, a filing rule subordinate node, a filing exemption subordinate node, an invoicing terms subordinate node, and a registration form subordinate node. The filing rule node contains a deviating period subordinate node and a standard period subordinate node. The registration form node contains a property valuation subordinate node. The graphical user interface presents data associated with an invoked instance of the tax obligation business object. The user interface includes computer readable instructions embodied on tangible media.

In a thirteenth aspect, a tangible computer readable medium includes program code for providing a message-based interface for performing a tax return service. The service exposes at least one service as defined in a service registry. Upon execution, the program code executes in an environment of computer systems providing message-based services. The program code receives, from a service consumer, a first message for processing a person's, a company's or an organization's tax details which taxpayers, or their legal representatives, may complete and send to a tax authority, using forms prescribed by the tax authority. The program code invokes a tax return business object. The business object is a logically centralized, semantically disjointed object representing a person's, a company's or an organization's tax details which taxpayers, or their legal representatives, may complete and send to a tax authority, using forms prescribed by the tax authority. The program code includes data logically organized as a tax return root node, a system status subordinate node, a user status subordinate node, a form subordinate node, a tax payer subordinate node, a tax preparer subordinate node, and a joint filer subordinate node. The form node contains a property valuation subordinate node. The tax payer node contains an identification subordinate node. The tax preparer node contains an identification subordinate node. The joint filer node contains an identification subordinate node. The program code initiates transmission of a message to a heterogeneous second application, executing in the environment of computer systems providing message-based services. The message is based on the data in the tax return business object. The message includes a tax return enterprise resource planning message entity, a message header package, a tax return package, and a log package.

In a fourteenth aspect, a tangible computer readable medium includes program code for providing a message-based interface for performing a tax return service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a tax return business object invoked by the second application. The business object is a logically centralized, semantically disjointed object representing a person's, a company's or an organization's tax details which taxpayers, or their legal representatives, may complete and send to a tax authority, using forms prescribed by the tax authority. The business object includes data logically organized as a tax return root node, a system status subordinate node, a user status subordinate node, a form subordinate node, a tax payer subordinate node, a tax preparer subordinate node, and a joint filer subordinate node. The form node contains a property valuation subordinate node. The tax payer node contains an identification subordinate node. The tax preparer node contains an identification subordinate node. The joint filer node contains an identification subordinate node. The message includes a tax return enterprise resource planning message entity, a message header package, a tax return package, and a log package. The program code receives a second message from the second application. The second message is associated with the invoked tax return business object and is in response to the first message.

In a fifteenth aspect, a distributed system operates in a landscape of computer systems providing message-based services. The system processes business objects involving processing a person's, a company's or an organization's tax details which taxpayers, or their legal representatives, may complete and send to a tax authority, using forms prescribed by the tax authority. The system includes memory and a graphical user interface remote from the memory. The memory stores a business object repository storing a plurality of business objects. Each business object is a logically centralized, semantically disjointed object of a particular business object type. At least one of the business objects represents a person's, a company's or an organization's tax details which taxpayers, or their legal representatives, may complete and send to a tax authority, using forms prescribed by the tax authority. The business object includes data logically organized as a tax return root node, a system status subordinate node, a user status subordinate node, a form subordinate node, a tax payer subordinate node, a tax preparer subordinate node, and a joint filer subordinate node. The form node contains a property valuation subordinate node. The tax payer node contains an identification subordinate node. The tax preparer node contains an identification subordinate node. The joint filer node contains an identification subordinate node. The graphical user interface presents data associated with an invoked instance of the tax return business object. The user interface includes computer readable instructions embodied on tangible media.

In some implementations, processing business objects includes creating, updating and/or retrieving information associated with the business objects.

BRIEF DESCRIPTION OF THE DRAWINGS

FIGS. 33-1 through 33-2 illustrate an exemplary TaxAssessmentNoticeERPMessage_Sync Element Structure.

FIG. 34 illustrates an exemplary TaxAssessmentNoticeERPByBusinessPartnerQueryMessage_Sync Element Structure.

FIGS. 35-1 through 35-2 illustrate an exemplary TaxAssessmentNoticeERPByBusinessPartnerResponseMessage_Sync Element Structure.

FIGS. 36-1 through 36-4 illustrate an exemplary TaxFormERPMessage_Sync Element Structure.

FIG. 37 illustrates an exemplary TaxFormERPByLevyTypeQueryMessage_Sync Element Structure.

FIGS. 38-1 through 38-4 illustrate an exemplary TaxFormERPByLevyTypeResponseMessage_Sync Element Structure.

FIG. 39 illustrates an exemplary TaxFormERPByIDQueryMessage_Sync Element Structure.

FIGS. 40-1 through 40-4 illustrate an exemplary TaxFormERPByIDResponseMessage_Sync Element Structure.

FIGS. 42-1 through 42-6 illustrate an exemplary TaxObjectERPMessage_Sync Element Structure.

FIGS. 43-1 through 43-2 illustrate an exemplary TaxObjectERPByBusinessPartnerQueryMessage_sync Element Structure.

FIGS. 44-1 through 44-4 illustrate an exemplary TaxObjectERPByBusinessPartnerResponseMessage_sync Element Structure.

FIG. 45 illustrates an exemplary TaxObjectERPByIdQuery_sync Element Structure.

FIGS. 46-1 through 46-3 illustrate an exemplary TaxObjectERPByIdResponse_sync Element Structure.

FIGS. 47-1 through 47-2 illustrate an exemplary TaxObjectERPCreateRequest_sync Element Structure.

FIGS. 48-1 through 48-3 illustrate an exemplary TaxObjectERPCreateConfirmation_sync Element Structure.

FIGS. 49-1 through 49-3 illustrate an exemplary TaxObjectERPUpdateRequest_sync Element Structure.

FIGS. 50-1 through 50-3 illustrate an exemplary TaxObjectERPUpdateConfirmation_sync Element Structure.

FIGS. 51-1 through 51-2 illustrate an exemplary TaxObjectERPCheckQuery_sync Element Structure.

FIGS. 52-1 through 52-3 illustrate an exemplary TaxObjectERPCheckResponse_sync Element Structure.

FIGS. 54-1 through 54-15 illustrate an exemplary TaxObligationERPMessage_Sync Element Structure.

FIGS. 55-1 through 55-7 illustrate an exemplary TaxObligationERPChangeRequestMessage_Sync Element Structure.

FIGS. 56-1 through 56-9 illustrate an exemplary TaxObligationERPChangeConfirmationMessage_Sync Element Structure.

FIGS. 57-1 through 57-3 illustrate an exemplary TaxObligationERPFilingObligationChangeRequestMessage_Sync Element Structure.

FIGS. 58-1 through 58-5 illustrate an exemplary TaxObligationERPFilingObligationChangeConfirmationMessage_Sync Element Structure.

FIGS. 59-1 through 59-7 illustrate an exemplary TaxObligationERPCheckQueryMessage_Sync Element Structure.

FIGS. 60-1 through 60-9 illustrate an exemplary TaxObligationERPCheckResponseMessage_Sync Element Structure.

FIGS. 61-1 through 61-3 illustrate an exemplary TaxObligationERPFilingObligationCheckQueryMessage_Sync Element Structure.

FIGS. 62-1 through 62-5 illustrate an exemplary TaxObligationERPFilingObligationCheckResponseMessage_Sync Element Structure.

FIGS. 63-1 through 63-6 illustrate an exemplary TaxObligationERPCreateRequestMessage_Sync Element Structure.

FIGS. 64-1 through 64-9 illustrate an exemplary TaxObligationERPCreateConfirmationMessage_Sync Element Structure.

FIGS. 65-1 through 65-2 illustrate an exemplary TaxObligationERPByBusinessPartnerQueryMessage_Sync Element Structure.

FIGS. 66-1 through 66-8 illustrate an exemplary TaxObligationERPByBusinessPartnerResponseMessage_Sync Element Structure.

FIGS. 67-1 through 67-2 illustrate an exemplary TaxObligationERPLevyTypeByBusinessPartnerQueryMessage_Sync Element Structure.

FIGS. 68-1 through 68-2 illustrate an exemplary TaxObligationERPLevyTypeByBusinessPartnerResponseMessage_Sync Element Structure.

FIG. 69 illustrates an exemplary TaxObligationERPRegistrationFormByIdQueryMessage_Sync Element Structure.

FIGS. 70-1 through 70-3 illustrate an exemplary TaxObligationERPRegistrationFormByIdResponseMessage_Sync Element Structure.

FIG. 71 illustrates an exemplary TaxObligationERPFilingObligationByIdQueryMessage Element Structure.

FIGS. 72-1 through 72-5 illustrate an exemplary TaxObligationERPFilingObligationByIdResponseMessage_Sync Element Structure.

FIG. 73 illustrates an exemplary TaxObligationERPByIdQueryMessage_Sync Element Structure.

FIGS. 74-1 through 74-12 illustrate an exemplary TaxObligationERPByIdResponseMessage_Sync Element Structure.

FIGS. 76-1 through 76-12 illustrate an exemplary TaxReturnERPMessage_Sync Element Structure.

FIGS. 77-1 through 77-9 illustrate an exemplary TaxReturnERPByBusinessPartnerQueryMessage_Sync Element Structure.

FIGS. 78-1 through 78-3 illustrate an exemplary TaxReturnERPByBusinessPartnerResponseMessage_Sync Element Structure.

FIG. 79 illustrates an exemplary TaxReturnERPByIdQueryMessage_Sync Element Structure.

FIGS. 80-1 through 80-10 illustrate an exemplary TaxReturnERPByIdResponseMessage_Sync Element Structure.

FIGS. 81-1 through 81-4 illustrate an exemplary TaxReturnERPCreateRequestMessage_Sync Element Structure.

FIGS. 82-1 through 82-10 illustrate an exemplary TaxReturnERPCreateConfirmationMessage_Sync Element Structure.

FIGS. 83-1 through 83-3 illustrate an exemplary TaxReturnERPValidateRequestMessage_Sync Element Structure.

FIGS. 84-1 through 84-10 illustrate an exemplary TaxReturnERPValidateConfirmationMessage_Sync Element Structure.

FIGS. 85-1 through 85-4 illustrate an exemplary TaxReturnERPChangeRequestMessage_Sync Element Structure.

FIGS. 86-1 through 86-10 illustrate an exemplary TaxReturnERPChangeConfirmationMessage_Sync Element Structure.

DETAILED DESCRIPTION

A. Overview

Figure 1:
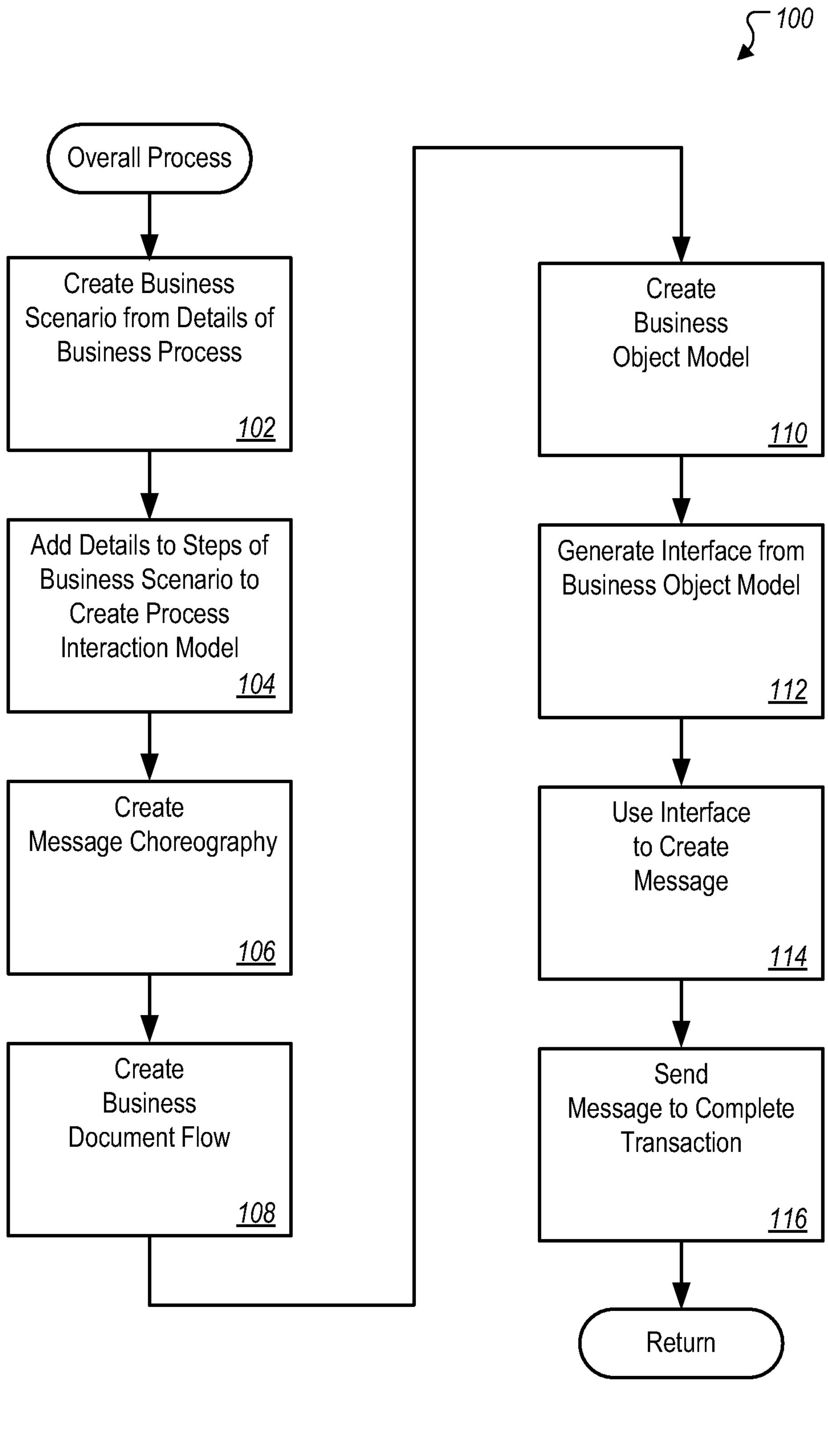
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a “business scenario” (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a “business transaction,” and each business entity is referred to as a “component” of the business transaction. The developers also identify the messages that are transmitted between the components. A “process interaction model” represents the complete process steps between two components.

After creating the process interaction model, the developers create a “message choreography” (step 106), which depicts the messages transmitted between the two components in the process interaction model. The developers then represent the transmission of the messages between the components during a business process in a “business document flow” (step 108). Thus, the business document flow illustrates the flow of information between the business entities during a business process.

Figure 2:
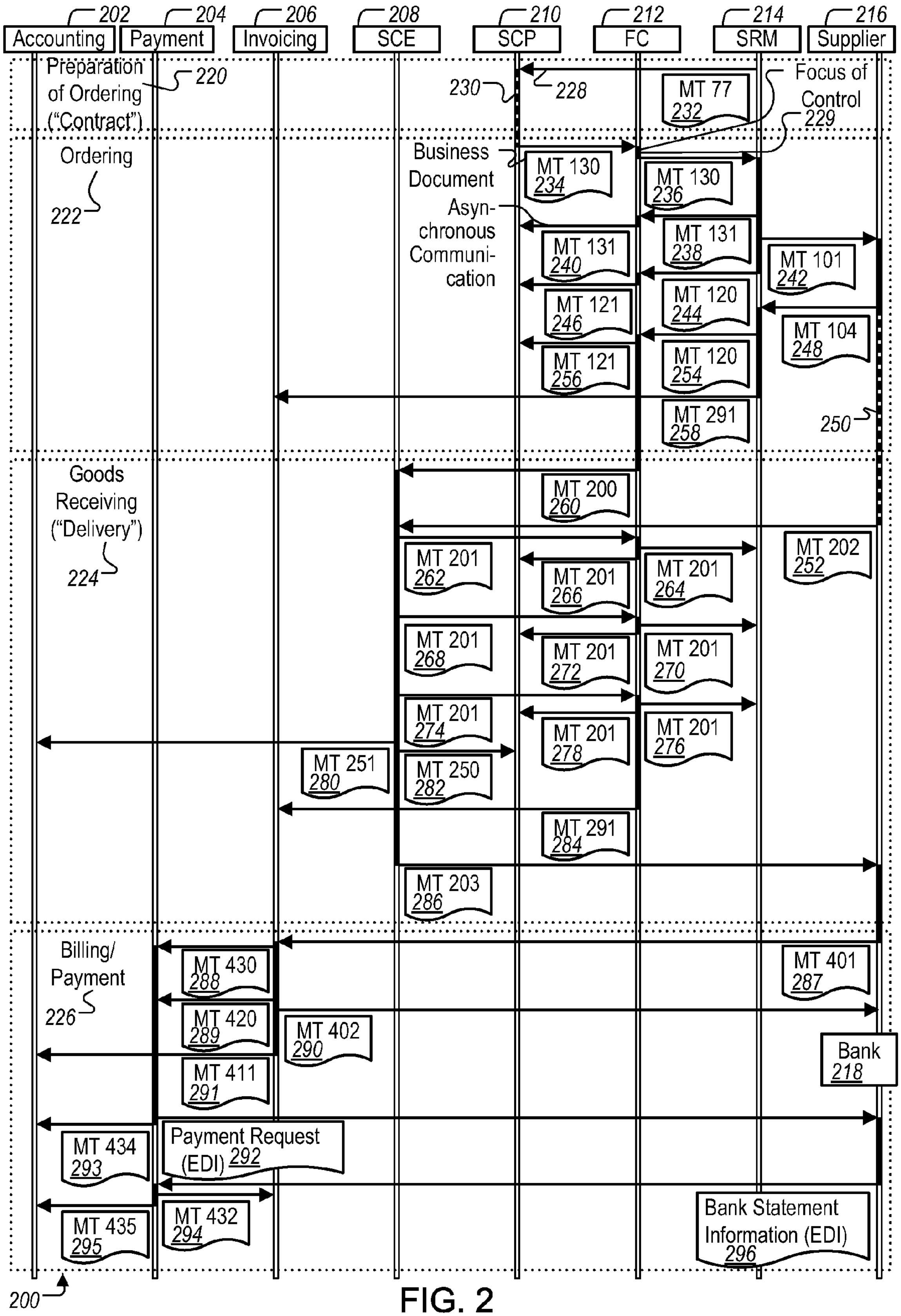
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution (“SCE”) 208, Supply Chain Planning (“SCP”) 210, Fulfillment Coordination (“FC”) 212, Supply Relationship Management (“SRM”) 214, Supplier 216, and Bank 218. The business document flow 200 is divided into four different transactions: Preparation of Ordering (“Contract”) 220, Ordering 222, Goods Receiving (“Delivery”) 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
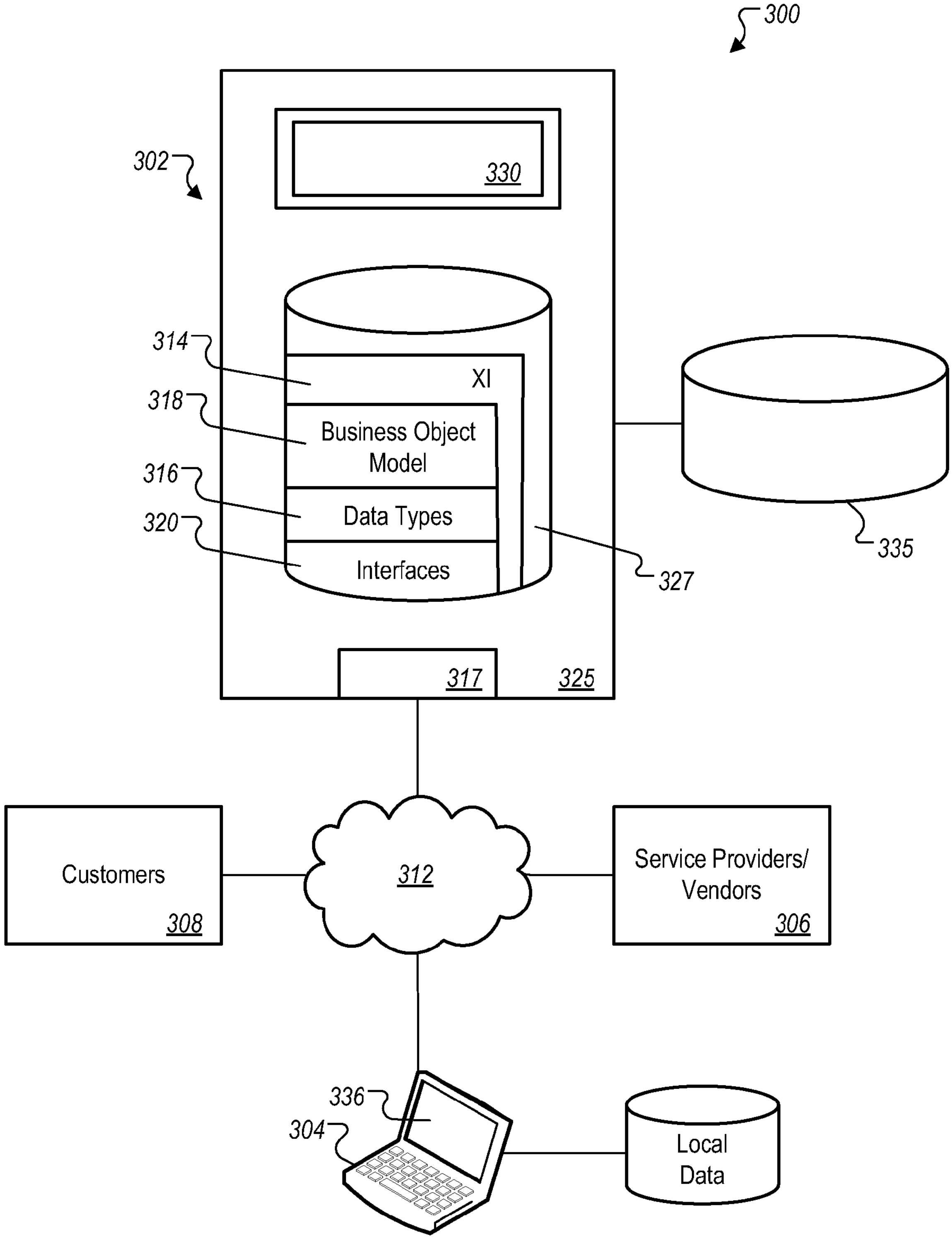
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
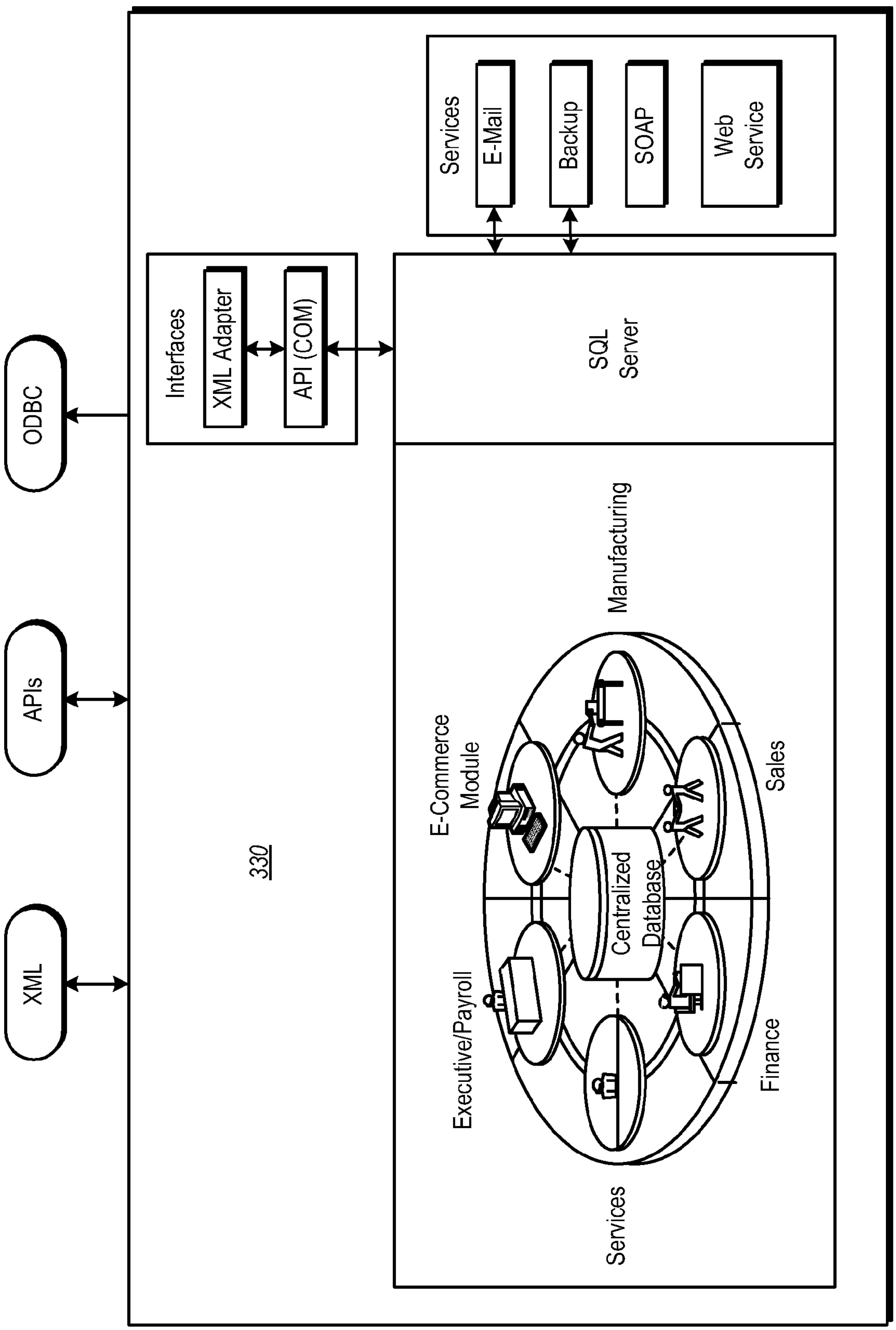
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
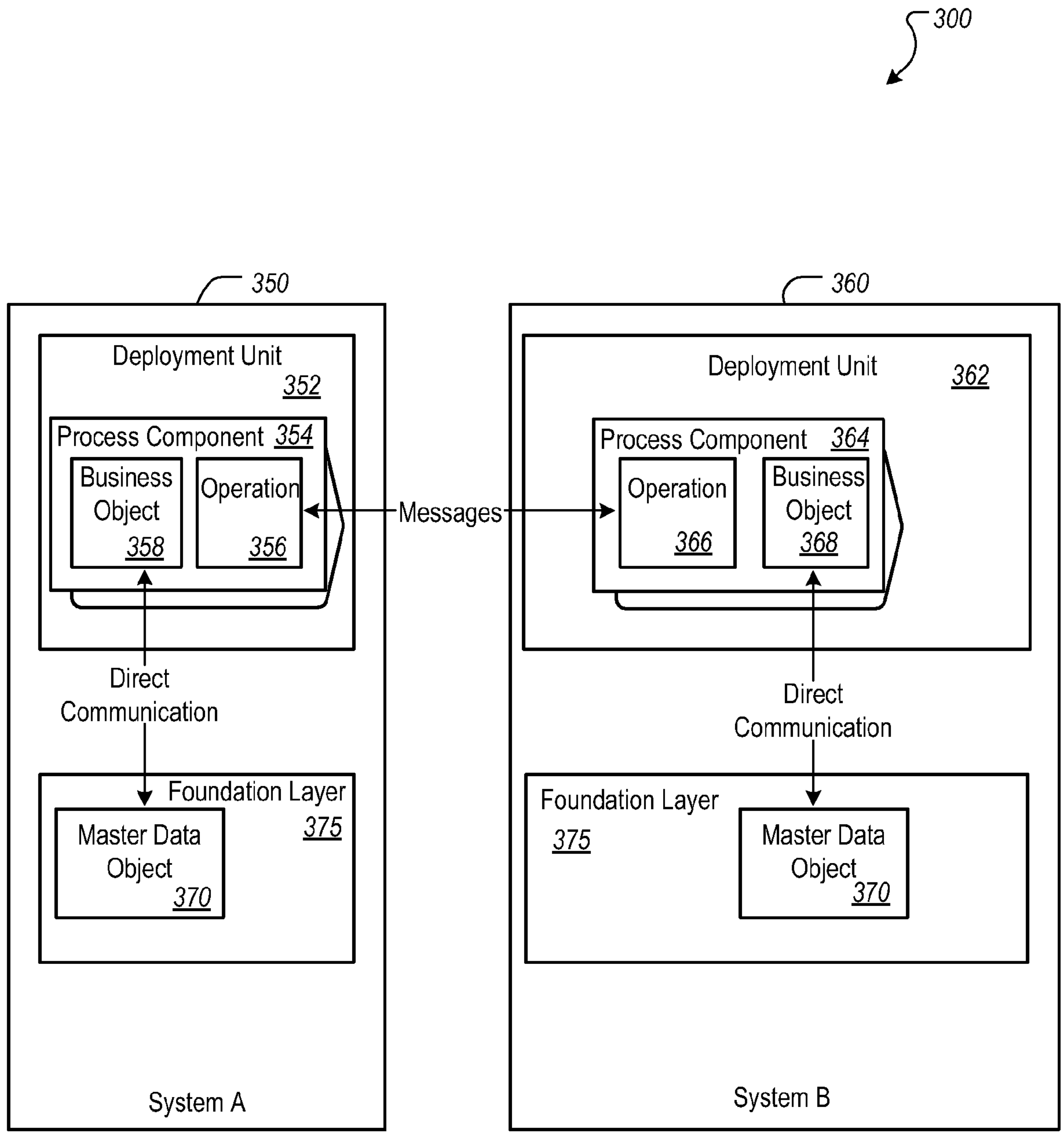

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
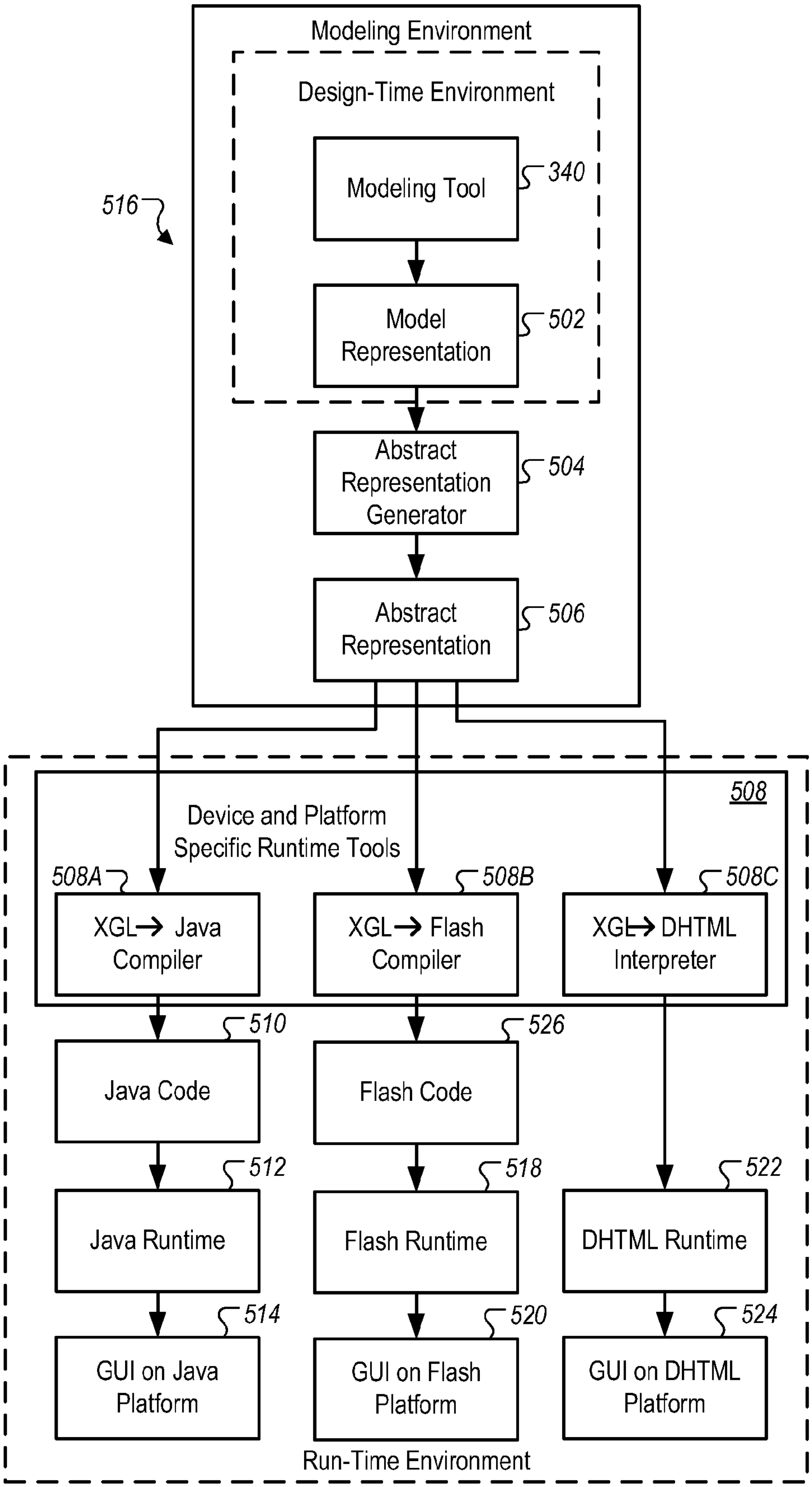
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific)

source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
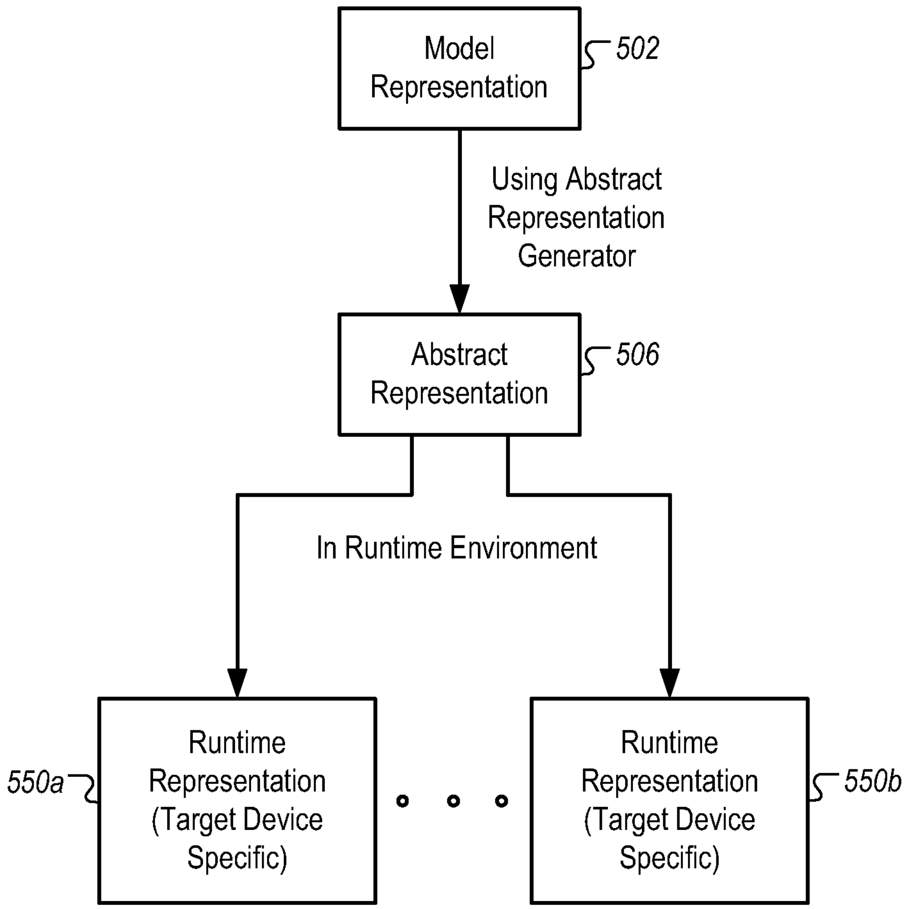
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
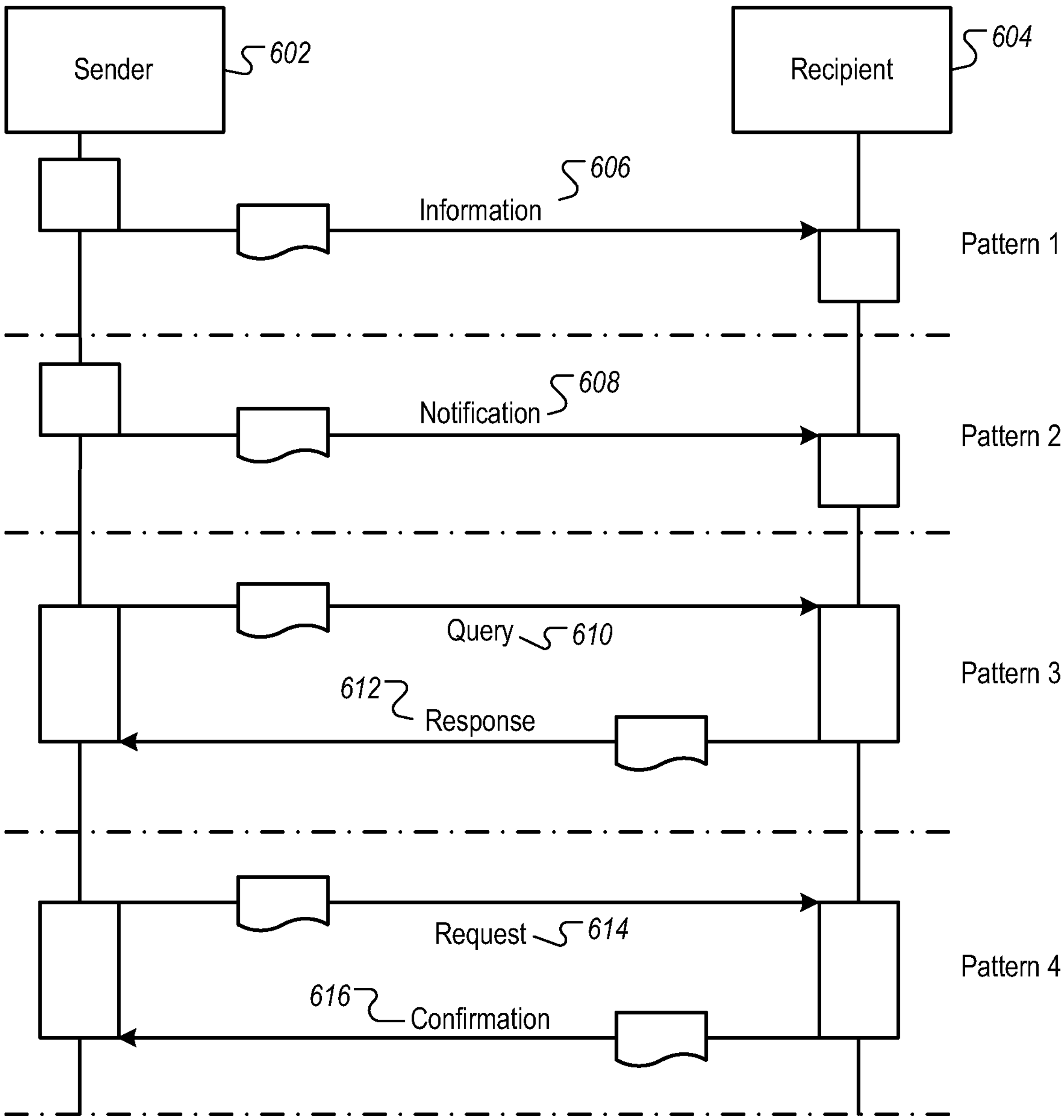
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
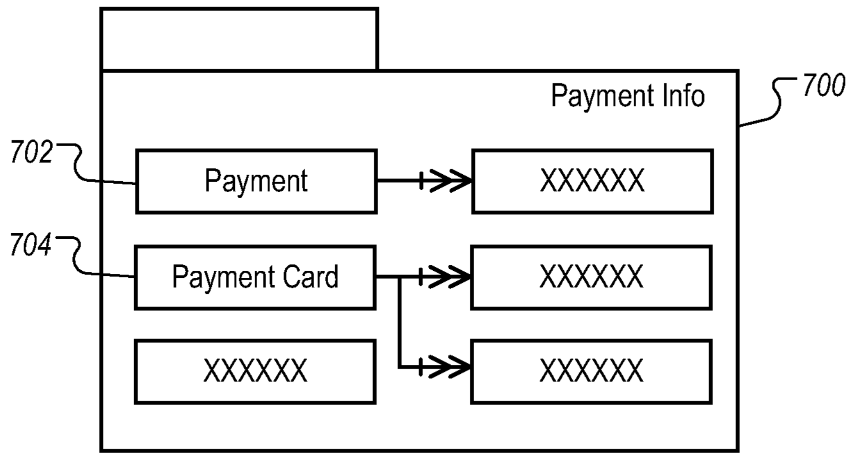
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
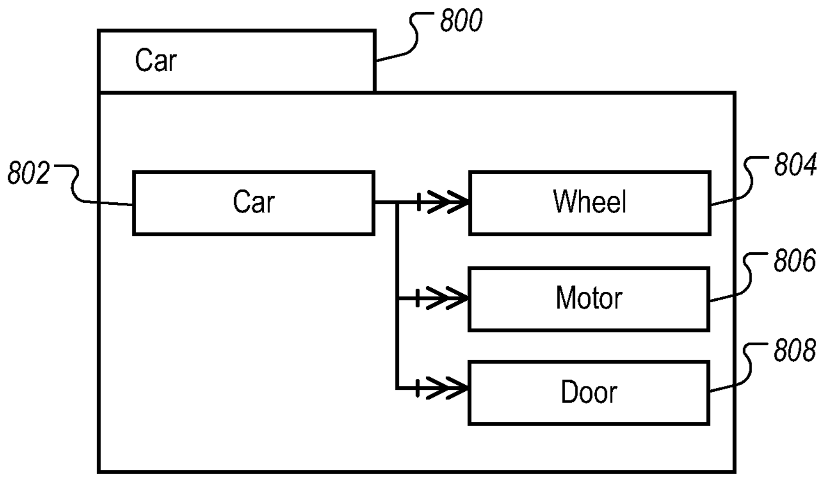
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
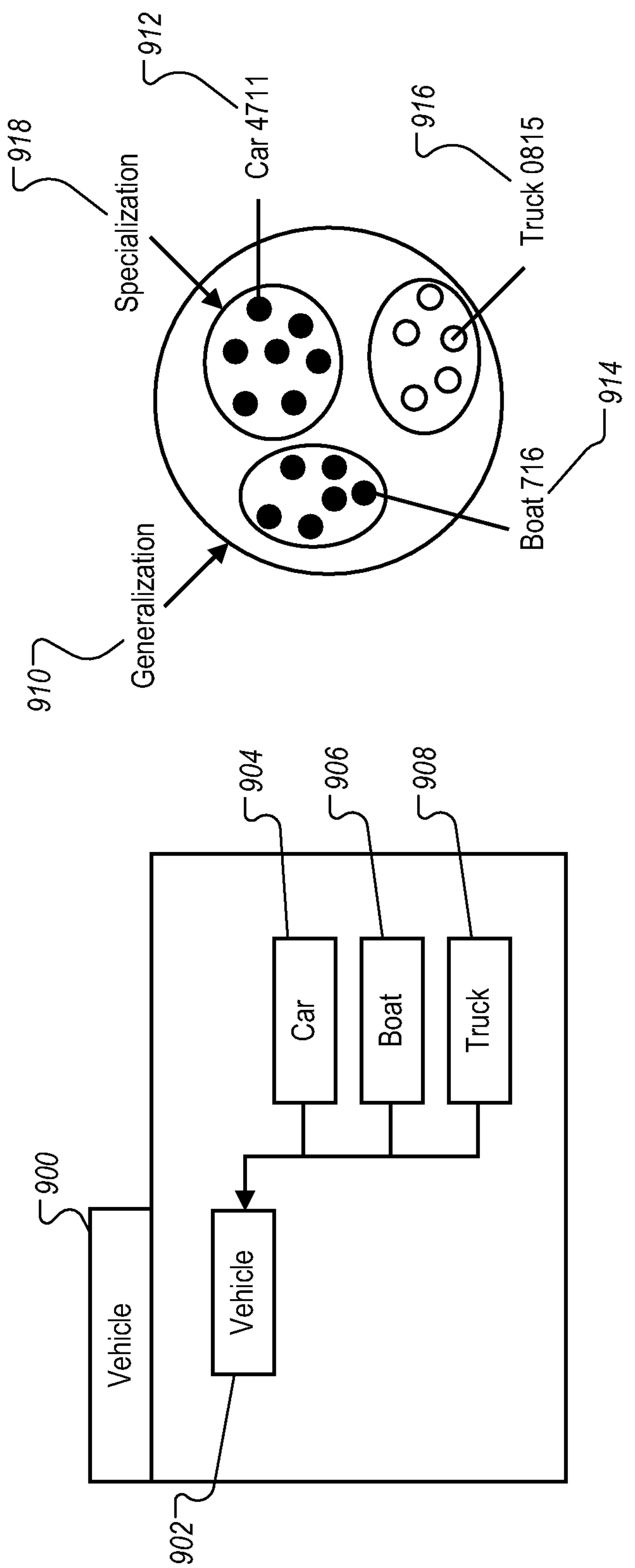
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
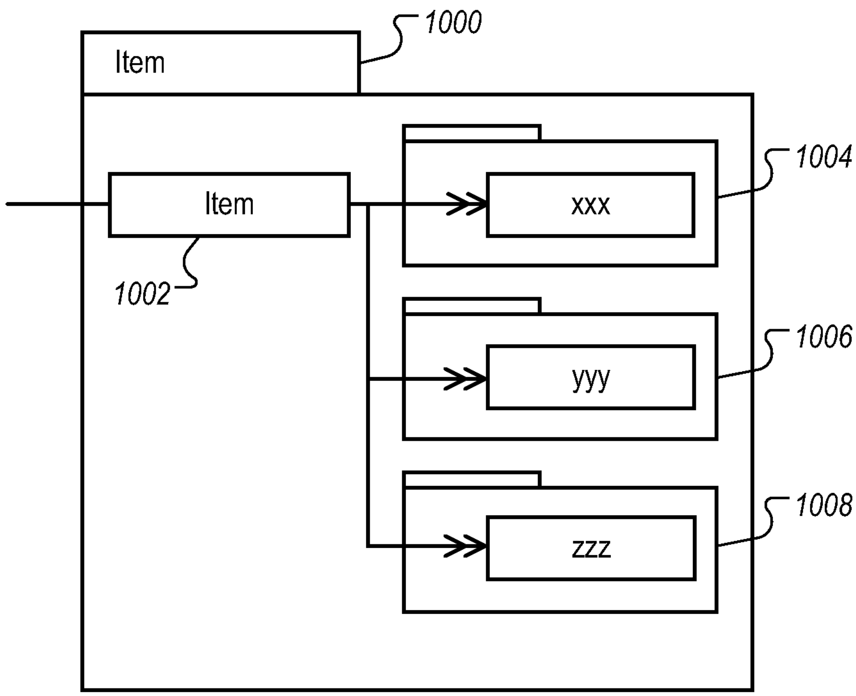
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
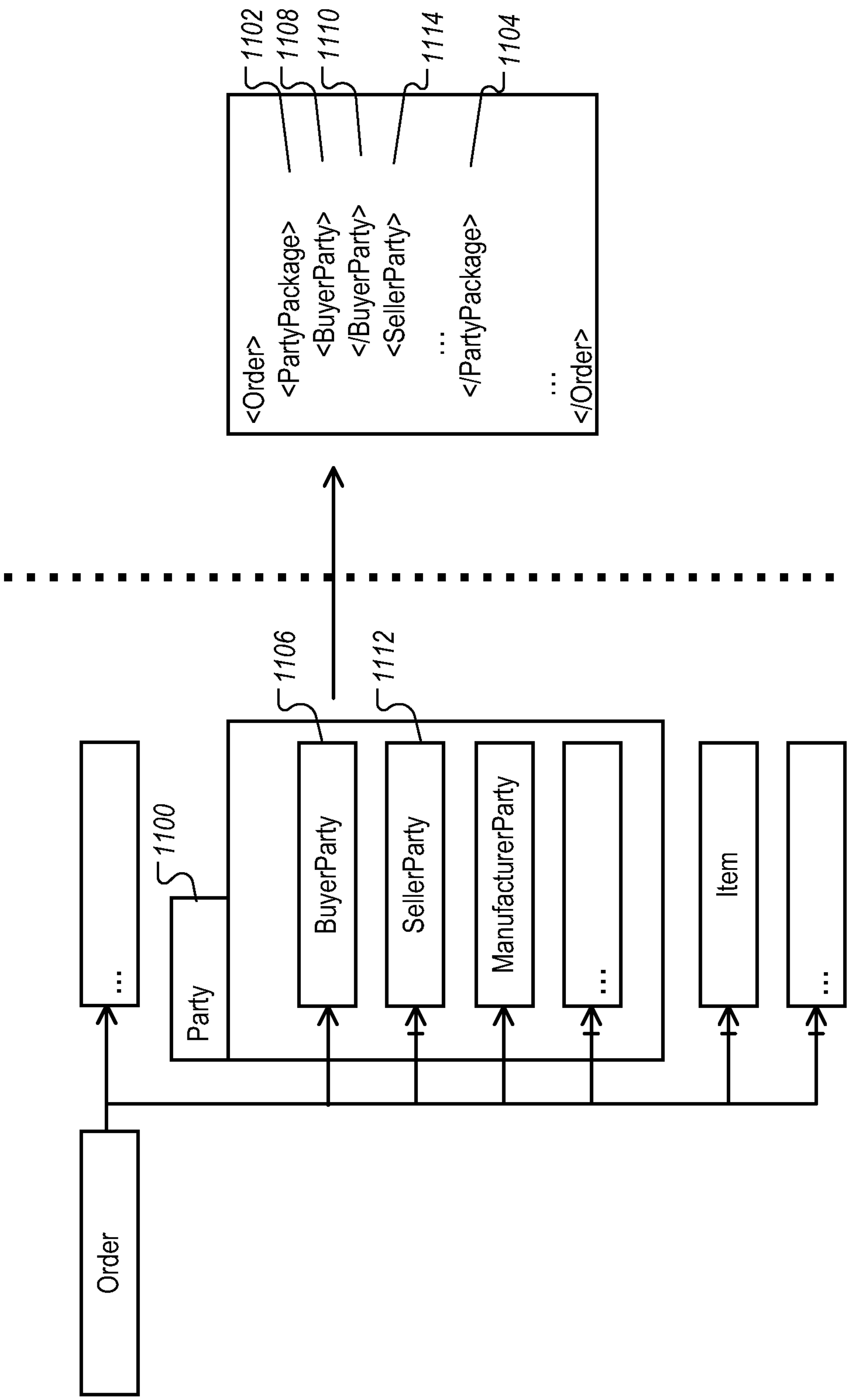
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
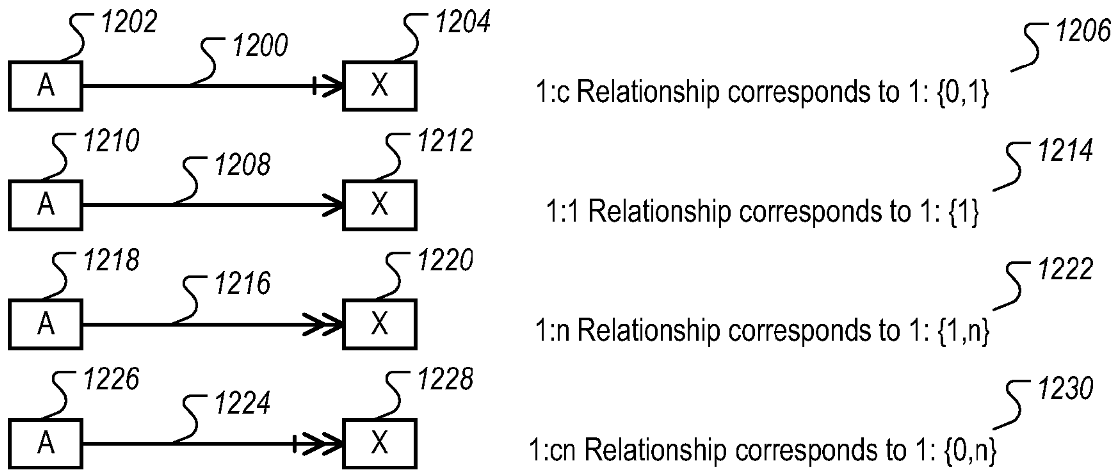
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
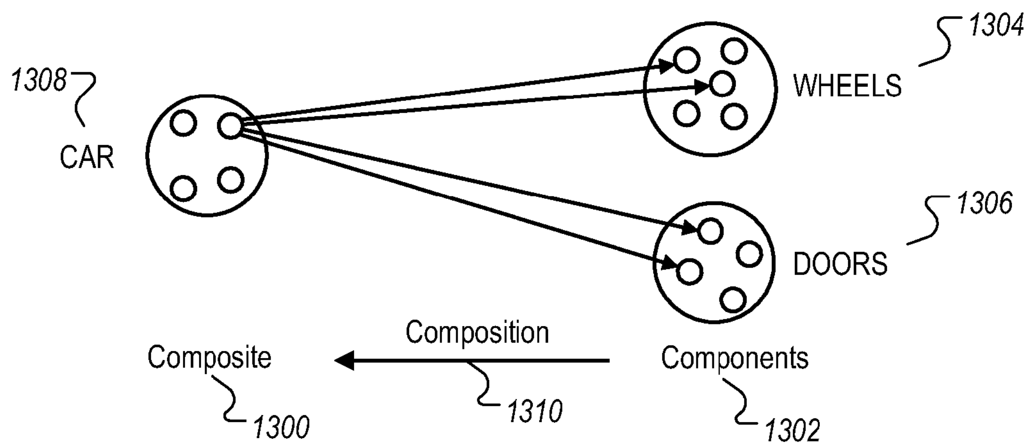
FIG. 13 depicts an example of a composition in accordance with methods and systems consistent with the subject matter described herein.
Figure 14:
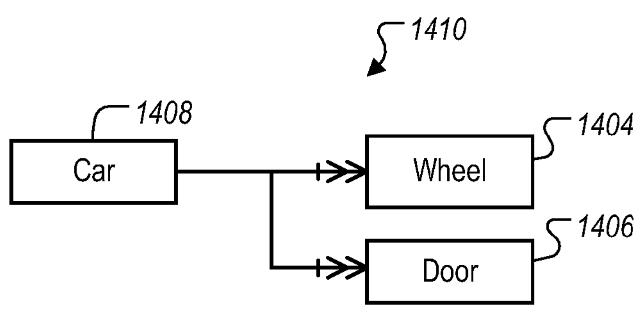
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
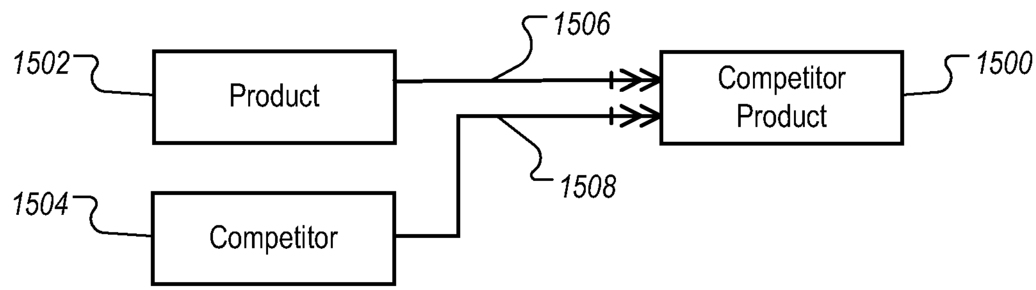
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
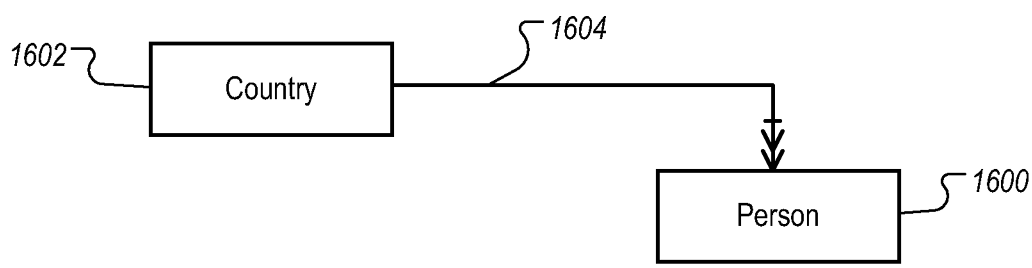
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
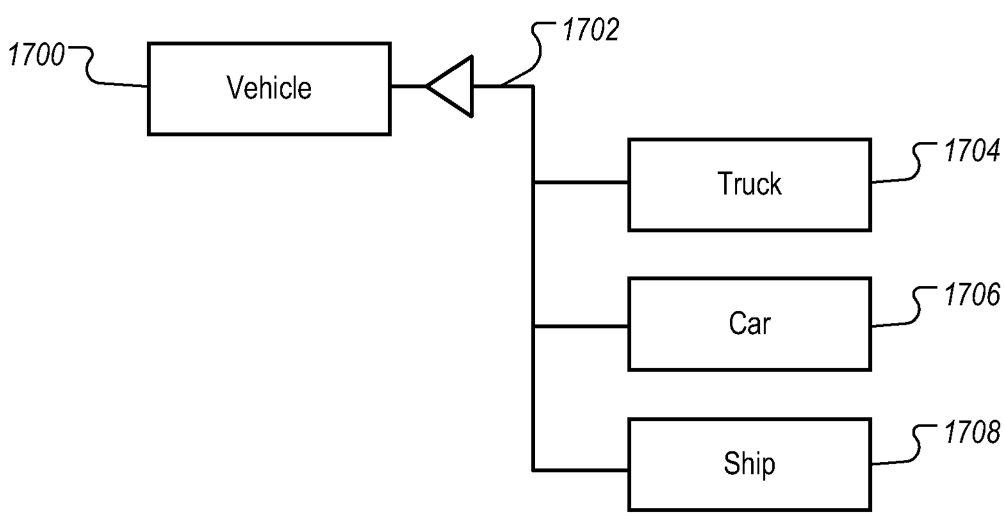
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
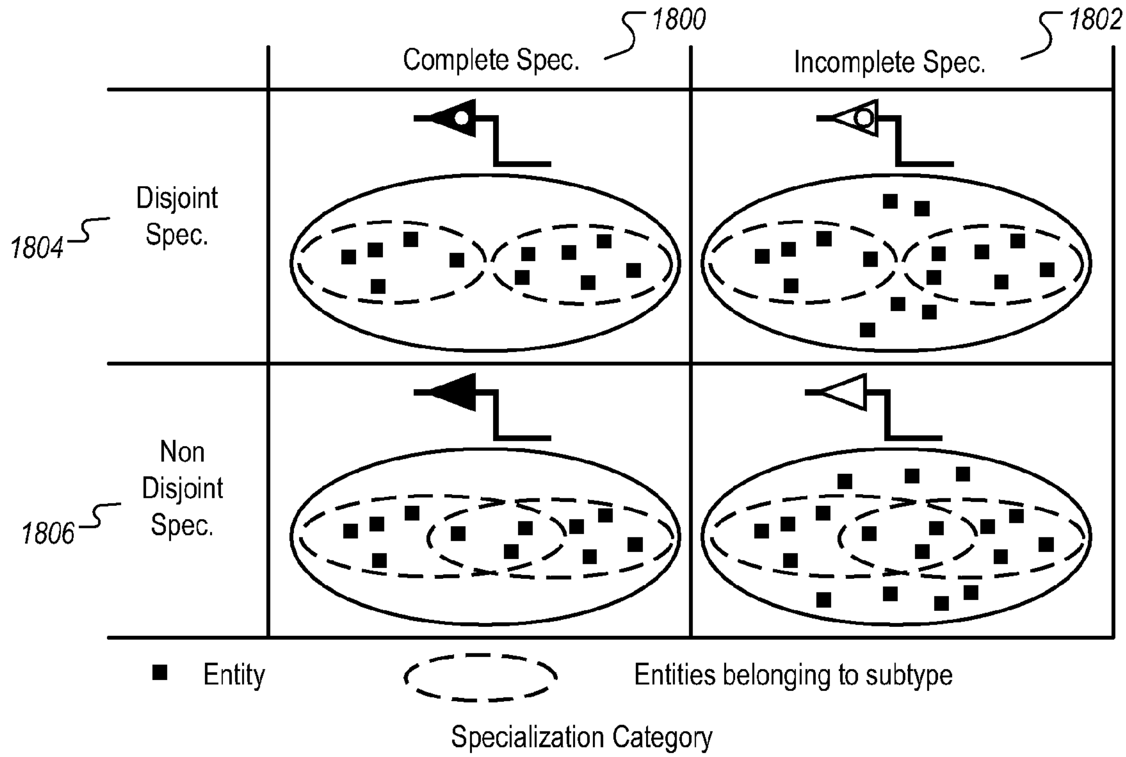
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
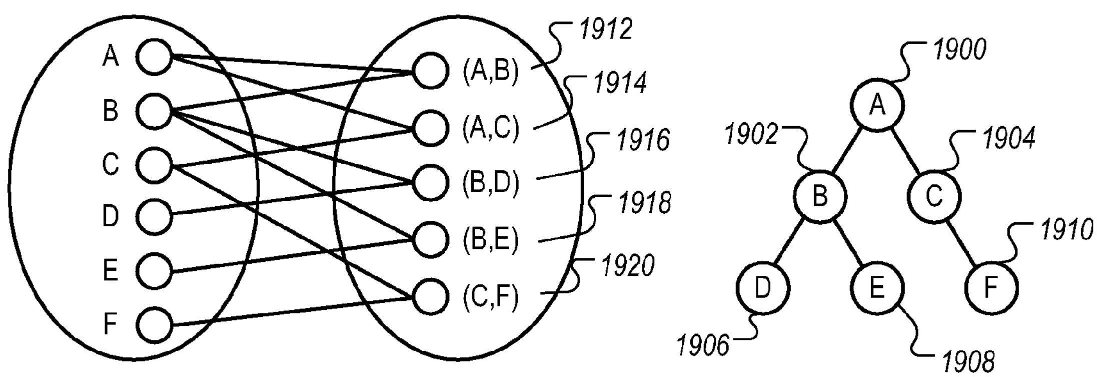
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
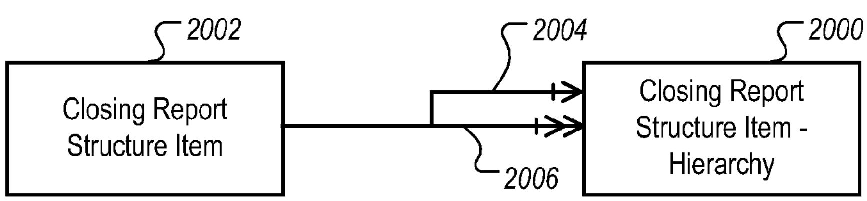
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
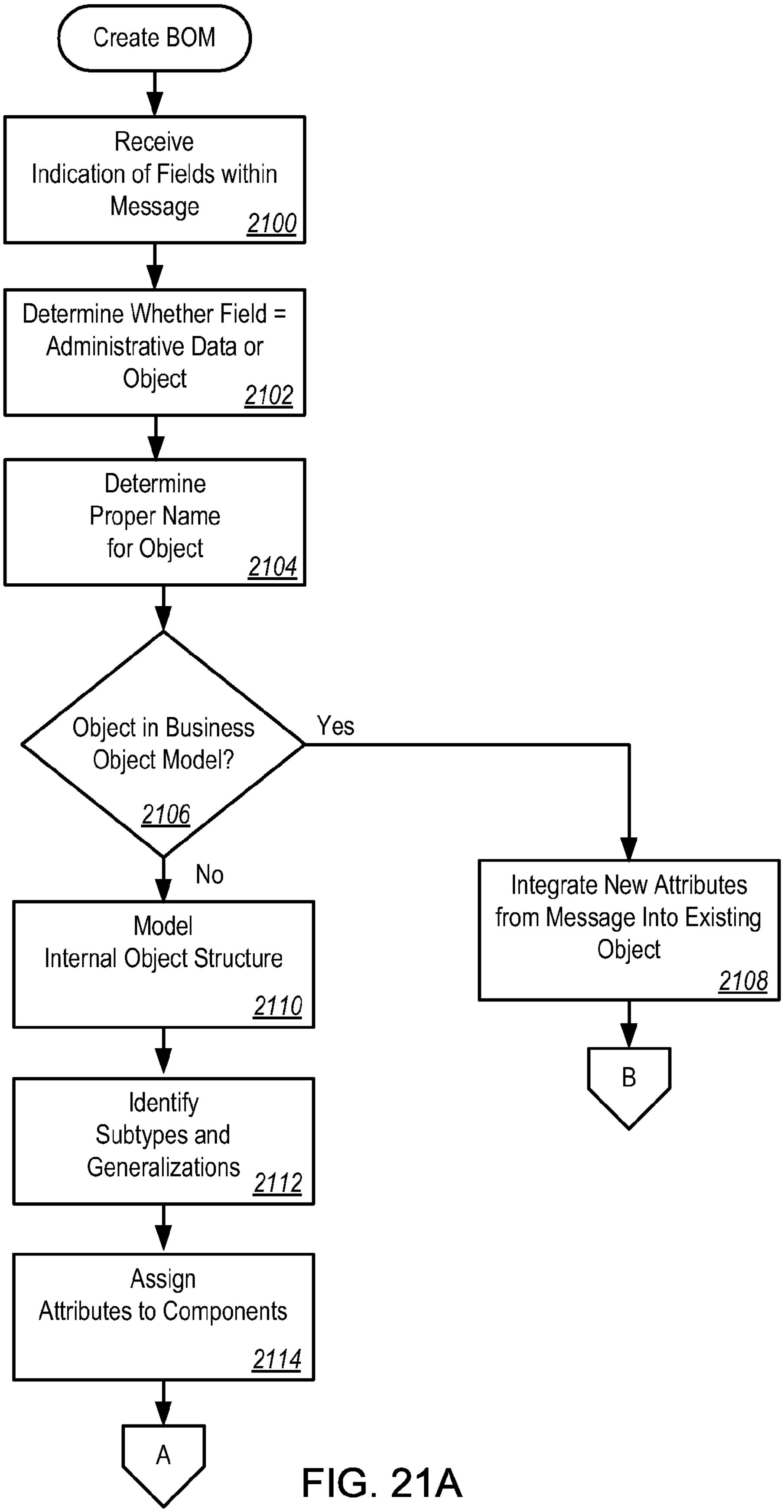
FIGS. 21A-B depict a flow diagram of the steps performed to create a business object model in accordance with methods and systems consistent with the subject matter described herein.
Figure 21B:
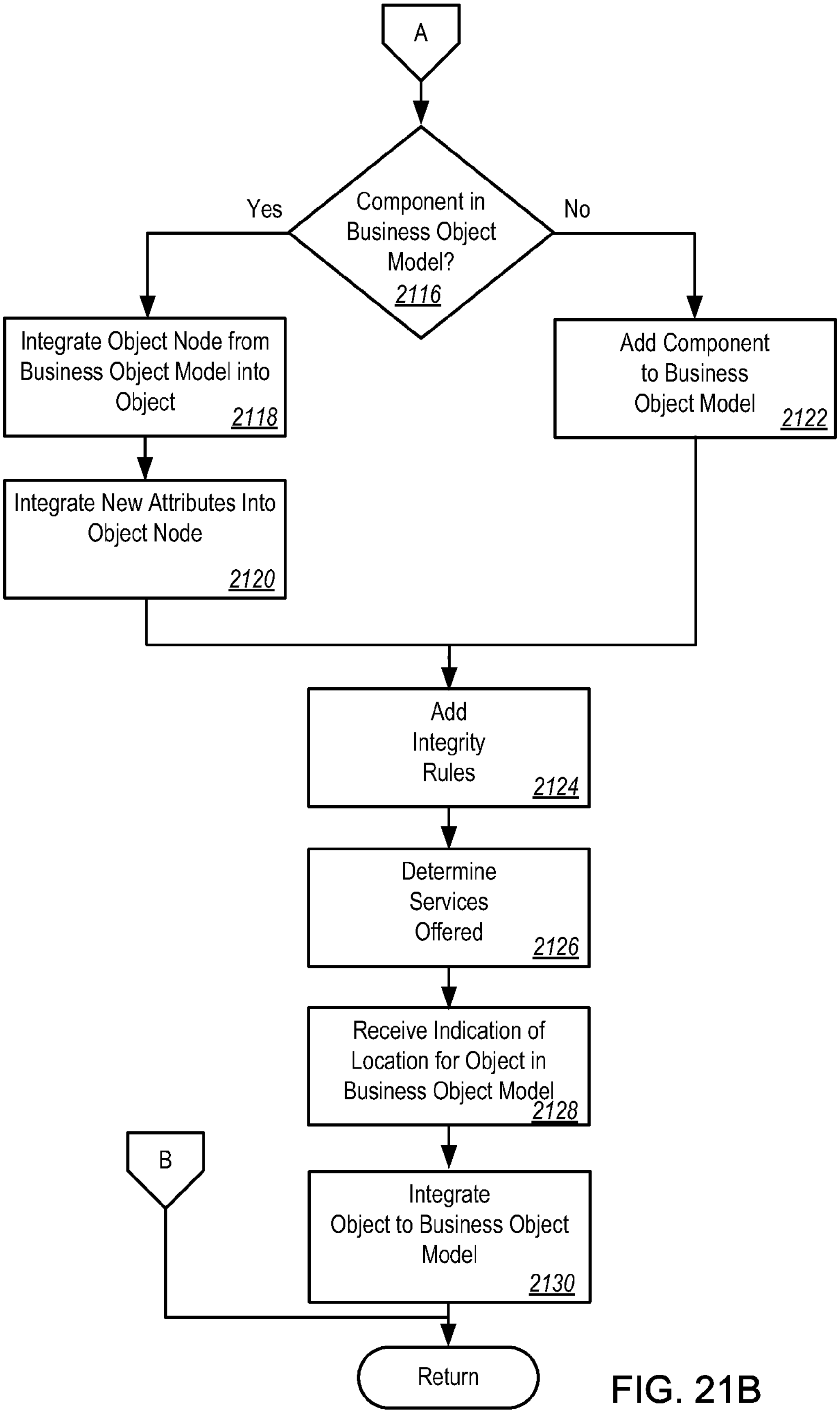

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |

-continued

| |
|---|
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |
| Location | | Location |
| LocationType | | |
| DeliveryItemGroupID | | DeliveryTerms |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | | Payment |

-continued

| | | |
|---|---|---|
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation | | |
| Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |

-continued

| | |
|---|---|
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |

-continued

| | | |
|---|---|---|
| DeliveryTerms | | 0 . . . 1 |
| Attachment | | 0 . . . n |
| Description | | 0 . . . 1 |
| ConfirmationDescription | | 0 . . . 1 |
| ScheduleLine | | 0 . . . n |
| | DeliveryPeriod | 1 |
| ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |

-continued

| | | | |
|---|---|---|---|
| ScheduleLine | | | 0 . . . n |
| | Delivery Period | | 1 |
| ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
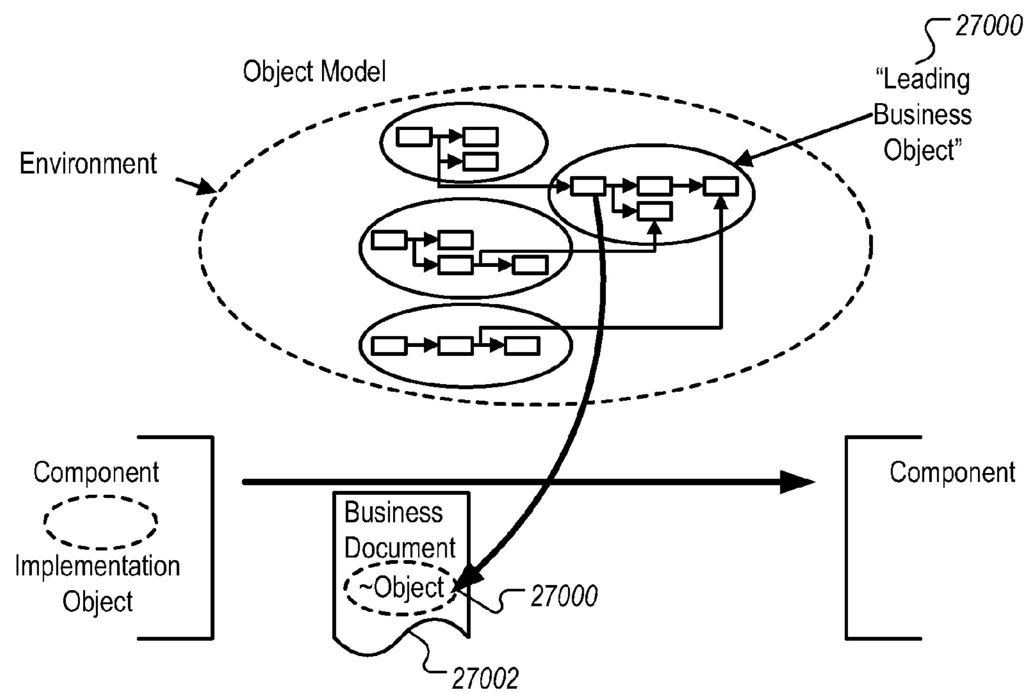
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
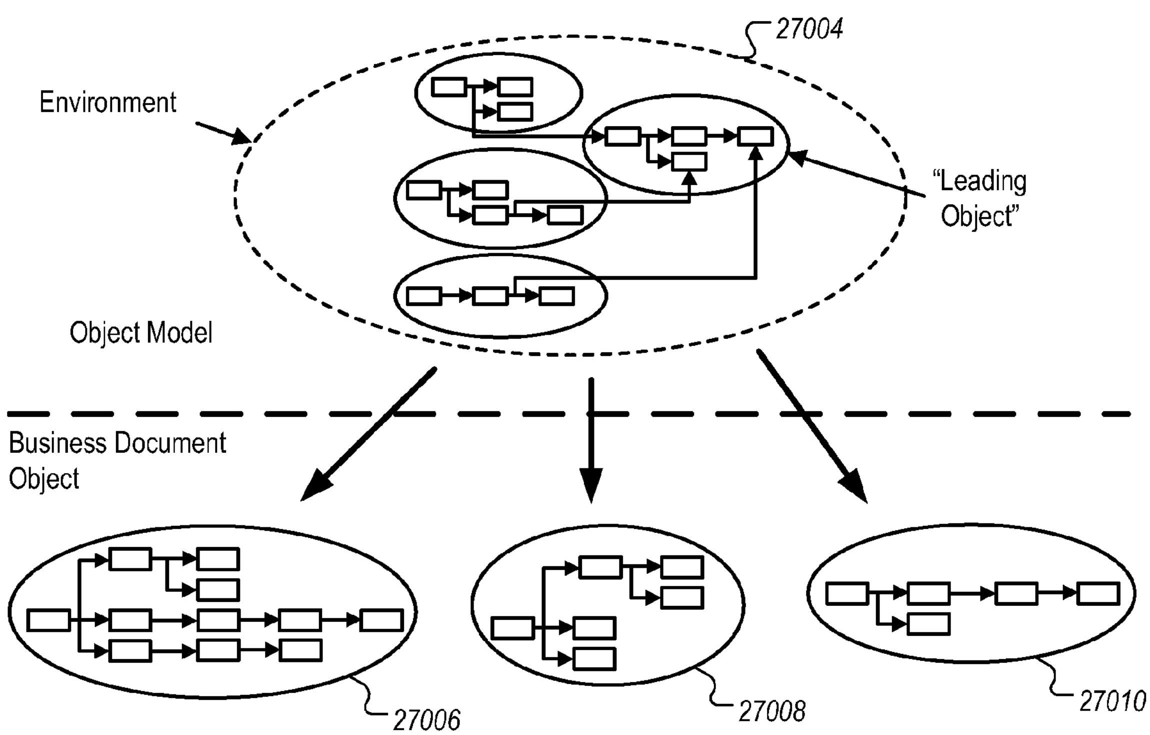

As illustrated in FIG. 27B, several business document objects 27006, 27008, and 27010 as overlapping views may be derived for a given leading object 27004. Each business document object results from the object model by hierarchization.

Figure 27C:
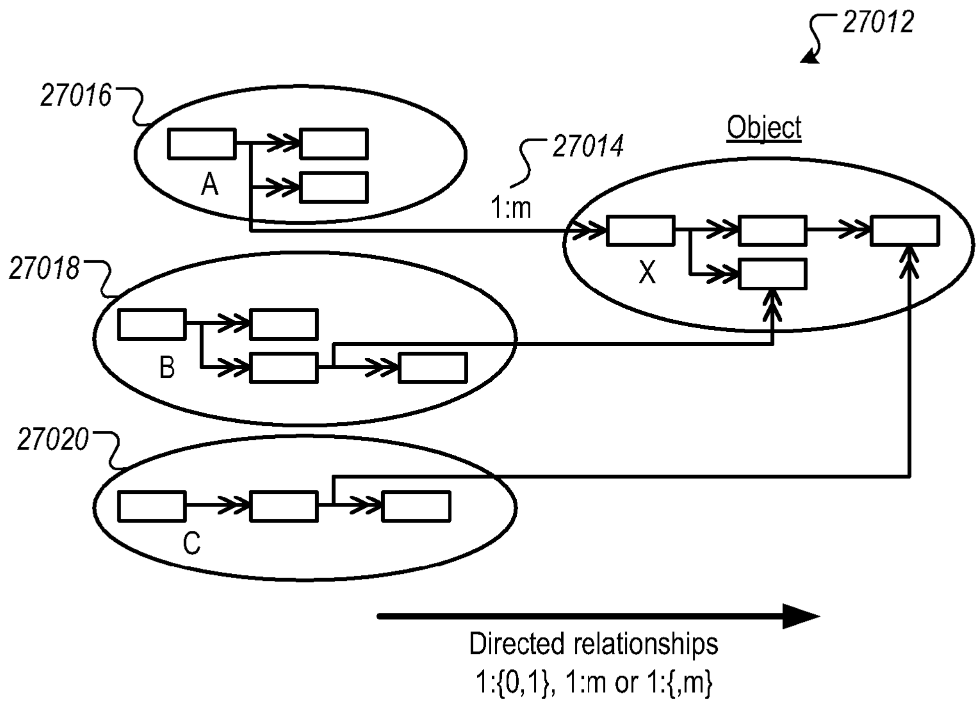

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
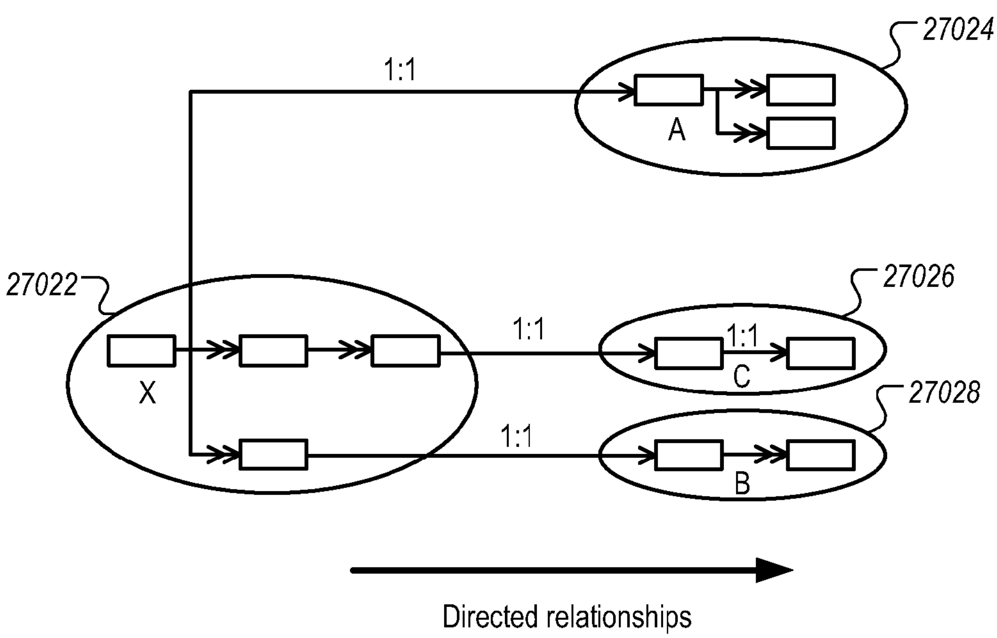

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
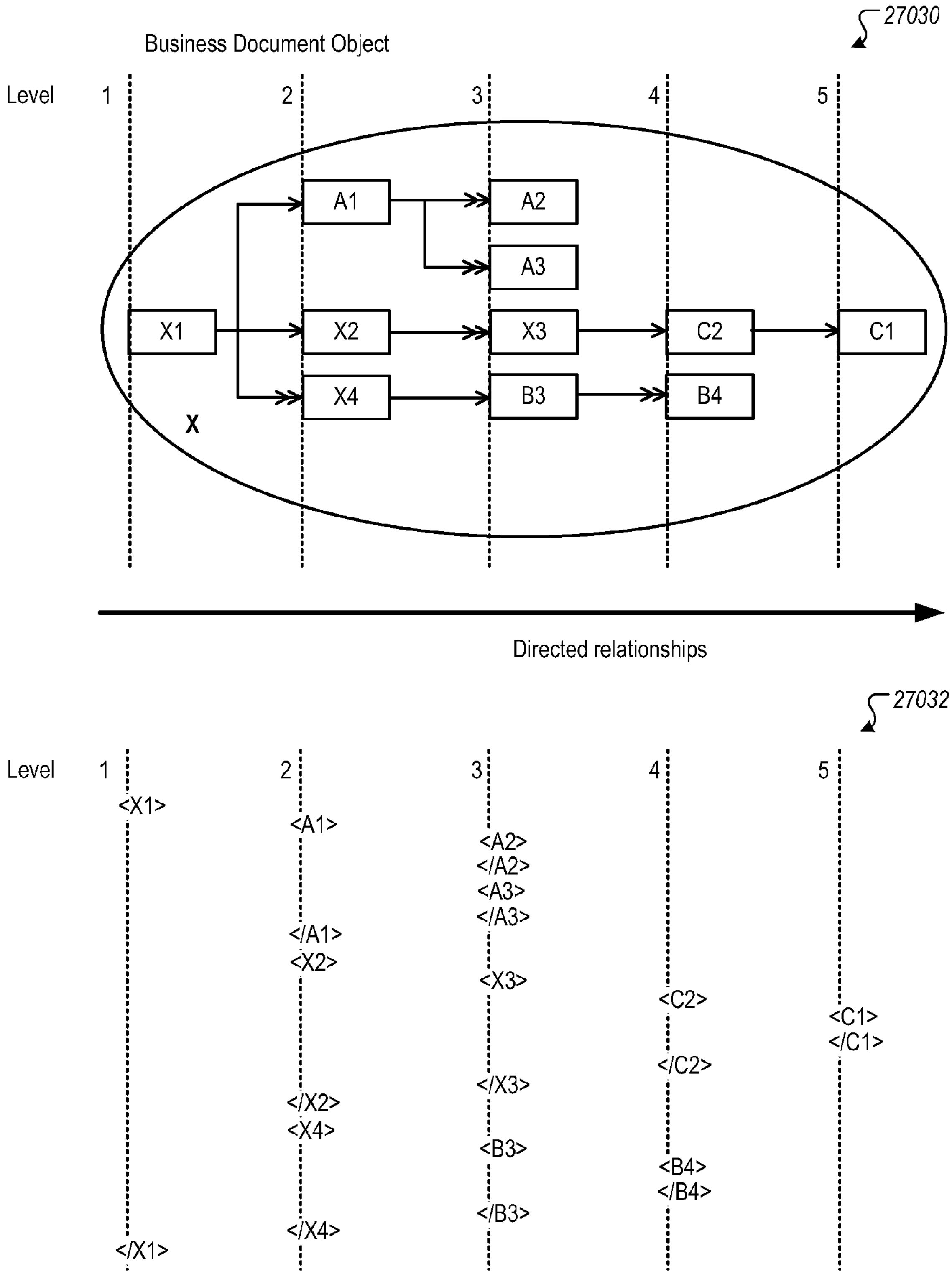

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role> Party, for example, BuyerParty, ItemBuyerParty. BTDReference nodes are modeled as separate entities for each reference type in the business document object. These nodes are given the name <Qualifier><BO><Node> Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
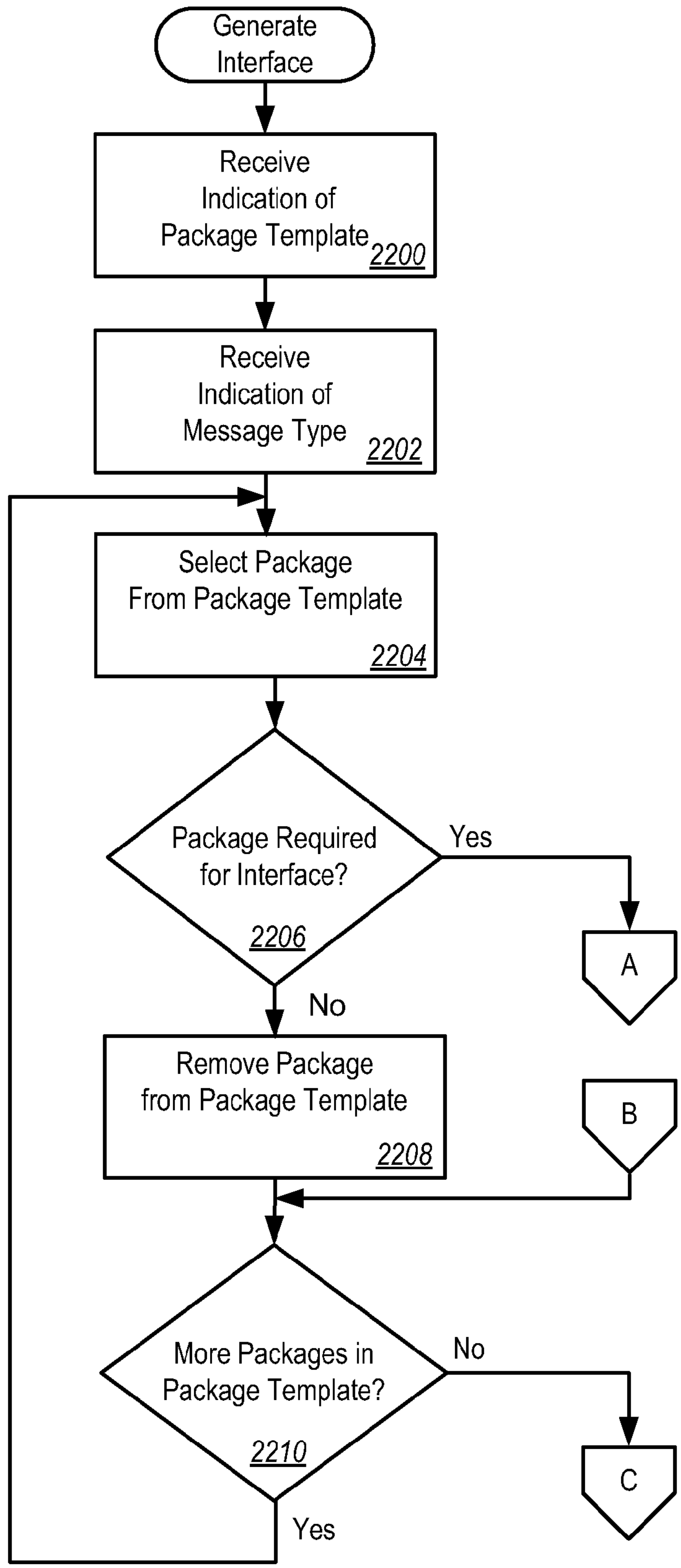
FIGS. 22A-F depict a flow diagram of the steps performed to generate an interface from the business object model in accordance with methods and systems consistent with the subject matter described herein.
Figure 22B:
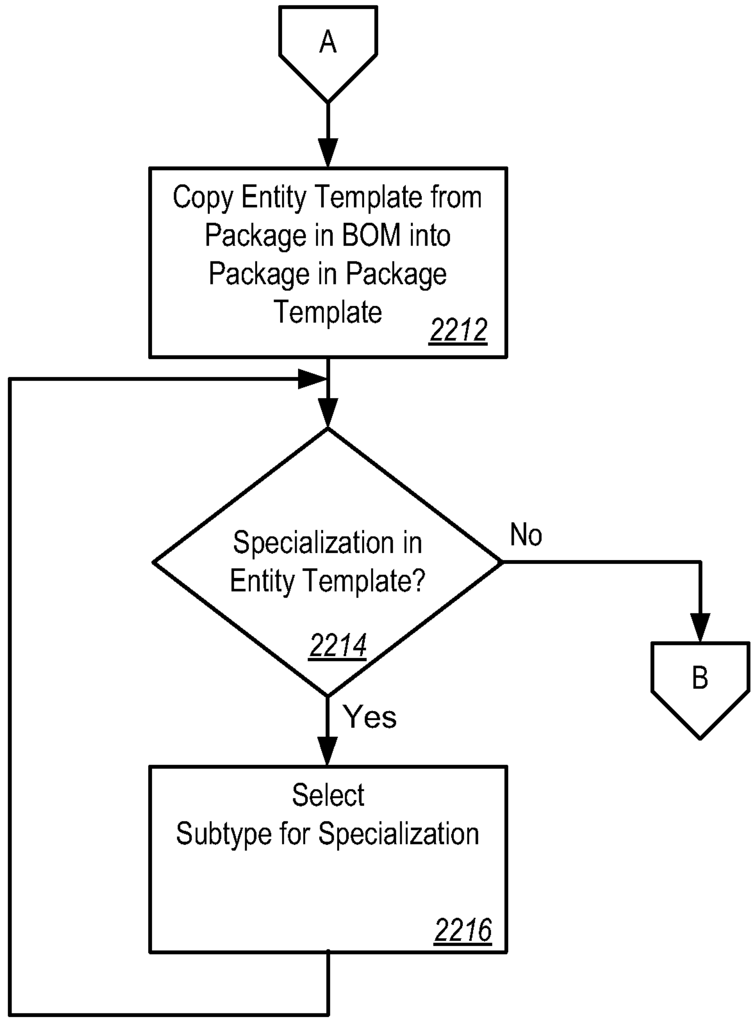
Figure 22C:
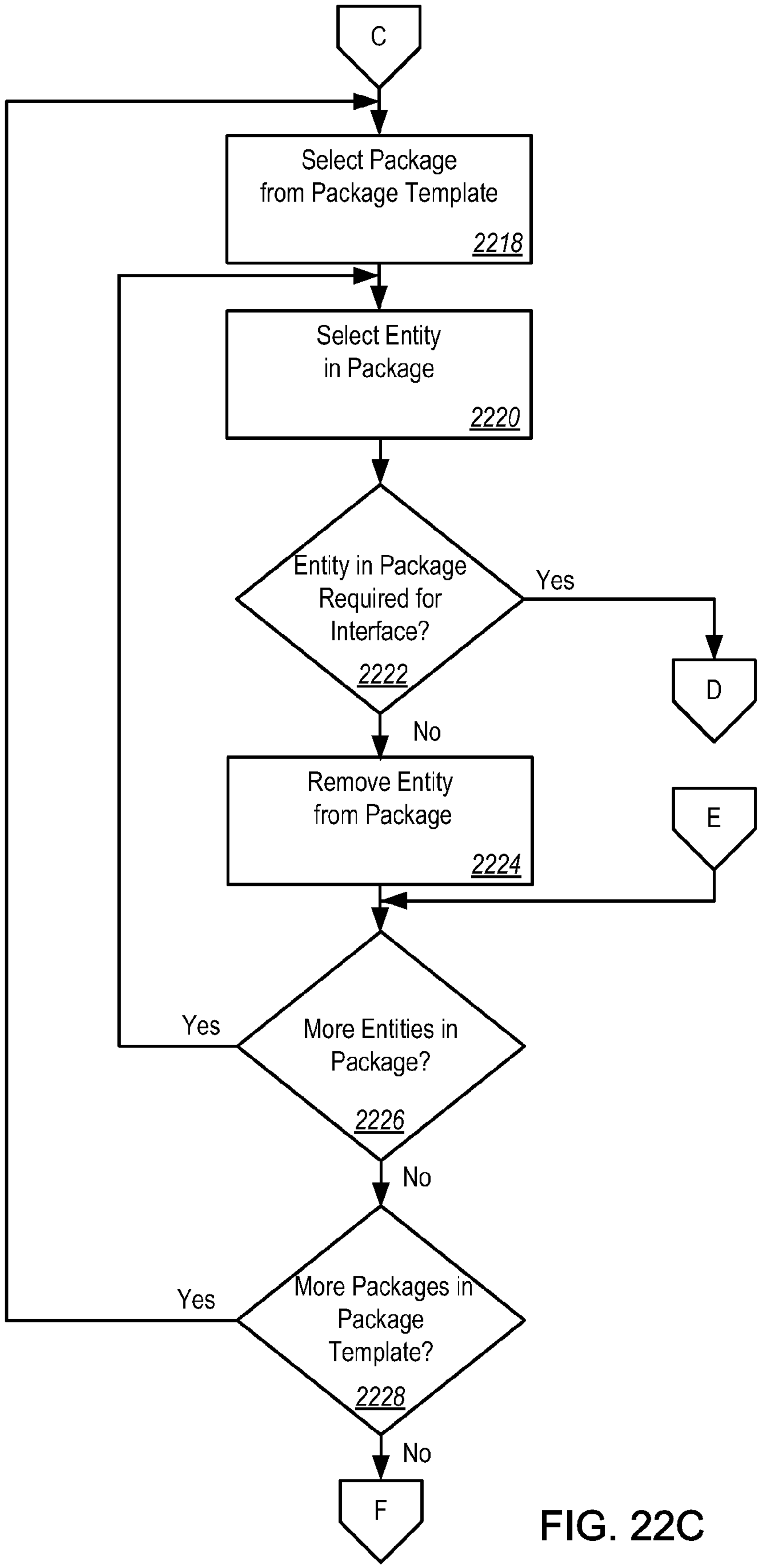

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
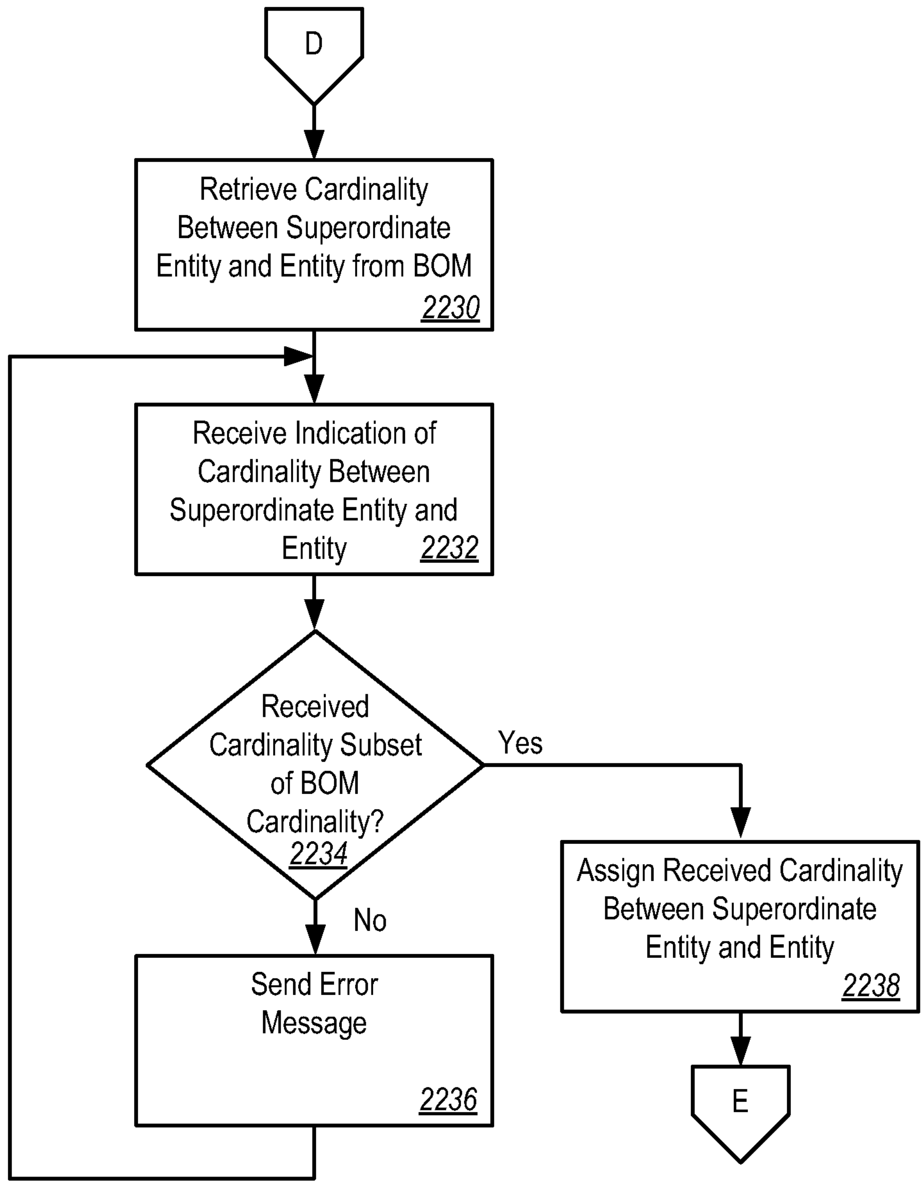

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
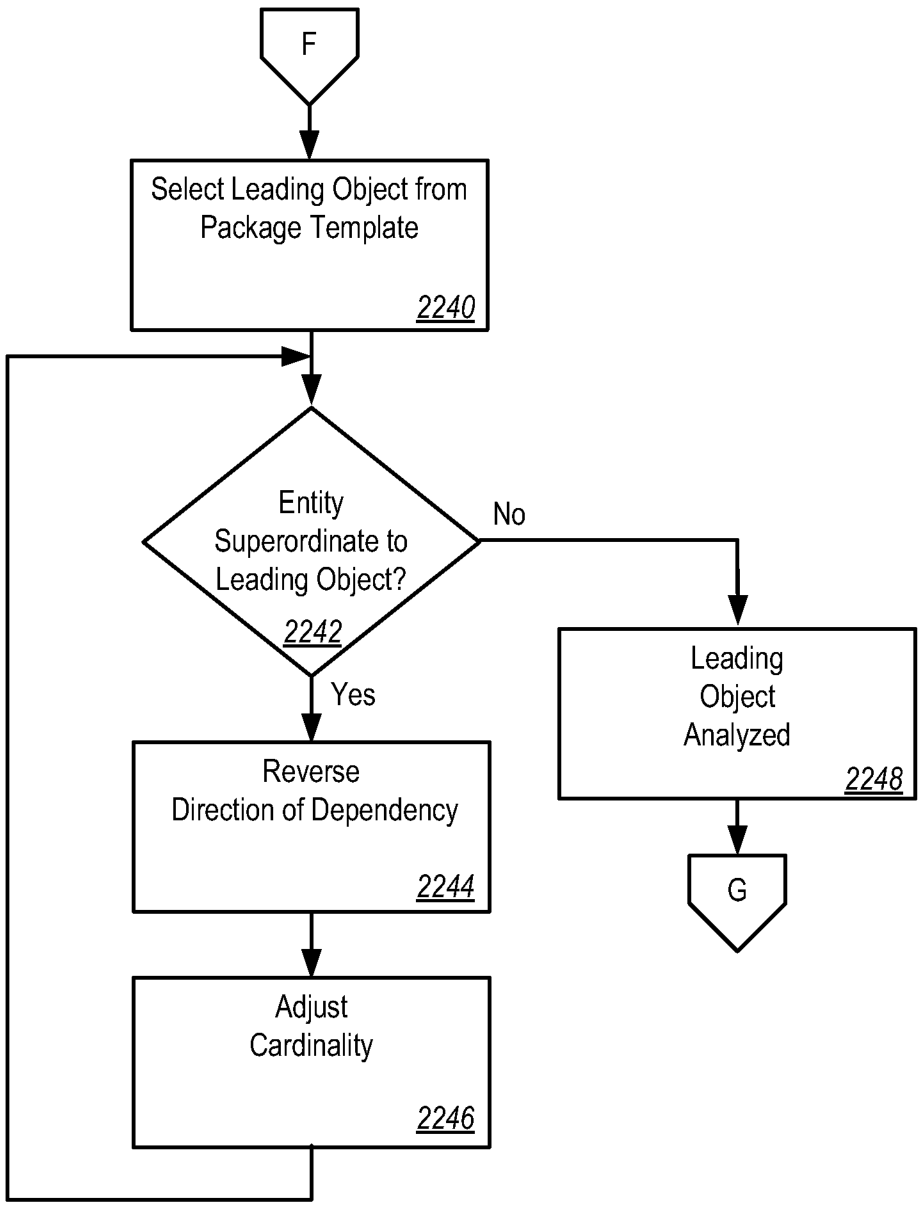

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
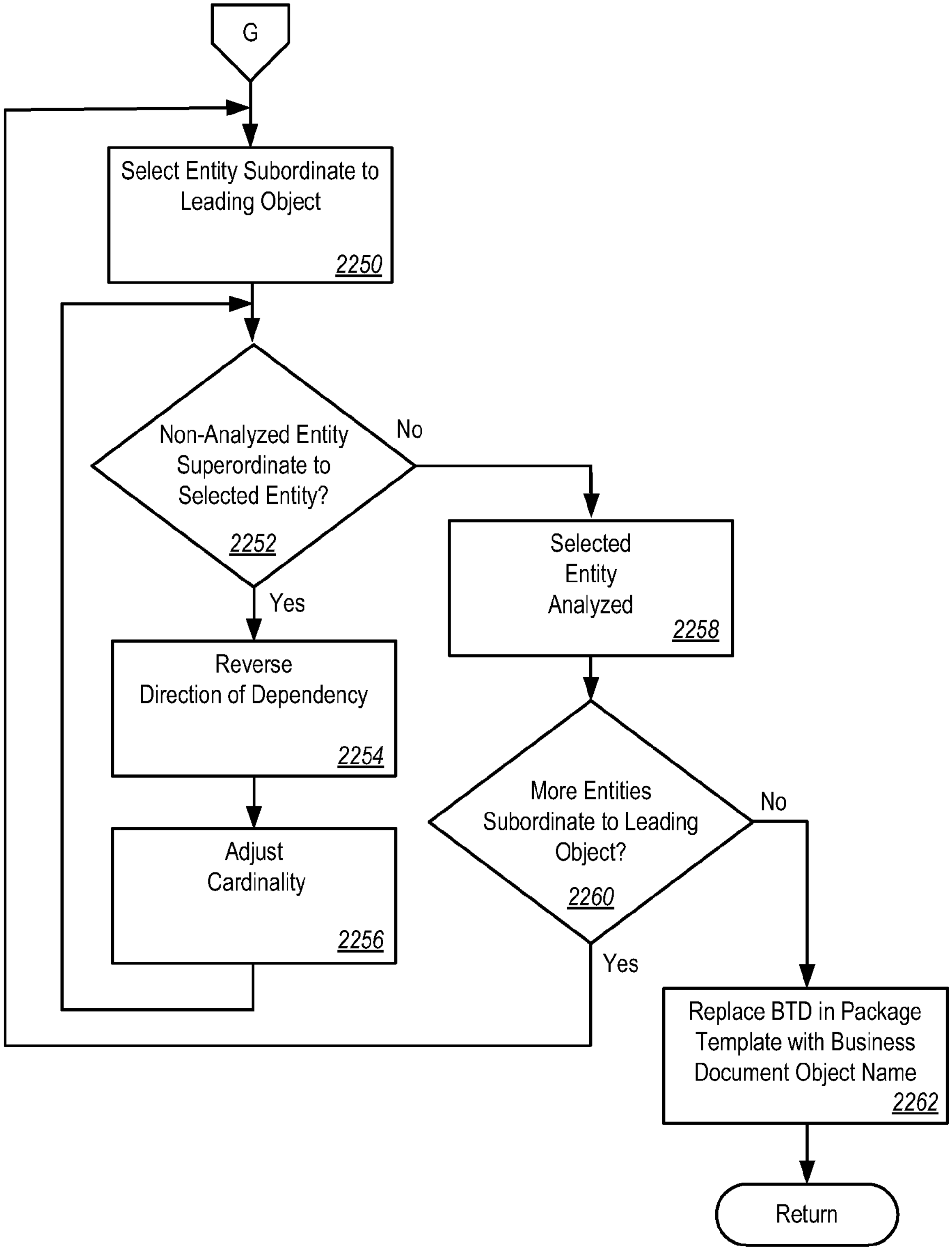

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
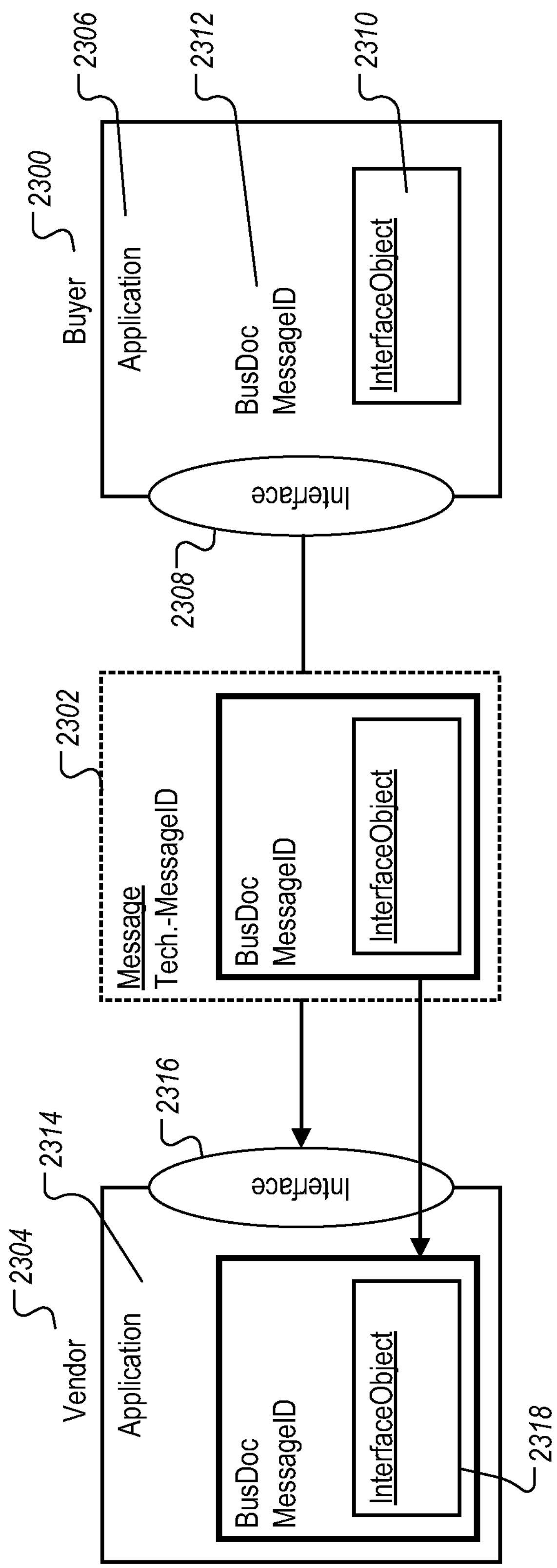
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
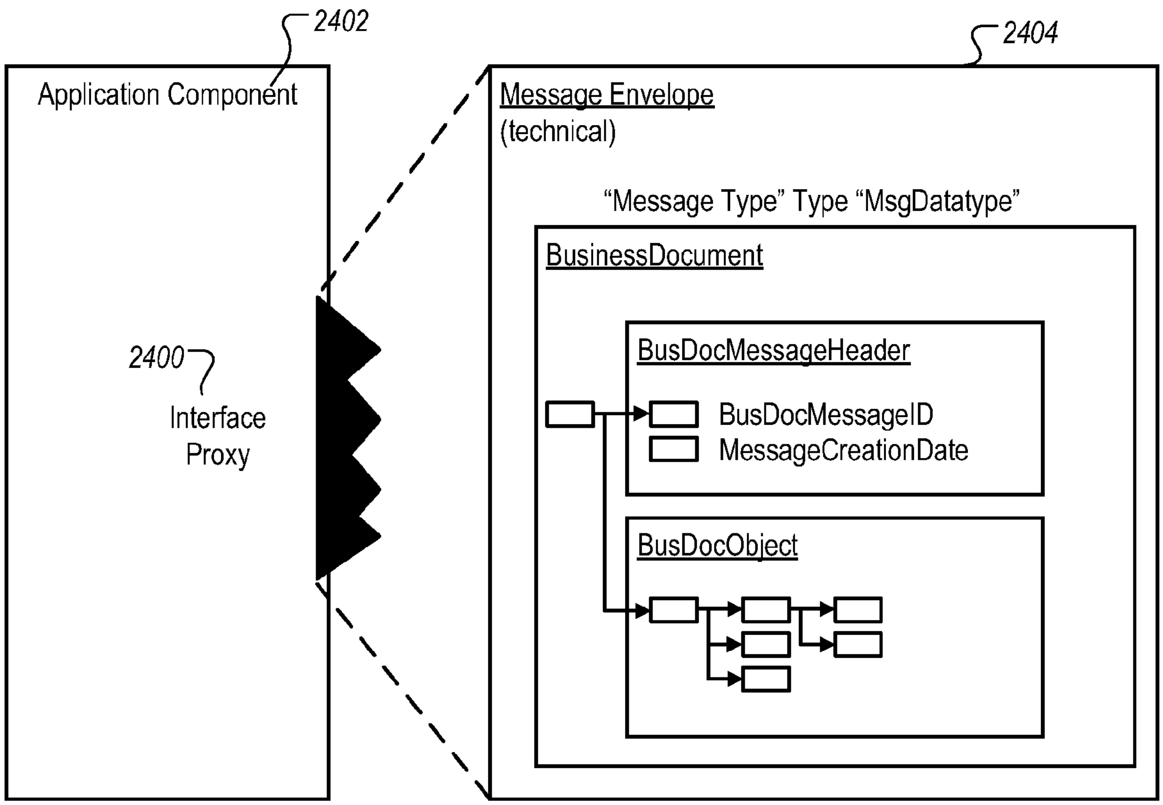
FIG. 24 depicts an interface proxy in accordance with methods and systems consistent with the subject matter described herein.
Figure 25:
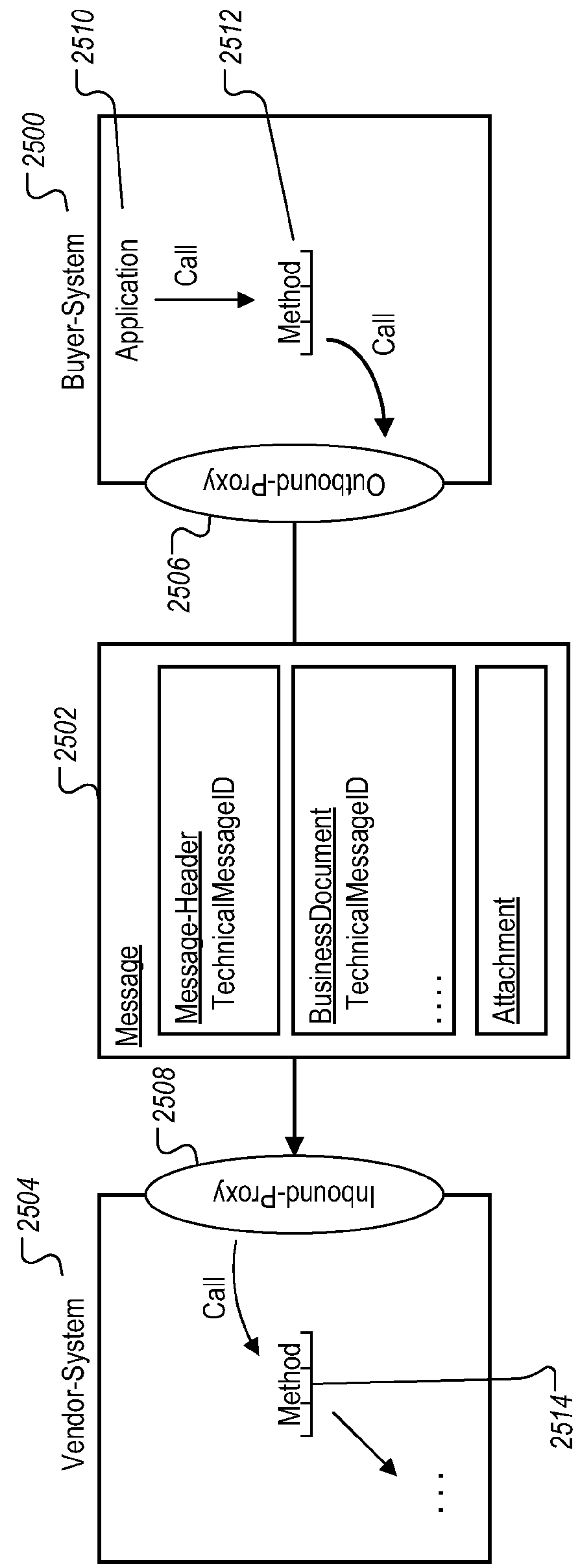
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
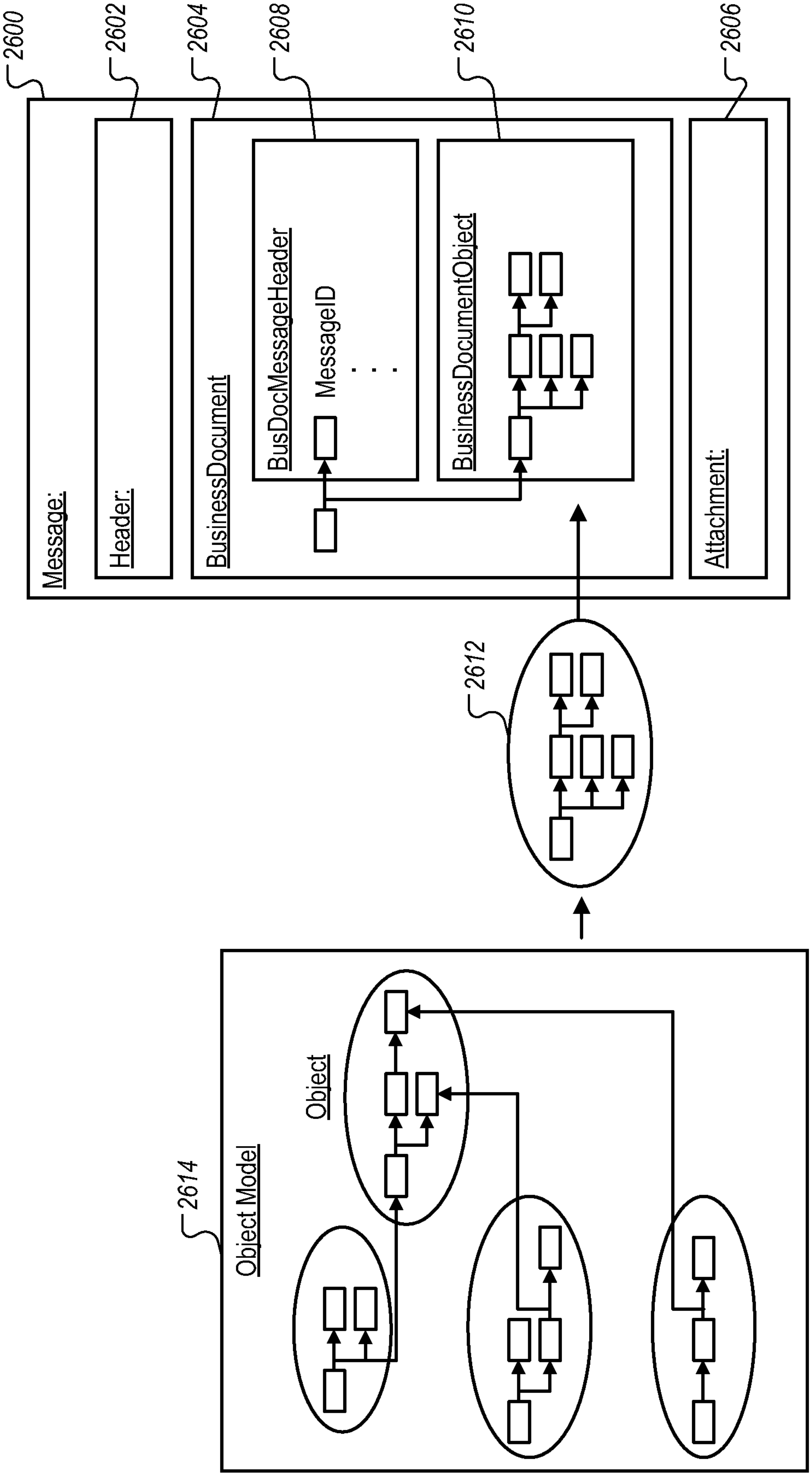
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
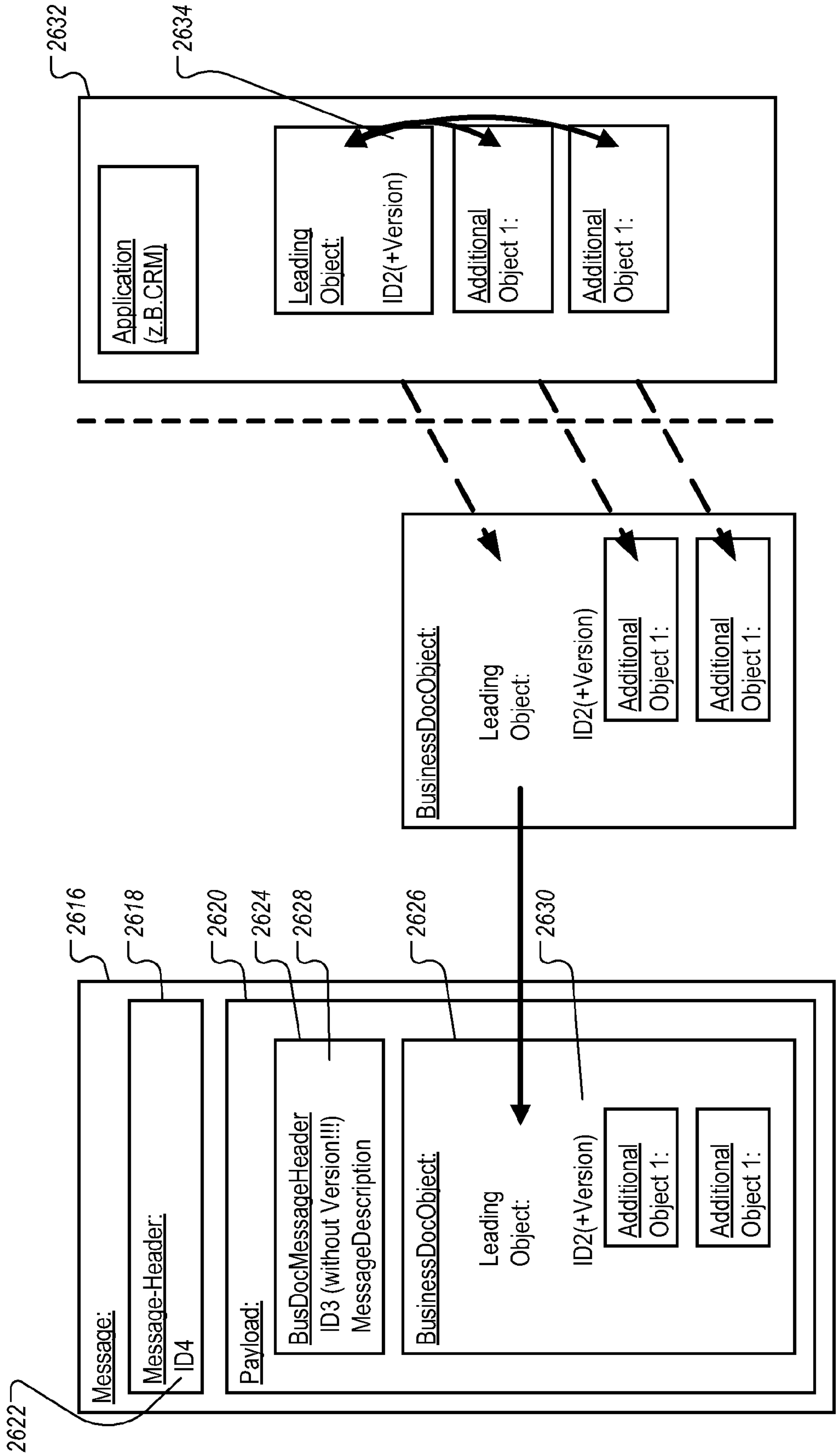
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
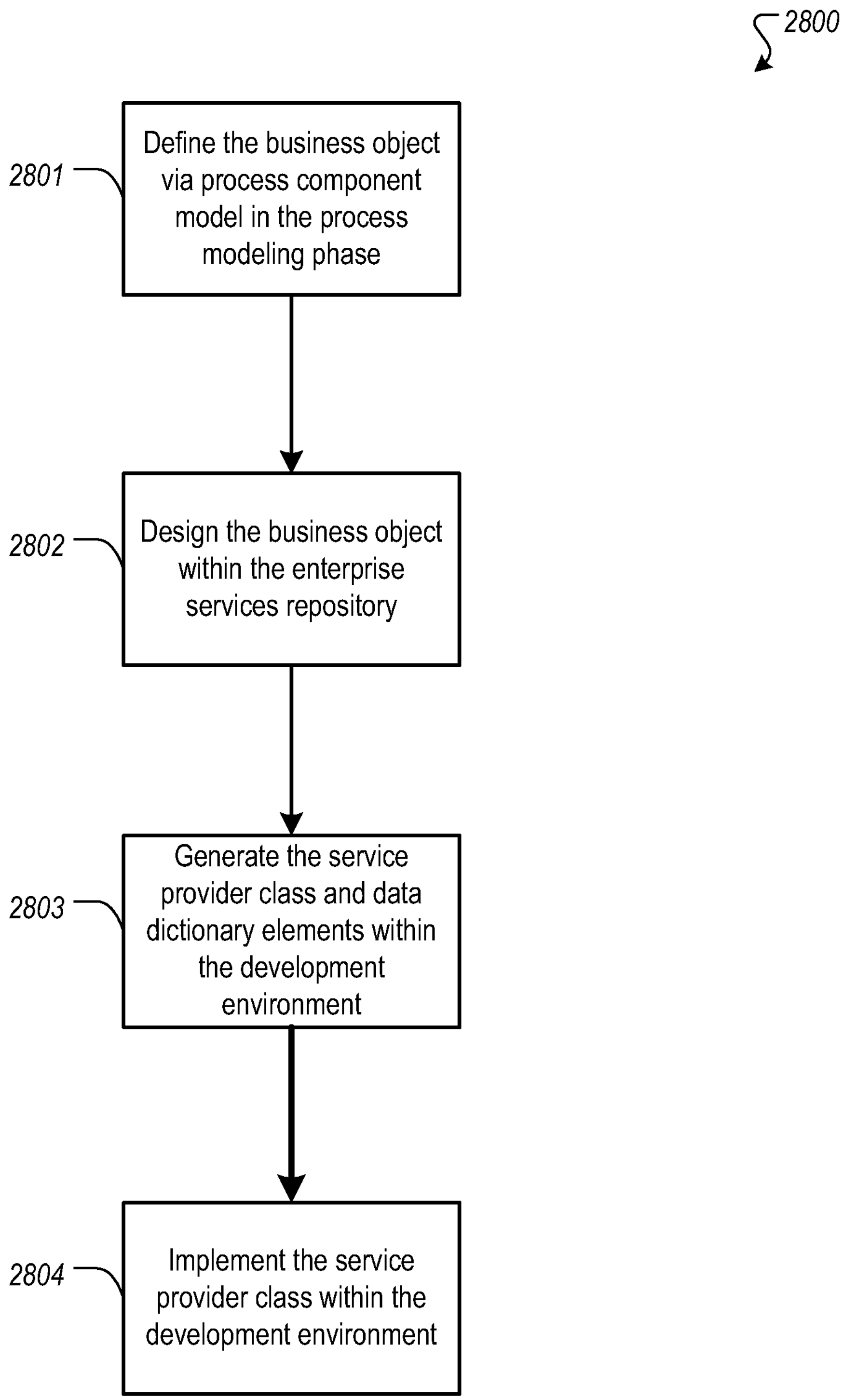
FIG. 28 illustrates an example method for service enabling in accordance with one embodiment of the present disclosure.
Figure 29:
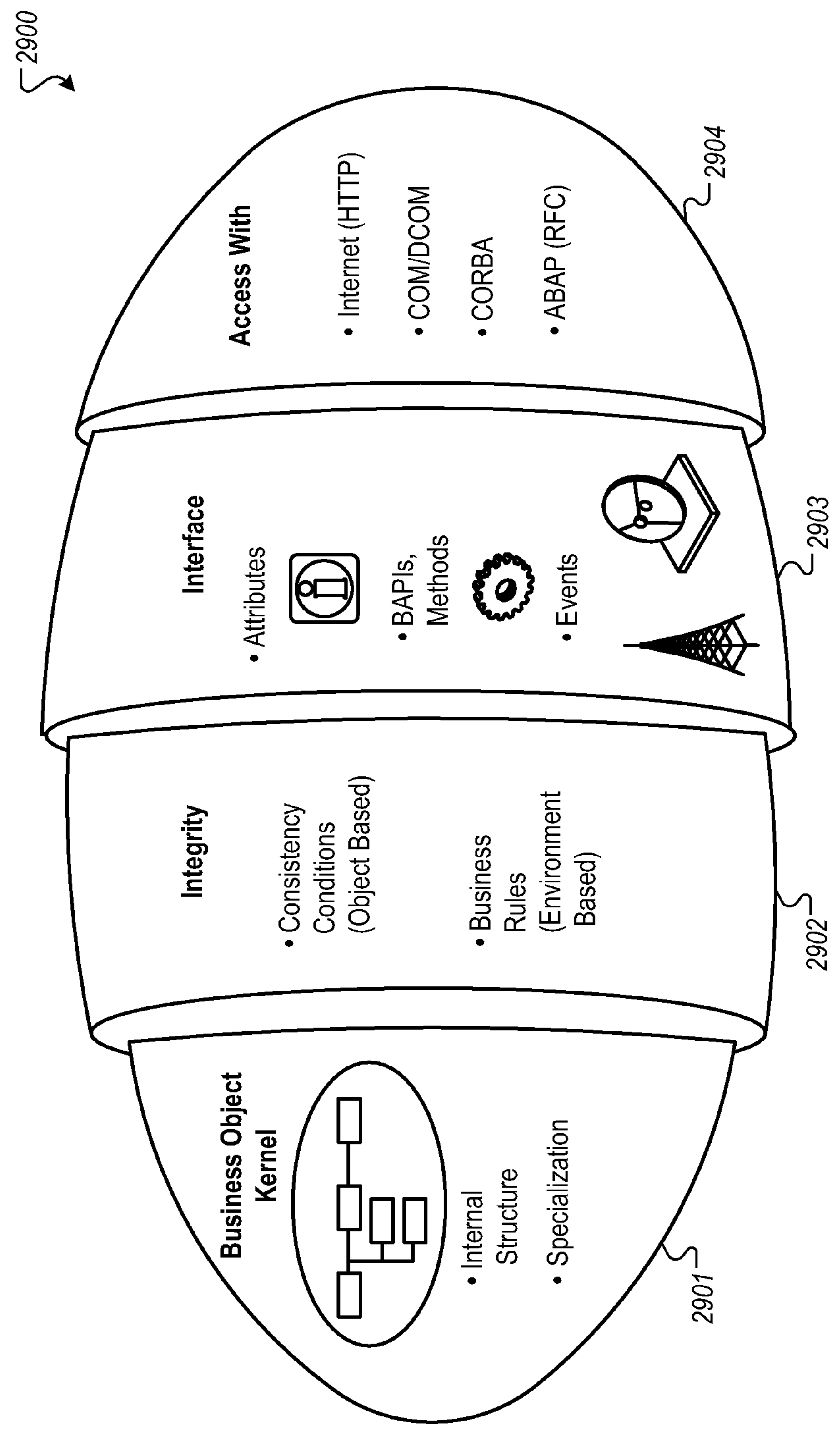
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
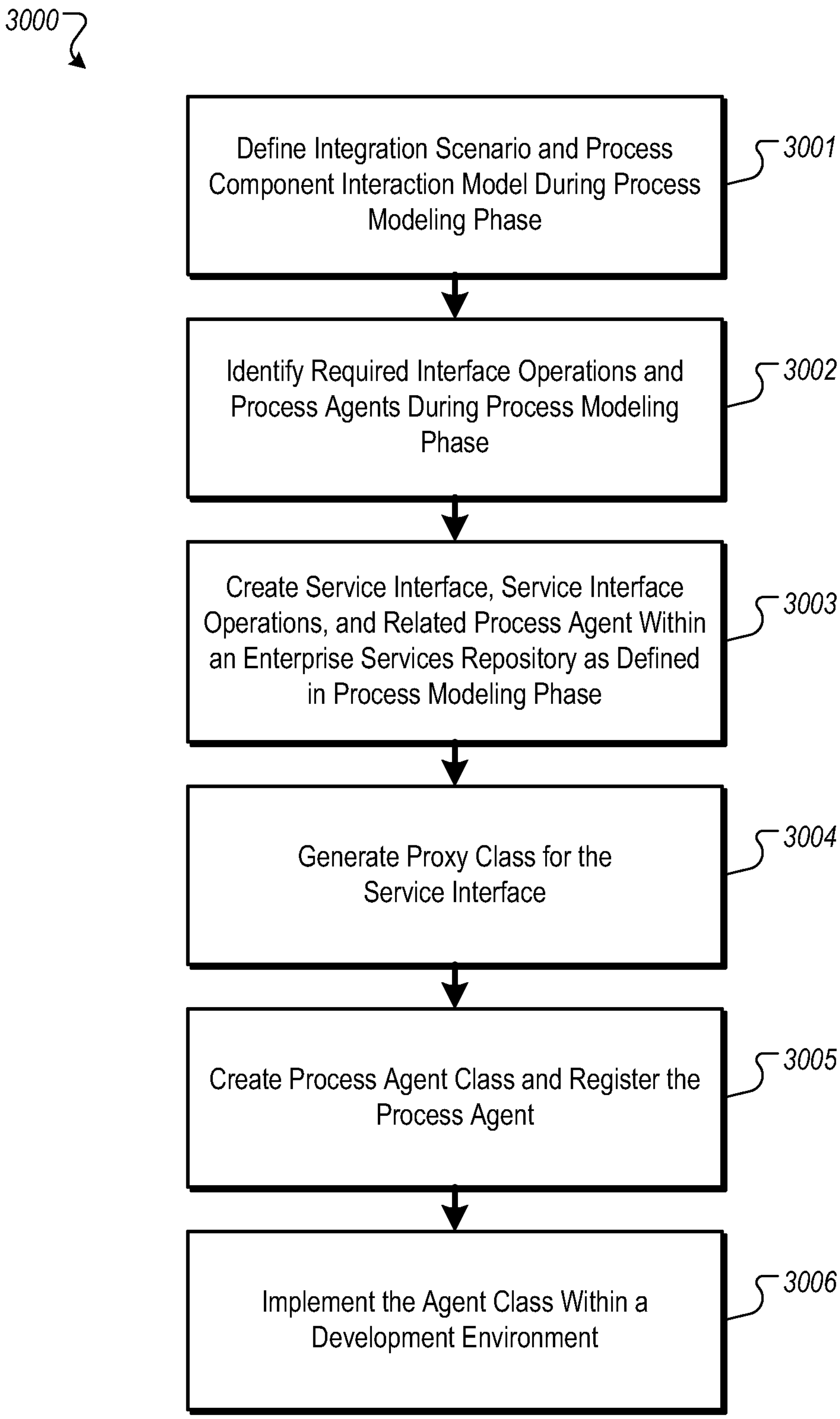
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
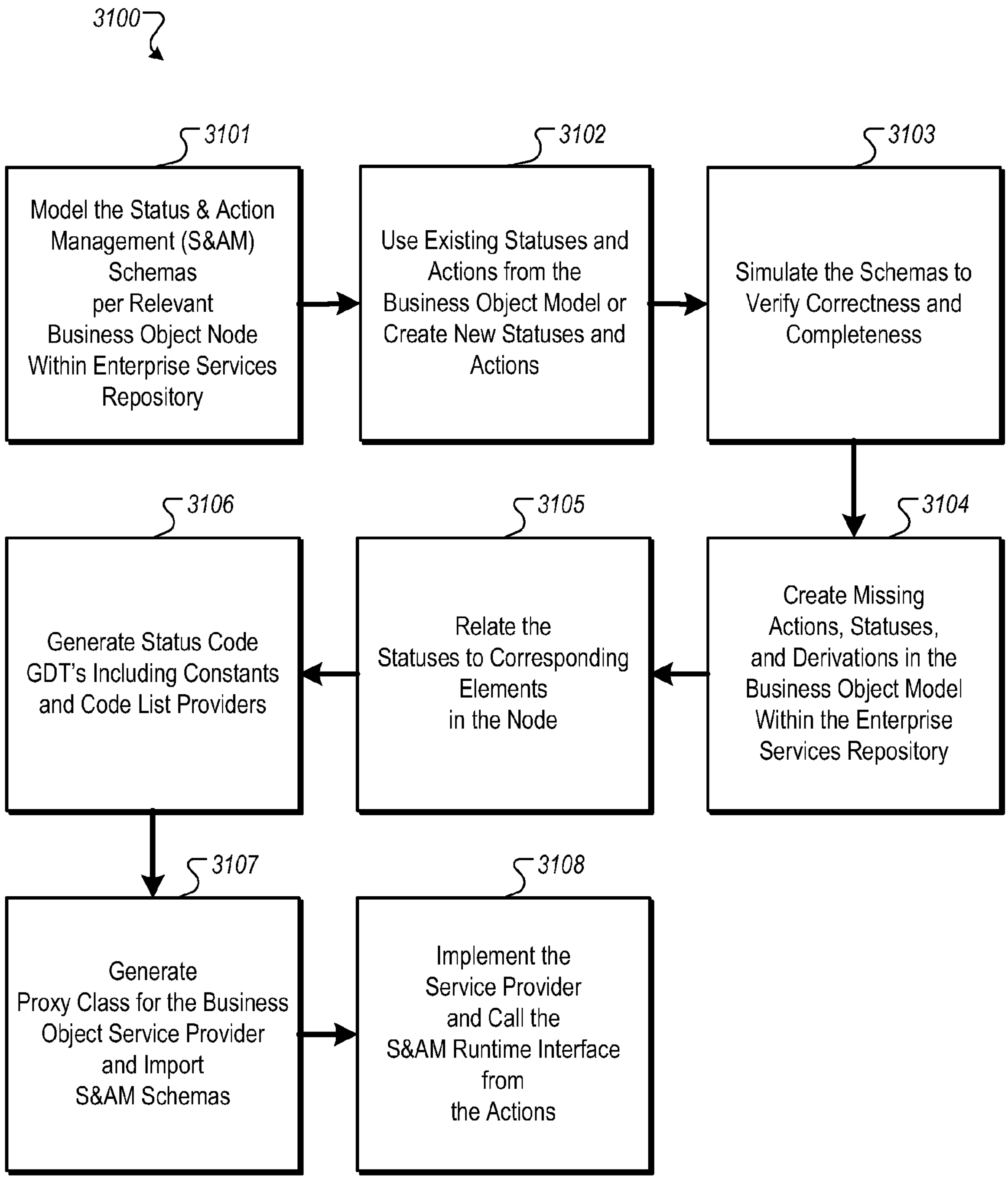
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Tax Assessment Interfaces

A tax assessment notice is a notice of a tax authority to a taxpayer which states that the taxpayer owes taxes or has a refund. The TaxAssessmentNotice interface performs a TaxAssessmentNoticeERPByBusinessPartnerQueryResponse_In operation. The TaxAssessmentNoticeERPByBusinessPartnerQueryResponse_In operation can find one or more tax assessment notices by business partners. The TaxAssessmentNoticeERPByBusinessPartnerQueryResponse_In operation includes various message types, namely a TaxAssessmentNoticeERPByBusinessPartnerQuery_sync and a TaxAssessment NoticeERPByBusinessPartnerResponse_sync. The structure of the TaxAssessmentNoticeERPByBusiness PartnerQuery_sync message type is specified by a TaxAssessmentNoticeERPByBusinessPartnerQueryMessage_sync message data type. The structure of the TaxAssessmentNoticeERPByBusinessPartnerResponse_sync message type is specified by a TaxAssessment NoticeERPByBusinessPartnerResponseMessage_sync message data type.

Figure 32:
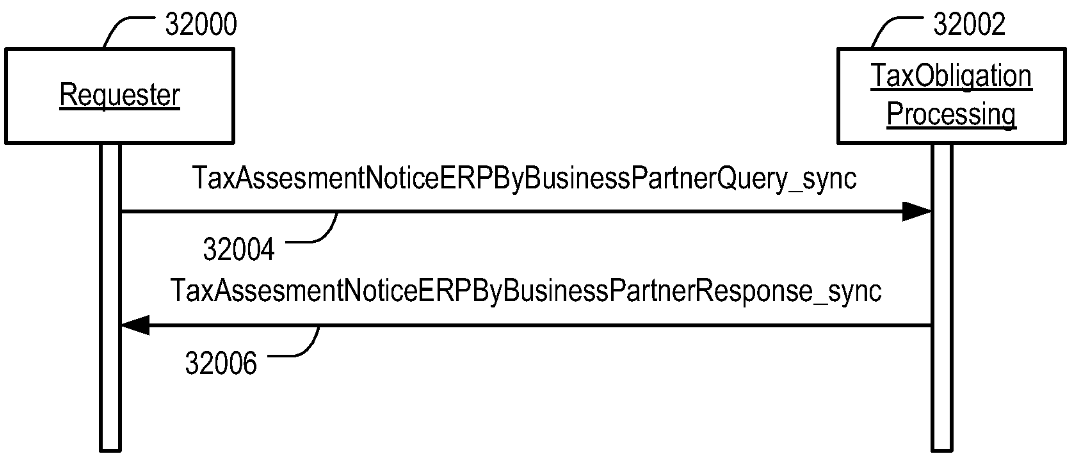
FIG. 32 illustrates an exemplary TaxAssessmentNotice Message Choreography.

The message choreography of FIG. 32 describes a possible logical sequence of messages that can be used to realize a Tax Assessment Notice business scenario. A "Requester" system 32000 can query tax assessment notice information (e.g., ERP information by business partner) from a "Tax Obligation Processing" system 32002, using a TaxAssesmentNoticeERPByBusinessPartnerQuery_sync message 32004 as shown, for example, in FIG. 32. The "Tax Obligation Processing" system 32002 can respond to the query using a TaxAssessmentNoticeERPByBusinessPartnerResponse_sync 32006 as shown, for example, in FIG. 32.

FIGS. 33-1 through 33-2 illustrate one example logical configuration of TaxAssessmentNoticeERPMessage_Sync 33000 element structure. Specifically, this figure depicts the arrangement and hierarchy of various components such as one or more levels of packages, entities, and datatypes, shown here as 33000 through 33052. As described above, packages may be used to represent hierarchy levels. Entities are discrete business elements that are used during a business transaction. Data types are used to type object entities and interfaces with a structure. For example, TaxAssessmentNoticeERPMessage_Sync element structure 33000 includes, among other things, a MessageHeader 33006. Accordingly, heterogeneous applications may communicate using this consistent message configured as such.

Additionally, FIG. 34 illustrates one example logical configuration of TaxAssessmentNoticeERPByBusinessPartnerQueryMessage_Sync element structure 34000. Specifically, this figure depicts the arrangement and hierarchy of various components such as one or more levels of packages, entities, and datatypes, shown here as 34000 through 34028. As described above, packages may be used to represent hierarchy levels. Entities are discrete business elements that are used during a business transaction. Data types are used to type object entities and interfaces with a structure. For example, TaxAssessmentNoticeERPByBusinessPartnerQueryMessage_Sync element structure 34000 includes, among other things, MessageHeader 34006. Accordingly, heterogeneous applications may communicate using this consistent message configured as such.

Additionally, FIGS. 35-1 through 35-2 illustrate one example logical configuration of TaxAssessmentNoticeERPByBusinessPartnerResponseMessage_Sync element structure 35000. Specifically, these figures depict the arrangement and hierarchy of various components such as one or more levels of packages, entities, and datatypes, shown here as 35000 through 35048. As described above, packages may be used to represent hierarchy levels. Entities are discrete business elements that are used during a business transaction. Data types are used to type object entities and interfaces with a structure. For example, TaxAssessmentNoticeERPByBusinessPartnerResponseMessage_Sync element structure 35000 includes, among other things, TaxAssessmentNotice 35006. Accordingly, heterogeneous applications may communicate using this consistent message configured as such.

In further detail, FIGS. 33-1 through 33-2 show an example configuration of an Element Structure that includes a TaxAssessmentNoticeERPMessage_sync 33000 package. The TaxAssessmentNoticeERPMessage_sync 33000 package is a TxAssmtNtcERPMsg 33004 data type. The TaxAssessmentNoticeERPMessage_sync 33000 package includes a TaxAssessmentNoticeERPMessage_sync 33002 entity. The TaxAssessmentNoticeERPMessage_sync 33000 package includes various packages, namely a MessageHeader 33006, a TaxAssessmentNotice 33012 and a Log 33048.

The MessageHeader 33006 package is a BasicBusinessDocumentMessageHeader 33010 data type. The MessageHeader 33006 package includes a MessageHeader 33008 entity.

The TaxAssessmentNotice 33012 package includes a TaxAssessmentNotice 33014 entity. The TaxAssessmentNotice 33012 package includes a ContractAccountInvoiceRequestAssignment 33040 package. The TaxAssessmentNotice 33014 entity includes various attributes, namely a TaxPayerPartyID 33016, a BillingPeriodID 33020, a LevyTypeCode 33024, a BinaryObject 33028, a BillingPeriodName 33032 and a LevyTypeName 33036. The TaxPayerPartyID 33016 attribute is a PartyInternalID 33018 data type. The BillingPeriodID 33020 attribute is a BillingPeriodID 33022 data type.

The LevyTypeCode 33024 attribute is a LevyTypeCode 33026 data type. The code can be a character string of letters, numbers, special characters (possibly with the exception of escape sequences), and symbols. The code represents a definitive value, a method, or a property description in an abbreviated or language-independent form.

The BinaryObject 33028 attribute is a BinaryObject 33030 data type. A BinaryObject is a finite data stream of any number of characters in binary notation (octets). The BinaryObject can be delivered to a partner using an implicit representation as an element value, or as a MIME (Multipurpose Internet Mail Extensions) attachment within a message, with a unique URI (Uniform Resource Identifier)-based reference to the corresponding attachment. The BillingPeriodName 33032 attribute is a MEDIUM_Name 33034 data type. The LevyTypeName 33036 attribute is a MEDIUM_Name 33038 data type.

The ContractAccountInvoiceRequestAssignment 33040 package includes a ContractAccountInvoiceRequestAssignment 33042 entity. The ContractAccountInvoiceRequestAssignment 33042 entity includes an ID 33044 attribute. The ID 33044 attribute is a Numeric 33046 data type.

The Log 33048 package is a Log 33052 data type. The Log 33048 package includes a Log 33050 entity.

In further detail, FIG. 34 illustrates an example configuration of an Element Structure that includes a TaxAssessmentNoticeERPByBusinessPartnerQueryMessage_sync 34000 package. The TaxAssessmentNoticeERPByBusinessPartnerQueryMessage_sync 34000 package includes a TaxAssessmentNoticeERPByBusinessPartnerQueryMessage_sync 34002 entity. The TaxAssessmentNoticeERPByBusinessPartnerQueryMessage_sync 34000 package includes various packages, namely a MessageHeader 34006 and a Selection 34012.

The MessageHeader 34006 package includes a MessageHeader 34008 entity. The MessageHeader 34008 entity has a cardinality of 1 34010 meaning that for each instance of the MessageHeader 34006 package there is one MessageHeader 34008 entity.

The Selection 34012 package includes a TaxAssessmentNoticeSelectionByBusinessPartner 34014 entity. The TaxAssessmentNoticeSelectionByBusinessPartner 34014 entity has a cardinality of 1 34016 meaning that for each instance of the Selection 34012 package there is one TaxAssessmentNoticeSelectionByBusinessPartner 34014 entity. The TaxAssessmentNoticeSelectionByBusinessPartner 34014 entity includes various attributes, namely a TaxPayerPartyID 34018, a BillingPeriodID 34022 and a LevyTypeCode 34026. The TaxPayerPartyID 34018 attribute has a cardinality of 1 34020 meaning that for each instance of the TaxAssessmentNoticeSelectionByBusinessPartner 34014 entity there is one TaxPayerPartyID 34018 attribute. The BillingPeriodID 34022 attribute has a cardinality of 1 34024 meaning that for each instance of the TaxAssessmentNoticeSelectionByBusinessPartner 34014 entity there is one BillingPeriodID 34022 attribute. The LevyTypeCode 34026 attribute has a cardinality of 1 34028 meaning that for each instance of the TaxAssessmentNoticeSelectionByBusinessPartner 34014 entity there is one LevyTypeCode 34026 attribute. The data types of the various packages, entities, and attributes are described with respect to FIG. 33.

In further detail, FIGS. 35-1 through 35-2 illustrate an example configuration of an Element Structure that includes a TaxAssessmentNoticeERPByBusinessPartnerMessage_sync 35000 package. The TaxAssessmentNoticeERPByBusinessPartnerMessage_sync 35000 package includes a TaxAssessmentNoticeERPByBusinessPartnerMessage_sync 35002 entity. The TaxAssessmentNoticeERPByBusinessPartnerMessage_sync 35000 package includes various packages, namely a TaxAssessmentNotice 35004 and a Log 35044.

The TaxAssessmentNotice 35004 package includes a TaxAssessmentNotice 35006 entity. The TaxAssessmentNotice 35004 package includes a ContractAccountInvoiceRequestAssignment 35034 package. The TaxAssessmentNotice 35006 entity has a cardinality of 0 . . . 1 35008 meaning that for each instance of the TaxAssessmentNotice 35004 package there may be one TaxAssessmentNotice 35006 entity. The TaxAssessmentNotice 35006 entity includes various attributes, namely a TaxPayerPartyID 35010, a BillingPeriodID 35014, a LevyTypeCode 35018, a BinaryObject 35022, a BillingPeriodName 35026 and a LevyTypeName 35030. The TaxPayerPartyID 35010 attribute has a cardinality of 1 35012 meaning that for each instance of the TaxAssessmentNotice 35006 entity there is one TaxPayerPartyID 35010 attribute. The BillingPeriodID 35014 attribute has a cardinality of 1 35016 meaning that for each instance of the TaxAssessmentNotice 35006 entity there is one BillingPeriodID 35014 attribute. The LevyTypeCode 35018 attribute has a cardinality of 1 35020 meaning that for each instance of the TaxAssessmentNotice 35006 entity there is one LevyTypeCode 35018 attribute. The BinaryObject 35022 attribute has a cardinality of 1 35024 meaning that for each instance of the TaxAssessmentNotice 35006 entity there is one BinaryObject 35022 attribute. The BillingPeriodName 35026 attribute has a cardinality of 0 . . . 1 35028 meaning that for each instance of the TaxAssessmentNotice 35006 entity there may be one BillingPeriodName 35026 attribute. The LevyTypeName 35030 attribute has a cardinality of 0 . . . 1 35032 meaning that for each instance of the TaxAssessmentNotice 35006 entity there may be one LevyTypeName 35030 attribute.

The ContractAccountInvoiceRequestAssignment 35034 package includes a ContractAccountInvoiceRequestAssignment 35036 entity. The ContractAccountInvoiceRequestAssignment 35036 entity has a cardinality of 0 . . . 1 35038 meaning that for each instance of the ContractAccountInvoiceRequestAssignment 35034 package there may be one ContractAccountInvoiceRequestAssignment 35036 entity. The ContractAccountInvoiceRequestAssignment 35036 entity includes a BillingDocumentNumber 35040 attribute. The BillingDocumentNumber 35040 attribute has a cardinality of 1 35042 meaning that for each instance of the ContractAccountInvoiceRequestAssignment 35036 entity there is one BillingDocumentNumber 35040 attribute.

The Log 35044 package includes a Log 35046 entity. The Log 35046 entity has a cardinality of 1 35048 meaning that for each instance of the Log 35044 package there is one Log 35046 entity. The data types of the various packages, entities, and attributes are described with respect to FIG. 33.

TaxForm Interfaces

A tax form is a form that may be filed by the taxpayer or the taxpayer's representative. A tax return or tax registration may include one or more tax forms. The TaxForm interface performs various operations, namely a TaxFormERPByLevyTypeQueryResponse_In and a TaxFormERPByIDQueryResponse_In. The TaxFormERPByLevyTypeQueryResponse_In operation includes various message types, namely a TaxFormERPByLevyTypeQuery_sync and a TaxFormERPByLevyTypeResponse_sync. The structure of the TaxFormERPByLevyTypeQuery_sync message type is specified by a TaxFormERPByLevyTypeQueryMessage_sync message data type. The structure of the TaxFormERPByLevyTypeResponse_sync message type is specified by a TaxFormERP- ByLevyTypeResponseMessage_sync message data type. The TaxFormERPByIDQueryResponse_In operation includes various message types, namely a TaxFormERPByIDQuery_sync and a TaxFormERPByIDResponse_sync. The structure of the TaxFormERPByIDQuery_sync message type is specified by a TaxFormERPByIDQueryMessage_sync message data type. The structure of the TaxFormERPByIDResponse_sync message type is specified by a TaxFormERPByIDResponseMessage_sync message data type.

FIGS. 36-1 through 36-4 illustrate one example logical configuration of TaxFormERPMessage_Sync element structure 36000. Specifically, these figures depict the arrangement and hierarchy of various components such as one or more levels of packages, entities, and datatypes, shown here as 36000 through 36092. As described above, packages may be used to represent hierarchy levels. Entities are discrete business elements that are used during a business transaction. Data types are used to type object entities and interfaces with a structure. For example, TaxFormERPMessage_Sync message 36000 includes, among other things, MessageHeader 36006. Accordingly, heterogeneous applications may communicate using this consistent message configured as such.

Additionally, FIG. 37 illustrates one example logical configuration of TaxFormERPByLevyTypeQueryMessage_Sync element structure 37000. Specifically, this figure depicts the arrangement and hierarchy of various components such as one or more levels of packages, entities, and datatypes, shown here as 37000 through 37026. As described above, packages may be used to represent hierarchy levels. Entities are discrete business elements that are used during a business transaction. Data types are used to type object entities and interfaces with a structure. For example, TaxFormERPByLevyTypeQueryMessage_Sync message 37000 includes, among other things, MessageHeader 37006. Accordingly, heterogeneous applications may communicate using this consistent message configured as such.

Additionally, FIGS. 38-1 through 38-4 illustrate one example logical configuration of TaxFormERPByLevyTypeResponseMessage_Sync element structure 38000. Specifically, these figures depict the arrangement and hierarchy of various components such as one or more levels of packages, entities, and datatypes, shown here as 38000 through 38094. As described above, packages may be used to represent hierarchy levels. Entities are discrete business elements that are used during a business transaction. Data types are used to type object entities and interfaces with a structure. For example, TaxFormERPByLevyTypeResponseMessage_Sync message 38000 includes, among other things, TaxForm 38006. Accordingly, heterogeneous applications may communicate using this consistent message configured as such.

Additionally, FIG. 39 illustrates one example logical configuration of TaxFormERPByIDQueryMessage_Sync element structure 39000. Specifically, this figure depicts the arrangement and hierarchy of various components such as one or more levels of packages, entities, and datatypes, shown here as 39000 through 39018. As described above, packages may be used to represent hierarchy levels. Entities are discrete business elements that are used during a business transaction. Data types are used to type object entities and interfaces with a structure. For example, TaxFormERPByIDQueryMessage_Sync message 39000 includes, among other things, MessageHeader 39006. Accordingly, heterogeneous applications may communicate using this consistent message configured as such.

Additionally, FIGS. 40-1 through 40-4 illustrate one example logical configuration of TaxFormERPByIDResponseMessage_Sync element structure 40000. Specifically, these figures depict the arrangement and hierarchy of various components such as one or more levels of packages, entities, and datatypes, shown here as 40000 through 40098. As described above, packages may be used to represent hierarchy levels. Entities are discrete business elements that are used during a business transaction. Data types are used to type object entities and interfaces with a structure. For example, TaxFormERPByIDResponseMessage_Sync message 40000 includes, among other things, TaxForm 40006. Accordingly, heterogeneous applications may communicate using this consistent message configured as such.

In further detail, FIGS. 36-1 through 36-4 illustrate an example configuration of an Element Structure that includes a TaxFormERPMessage_Sync 36000 package. The TaxFormERPMessage_Sync 36000 package includes a TaxFormERPMessage_Sync 36002 entity. The TaxFormERPMessage_Sync 36000 package includes various packages, namely a MessageHeader 36004, a TaxForm 36010 and a Log 36088.

The MessageHeader 36004 package is a BusinessDocumentMessageHeader 36008 data type. The MessageHeader 36004 package includes a MessageHeader 36006 entity.

A BusinessDocumentMessageHeader includes business information from a perspective of a sender application for the identifying and processing of a business document instance within a technical message (and if applicable, with a reference to a previous instance of a business document within a previous technical message). The BusinessDocumentMessageHeader may also include information about the sender and information about the receiver.

The TaxForm 36010 package includes a TaxForm 36012 entity. The TaxForm 36010 package includes various packages, namely a Usagedata 36042 and a PropertyValuation 36080.

The TaxForm 36012 entity includes various attributes, namely an ID 36014, a TemplateID 36018, a TypeCode 36022, a ValidFromDate 36026, a ValidToDate 36030, a BinaryObject 36034 and a TemplateName 36038. The ID 36014 attribute is an Identifier 36016 data type. The TemplateID 36018 attribute is an InternalServiceRequestTemplateID 36020 data type. The TypeCode 36022 attribute is a Code 36024 data type. The ValidFromDate 36026 attribute is a Date 36028 data type. The ValidToDate 36030 attribute is a Date 36032 data type. The BinaryObject 36034 attribute is a BinaryObject 36036 data type. The TemplateName 36038 attribute is a MEDIUM_Name 36040 data type.

The Usagedata 36042 package includes a Usagedata 36044 entity. The Usagedata 36044 entity includes various attributes, namely aUsageCode 36046, a LevyTypeCode 36050, a CoverFormIndicator 36054, a MinimumNumberValue 36058, a MaximumNumberValue 36062 and a LevyTypeName 36066. The Usagedata 36044 entity includes a BillingPeriod 36070 subordinate entity. The UsageCode 36046 attribute is a Code 36048 data type. The LevyTypeCode 36050 attribute is a LevyTypeCode 36052 data type. The CoverFormIndicator 36054 attribute is an Indicator 36056 data type. The MinimumNumberValue 36058 attribute is a NumberValue 36060 data type. The MaximumNumberValue 36062 attribute is a NumberValue 36064 data type. The LevyTypeName 36066 attribute is a MEDIUM_Name 36068 data type. The BillingPeriod 36070 entity includes various attributes, namely a BillingPeriodID 36072 and a BillingPeriodName 36076. The BillingPeriodID 36072 attribute is a BillingPeriodID 36074 data type. The BillingPeriodName 36076 attribute is a MEDIUM_Name 36078 data type. The PropertyValuation 36080 package includes a PropertyValuation 36082 entity. The PropertyValuation 36082 entity includes a PropertyValuation 36084 attribute. The PropertyValuation 36084 attribute is a PropertyValuation 36086 data type.

The Log 36088 package is a Log 36092 data type. The Log 36088 package includes a Log 36090 entity.

In further detail, FIG. 37 illustrates an example configuration of an Element Structure that includes a TaxFormERPByLevyTypeQueryMessage_sync 37000 package. The TaxFormERPByLevyTypeQueryMessage_sync 37000 package includes a TaxFormERPByLevyTypeQueryMessage_sync 37002 entity. The TaxFormERPByLevyTypeQueryMessage_sync 37000 package includes various packages, namely a MessageHeader 37004 and a Selection 37010.

The MessageHeader 37004 package includes a MessageHeader 37006 entity. The MessageHeader 37006 entity has a cardinality of 0 . . . 1 37008 meaning that for each instance of the MessageHeader 37004 package there may be one MessageHeader 37006 entity.

The Selection 37010 package includes a TaxFormSelectionByLevyType 37012 entity. The TaxFormSelectionByLevyType 37012 entity has a cardinality of 1 37014 meaning that for each instance of the Selection 37010 package there is one TaxFormSelectionByLevyType 37012 entity. The TaxFormSelectionByLevyType 37012 entity includes various attributes, namely a LevyTypeCode 37016, a BillingPeriodID 37020 and a TaxFormUsageCode 37024. The LevyTypeCode 37016 attribute has a cardinality of 1 37018 meaning that for each instance of the TaxFormSelectionByLevyType 37012 entity there is one LevyTypeCode 37016 attribute. The BillingPeriodID 37020 attribute has a cardinality of 0 . . . 1 37022 meaning that for each instance of the TaxFormSelectionByLevyType 37012 entity there may be one BillingPeriodID 37020 attribute. The TaxFormUsageCode 37024 attribute has a cardinality of 1 37026 meaning that for each instance of the TaxFormSelectionByLevyType 37012 entity there is one TaxFormUsageCode 37024 attribute. The data types of the various packages, entities, and attributes are described with respect to FIG. 36.

In further detail, FIGS. 38-1 through 38-4 illustrate an example configuration of an Element Structure that includes a TaxFormERPByLevyTypeResponseMessage_Sync 38000 package. The TaxFormERPByLevyTypeResponseMessage_Sync 38000 package includes a TaxFormERPByLevyTypeResponseMessage_Sync 38002 entity. The TaxFormERPByLevyTypeResponseMessage_Sync 38000 package includes various packages, namely a TaxForm 38004 and a Log 38090.

The TaxForm 38004 package includes a TaxForm 38006 entity. The TaxForm 38004 package includes various packages, namely a UsageData 38038 and a PropertyValuation 38080. The TaxForm 38006 entity has a cardinality of 0 . . . n 38008 meaning that for each instance of the TaxForm 38004 package there may be one or more TaxForm 38006 entities. The TaxForm 38006 entity includes various attributes, namely an ID 38010, a TemplateID 38014, a TypeCode 38018, a ValidFromDate 38022, a ValidToDate 38026, a BinaryObject 38030 and a TemplateName 38034. The ID 38010 attribute has a cardinality of 1 38012 meaning that for each instance of the TaxForm 38006 entity there is one ID 38010 attribute. The TemplateID 38014 attribute has a cardinality of 1 38016 meaning that for each instance of the TaxForm 38006 entity there is one TemplateID 38014 attribute. The TypeCode 38018 attribute has a cardinality of 0 . . . 1 38020 meaning that for each instance of the TaxForm 38006 entity there may be one TypeCode 38018 attribute. The ValidFromDate 38022 attribute has a cardinality of 1 38024 meaning that for each instance of the TaxForm 38006 entity there is one ValidFromDate 38022 attribute. The ValidToDate 38026 attribute has a cardinality of 1 38028 meaning that for each instance of the TaxForm 38006 entity there is one ValidToDate 38026 attribute. The BinaryObject 38030 attribute has a cardinality of 1 38032 meaning that for each instance of the TaxForm 38006 entity there is one BinaryObject 38030 attribute. The TemplateName 38034 attribute has a cardinality of 0 . . . 1 38036 meaning that for each instance of the TaxForm 38006 entity there may be one TemplateName 38034 attribute.

The UsageData 38038 package includes a UsageData 38040 entity. The UsageData 38040 entity has a cardinality of 0 . . . 1 38042 meaning that for each instance of the UsageData 38038 package there may be one UsageData 38040 entity. The UsageData 38040 entity includes various attributes, namely a UsageCode 38044, a LevyTypeCode 38048, a CoverFormIndicator 38052, a MinimumNumberValue 38056, a MaximumNumberValue 38060 and a LevyTypeName 38064. The UsageData 38040 entity includes a BillingPeriod 38068 subordinate entity. The UsageCode 38044 attribute has a cardinality of 0 . . . 1 38046 meaning that for each instance of the UsageData 38040 entity there may be one UsageCode 38044 attribute. The LevyTypeCode 38048 attribute has a cardinality of 1 38050 meaning that for each instance of the UsageData 38040 entity there is one LevyTypeCode 38048 attribute. The CoverFormIndicator 38052 attribute has a cardinality of 1 38054 meaning that for each instance of the UsageData 38040 entity there is one CoverFormIndicator 38052 attribute. The MinimumNumberValue 38056 attribute has a cardinality of 0 . . . 1 38058 meaning that for each instance of the UsageData 38040 entity there may be one MinimumNumberValue 38056 attribute. The MaximumNumberValue 38060 attribute has a cardinality of 0 . . . 1 38062 meaning that for each instance of the UsageData 38040 entity there may be one MaximumNumberValue 38060 attribute. The LevyTypeName 38064 attribute has a cardinality of 0 . . . 1 38066 meaning that for each instance of the UsageData 38040 entity there may be one LevyTypeName 38064 attribute.

The BillingPeriod 38068 entity has a cardinality of 0 . . . n 38070 meaning that for each instance of the UsageData 38040 entity there may be one or more BillingPeriod 38068 entities. The BillingPeriod 38068 entity includes various attributes, namely a BillingPeriodID 38072 and a BillingPeriodName 38076. The BillingPeriodID 38072 attribute has a cardinality of 1 38074 meaning that for each instance of the BillingPeriod 38068 entity there is one BillingPeriodID 38072 attribute. The BillingPeriodName 38076 attribute has a cardinality of 0 . . . 1 38078 meaning that for each instance of the BillingPeriod 38068 entity there may be one BillingPeriodName 38076 attribute.

The PropertyValuation 38080 package includes a PropertyValuation 38082 entity. The PropertyValuation 38082 entity has a cardinality of 0 . . . 1 38084 meaning that for each instance of the PropertyValuation 38080 package there may be one PropertyValuation 38082 entity. The PropertyValuation 38082 entity includes a PropertyValuation 38086 attribute. The PropertyValuation 38086 attribute has a cardinality of 1 . . . n 38088 meaning that for each instance of the PropertyValuation 38082 entity there are one or more PropertyValuation 38086 attributes.

The Log 38090 package includes a Log 38092 entity. The Log 38092 entity has a cardinality of 1 38094 meaning that for each instance of the Log 38090 package there is one Log 38092 entity. The data types of the various packages, entities, and attributes are described with respect to FIG. 36.

In further detail, FIG. 39 illustrates an example configuration of an Element Structure that includes a TaxFormERPByIDQueryMessage_sync 39000 package. The TaxFormERPByIDQueryMessage_sync 39000 package includes a TaxFormERPByIDQueryMessage_sync 39002 entity. The TaxFormERPByIDQueryMessage_sync 39000 package includes various packages, namely a MessageHeader 39004 and a Selection 39010.

The MessageHeader 39004 package includes a MessageHeader 39006 entity. The MessageHeader 39006 entity has a cardinality of 0 . . . 1 39008 meaning that for each instance of the MessageHeader 39004 package there may be one MessageHeader 39006 entity.

The Selection 39010 package includes a TaxFormSelectionByID 39012 entity. The TaxFormSelectionByID 39012 entity has a cardinality of 1 39014 meaning that for each instance of the Selection 39010 package there is one TaxFormSelectionByID 39012 entity. The TaxFormSelectionByID 39012 entity includes an ID 39016 attribute. The ID 39016 attribute has a cardinality of 1 39018 meaning that for each instance of the TaxFormSelectionByID 39012 entity there is one ID 39016 attribute. The data types of the various packages, entities, and attributes are described with respect to FIG. 36.

In further detail, FIGS. 40-1 through 40-4 illustrate an example configuration of an Element Structure that includes a TaxFormERPByIDResponseMessage_Sync 40000 package. The TaxFormERPByIDResponseMessage_Sync 40000 package includes a TaxFormERPByIDResponseMessage_Sync 40002 entity. The TaxFormERPByIDResponseMessage_Sync 40000 package includes various packages, namely a TaxForm 40004 and a Log 40094.

The TaxForm 40004 package includes a TaxForm 40006 entity. The TaxForm 40004 package includes various packages, namely a UsageData 40042 and a PropertyValuation 40084. The TaxForm 40006 entity has a cardinality of 0 . . . 1 40008 meaning that for each instance of the TaxForm 40004 package there may be one TaxForm 40006 entity. The TaxForm 40006 entity includes various attributes, namely an ID 40010, a TemplateID 40014, a TypeCode 40018, a ValidFromDate 40022, a ValidToDate 40026, a BinaryObject 40030, a TemplateName 40034 and a TypeName 40038. The ID 40010 attribute has a cardinality of 1 40012 meaning that for each instance of the TaxForm 40006 entity there is one ID 40010 attribute. The TemplateID 40014 attribute has a cardinality of 1 40016 meaning that for each instance of the TaxForm 40006 entity there is one TemplateID 40014 attribute. The TypeCode 40018 attribute has a cardinality of 0 . . . 1 40020 meaning that for each instance of the TaxForm 40006 entity there may be one TypeCode 40018 attribute. The ValidFromDate 40022 attribute has a cardinality of 1 40024 meaning that for each instance of the TaxForm 40006 entity there is one ValidFromDate 40022 attribute. The ValidToDate 40026 attribute has a cardinality of 1 40028 meaning that for each instance of the TaxForm 40006 entity there is one ValidToDate 40026 attribute. The BinaryObject 40030 attribute has a cardinality of 1 40032 meaning that for each instance of the TaxForm 40006 entity there is one BinaryObject 40030 attribute. The TemplateName 40034 attribute has a cardinality of 0 . . . 1 40036 meaning that for each instance of the TaxForm 40006 entity there may be one TemplateName 40034 attribute. The TypeName 40038 attribute has a cardinality of 0 . . . 1 40040 meaning that for each instance of the TaxForm 40006 entity there may be one TypeName 40038 attribute.

The UsageData 40042 package includes a UsageData 40044 entity. The UsageData 40044 entity has a cardinality of 0 . . . n 40046 meaning that for each instance of the UsageData 40042 package there may be one or more UsageData 40044 entities. The UsageData 40044 entity includes various attributes, namely a UsageCode 40048, a LevyTypeCode 40052, a CoverFormIndicator 40056, a MinimumNumberValue 40060, a MaximumNumberValue 40064 and a LevyTypeName 40068. The UsageData 40044 entity includes a BillingPeriod 40072 subordinate entity. The UsageCode 40048 attribute has a cardinality of 0 . . . 1 40050 meaning that for each instance of the UsageData 40044 entity there may be one UsageCode 40048 attribute. The LevyTypeCode 40052 attribute has a cardinality of 1 40054 meaning that for each instance of the UsageData 40044 entity there is one LevyTypeCode 40052 attribute. The CoverFormIndicator 40056 attribute has a cardinality of 1 40058 meaning that for each instance of the UsageData 40044 entity there is one CoverFormIndicator 40056 attribute. The MinimumNumberValue 40060 attribute has a cardinality of 0 . . . 1 40062 meaning that for each instance of the UsageData 40044 entity there may be one MinimumNumberValue 40060 attribute. The MaximumNumberValue 40064 attribute has a cardinality of 0 . . . 1 40066 meaning that for each instance of the UsageData 40044 entity there may be one MaximumNumberValue 40064 attribute. The LevyTypeName 40068 attribute has a cardinality of 0 . . . 1 40070 meaning that for each instance of the UsageData 40044 entity there may be one LevyTypeName 40068 attribute.

The BillingPeriod 40072 entity has a cardinality of 0 . . . n 40074 meaning that for each instance of the UsageData 40044 entity there may be one or more BillingPeriod 40072 entities. The BillingPeriod 40072 entity includes various attributes, namely a BillingPeriodID 40076 and a BillingPeriodName 40080. The BillingPeriodID 40076 attribute has a cardinality of 1 40078 meaning that for each instance of the BillingPeriod 40072 entity there is one BillingPeriodID 40076 attribute. The BillingPeriodName 40080 attribute has a cardinality of 0 . . . 1 40082 meaning that for each instance of the BillingPeriod 40072 entity there may be one BillingPeriodName 40080 attribute.

The PropertyValuation 40084 package includes a PropertyValuation 40086 entity. The PropertyValuation 40086 entity has a cardinality of 0 . . . 1 40088 meaning that for each instance of the PropertyValuation 40084 package there may be one PropertyValuation 40086 entity. The PropertyValuation 40086 entity includes a PropertyValuation 40090 attribute. The PropertyValuation 40090 attribute has a cardinality of 1 . . . n 40092 meaning that for each instance of the PropertyValuation 40086 entity there are one or more PropertyValuation 40090 attributes.

The Log 40094 package includes a Log 40096 entity. The Log 40096 entity has a cardinality of 1 40098 meaning that for each instance of the Log 40094 package there is one Log 40096 entity. The data types of the various packages, entities, and attributes are described with respect to FIG. 36.

TaxObject Interfaces

A tax object is a subject of a tax assessment. A tax object may include attributes which are a basis for a tax calculation. The TaxObject interface performs various operations, namely a TaxObjectERPByBusinessPartnerQueryResponse_In, a TaxObjectERPByIDQueryResponse_In, a TaxObjectERPCreateRequestConfirmation_In, a TaxObjectERPUpdateRequestConfirmation_In, and a TaxObjectERPCheckQueryResponse_In. The TaxObjectERPByBusinessPartnerQueryResponse_In operation can find a tax object by taxpayer.

The TaxObjectERPByBusinessPartnerQueryResponse_In operation includes various message types, namely a TaxObjectERPByBusinessPartnerQuery_sync and a TaxObjectERPByBusinessPartnerResponse_sync. The structure of the TaxObjectERPByBusinessPartnerQuery_sync message type is specified by a TaxObjectERPByBusinessPartnerQueryMessage_sync message data type. The structure of the TaxObjectERPByBusinessPartnerResponse_sync message type is specified by a TaxObjectERPByBusinessPartnerResponseMessage_sync message data type. The TaxObjectERPByIDQueryResponse_In operation can read a tax object.

The TaxObjectERPByIDQueryResponse_In operation includes various message types, namely a TaxObjectERPByIDQuery_sync and a TaxObjectERPByIdResponse_sync. The structure of the TaxObjectERPByIDQuery_sync message type is specified by a TaxObjectERPByIDQueryMessage_sync message data type. The structure of the TaxObjectERPByIdResponse_sync message type is specified by a TaxObjectERPByIdResponseMessage_sync message data type. The TaxObjectERPCreateRequestConfirmation_In operation can create a new tax object.

The TaxObjectERPCreateRequestConfirmation_In operation includes various message types, namely a TaxObjectERPCreateRequest_sync and a TaxObjectERPCreateConfirmation_sync. The structure of the TaxObjectERPCreateRequest_sync message type is specified by a TaxObjectERPCreateRequestMessage_sync message data type. The structure of the TaxObjectERPCreateConfirmation_sync message type is specified by a TaxObjectERPCreateConfirmationMessage_sync message data type. The TaxObjectERPUpdateRequestConfirmation_In operation can update a tax object.

The TaxObjectERPUpdateRequestConfirmation_In operation includes various message types, namely a TaxObjectERPUpdateRequest_sync and a TaxObjectERPUpdateConfirmation_sync. The structure of the TaxObjectERPUpdateRequest_sync message type is specified by a TaxObjectERPUpdateRequestMessage_sync message data type. The structure of the TaxObjectERPUpdateConfirmation_sync message type is specified by a TaxObjectERPUpdateConfirmationMessage_sync message data type. The TaxObjectERPCheckQueryResponse_In operation can check if data of a tax object is consistent and can be created or changed.

The TaxObjectERPCheckQueryResponse_In operation includes various message types, namely a TaxObjectERPCheckQuery_sync and a TaxObjectERPCheckResponse_sync. The structure of the TaxObjectERPCheckQuery_sync message type is specified by a TaxObjectERPCheckQueryMessage_sync message data type. The structure of the TaxObjectERPCheckResponse_sync message type is specified by a TaxObjectERPCheckResponseMessage_sync message data type.

Figure 41:
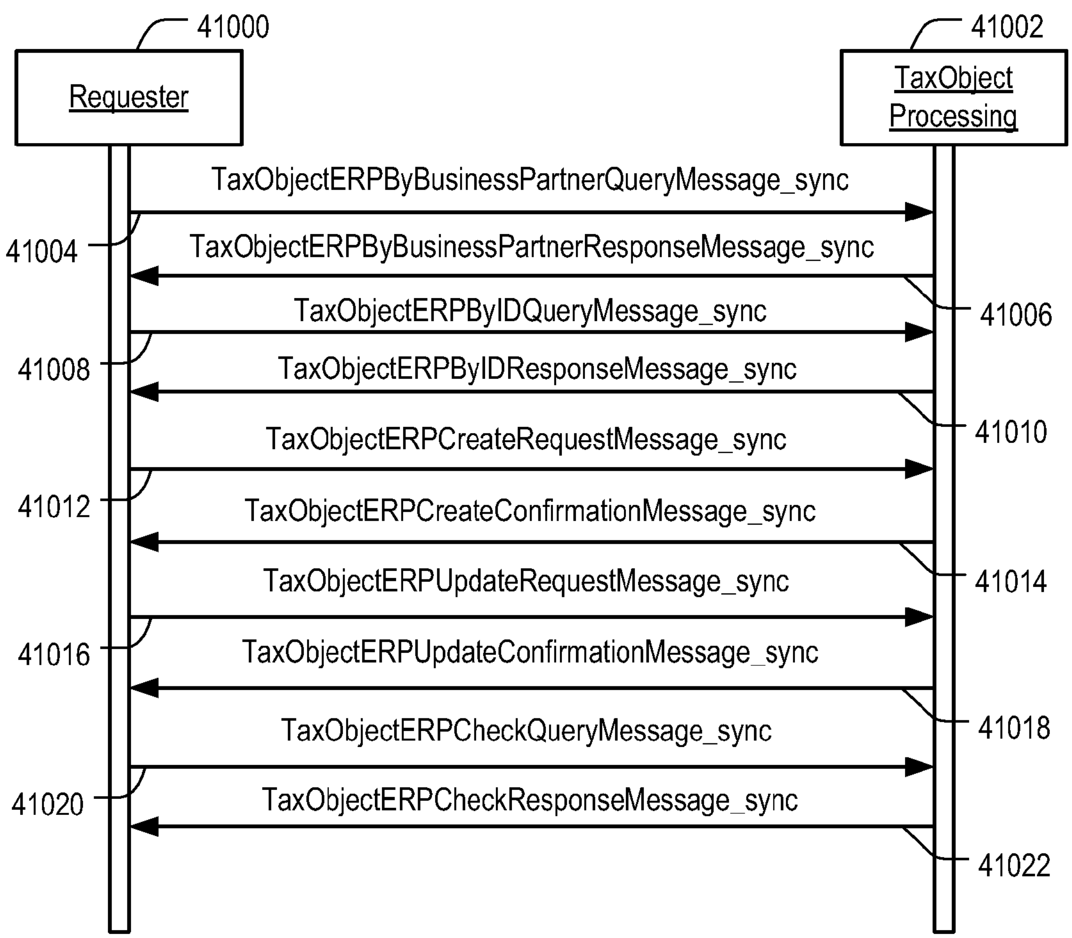
FIG. 41 illustrates an exemplary TaxObject Message Choreography.

The message choreography of FIG. 41 describes a possible logical sequence of messages that can be used to realize a Tax Object business scenario. A "Requester" system 41000 can query tax object ERP information by business partner from a "Tax Object Processing" system 41002, using a TaxObjectERPByBusinessPartnerQueryMessage_sync message 41004 as shown, for example, in FIG. 41. The "Tax Object Processing" system 41002 can respond to the query using a TaxObjectERPByBusinessPartnerResponseMessage_sync 41006 as shown, for example, in FIG. 41.

The "Requester" system 41000 can query tax object ERP information by ID from the "Tax Object Processing" system 41002, using a TaxObjectERPByIDQueryMessage_sync message 41008 as shown, for example, in FIG. 41. The "Tax Object Processing" system 41002 can respond to the query using a TaxObjectERPByIDResponseMessage_sync 41010 as shown, for example, in FIG. 41.

The "Requester" system 41000 can request creation of tax object ERP information by the "Tax Object Processing" system 41002 using a TaxObjectERPCreateRequestMessage_sync message 41012 as shown, for example, in FIG. 41. The "Tax Object Processing" system 41002 can confirm the request using a TaxObjectERPCreateConfirmationMessage_sync 41014 as shown, for example, in FIG. 41.

The "Requester" system 41000 can request the update of tax object ERP information by the "Tax Object Processing" system 41002 using a TaxObjectERPUpdateRequestMessage_sync message 41016 as shown, for example, in FIG. 41. The "Tax Object Processing" system 41002 can confirm the request using a TaxObjectERPUpdateConfirmationMessage_sync 41018 as shown, for example, in FIG. 41.

The "Requester" system 41000 can query tax object ERP check information from the "Tax Object Processing" system 41002, using a TaxObjectERPCheckQueryMessage_sync message 41020 as shown, for example, in FIG. 41. The "Tax Object Processing" system 41002 can respond to the query using a TaxObjectERPCheckResponseMessage_sync 41022 as shown, for example, in FIG. 41.

FIGS. 42-1 through 42-6 illustrate one example logical configuration of TaxObjectERPMessage_Sync element structure 42000. Specifically, these figures depict the arrangement and hierarchy of various components such as one or more levels of packages, entities, and datatypes, shown here as 42000 through 42134. As described above, packages may be used to represent hierarchy levels. Entities are discrete business elements that are used during a business transaction. Data types are used to type object entities and interfaces with a structure. For example, TaxObjectERPMessage_Sync element structure 42000 includes, among other things, MessageHeader 42006. Accordingly, heterogeneous applications may communicate using this consistent message configured as such.

Additionally, FIGS. 43-1 through 43-2 illustrate one example logical configuration of TaxObjectERPByBusinessPartnerQueryMessage_sync element structure 43000. Specifically, these figures depict the arrangement and hierarchy of various components such as one or more levels of packages, entities, and datatypes, shown here as 43000 through 43036. As described above, packages may be used to represent hierarchy levels. Entities are discrete business elements that are used during a business transaction. Data types are used to type object entities and interfaces with a structure. For example, TaxObjectERPByBusinessPartnerQueryMessage_sync element structure 43000 includes, among other things, Selection 43004. Accordingly, heterogeneous applications may communicate using this consistent message configured as such.

Additionally, FIGS. 44-1 through 44-4 illustrate one example logical configuration of TaxObjectERPByBusinessPartnerResponseMessage_sync element structure 44000. Specifically, these figures depict the arrangement and hierarchy of various components such as one or more levels of packages, entities, and datatypes, shown here as 44000 through 44096. As described above, packages may be used to represent hierarchy levels. Entities are discrete business elements that are used during a business transaction. Data types are used to type object entities and interfaces with a structure. For example, TaxObjectERPByBusinessPartnerResponseMessage_sync element structure 44000 includes, among other things, TaxObject 44006. Accordingly, heterogeneous applications may communicate using this consistent message configured as such.

Additionally, FIG. 45 illustrates one example logical configuration of TaxObjectERPByIdQuery_sync element structure 45000. Specifically, this figure depicts the arrangement and hierarchy of various components such as one or more levels of packages, entities, and datatypes, shown here as 45000 through 45012. As described above, packages may be used to represent hierarchy levels. Entities are discrete business elements that are used during a business transaction. Data types are used to type object entities and interfaces with a structure. For example, TaxObjectERPByIdQuery_sync element structure 45000 includes, among other things, Selection 45004. Accordingly, heterogeneous applications may communicate using this consistent message configured as such.

Additionally, FIGS. 46-1 through 46-3 illustrate one example logical configuration of TaxObjectERPById-Response sync element structure 46000. Specifically, these FIGS. depict the arrangement and hierarchy of various components such as one or more levels of packages, entities, and datatypes, shown here as 46000 through 46082. As described above, packages may be used to represent hierarchy levels. Entities are discrete business elements that are used during a business transaction. Data types are used to type object entities and interfaces with a structure. For example, TaxObject-ERPByIdResponse_sync element structure 46000 includes, among other things, TaxObject 46006. Accordingly, heterogeneous applications may communicate using this consistent message configured as such.

Additionally, FIGS. 47-1 through 47-2 illustrate one example logical configuration of TaxObjectERPCreateRequest_sync element structure 47000. Specifically, these figures depict the arrangement and hierarchy of various components such as one or more levels of packages, entities, and datatypes, shown here as 47000 through 47050. As described above, packages may be used to represent hierarchy levels. Entities are discrete business elements that are used during a business transaction. Data types are used to type object entities and interfaces with a structure. For example, TaxObject-ERPCreateRequest_sync element structure 47000 includes, among other things, MessageHeader 47006. Accordingly, heterogeneous applications may communicate using this consistent message configured as such.

Additionally, FIGS. 48-1 through 48-3 illustrate one example logical configuration of TaxObjectERPCreateConfirmation_sync element structure 48000. Specifically, these figures depict the arrangement and hierarchy of various components such as one or more levels of packages, entities, and datatypes, shown here as 48000 through 48084. As described above, packages may be used to represent hierarchy levels. Entities are discrete business elements that are used during a business transaction. Data types are used to type object entities and interfaces with a structure. For example, TaxObject-ERPCreateConfirmation_sync element structure 48000 includes, among other things, MessageHeader 48006. Accordingly, heterogeneous applications may communicate using this consistent message configured as such.

Additionally, FIGS. 49-1 through 49-3 illustrate one example logical configuration of TaxObjectERPUpdateRequest_sync element structure 49000. Specifically, these figures depict the arrangement and hierarchy of various components such as one or more levels of packages, entities, and datatypes, shown here as 49000 through 49072. As described above, packages may be used to represent hierarchy levels. Entities are discrete business elements that are used during a business transaction. Data types are used to type object entities and interfaces with a structure. For example, TaxObject-ERPUpdateRequest_sync element structure 49000 includes, among other things, MessageHeader 49006. Accordingly, heterogeneous applications may communicate using this consistent message configured as such.

Additionally, FIGS. 50-1 through 50-3 illustrate one example logical configuration of TaxObjectERPUpdateConfirmation_sync element structure 50000. Specifically, these figures depict the arrangement and hierarchy of various components such as one or more levels of packages, entities, and datatypes, shown here as 50000 through 50084. As described above, packages may be used to represent hierarchy levels. Entities are discrete business elements that are used during a business transaction. Data types are used to type object entities and interfaces with a structure. For example, TaxObject-ERPUpdateConfirmation_sync element structure 50000 includes, among other things, MessageHeader 50006. Accordingly, heterogeneous applications may communicate using this consistent message configured as such.

Additionally, FIGS. 51-1 through 51-2 illustrate one example logical configuration of TaxObjectERPCheckQuery_sync element structure 51000. Specifically, these figures depict the arrangement and hierarchy of various components such as one or more levels of packages, entities, and datatypes, shown here as 51000 through 51064. As described above, packages may be used to represent hierarchy levels. Entities are discrete business elements that are used during a business transaction. Data types are used to type object entities and interfaces with a structure. For example, TaxObject-ERPCheckQuery_sync element structure 51000 includes, among other things, TaxObject 51006. Accordingly, heterogeneous applications may communicate using this consistent message configured as such.

Additionally, FIGS. 52-1 through 52-3 illustrate one example logical configuration of TaxObjectERPCheckResponse_sync element structure 52000. Specifically, these figures depict the arrangement and hierarchy of various components such as one or more levels of packages, entities, and datatypes, shown here as 52000 through 52078. As described above, packages may be used to represent hierarchy levels. Entities are discrete business elements that are used during a business transaction. Data types are used to type object entities and interfaces with a structure. For example, TaxObject-ERPCheckResponse_sync element structure 52000 includes, among other things, TaxObject 52006. Accordingly, heterogeneous applications may communicate using this consistent message configured as such.

In further detail, FIGS. 42-1 through 42-6 illustrate an example configuration of an Element Structure that includes a TaxObjectERPMessage_sync 42000 package. The TaxObjectERPMessage_sync 42000 package is a TxObjERPMsg 42004 data type. The TaxObjectERPMessage_sync 42000 package includes a TaxObjectERPMessage_sync 42002 entity. The TaxObjectERPMessage_sync 42000 package includes various packages, namely a MessageHeader 42006, a TaxObject 42012, a ProcessingConditions 42120 and a Log 42130.

The MessageHeader 42006 package is a BasicBusiness-DocumentMessageHeader 42010 data type. The Message-Header 42006 package includes a MessageHeader 42008 entity.

The TaxObject 42012 package is a TxObj 42016 data type. The TaxObject 42012 package includes a TaxObject 42014 entity. The TaxObject 42012 package includes various packages, namely a BusinessLicenseAssignment 42050, a PropertyGroup 42058, a PropertyValuation 42064, a Location-Data 42074 and a TaxObligationAssignment 42086.

The TaxObject 42014 entity includes various attributes, namely a propertyGroupListCompleteTransmissionIndicator 42018, a taxObligationAssignmentListCompleteTransmissionIndicator 42022, a TaxObjectID 42026, a ChangeStateID 42030, an ObjectTypeCode 42034, an ObjectTypeName 42038, a TaxObjectName 42042 and a SubapplicationCode 42046.

The propertyGroupListCompleteTransmissionIndicator 42018 attribute is an Indicator 42020 data type. The taxObligationAssignmentListCompleteTransmissionIndicator 42022 attribute is an Indicator 42024 data type. The TaxObjectID 42026 attribute is an Identifier 42028 data type. The ChangeStateID 42030 attribute is a ChangeStateID 42032 data type. The ObjectTypeCode 42034 attribute is a Code 42036 data type. The ObjectTypeName 42038 attribute is a MEDIUM_Name 42040 data type. The TaxObjectName 42042 attribute is a MEDIUM_Name 42044 data type. The SubapplicationCode 42046 attribute is a Code 42048 data type. The BusinessLicenseAssignment 42050 package is a TxObjERPBusLicAssgmt 42054 data type. The BusinessLicenseAssignment 42050 package includes a BusinessLicenseAssignment 42052 entity. The PropertyGroup 42058 package is a TxObjERPProptyGrp 42062 data type. The PropertyGroup 42058 package includes a PropertyGroup 42060 entity. The PropertyValuation 42064 package is a TxObjERPProptyValn 42068 data type. The PropertyValuation 42064 package includes a PropertyValuation 42066 entity. The PropertyValuation 42066 entity includes a PropertyValuation 42070 attribute. The PropertyValuation 42070 attribute is a PropertyValuation 42072 data type. The LocationData 42074 package is a TxObjERPLocData 42078 data type. The LocationData 42074 package includes a LocationData 42076 entity.

The TaxObligationAssignment 42086 package is a TxObjERPTxOblgnAssgmt 42090 data type. The TaxObligationAssignment 42086 package includes a TaxObligationAssignment 42088 entity. The TaxObligationAssignment 42088 entity includes various attributes, namely an actionCode 42092, a TaxObligationID 42096, a LevyTypeCode 42100, a LevyTypeName 42104, a StartBillingPeriodID 42108, a StartBillingPeriodName 42112 and a TaxPayerPartyID 42116. The actionCode 42092 attribute is an ActionCode 42094 data type. The TaxObligationID 42096 attribute is an Identifier 42098 data type. The LevyTypeCode 42100 attribute is a LevyTypeCode 42102 data type. The LevyTypeName 42104 attribute is a MEDIUM_Name 42106 data type. The StartBillingPeriodID 42108 attribute is a BillingPeriodID 42110 data type. The StartBillingPeriodName 42112 attribute is a MEDIUM_Name 42114 data type. The TaxPayerPartyID 42116 attribute is a PartyInternalID 42118 data type. The ProcessingConditions 42120 package is a QueryProcessingConditions 42124 data type. The ProcessingConditions 42120 package includes various entities, namely a QueryProcessingConditions 42122 and a ResponseProcessingConditions 42126. The Log 42130 package is a Log 42134 data type. The Log 42130 package includes a Log 42132 entity.

In further detail, FIGS. 43-1 through 43-2 illustrate an example configuration of an Element Structure that includes a TaxObjectERPByBusinessPartnerQueryMessage_sync 43000 package. The TaxObjectERPByBusinessPartnerQueryMessage_sync 43000 package includes a TaxObjectERPByBusinessPartnerQueryMessage_sync 43002 entity. The TaxObjectERPByBusinessPartnerQueryMessage_sync 43000 package includes various packages, namely a Selection 43004 and a ProcessingConditions 43026.

The Selection 43004 package includes a TaxObjectSelectionByTaxPayerPartyID 43006 entity. The TaxObjectSelectionByTaxPayerPartyID 43006 entity has a cardinality of 1 43008 meaning that for each instance of the Selection 43004 package there is one TaxObjectSelectionByTaxPayerPartyID 43006 entity. The TaxObjectSelectionByTaxPayerPartyID 43006 entity includes various attributes, namely an InclusionExclusionCode 43010, an IntervalBoundaryTypeCode 43014, a LowerBoundaryTaxPayerPartyID 43018 and an UpperBoundaryTaxPayerPartyID 43022. The InclusionExclusionCode 43010 attribute has a cardinality of 0 . . . 1 43012 meaning that for each instance of the TaxObjectSelectionByTaxPayerPartyID 43006 entity there may be one InclusionExclusionCode 43010 attribute. The IntervalBoundaryTypeCode 43014 attribute has a cardinality of 0 . . . 1 43016 meaning that for each instance of the TaxObjectSelectionByTaxPayerPartyID 43006 entity there may be one IntervalBoundaryTypeCode 43014 attribute. The LowerBoundaryTaxPayerPartyID 43018 attribute has a cardinality of 1 43020 meaning that for each instance of the TaxObjectSelectionByTaxPayerPartyID 43006 entity there is one LowerBoundaryTaxPayerPartyID 43018 attribute. The UpperBoundaryTaxPayerPartyID 43022 attribute has a cardinality of 0 . . . 1 43024 meaning that for each instance of the TaxObjectSelectionByTaxPayerPartyID 43006 entity there may be one UpperBoundaryTaxPayerPartyID 43022 attribute.

The ProcessingConditions 43026 package includes a QueryProcessingConditions 43028 entity. The QueryProcessingConditions 43028 entity includes various attributes, namely a QueryHitsMaximumNumberValue 43030 and an UnlimitedQueryHitsIndicator 43034. The QueryHitsMaximumNumberValue 43030 attribute has a cardinality of 0 . . . 1 43032 meaning that for each instance of the QueryProcessingConditions 43028 entity there may be one QueryHitsMaximumNumberValue 43030 attribute. The UnlimitedQueryHitsIndicator 43034 attribute has a cardinality of 1 43036 meaning that for each instance of the QueryProcessingConditions 43028 entity there is one UnlimitedQueryHitsIndicator 43034 attribute.

In further detail, FIGS. 44-1 through 44-4 illustrate an example configuration of an Element Structure that includes a TaxObjectERPByBusinessPartnerResponseMessage_sync 44000 package. The TaxObjectERPByBusinessPartnerResponseMessage_sync 44000 package includes a TaxObjectERPByBusinessPartnerResponseMessage_sync 44002 entity. The TaxObjectERPByBusinessPartnerResponseMessage_sync 44000 package includes various packages, namely a TaxObject 44004, a ProcessingConditions 44078 and a Log 44092.

The TaxObject 44004 package includes a TaxObject 44006 entity. The TaxObject 44004 package includes various packages, namely a BusinessLicenseAssignment 44026, a PropertyGroup 44032, a PropertyValuation 44038 and a TaxObligationAssignment 44048. The TaxObject 44006 entity has a cardinality of 0 . . . n 44008 meaning that for each instance of the TaxObject 44004 package there may be one or more TaxObject 44006 entities. The TaxObject 44006 entity includes various attributes, namely a TaxObjectID 44010, an ObjectTypeCode 44014, an ObjectTypeName 44018 and a TaxObjectName 44022. The TaxObjectID 44010 attribute has a cardinality of 1 44012 meaning that for each instance of the TaxObject 44006 entity there is one TaxObjectID 44010 attribute. The ObjectTypeCode 44014 attribute has a cardinality of 1 44016 meaning that for each instance of the TaxObject 44006 entity there is one ObjectTypeCode 44014 attribute. The ObjectTypeName 44018 attribute has a cardinality of 0 . . . 1 44020 meaning that for each instance of the TaxObject 44006 entity there may be one ObjectTypeName 44018 attribute. The TaxObjectName 44022 attribute has a cardinality of 0 . . . 1 44024 meaning that for each instance of the TaxObject 44006 entity there may be one TaxObjectName 44022 attribute.

The BusinessLicenseAssignment 44026 package includes a BusinessLicenseAssignment 44028 entity. The BusinessLicenseAssignment 44028 entity has a cardinality of 0 . . . 1 44030 meaning that for each instance of the BusinessLicenseAssignment 44026 package there may be one BusinessLicenseAssignment 44028 entity.

The PropertyGroup 44032 package includes a PropertyGroup 44034 entity. The PropertyGroup 44034 entity has a cardinality of 0 . . . n 44036 meaning that for each instance of the PropertyGroup 44032 package there may be one or more PropertyGroup 44034 entities. The PropertyValuation 44038 package includes a PropertyValuation 44040 entity. The PropertyValuation 44040 entity has a cardinality of 0 . . . 1 44042 meaning that for each instance of the PropertyValuation 44038 package there may be one PropertyValuation 44040 entity. The PropertyValuation 44040 entity includes a PropertyValuation 44044 attribute. The PropertyValuation 44044 attribute has a cardinality of 0 . . . n 44046 meaning that for each instance of the PropertyValuation 44040 entity there may be one or more PropertyValuation 44044 attributes.

The TaxObligationAssignment 44048 package includes a TaxObligationAssignment 44050 entity. The TaxObligationAssignment 44050 entity has a cardinality of 1 . . . n 44052 meaning that for each instance of the TaxObligationAssignment 44048 package there are one or more TaxObligationAssignment 44050 entities. The TaxObligationAssignment 44050 entity includes various attributes, namely a TaxObligationID 44054, a LevyTypeCode 44058, a LevyTypeName 44062, a StartBillingPeriodID 44066, a StartBillingPeriodName 44070 and a TaxPayerPartyID 44074. The TaxObligationID 44054 attribute has a cardinality of 1 44056 meaning that for each instance of the TaxObligationAssignment 44050 entity there is one TaxObligationID 44054 attribute. The LevyTypeCode 44058 attribute has a cardinality of 0 . . . 1 44060 meaning that for each instance of the TaxObligationAssignment 44050 entity there may be one LevyTypeCode 44058 attribute. The LevyTypeName 44062 attribute has a cardinality of 0 . . . 1 44064 meaning that for each instance of the TaxObligationAssignment 44050 entity there may be one LevyTypeName 44062 attribute. The StartBillingPeriodID 44066 attribute has a cardinality of 0 . . . 1 44068 meaning that for each instance of the TaxObligationAssignment 44050 entity there may be one StartBillingPeriodID 44066 attribute. The StartBillingPeriodName 44070 attribute has a cardinality of 0 . . . 1 44072 meaning that for each instance of the TaxObligationAssignment 44050 entity there may be one StartBillingPeriodName 44070 attribute. The TaxPayerPartyID 44074 attribute has a cardinality of 1 44076 meaning that for each instance of the TaxObligationAssignment 44050 entity there is one TaxPayerPartyID 44074 attribute.

The ProcessingConditions 44078 package includes a ResponseProcessingConditions 44080 entity. The ResponseProcessingConditions 44080 entity has a cardinality of 1 44082 meaning that for each instance of the ProcessingConditions 44078 package there is one ResponseProcessingConditions 44080 entity. The ResponseProcessingConditions 44080 entity includes various attributes, namely a ReturnedQueryHitsNumberValue 44084 and a MoreElementsAvailableIndicator 44088. The ReturnedQueryHitsNumberValue 44084 attribute has a cardinality of 1 44086 meaning that for each instance of the ResponseProcessingConditions 44080 entity there is one ReturnedQueryHitsNumberValue 44084 attribute. The MoreElementsAvailableIndicator 44088 attribute has a cardinality of 1 44090 meaning that for each instance of the ResponseProcessingConditions 44080 entity there is one MoreElementsAvailableIndicator 44088 attribute.

The Log 44092 package includes a Log 44094 entity. The Log 44094 entity has a cardinality of 1 44096 meaning that for each instance of the Log 44092 package there is one Log 44094 entity.

In further detail, FIG. 45 illustrates an example configuration of an Element Structure that includes a TaxObjectERPByIdQueryMessage_sync 45000 package. The TaxObjectERPByIdQueryMessage_sync 45000 package includes a TaxObjectERPByIdQueryMessage_sync 45002 entity. The TaxObjectERPByIdQueryMessage_sync 45000 package includes a Selection 45004 package.

The Selection 45004 package includes a TaxObjectSelectionById 45006 entity. The TaxObjectSelectionById 45006 entity has a cardinality of 1 45008 meaning that for each instance of the Selection 45004 package there is one TaxObjectSelectionById 45006 entity. The TaxObjectSelectionById 45006 entity includes a TaxObjectID 45010 attribute. The TaxObjectID 45010 attribute has a cardinality of 1 45012 meaning that for each instance of the TaxObjectSelectionById 45006 entity there is one TaxObjectID 45010 attribute.

In further detail, FIGS. 46-1 through 46-3 illustrate an example configuration of an Element Structure that includes a TaxObjectERPByIdResponseMessage_sync 46000 package. The TaxObjectERPByIdResponseMessage_sync 46000 package includes a TaxObjectERPByIdResponseMessage_sync 46002 entity. The TaxObjectERPByIdResponseMessage_sync 46000 package includes various packages, namely a TaxObject 46004 and a Log 46078.

The TaxObject 46004 package includes a TaxObject 46006 entity. The TaxObject 46004 package includes various packages, namely a BusinessLicenseAssignment 46030, a PropertyGroup 46036, a PropertyValuation 46042 and a TaxObligationAssignment 46052.

The TaxObject 46006 entity has a cardinality of 0 . . . 1 46008 meaning that for each instance of the TaxObject 46004 package there may be one TaxObject 46006 entity. The TaxObject 46006 entity includes various attributes, namely a TaxObjectID 46010, a ChangeStateID 46014, an ObjectTypeCode 46018, an ObjectTypeName 46022 and a TaxObjectName 46026. The TaxObjectID 46010 attribute has a cardinality of 1 46012 meaning that for each instance of the TaxObject 46006 entity there is one TaxObjectID 46010 attribute. The ChangeStateID 46014 attribute has a cardinality of 0 . . . 1 46016 meaning that for each instance of the TaxObject 46006 entity there may be one ChangeStateID 46014 attribute. The ObjectTypeCode 46018 attribute has a cardinality of 1 46020 meaning that for each instance of the TaxObject 46006 entity there is one ObjectTypeCode 46018 attribute. The ObjectTypeName 46022 attribute has a cardinality of 0 . . . 1 46024 meaning that for each instance of the TaxObject 46006 entity there may be one ObjectTypeName 46022 attribute. The TaxObjectName 46026 attribute has a cardinality of 0 . . . 1 46028 meaning that for each instance of the TaxObject 46006 entity there may be one TaxObjectName 46026 attribute.

The BusinessLicenseAssignment 46030 package includes a BusinessLicenseAssignment 46032 entity. The BusinessLicenseAssignment 46032 entity has a cardinality of 0 . . . 1 46034 meaning that for each instance of the BusinessLicenseAssignment 46030 package there may be one BusinessLicenseAssignment 46032 entity.

The PropertyGroup 46036 package includes a PropertyGroup 46038 entity. The PropertyGroup 46038 entity has a cardinality of 0 . . . n 46040 meaning that for each instance of the PropertyGroup 46036 package there may be one or more PropertyGroup 46038 entities.

The PropertyValuation 46042 package includes a PropertyValuation 46044 entity. The PropertyValuation 46044 entity has a cardinality of 0 . . . 1 46046 meaning that for each instance of the PropertyValuation 46042 package there may be one PropertyValuation 46044 entity. The PropertyValuation 46044 entity includes a PropertyValuation 46048 attribute. The PropertyValuation 46048 attribute has a cardinality of 0 . . . n 46050 meaning that for each instance of the PropertyValuation 46044 entity there may be one or more PropertyValuation 46048 attributes.

The TaxObligationAssignment 46052 package includes a TaxObligationAssignment 46054 entity. The TaxObligationAssignment 46054 entity has a cardinality of 1 . . . n 46056 meaning that for each instance of the TaxObligationAssignment 46052 package there are one or more TaxObligationAssignment 46054 entities. The TaxObligationAssignment 46054 entity includes various attributes, namely a TaxObligationID 46058, a LevyTypeCode 46062, a LevyTypeName 46066, a StartBillingPeriodID 46070 and a StartBillingPeriodName 46074. The TaxObligationID 46058 attribute has a cardinality of 1 46060 meaning that for each instance of the TaxObligationAssignment 46054 entity there is one TaxObligationID 46058 attribute. The LevyTypeCode 46062 attribute has a cardinality of 0 . . . 1 46064 meaning that for each instance of the TaxObligationAssignment 46054 entity there may be one LevyTypeCode 46062 attribute. The LevyTypeName 46066 attribute has a cardinality of 0 . . . 1 46068 meaning that for each instance of the TaxObligationAssignment 46054 entity there may be one LevyTypeName 46066 attribute. The StartBillingPeriodID 46070 attribute has a cardinality of 0 . . . 1 46072 meaning that for each instance of the TaxObligationAssignment 46054 entity there may be one StartBillingPeriodID 46070 attribute. The StartBillingPeriodName 46074 attribute has a cardinality of 0 . . . 1 46076 meaning that for each instance of the TaxObligationAssignment 46054 entity there may be one StartBillingPeriodName 46074 attribute.

The Log 46078 package includes a Log 46080 entity. The Log 46080 entity has a cardinality of 1 46082 meaning that for each instance of the Log 46078 package there is one Log 46080 entity.

In further detail, FIGS. 47-1 through 47-2 illustrate an example configuration of an Element Structure that includes a TaxObjectERPCreateRequestMessage_sync 47000 package. The TaxObjectERPCreateRequestMessage_sync 47000 package includes a TaxObjectERPCreateRequestMessage_sync 47002 entity. The TaxObjectERPCreateRequestMessage_sync 47000 package includes various packages, namely a MessageHeader 47004 and a TaxObject 47010.

The MessageHeader 47004 package includes a MessageHeader 47006 entity. The MessageHeader 47006 entity has a cardinality of 0 . . . 1 47008 meaning that for each instance of the MessageHeader 47004 package there may be one MessageHeader 47006 entity.

The TaxObject 47010 package includes a TaxObject 47012 entity. The TaxObject 47010 package includes various packages, namely a BusinessLicenseAssignment 47020, a PropertyGroup 47026, a PropertyValuation 47032 and a TaxObligationAssignment 47042.

The TaxObject 47012 entity has a cardinality of 1 47014 meaning that for each instance of the TaxObject 47010 package there is one TaxObject 47012 entity. The TaxObject 47012 entity includes a TaxObjectName 47016 attribute. The TaxObjectName 47016 attribute has a cardinality of 0 . . . 1 47018 meaning that for each instance of the TaxObject 47012 entity there may be one TaxObjectName 47016 attribute.

The BusinessLicenseAssignment 47020 package includes a BusinessLicenseAssignment 47022 entity. The BusinessLicenseAssignment 47022 entity has a cardinality of 0 . . . 1 47024 meaning that for each instance of the BusinessLicenseAssignment 47020 package there may be one BusinessLicenseAssignment 47022 entity.

The PropertyGroup 47026 package includes a PropertyGroup 47028 entity. The PropertyGroup 47028 entity has a cardinality of 0 . . . n 47030 meaning that for each instance of the PropertyGroup 47026 package there may be one or more PropertyGroup 47028 entities.

The PropertyValuation 47032 package includes a PropertyValuation 47034 entity. The PropertyValuation 47034 entity has a cardinality of 0 . . . 1 47036 meaning that for each instance of the PropertyValuation 47032 package there may be one PropertyValuation 47034 entity. The PropertyValuation 47034 entity includes a PropertyValuation 47038 attribute. The PropertyValuation 47038 attribute has a cardinality of 0 . . . n 47040 meaning that for each instance of the PropertyValuation 47034 entity there may be one or more PropertyValuation 47038 attributes.

The TaxObligationAssignment 47042 package includes a TaxObligationAssignment 47044 entity. The TaxObligationAssignment 47044 entity has a cardinality of 1 . . . n 47046 meaning that for each instance of the TaxObligationAssignment 47042 package there are one or more TaxObligationAssignment 47044 entities. The TaxObligationAssignment 47044 entity includes a TaxObligationID 47048 attribute. The TaxObligationID 47048 attribute has a cardinality of 1 47050 meaning that for each instance of the TaxObligationAssignment 47044 entity there is one TaxObligationID 47048 attribute.

In further detail, FIGS. 48-1 through 48-3 illustrate an example configuration of an Element Structure that includes a TaxObjectERPCreateConfirmationMessage_sync 48000 package. The TaxObjectERPCreateConfirmationMessage_sync 48000 package includes a TaxObjectERPCreateConfirmationMessage_sync 48002 entity. The TaxObjectERPCreateConfirmationMessage_sync 48000 package includes various packages, namely a MessageHeader 48004, a TaxObject 48010 and a Log 48080.

The MessageHeader 48004 package includes a MessageHeader 48006 entity. The MessageHeader 48006 entity has a cardinality of 0 . . . 1 48008 meaning that for each instance of the MessageHeader 48004 package there may be one MessageHeader 48006 entity.

The TaxObject 48010 package includes a TaxObject 48012 entity. The TaxObject 48010 package includes various packages, namely a BusinessLicenseAssignment 48032, a PropertyGroup 48038, a PropertyValuation 48044 and a TaxObligationAssignment 48054.

The TaxObject 48012 entity has a cardinality of 0 . . . 1 48014 meaning that for each instance of the TaxObject 48010 package there may be one TaxObject 48012 entity. The TaxObject 48012 entity includes various attributes, namely a TaxObjectID 48016, an ObjectTypeCode 48020, an ObjectTypeName 48024 and a TaxObjectName 48028. The TaxObjectID 48016 attribute has a cardinality of 1 48018 meaning that for each instance of the TaxObject 48012 entity there is one TaxObjectID 48016 attribute. The ObjectTypeCode 48020 attribute has a cardinality of 1 48022 meaning that for each instance of the TaxObject 48012 entity there is one ObjectTypeCode 48020 attribute. The ObjectTypeName 48024 attribute has a cardinality of 0 . . . 1 48026 meaning that for each instance of the TaxObject 48012 entity there may be one ObjectTypeName 48024 attribute. The TaxObjectName 48028 attribute has a cardinality of 0 . . . 1 48030 meaning that for each instance of the TaxObject 48012 entity there may be one TaxObjectName 48028 attribute.

The BusinessLicenseAssignment 48032 package includes a BusinessLicenseAssignment 48034 entity. The BusinessLicenseAssignment 48034 entity has a cardinality of 0 . . . 1 48036 meaning that for each instance of the BusinessLicenseAssignment 48032 package there may be one BusinessLicenseAssignment 48034 entity. The PropertyGroup 48038 package includes a PropertyGroup 48040 entity. The PropertyGroup 48040 entity has a cardinality of 0 . . . n 48042 meaning that for each instance of the PropertyGroup 48038 package there may be one or more PropertyGroup 48040 entities. The PropertyValuation 48044 package includes a PropertyValuation 48046 entity. The PropertyValuation 48046 entity has a cardinality of 0 . . . 1 48048 meaning that for each instance of the PropertyValuation 48044 package there may be one PropertyValuation 48046 entity. The PropertyValuation 48046 entity includes a PropertyValuation 48050 attribute. The PropertyValuation 48050 attribute has a cardinality of 0 . . . n 48052 meaning that for each instance of the PropertyValuation 48046 entity there may be one or more PropertyValuation 48050 attributes. The TaxObligationAssignment 48054 package includes a TaxObligationAssignment 48056 entity.

The TaxObligationAssignment 48056 entity has a cardinality of 1 . . . n 48058 meaning that for each instance of the TaxObligationAssignment 48054 package there are one or more TaxObligationAssignment 48056 entities. The TaxObligationAssignment 48056 entity includes various attributes, namely a TaxObligationID 48060, a LevyTypeCode 48064, a LevyTypeName 48068, a StartBillingPeriodID 48072 and a StartBillingPeriodName 48076. The TaxObligationID 48060 attribute has a cardinality of 1 48062 meaning that for each instance of the TaxObligationAssignment 48056 entity there is one TaxObligationID 48060 attribute. The LevyTypeCode 48064 attribute has a cardinality of 0 . . . 1 48066 meaning that for each instance of the TaxObligationAssignment 48056 entity there may be one LevyTypeCode 48064 attribute. The LevyTypeName 48068 attribute has a cardinality of 0 . . . 1 48070 meaning that for each instance of the TaxObligationAssignment 48056 entity there may be one LevyTypeName 48068 attribute. The StartBillingPeriodID 48072 attribute has a cardinality of 0 . . . 1 48074 meaning that for each instance of the TaxObligationAssignment 48056 entity there may be one StartBillingPeriodID 48072 attribute. The StartBillingPeriodName 48076 attribute has a cardinality of 0 . . . 1 48078 meaning that for each instance of the TaxObligationAssignment 48056 entity there may be one StartBillingPeriodName 48076 attribute.

The Log 48080 package includes a Log 48082 entity. The Log 48082 entity has a cardinality of 1 48084 meaning that for each instance of the Log 48080 package there is one Log 48082 entity.

In further detail, FIGS. 49-1 through 49-3 illustrate an example configuration of an Element Structure that includes a TaxObjectERPUpdateRequestMessage_sync 49000 package. The TaxObjectERPUpdateRequestMessage_sync 49000 package includes a TaxObjectERPUpdateRequestMessage_sync 49002 entity. The TaxObjectERPUpdateRequestMessage_sync 49000 package includes various packages, namely a MessageHeader 49004 and a TaxObject 49010.

The MessageHeader 49004 package includes a MessageHeader 49006 entity. The MessageHeader 49006 entity has a cardinality of 0 . . . 1 49008 meaning that for each instance of the MessageHeader 49004 package there may be one MessageHeader 49006 entity.

The TaxObject 49010 package includes a TaxObject 49012 entity. The TaxObject 49010 package includes various packages, namely a BusinessLicenseAssignment 49036, a PropertyGroup 49044, a PropertyValuation 49050 and a TaxObligationAssignment 49060.

The TaxObject 49012 entity has a cardinality of 0 . . . 1 49014 meaning that for each instance of the TaxObject 49010 package there may be one TaxObject 49012 entity. The TaxObject 49012 entity includes various attributes, namely a propertyGroupListCompleteTransmissionIndicator 49016, a taxObligationAssignmentListCompleteTransmissionIndicator 49020, a TaxObjectID 49024, a ChangeStateID 49028 and a TaxObjectName 49032. The propertyGroupListCompleteTransmissionIndicator 49016 attribute has a cardinality of 1 49018 meaning that for each instance of the TaxObject 49012 entity there is one propertyGroupListCompleteTransmissionIndicator 49016 attribute. The taxObligationAssignmentListCompleteTransmissionIndicator 49020 attribute has a cardinality of 1 49022 meaning that for each instance of the TaxObject 49012 entity there is one taxObligationAssignmentListCompleteTransmissionIndicator 49020 attribute. The TaxObjectID 49024 attribute has a cardinality of 1 49026 meaning that for each instance of the TaxObject 49012 entity there is one TaxObjectID 49024 attribute. The ChangeStateID 49028 attribute has a cardinality of 1 49030 meaning that for each instance of the TaxObject 49012 entity there is one ChangeStateID 49028 attribute. The TaxObjectName 49032 attribute has a cardinality of 0 . . . 1 49034 meaning that for each instance of the TaxObject 49012 entity there may be one TaxObjectName 49032 attribute.

The BusinessLicenseAssignment 49036 package includes a BusinessLicenseAssignment 49038 entity. The BusinessLicenseAssignment 49038 entity has a cardinality of 0 . . . 1 49040 meaning that for each instance of the BusinessLicenseAssignment 49036 package there may be one BusinessLicenseAssignment 49038 entity.

The PropertyGroup 49044 package includes a PropertyGroup 49046 entity. The PropertyGroup 49046 entity has a cardinality of 0 . . . n 49048 meaning that for each instance of the PropertyGroup 49044 package there may be one or more PropertyGroup 49046 entities. The PropertyValuation 49050 package includes a PropertyValuation 49052 entity. The PropertyValuation 49052 entity has a cardinality of 0 . . . 1 49054 meaning that for each instance of the PropertyValuation 49050 package there may be one PropertyValuation 49052 entity. The PropertyValuation 49052 entity includes a PropertyValuation 49056 attribute. The PropertyValuation 49056 attribute has a cardinality of 0 . . . n 49058 meaning that for each instance of the PropertyValuation 49052 entity there may be one or more PropertyValuation 49056 attributes. The TaxObligationAssignment 49060 package includes a TaxObligationAssignment 49062 entity.

The TaxObligationAssignment 49062 entity has a cardinality of 0 . . . n 49064 meaning that for each instance of the TaxObligationAssignment 49060 package there may be one or more TaxObligationAssignment 49062 entities. The TaxObligationAssignment 49062 entity includes various attributes, namely an actionCode 49066 and a TaxObligationID 49070. The actionCode 49066 attribute has a cardinality of 1 49068 meaning that for each instance of the TaxObligationAssignment 49062 entity there is one actionCode 49066 attribute. The TaxObligationID 49070 attribute has a cardinality of 1 49072 meaning that for each instance of the TaxObligationAssignment 49062 entity there is one TaxObligationID 49070 attribute.

In further detail, FIGS. 50-1 through 50-3 illustrate an example configuration of an Element Structure that includes a TaxObjectERPUpdateConfirmationMessage_sync 50000 package. The TaxObjectERPUpdateConfirmationMessage_sync 50000 package includes a TaxObjectERPUpdateConfirmationMessage_sync 50002 entity. The TaxObjectERPUpdateConfirmationMessage_sync 50000 package includes various packages, namely a MessageHeader 50004, a TaxObject 50010 and a Log 50080.

The MessageHeader 50004 package includes a MessageHeader 50006 entity. The MessageHeader 50006 entity has a cardinality of 0 . . . 1 50008 meaning that for each instance of the MessageHeader 50004 package there may be one MessageHeader 50006 entity.

The TaxObject 50010 package includes a TaxObject 50012 entity. The TaxObject 50010 package includes various packages, namely a BusinessLicenseAssignment 50032, a PropertyGroup 50038, a PropertyValuation 50044 and a TaxObligationAssignment 50054.

The TaxObject 50012 entity has a cardinality of 0 . . . 1 50014 meaning that for each instance of the TaxObject 50010 package there may be one TaxObject 50012 entity. The TaxObject 50012 entity includes various attributes, namely a TaxObjectID 50016, an ObjectTypeCode 50020, an ObjectTypeName 50024 and a TaxObjectName 50028. The TaxObjectID 50016 attribute has a cardinality of 1 50018 meaning that for each instance of the TaxObject 50012 entity there is one TaxObjectID 50016 attribute. The ObjectTypeCode 50020 attribute has a cardinality of 1 50022 meaning that for each instance of the TaxObject 50012 entity there is one ObjectTypeCode 50020 attribute. The ObjectTypeName 50024 attribute has a cardinality of 0 . . . 1 50026 meaning that for each instance of the TaxObject 50012 entity there may be one ObjectTypeName 50024 attribute. The TaxObjectName 50028 attribute has a cardinality of 0 . . . 1 50030 meaning that for each instance of the TaxObject 50012 entity there may be one TaxObjectName 50028 attribute.

The BusinessLicenseAssignment 50032 package includes a BusinessLicenseAssignment 50034 entity. The BusinessLicenseAssignment 50034 entity has a cardinality of 0 . . . 1 50036 meaning that for each instance of the BusinessLicenseAssignment 50032 package there may be one BusinessLicenseAssignment 50034 entity.

The PropertyGroup 50038 package includes a PropertyGroup 50040 entity. The PropertyGroup 50040 entity has a cardinality of 0 . . . n 50042 meaning that for each instance of the PropertyGroup 50038 package there may be one or more PropertyGroup 50040 entities.

The PropertyValuation 50044 package includes a PropertyValuation 50046 entity. The PropertyValuation 50046 entity has a cardinality of 0 . . . 1 50048 meaning that for each instance of the PropertyValuation 50044 package there may be one PropertyValuation 50046 entity. The PropertyValuation 50046 entity includes a PropertyValuation 50050 attribute. The PropertyValuation 50050 attribute has a cardinality of 0 . . . n 50052 meaning that for each instance of the PropertyValuation 50046 entity there may be one or more PropertyValuation 50050 attributes. The TaxObligationAssignment 50054 package includes a TaxObligationAssignment 50056 entity.

The TaxObligationAssignment 50056 entity has a cardinality of 0 . . . n 50058 meaning that for each instance of the TaxObligationAssignment 50054 package there may be one or more TaxObligationAssignment 50056 entities. The TaxObligationAssignment 50056 entity includes various attributes, namely a TaxObligationID 50060, a LevyTypCode 50064, a LevyTypName 50068, a StartBillingPeriodID 50072 and a StartBillingPeriodName 50076. The TaxObligationID 50060 attribute has a cardinality of 1 50062 meaning that for each instance of the TaxObligationAssignment 50056 entity there is one TaxObligationID 50060 attribute. The LevyTypCode 50064 attribute has a cardinality of 0 . . . 1 50066 meaning that for each instance of the TaxObligationAssignment 50056 entity there may be one LevyTypCode 50064 attribute. The LevyTypName 50068 attribute has a cardinality of 0 . . . 1 50070 meaning that for each instance of the TaxObligationAssignment 50056 entity there may be one LevyTypName 50068 attribute. The StartBillingPeriodID 50072 attribute has a cardinality of 0 . . . 1 50074 meaning that for each instance of the TaxObligationAssignment 50056 entity there may be one StartBillingPeriodID 50072 attribute. The StartBillingPeriodName 50076 attribute has a cardinality of 0 . . . 1 50078 meaning that for each instance of the TaxObligationAssignment 50056 entity there may be one StartBillingPeriodName 50076 attribute.

The Log 50080 package includes a Log 50082 entity. The Log 50082 entity has a cardinality of 1 50084 meaning that for each instance of the Log 50080 package there is one Log 50082 entity.

In further detail, FIGS. 51-1 through 51-2 illustrate an example configuration of an Element Structure that includes a TaxObjectERPCheckQueryMessage_sync 51000 package. The TaxObjectERPCheckQueryMessage_sync 51000 package includes a TaxObjectERPCheckQueryMessage_sync 51002 entity. The TaxObjectERPCheckQueryMessage_sync 51000 package includes a TaxObject 51004 package.

The TaxObject 51004 package includes a TaxObject 51006 entity. The TaxObject 51004 package includes various packages, namely a BusinessLicenseAssignment 51026, a PropertyGroup 51032, a PropertyValuation 51038 and a TaxObligationAssignment 51048.

The TaxObject 51006 entity has a cardinality of 1 51008 meaning that for each instance of the TaxObject 51004 package there is one TaxObject 51006 entity. The TaxObject 51006 entity includes various attributes, namely a TaxObjectID 51010, a ChangeStateID 51014, an ObjectTypeCode 51018 and a TaxObjectName 51022. The TaxObjectID 51010 attribute has a cardinality of 1 51012 meaning that for each instance of the TaxObject 51006 entity there is one TaxObjectID 51010 attribute. The ChangeStateID 51014 attribute has a cardinality of 0 . . . 1 51016 meaning that for each instance of the TaxObject 51006 entity there may be one ChangeStateID 51014 attribute. The ObjectTypeCode 51018 attribute has a cardinality of 1 51020 meaning that for each instance of the TaxObject 51006 entity there is one ObjectTypeCode 51018 attribute. The TaxObjectName 51022 attribute has a cardinality of 0 . . . 1 51024 meaning that for each instance of the TaxObject 51006 entity there may be one TaxObjectName 51022 attribute.

The BusinessLicenseAssignment 51026 package includes a BusinessLicenseAssignment 51028 entity. The BusinessLicenseAssignment 51028 entity has a cardinality of 0 . . . 1 51030 meaning that for each instance of the BusinessLicenseAssignment 51026 package there may be one BusinessLicenseAssignment 51028 entity. The PropertyGroup 51032 package includes a PropertyGroup 51034 entity. The PropertyGroup 51034 entity has a cardinality of 0 . . . n 51036 meaning that for each instance of the PropertyGroup 51032 package there may be one or more PropertyGroup 51034 entities.

The PropertyValuation 51038 package includes a PropertyValuation 51040 entity. The PropertyValuation 51040 entity has a cardinality of 0 . . . 1 51042 meaning that for each instance of the PropertyValuation 51038 package there may be one PropertyValuation 51040 entity. The PropertyValuation 51040 entity includes a PropertyValuation 51044 attribute. The PropertyValuation 51044 attribute has a cardinality of 0 . . . n 51046 meaning that for each instance of the PropertyValuation 51040 entity there may be one or more PropertyValuation 51044 attributes.

The TaxObligationAssignment 51048 package includes a TaxObligationAssignment 51050 entity. The TaxObligationAssignment 51050 entity has a cardinality of 0 . . . n 51052 meaning that for each instance of the TaxObligationAssignment 51048 package there may be one or more TaxObligationAssignment 51050 entities. The TaxObligationAssignment 51050 entity includes various attributes, namely a TaxObligationID 51054, a RevenueTypeCode 51058 and a PeriodAssignmentCode 51062. The TaxObligationID 51054 attribute has a cardinality of 1 51056 meaning that for each instance of the TaxObligationAssignment 51050 entity there is one TaxObligationID 51054 attribute. The RevenueTypeCode 51058 attribute has a cardinality of 0 . . . 1 51060 meaning that for each instance of the TaxObligationAssignment 51050 entity there may be one RevenueTypeCode 51058 attribute. The PeriodAssignmentCode 51062 attribute has a cardinality of 0 . . . 1 51064 meaning that for each instance of the TaxObligationAssignment 51050 entity there may be one PeriodAssignmentCode 51062 attribute.

In further detail, FIGS. 52-1 through 52-3 illustrate an example configuration of an Element Structure that includes a TaxObjectERPCheckResponseMessage_sync 52000 package. The TaxObjectERPCheckResponseMessage_sync 52000 package includes a TaxObjectERPCheckResponseMessage_sync 52002 entity. The TaxObjectERPCheckResponseMessage_sync 52000 package includes various packages, namely a TaxObject 52004 and a Log 52074.

The TaxObject 52004 package includes a TaxObject 52006 entity. The TaxObject 52004 package includes various packages, namely a BusinessLicenseAssignment 52026, a PropertyGroup 52032, a PropertyValuation 52038 and a TaxObligationAssignment 52048.

The TaxObject 52006 entity has a cardinality of 0 . . . 1 52008 meaning that for each instance of the TaxObject 52004 package there may be one TaxObject 52006 entity. The TaxObject 52006 entity includes various attributes, namely a TaxObjectID 52010, an ObjectTypeCode 52014, an ObjectTypeName 52018 and a TaxObjectName 52022. The TaxObjectID 52010 attribute has a cardinality of 1 52012 meaning that for each instance of the TaxObject 52006 entity there is one TaxObjectID 52010 attribute. The ObjectTypeCode 52014 attribute has a cardinality of 0 . . . 1 52016 meaning that for each instance of the TaxObject 52006 entity there may be one ObjectTypeCode 52014 attribute. The ObjectTypeName 52018 attribute has a cardinality of 0 . . . 1 52020 meaning that for each instance of the TaxObject 52006 entity there may be one ObjectTypeName 52018 attribute. The TaxObjectName 52022 attribute has a cardinality of 0 . . . 1 52024 meaning that for each instance of the TaxObject 52006 entity there may be one TaxObjectName 52022 attribute.

The BusinessLicenseAssignment 52026 package includes a BusinessLicenseAssignment 52028 entity. The BusinessLicenseAssignment 52028 entity has a cardinality of 0 . . . 1 52030 meaning that for each instance of the BusinessLicenseAssignment 52026 package there may be one BusinessLicenseAssignment 52028 entity.

The PropertyGroup 52032 package includes a PropertyGroup 52034 entity.

The PropertyGroup 52034 entity has a cardinality of 0 . . . n 52036 meaning that for each instance of the PropertyGroup 52032 package there may be one or more PropertyGroup 52034 entities.

The PropertyValuation 52038 package includes a PropertyValuation 52040 entity. The PropertyValuation 52040 entity has a cardinality of 0 . . . 1 52042 meaning that for each instance of the PropertyValuation 52038 package there may be one PropertyValuation 52040 entity. The PropertyValuation 52040 entity includes a PropertyValuation 52044 attribute. The PropertyValuation 52044 attribute has a cardinality of 0 . . . n 52046 meaning that for each instance of the PropertyValuation 52040 entity there may be one or more PropertyValuation 52044 attributes.

The TaxObligationAssignment 52048 package includes a TaxObligationAssignment 52050 entity. The TaxObligationAssignment 52050 entity has a cardinality of 0 . . . n 52052 meaning that for each instance of the TaxObligationAssignment 52048 package there may be one or more TaxObligationAssignment 52050 entities. The TaxObligationAssignment 52050 entity includes various attributes, namely a TaxObligationID 52054, a LevyTypCode 52058, a LevyTypName 52062, a StartBillingPeriodID 52066 and a StartBillingPeriodName 52070. The TaxObligationID 52054 attribute has a cardinality of 1 52056 meaning that for each instance of the TaxObligationAssignment 52050 entity there is one TaxObligationID 52054 attribute. The LevyTypCode 52058 attribute has a cardinality of 0 . . . 1 52060 meaning that for each instance of the TaxObligationAssignment 52050 entity there may be one LevyTypCode 52058 attribute. The LevyTypName 52062 attribute has a cardinality of 0 . . . 1 52064 meaning that for each instance of the TaxObligationAssignment 52050 entity there may be one LevyTypName 52062 attribute. The StartBillingPeriodID 52066 attribute has a cardinality of 0 . . . 1 52068 meaning that for each instance of the TaxObligationAssignment 52050 entity there may be one StartBillingPeriodID 52066 attribute. The StartBillingPeriodName 52070 attribute has a cardinality of 0 . . . 1 52072 meaning that for each instance of the TaxObligationAssignment 52050 entity there may be one StartBillingPeriodName 52070 attribute.

The Log 52074 package includes a Log 52076 entity. The Log 52076 entity has a cardinality of 1 52078 meaning that for each instance of the Log 52074 package there is one Log 52076 entity.

TaxObligation Interfaces

A tax obligation is a legal requirement that may be fulfilled by a taxpayer. A tax obligation includes the filing of tax returns and payment of taxes at defined due dates, which may incur a penalty for lack of fulfillment. The TaxObligation interface performs various operations, namely a TaxObligationERPChangeRequestConfirmation_In, a TaxObligationERPFilingObligationChangeRequestConfirmation_In, a TaxObligationERPCheckQueryResponse_In, a TaxObligationERPFilingObligationCheckQueryResponse_In, a TaxObligationERPCreateRequestConfirmation_In, a TaxObligationERPByBusinessPartnerQueryResponse_In, a TaxObligationERPLevyTypeByBusinessPartnerQueryResponse_In, a TaxObligationERPRegistrationFormByIdQueryResponse_In, a TaxObligationERPFilingObligationByIdQueryResponse_In, and a TaxObligationERPByIdQueryResponse_In.

The TaxObligationERPChangeRequestConfirmation_In operation can change registration information based on tax registration form, and can also deregister. The TaxObligation- ERPChangeRequestConfirmation_In operation includes various message types, namely a TaxObligationERPChangeRequest_sync and a TaxObligationERPChangeConfirmation_sync. The structure of the TaxObligationERPChangeRequest_sync message type is specified by a TaxObligationERPChangeRequestMessage_sync message data type. The structure of the TaxObligationERPChangeConfirmation_sync message type is specified by a TaxObligationERPChangeConfirmationMessage_sync message data type.

The TaxObligationERPFilingObligationChangeRequestConfirmation_In operation can maintain a tax filing obligation for a given revenue type and tax assessment. The TaxObligationERPFilingObligationChangeRequestConfirmation_In operation includes various message types, namely a TaxObligationERPFilingObligationChangeRequest_sync and a TaxObligationERPFilingObligationChangeConfirmation_sync. The structure of the TaxObligationERPFilingObligationChangeRequest_sync message type is specified by a TaxObligationERPFilingObligationChangeRequestMessage_sync message data type. The structure of the TaxObligationERPFilingObligationChangeConfirmation_sync message type is specified by a TaxObligationERPFilingObligationChangeConfirmationMessage_sync message data type.

The TaxObligationERPCheckQueryResponse_In operation can check if data of a tax obligation is consistent and can be created or changed. The TaxObligationERPCheckQueryResponse_In operation includes various message types, namely a TaxObligationERPCheckQuery_sync and a TaxObligationERPCheckResponse_sync. The structure of the TaxObligationERPCheckQuery_sync message type is specified by a TaxObligationERPCheckQueryMessage_sync message data type. The structure of the TaxObligationERPCheckResponse_sync message type is specified by a TaxObligationERPCheckResponseMessage_sync message data type.

The TaxObligationERPFilingObligationCheckQueryResponse_In operation can check if tax filing obligation is consistent and can be created or changed. The TaxObligationERPFilingObligationCheckQueryResponse_In operation includes various message types, namely a TaxObligationERPFilingObligationCheckQuery_sync and a TaxObligationERPFilingObligationCheckResponse_sync. The structure of the TaxObligationERPFilingObligationCheckQuery_sync message type is specified by a TaxObligationERPFilingObligationCheckQueryMessage_sync message data type. The structure of the TaxObligationERPFilingObligationCheckResponse_sync message type is specified by a TaxObligationERPFilingObligationCheckResponseMessage_sync message data type.

The TaxObligationERPCreateRequestConfirmation_In operation can create registration information based on a tax registration form. The TaxObligationERPCreateRequestConfirmation_In operation includes various message types, namely a TaxObligationERPCreateRequest_sync and a TaxObligationERPCreateConfirmation_sync. The structure of the TaxObligationERPCreateRequest_sync message type is specified by a TaxObligationERPCreateRequestMessage_sync message data type. The structure of the TaxObligationERPCreateConfirmation_sync message type is specified by a TaxObligationERPCreateConfirmationMessage_sync message data type.

The TaxObligationERPByBussinessPartnerQueryResponse_In operation can return all tax obligations for tax payers. The TaxObligationERPByBussinessPartnerQueryResponse_In operation includes various message types, namely a TaxObligationERPByBussinessPartnerQuery_sync and a TaxObligationERPByBussinessPartnerResponse_sync. The structure of the TaxObligationERPByBussinessPartnerQuery_sync message type is specified by a TaxObligationERPByBussinessPartnerQueryMessage_sync message data type. The structure of the TaxObligationERPByBussinessPartnerResponse_sync message type is specified by a TaxObligationERPByBussinessPartnerResponseMessage_sync message data type.

The TaxObligationERPLevyTypeByBusinessPartnerQueryResponse_In operation can return all levy types that exist for tax payers. The TaxObligationERPLevyTypeByBusinessPartnerQueryResponse_In operation includes various message types, namely a TaxObligationERPLevyTypeByBusinessPartnerQuery_sync and a TaxObligationERPLevyTypeByBusinessPartnerResponse_sync. The structure of the TaxObligationERPLevyTypeByBusinessPartnerQuery_sync message type is specified by a TaxObligationERPLevyTypeByBusinessPartnerQueryMessage_sync message data type. The structure of the TaxObligationERPLevyTypeByBusinessPartnerResponse_sync message type is specified by a TaxObligationERPLevyTypeByBusinessPartnerResponseMessage_sync message data type.

The TaxObligationERPRegistrationFormByIdQueryResponse_In operation can read tax registration form data. The TaxObligationERPRegistrationFormByIdQueryResponse_In operation includes various message types, namely a TaxObligationERPRegistrationFormByIdQuery_sync and a TaxObligationERPRegistrationFormByIdResponse_sync. The structure of the TaxObligationERPRegistrationFormByIdQuery_sync message type is specified by a TaxObligationERPRegistrationFormByIdQueryMessage_sync message data type. The structure of the TaxObligationERPRegistrationFormByIdResponse_sync message type is specified by a TaxObligationERPRegistrationFormByIdResponseMessage_sync message data type.

The TaxObligationERPFilingObligationByIdQueryResponse_In operation can return filing obligations for a tax obligation. The TaxObligationERPFilingObligationByIdQueryResponse_In operation includes various message types, namely a TaxObligationERPFilingObligationByIdQuery_sync and a TaxObligationERPFilingObligationByIdResponse_sync. The structure of the TaxObligationERPFilingObligationByIdQuery_sync message type is specified by a TaxObligationERPFilingObligationByIdQueryMessage_sync message data type. The structure of the TaxObligationERPFilingObligationByIdResponse_sync message type is specified by a TaxObligationERPFilingObligationByIdResponseMessage_sync message data type.

The TaxObligationERPByIdQueryResponse_In operation can return a specific tax obligation. The TaxObligationERPByIdQueryResponse_In operation includes various message types, namely a TaxObligationERPByIdQuery_sync and a TaxObligationERPByIdResponse_sync. The structure of the TaxObligationERPByIdQuery_sync message type is specified by a TaxObligationERPByIdQueryMessage_sync message data type. The structure of the TaxObligationERPByIdResponse_sync message type is specified by a TaxObligationERPByIdResponseMessage_sync message data type.

Figure 53:
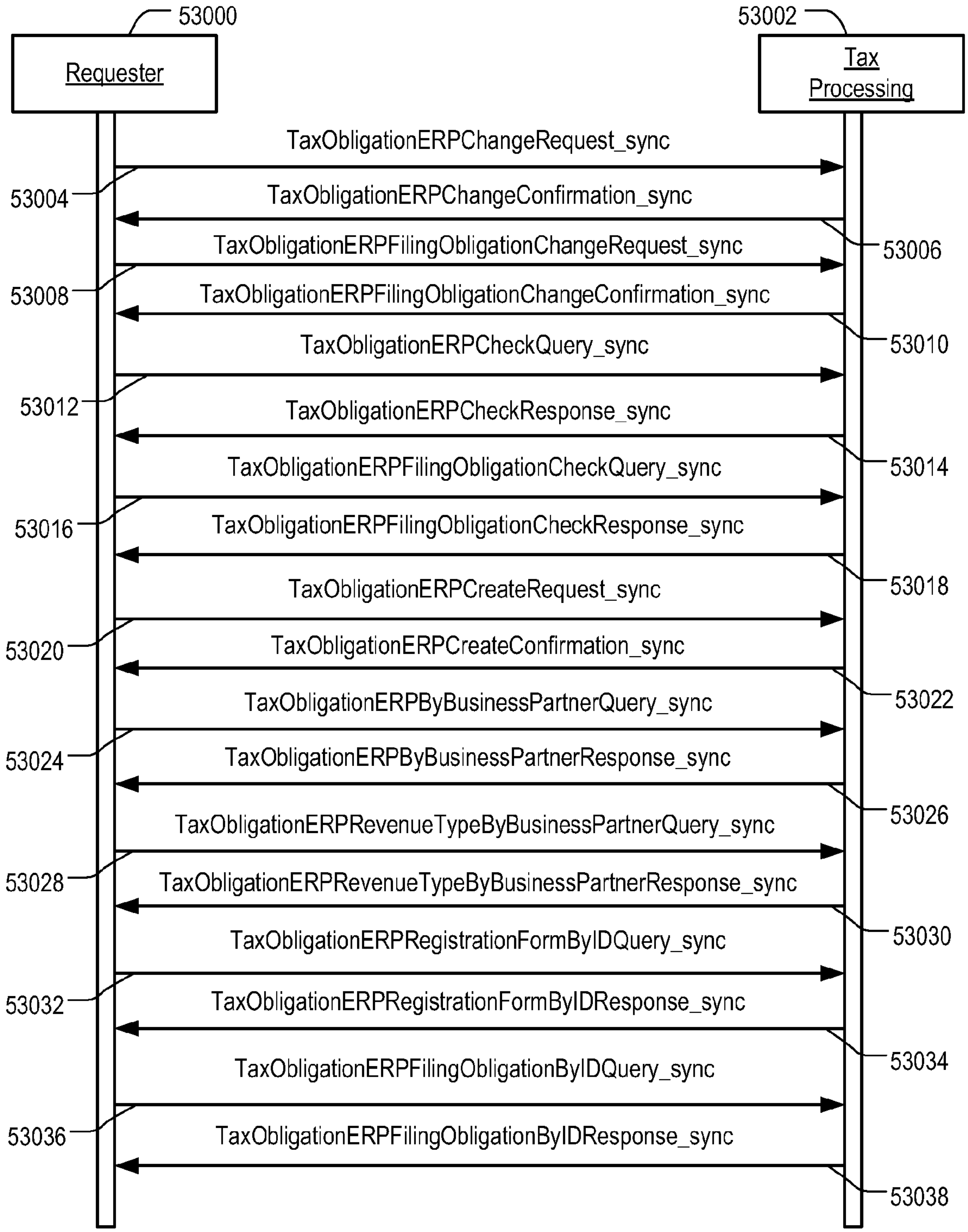
FIG. 53 illustrates an exemplary TaxObligation Message Choreography.

The message choreography of FIG. 53 describes a possible logical sequence of messages that can be used to realize a Tax Obligation business scenario. A "Requester" system 53000 can query tax obligation ERP information from a "Tax Processing" system 53002, using a TaxObligationERPChangeRequest_sync message 53004 as shown, for example, in FIG. 53. The "Tax Processing" system 53002 can respond to the query using a TaxObligationERPChangeConfirmation_sync 53006 as shown, for example, in FIG. 53.

The "Requester" system 53000 can request the change of tax obligation ERP filing obligation information in the "Tax Processing" system 53002 using a TaxObligationERPFilingObligationChangeRequest_sync message 53008 as shown, for example, in FIG. 53. The "Tax Processing" system 53002 can confirm the request using a TaxObligationERPFilingObligationChangeConfirmation_sync 53010 as shown, for example, in FIG. 53.

The "Requester" system 53000 can query a tax obligation ERP check in the "Tax Processing" system 53002 using a TaxObligationERPCheckQuery_sync message 53012 as shown, for example, in FIG. 53. The "Tax Processing" system 53002 can confirm the request using a TaxObligationERPCheckResponse_sync 53014 as shown, for example, in FIG. 53.

The "Requester" system 53000 can query tax obligation ERP filing obligation check information in the "Tax Processing" system 53002 using a TaxObligationERPFilingObligationCheckQuery_sync message 53016 as shown, for example, in FIG. 53. The "Tax Processing" system 53002 can respond to the query using a TaxObligationERPFilingObligationCheckResponse_sync 53018 as shown, for example, in FIG. 53.

The "Requester" system 53000 can request the creation of tax obligation ERP information in the "Tax Processing" system 53002 using a TaxObligationERPCreateRequest_sync message 53020 as shown, for example, in FIG. 53. The "Tax Processing" system 53002 can confirm the request using a TaxObligationERPCreateConfirmation_sync 53022 as shown, for example, in FIG. 53.

The "Requester" system 53000 can query tax obligation ERP information by business partner in the "Tax Processing" system 53002 using a TaxObligationERPByBusinessPartnerQuery_sync message 53024 as shown, for example, in FIG. 53. The "Tax Processing" system 53002 can respond to the query using a TaxObligationERPByBusinessPartnerResponse_sync 53026 as shown, for example, in FIG. 53.

The "Requester" system 53000 can query tax obligation ERP revenue type information by business partner in the "Tax Processing" system 53002 using a TaxObligationERPRevenueTypeByBusinessPartnerQuery_sync message 53028 as shown, for example, in FIG. 53. The "Tax Processing" system 53002 can respond to the query using a TaxObligationERPRevenueTypeByBusinessPartnerResponse_sync 53030 as shown, for example, in FIG. 53.

The "Requester" system 53000 can query tax obligation ERP registration form information by ID in the "Tax Processing" system 53002 using a TaxObligationERPRegistrationFormByIDQuery_sync message 53032 as shown, for example, in FIG. 53. The "Tax Processing" system 53002 can respond to the query using a TaxObligationERPRegistrationFormByIDResponse_sync 53034 as shown, for example, in FIG. 53.

The "Requester" system 53000 can query tax obligation ERP filing information by ID in the "Tax Processing" system 53002 using a TaxObligationERPFilingObligationByIDQuery_sync message 53036 as shown, for example, in FIG. 53. The "Tax Processing" system 53002 can respond to the query using a TaxObligationERPFilingObligationByIDResponse_sync 53038 as shown, for example, in FIG. 53.

FIGS. 54-1 through 54-15 illustrate one example logical configuration of TaxObligationERPMessage_Sync element structure 54000. Specifically, these figures depict the arrangement and hierarchy of various components such as one or more levels of packages, entities, and datatypes, shown here as 54000 through 54362. As described above, packages may be used to represent hierarchy levels. Entities are discrete business elements that are used during a business transaction. Data types are used to type object entities and interfaces with a structure. For example, TaxObligationERPMessage_Sync element structure 54000 includes, among other things, MessageHeader 54006. Accordingly, heterogeneous applications may communicate using this consistent message configured as such.

Additionally, FIGS. 55-1 through 55-7 illustrate one example logical configuration of TaxObligationERPChangeRequestMessage_Sync element structure 55000. Specifically, these figures depict the arrangement and hierarchy of various components such as one or more levels of packages, entities, and datatypes, shown here as 55000 through 55174. As described above, packages may be used to represent hierarchy levels. Entities are discrete business elements that are used during a business transaction. Data types are used to type object entities and interfaces with a structure. For example, TaxObligationERPChangeRequestMessage_Sync element structure 55000 includes, among other things, MessageHeader 55006. Accordingly, heterogeneous applications may communicate using this consistent message configured as such.

Additionally, FIGS. 56-1 through 56-9 illustrate one example logical configuration of TaxObligationERPChangeConfirmationMessage_Sync element structure 56000. Specifically, these figures depict the arrangement and hierarchy of various components such as one or more levels of packages, entities, and datatypes, shown here as 56000 through 56224. As described above, packages may be used to represent hierarchy levels. Entities are discrete business elements that are used during a business transaction. Data types are used to type object entities and interfaces with a structure. For example, TaxObligationERPChangeConfirmationMessage_Sync element structure 56000 includes, among other things, MessageHeader 56006. Accordingly, heterogeneous applications may communicate using this consistent message configured as such.

Additionally, FIGS. 57-1 through 57-3 illustrate one example logical configuration of TaxObligationERPFilingObligationChangeRequestMessage_Sync element structure 57000. Specifically, these figures depict the arrangement and hierarchy of various components such as one or more levels of packages, entities, and datatypes, shown here as 57000 through 57076. As described above, packages may be used to represent hierarchy levels. Entities are discrete business elements that are used during a business transaction. Data types are used to type object entities and interfaces with a structure. For example, TaxObligationERPFilingObligationChangeRequestMessage_Sync element structure 57000 includes, among other things, MessageHeader 57006. Accordingly, heterogeneous applications may communicate using this consistent message configured as such.

Additionally, FIGS. 58-1 through 58-5 illustrate one example logical configuration of TaxObligationERPFilingObligationChangeConfirmationMessage_Sync element structure 58000. Specifically, these figures depict the arrangement and hierarchy of various components such as one or more more levels of packages, entities, and datatypes, shown here as 58000 through 58126. As described above, packages may be used to represent hierarchy levels. Entities are discrete business elements that are used during a business transaction. Data types are used to type object entities and interfaces with a structure. For example, TaxObligationERPFilingObligationChangeConfirmationMessage_Sync element structure 58000 includes, among other things, MessageHeader 58006. Accordingly, heterogeneous applications may communicate using this consistent message configured as such.

Additionally, FIGS. 59-1 through 59-7 illustrate one example logical configuration of TaxObligationERPCheckQueryMessage_Sync element structure 59000. Specifically, these figures depict the arrangement and hierarchy of various components such as one or more levels of packages, entities, and datatypes, shown here as 59000 through 59166. As described above, packages may be used to represent hierarchy levels. Entities are discrete business elements that are used during a business transaction. Data types are used to type object entities and interfaces with a structure. For example, TaxObligationERPCheckQueryMessage_Sync element structure 59000 includes, among other things, MessageHeader 59006. Accordingly, heterogeneous applications may communicate using this consistent message configured as such.

Additionally, FIGS. 60-1 through 60-9 illustrate one example logical configuration of TaxObligationERPCheckResponseMessage_Sync element structure 60000. Specifically, these figures depict the arrangement and hierarchy of various components such as one or more levels of packages, entities, and datatypes, shown here as 60000 through 60224. As described above, packages may be used to represent hierarchy levels. Entities are discrete business elements that are used during a business transaction. Data types are used to type object entities and interfaces with a structure. For example, TaxObligationERPCheckResponseMessage_Sync element structure 60000 includes, among other things, MessageHeader 60006. Accordingly, heterogeneous applications may communicate using this consistent message configured as such.

Additionally, FIGS. 61-1 through 61-3 illustrate one example logical configuration of TaxObligationERPFilingObligationCheckQueryMessage_Sync element structure 61000. Specifically, these figures depict the arrangement and hierarchy of various components such as one or more levels of packages, entities, and datatypes, shown here as 61000 through 61068. As described above, packages may be used to represent hierarchy levels. Entities are discrete business elements that are used during a business transaction. Data types are used to type object entities and interfaces with a structure. For example, TaxObligationERPFilingObligationCheckQueryMessage_Sync element structure 61000 includes, among other things, MessageHeader 61006. Accordingly, heterogeneous applications may communicate using this consistent message configured as such.

Additionally, FIGS. 62-1 through 62-5 illustrate one example logical configuration of TaxObligationERPFilingObligationCheckResponseMessage_Sync element structure 62000. Specifically, these figures depict the arrangement and hierarchy of various components such as one or more levels of packages, entities, and datatypes, shown here as 62000 through 62126. As described above, packages may be used to represent hierarchy levels. Entities are discrete business elements that are used during a business transaction. Data types are used to type object entities and interfaces with a structure. For example, TaxObligationERPFilingObligationCheckResponseMessage_Sync element structure 62000 includes, among other things, MessageHeader 62006. Accordingly, heterogeneous applications may communicate using this consistent message configured as such.

Additionally, FIGS. 63-1 through 63-6 illustrate one example logical configuration of TaxObligationERPCreateRequestMessage_Sync element structure 63000. Specifically, these figures depict the arrangement and hierarchy of various components such as one or more levels of packages, entities, and datatypes, shown here as 63000 through 63158. As described above, packages may be used to represent hierarchy levels. Entities are discrete business elements that are used during a business transaction. Data types are used to type object entities and interfaces with a structure. For example, TaxObligationERPCreateRequestMessage_Sync element structure 63000 includes, among other things, MessageHeader 63006. Accordingly, heterogeneous applications may communicate using this consistent message configured as such.

Additionally, FIGS. 64-1 through 64-9 illustrate one example logical configuration of TaxObligationERPCreateConfirmationMessage_Sync element structure 64000. Specifically, these figures depict the arrangement and hierarchy of various components such as one or more levels of packages, entities, and datatypes, shown here as 64000 through 64224. As described above, packages may be used to represent hierarchy levels. Entities are discrete business elements that are used during a business transaction. Data types are used to type object entities and interfaces with a structure. For example, TaxObligationERPCreateConfirmationMessage_Sync element structure 64000 includes, among other things, MessageHeader 64006. Accordingly, heterogeneous applications may communicate using this consistent message configured as such.

Additionally, FIGS. 65-1 through 65-2 illustrate one example logical configuration of TaxObligationERPByBusinessPartnerQueryMessage_Sync element structure 65000. Specifically, these figures depict the arrangement and hierarchy of various components such as one or more levels of packages, entities, and datatypes, shown here as 65000 through 65042. As described above, packages may be used to represent hierarchy levels. Entities are discrete business elements that are used during a business transaction. Data types are used to type object entities and interfaces with a structure. For example, TaxObligationERPByBusinessPartnerQueryMessage_Sync element structure 65000 includes, among other things, MessageHeader 65006. Accordingly, heterogeneous applications may communicate using this consistent message configured as such.

Additionally, FIGS. 66-1 through 66-8 illustrate one example logical configuration of TaxObligationERPByBusinessPartnerResponseMessage_Sync element structure 66000. Specifically, these figures depict the arrangement and hierarchy of various components such as one or more levels of packages, entities, and datatypes, shown here as 66000 through 66198. As described above, packages may be used to represent hierarchy levels. Entities are discrete business elements that are used during a business transaction. Data types are used to type object entities and interfaces with a structure. For example, TaxObligationERPByBusinessPartnerResponseMessage_Sync element structure 66000 includes, among other things, MessageHeader 66006. Accordingly, heterogeneous applications may communicate using this consistent message configured as such.

Additionally, FIGS. 67-1 through 67-2 illustrate one example logical configuration of TaxObligationERPLevyTypeByBusinessPartnerQueryMessage_Sync element structure 67000. Specifically, these figures depict the arrangement and hierarchy of various components such as one or more levels of packages, entities, and datatypes, shown here as 67000 through 67042. As described above, packages may be used to represent hierarchy levels. Entities are discrete business elements that are used during a business transaction. Data types are used to type object entities and interfaces with a structure. For example, TaxObligationERPLevyTypeByBusinessPartnerQueryMessage_Sync element structure 67000 includes, among other things, MessageHeader 67006. Accordingly, heterogeneous applications may communicate using this consistent message configured as such.

Additionally, FIGS. 68-1 through 68-2 illustrate one example logical configuration of TaxObligationERPLevyTypeByBusinessPartnerResponseMessage_Sync element structure 68000. Specifically, these figures depict the arrangement and hierarchy of various components such as one or more levels of packages, entities, and datatypes, shown here as 68000 through 68050. As described above, packages may be used to represent hierarchy levels. Entities are discrete business elements that are used during a business transaction. Data types are used to type object entities and interfaces with a structure. For example, TaxObligationERPLevyTypeByBusinessPartnerResponseMessage_Sync element structure 68000 includes, among other things, MessageHeader 68006. Accordingly, heterogeneous applications may communicate using this consistent message configured as such.

Additionally, FIG. 69 illustrates one example logical configuration of TaxObligationERPRegistrationFormByIdQueryMessage_Sync element structure 69000. Specifically, this figure depicts the arrangement and hierarchy of various components such as one or more levels of packages, entities, and datatypes, shown here as 69000 through 69018. As described above, packages may be used to represent hierarchy levels. Entities are discrete business elements that are used during a business transaction. Data types are used to type object entities and interfaces with a structure. For example, TaxObligationERPRegistrationFormByIdQueryMessage_Sync element structure 69000 includes, among other things, MessageHeader 69006. Accordingly, heterogeneous applications may communicate using this consistent message configured as such.

Additionally, FIGS. 70-1 through 70-3 illustrate one example logical configuration of TaxObligationERPRegistrationFormByIdResponseMessage_Sync element structure 70000. Specifically, these figures depict the arrangement and hierarchy of various components such as one or more levels of packages, entities, and datatypes, shown here as 70000 through 70072. As described above, packages may be used to represent hierarchy levels. Entities are discrete business elements that are used during a business transaction. Data types are used to type object entities and interfaces with a structure. For example, TaxObligationERPRegistrationFormByIdResponseMessage_Sync element structure 70000 includes, among other things, MessageHeader 70006. Accordingly, heterogeneous applications may communicate using this consistent message configured as such.

Additionally, FIG. 71 illustrates one example logical configuration of TaxObligationERPFilingObligationByIdQueryMessage element structure 71000. Specifically, this figure depicts the arrangement and hierarchy of various components such as one or more levels of packages, entities, and datatypes, shown here as 71000 through 71018. As described above, packages may be used to represent hierarchy levels. Entities are discrete business elements that are used during a business transaction. Data types are used to type object entities and interfaces with a structure. For example, TaxObligationERPFilingObligationByIdQueryMessage element structure 71000 includes, among other things, MessageHeader 71006. Accordingly, heterogeneous applications may communicate using this consistent message configured as such.

Additionally, FIGS. 72-1 through 72-5 illustrate one example logical configuration of TaxObligationERPFilingObligationByIdResponseMessage_Sync element structure 72000. Specifically, these figures depict the arrangement and hierarchy of various components such as one or more levels of packages, entities, and datatypes, shown here as 72000 through 72114. As described above, packages may be used to represent hierarchy levels. Entities are discrete business elements that are used during a business transaction. Data types are used to type object entities and interfaces with a structure. For example, TaxObligationERPFilingObligationByIdResponseMessage_Sync element structure 72000 includes, among other things, MessageHeader 72006. Accordingly, heterogeneous applications may communicate using this consistent message configured as such.

Additionally, FIG. 73 illustrates one example logical configuration of TaxObligationERPByIdQueryMessage_Sync element structure 73000. Specifically, this figure depicts the arrangement and hierarchy of various components such as one or more levels of packages, entities, and datatypes, shown here as 73000 through 73018. As described above, packages may be used to represent hierarchy levels. Entities are discrete business elements that are used during a business transaction. Data types are used to type object entities and interfaces with a structure. For example, TaxObligationERPByIdQueryMessage_Sync element structure 73000 includes, among other things, MessageHeader 73006. Accordingly, heterogeneous applications may communicate using this consistent message configured as such.

Additionally, FIGS. 74-1 through 74-12 illustrate one example logical configuration of TaxObligationERPByIdResponseMessage_Sync element structure 74000. Specifically, these figures depict the arrangement and hierarchy of various components such as one or more levels of packages, entities, and datatypes, shown here as 74000 through 74294. As described above, packages may be used to represent hierarchy levels. Entities are discrete business elements that are used during a business transaction. Data types are used to type object entities and interfaces with a structure. For example, TaxObligationERPByIdResponseMessage_Sync element structure 74000 includes, among other things, MessageHeader 74006. Accordingly, heterogeneous applications may communicate using this consistent message configured as such.

In further detail, FIGS. 54-1 through 54-15 illustrate an example configuration of an Element Structure that includes a TaxObligationERPMessage_sync 54000 package. The TaxObligationERPMessage_sync 54000 package is a TxOblgnERPMsg 54004 data type. The TaxObligationERPMessage_sync 54000 package includes a TaxObligationERPMessage_sync 54002 entity. The TaxObligationERPMessage_sync 54000 package includes various packages, namely a MessageHeader 54006, a TaxObligation 54012, a ProcessingConditions 54348 and a Log 54358.

The MessageHeader 54006 package is a BusinessDocumentMessageHeader 54010 data type. The MessageHeader 54006 package includes a MessageHeader 54008 entity.

The TaxObligation 54012 package is a TxOblgn 54016 data type. The TaxObligation 54012 package includes a TaxObligation 54014 entity. The TaxObligation 54012 package includes various packages, namely a FilingObligation 54102, a FilingRule 54180, a FilingExemption 54276, an InvoicingTerms 54302 and a RegistrationForm 54316. The TaxObligation 54014 entity includes various attributes, namely an @filingObligationListCompleteTransmissionIndicator 54018, an @filingRuleListCompleteTransmissionIndicator 54022, an @filingExemptionListCompleteTransmissionIndicator 54026, an @registrationFormListCompleteTransmissionIndicator 54030, a TaxObligationID 54034, a TaxPayerPartyID 54038, a LevyTypeCode 54042, a LevyTypeName 54046, a StartBillingPeriodID 54050, a StartBillingPeriodName 54054, an EndBillingPeriodID 54058, an EndBillingPeriodName 54062, a ValidityStartDate 54066, a ValidityEndDate 54070, a TaxObjectID 54074, a ContractAccountID 54078, a RegistrationStatusCode 54082, a RegistrationStatusName 54086, a ContactPartyID 54090, an ElectronicFilingCode 54094 and an EmailReminderIndicator 54098.

The @filingObligationListCompleteTransmissionIndicator 54018 attribute is an Indicator 54020 data type. The @filingRuleListCompleteTransmissionIndicator 54022 attribute is an Indicator 54024 data type. The @filingExemptionListCompleteTransmissionIndicator 54026 attribute is an Indicator 54028 data type. The @registrationFormListCompleteTransmissionIndicator 54030 attribute is an Indicator 54032 data type. The TaxObligationID 54034 attribute is an Identifier 54036 data type. An Identifier is a unique identification of an object within an identification scheme that is managed by an agency. There are usually multiple identification schemes for identifying an object.

The TaxPayerPartyID 54038 attribute is a PartyInternalID 54040 data type. A BusinessPartnerInternalID is a unique proprietary identifier for a business partner. The Party ID here represents the Backend Internal Business Partner ID. The LevyTypeCode 54042 attribute is a LevyTypeCode 54044 data type. A Code is a character string of letters, numbers, special characters (except escape sequences), and symbols. A code represents a definitive value, method, or a property description in an abbreviated or language-independent form. LevyTypeCode represents a revenue type.

The LevyTypeName 54046 attribute is a MEDIUM_Name 54048 data type. LevyTypeName is a revenue type name. The StartBillingPeriodID 54050 attribute is a BillingPeriodID 54052 data type. StartBillingPeriodID is a key for period assignment (e.g., starting period). The StartBillingPeriodName 54054 attribute is a MEDIUM_Name 54056 data type. MEDIUM_Description is a restriction on GDT Description to specify a uniform length for descriptions of medium length. MEDIUM_Description contains the variable “MEDIUM_”, which may get replaced by one or more qualifiers. StartBillingPeriodName is text for a period key.

The EndBillingPeriodID 54058 attribute is a BillingPeriodID 54060 data type. The EndBillingPeriodName 54062 attribute is a MEDIUM_Name 54064 data type. MEDIUM_Description is a restriction on GDT Description to specify a uniform length for descriptions of medium length. MEDIUM_Description contains the variable “MEDIUM_”, which gets replaced by one or more qualifiers. The ValidityStartDate 54066 attribute is a Date 54068 data type. A Date is a specification of an exact day in the Gregorian calendar.

The ValidityEndDate 54070 attribute is a Date 54072 data type. A Date is a specification of an exact day in the Gregorian calendar. The TaxObjectID 54074 attribute is an Identifier 54076 data type. The ContractAccountID 54078 attribute is a ContractAccountID 54080 data type. A ContractAccountID is a unique identifier for a contract account. The RegistrationStatusCode 54082 attribute is a Code 54084 data type. A code is a character string of letters, numbers, special characters (except escape sequences), and symbols. A code represents a definitive value, a method, or a property description in an abbreviated or language-independent form. RegistrationStatusCode is a code for a registration status.

The RegistrationStatusName 54086 attribute is a MEDIUM_Name 54088 data type. MEDIUM_Description is a restriction on GDT Description to specify a uniform length for descriptions of medium length. MEDIUM_Description contains the variable “MEDIUM_”, which gets replaced by one or more qualifiers. RegistrationStatusName is text for a registration status. The ContactPartyID 54090 attribute is a PartyInternalID 54092 data type. The ElectronicFilingCode 54094 attribute is a Code 54096 data type. Code is a character string of letters, numbers, special characters (except escape sequences), and symbols. A code represents a definitive value, a method, or a property description in an abbreviated or language-independent form. The EmailReminderIndicator 54098 attribute is an Indicator 54100 data type. The FilingObligation 54102 package is a TxOblgnFilngOblgn 54106 data type.

The FilingObligation 54102 package includes a FilingObligation 54104 entity. The FilingObligation 54104 entity includes various attributes, namely an @actionCode 54108, an InboundCorrespondenceCategoryCode 54112, an InboundCorrespondenceCategoryName 54116, a BillingPeriodID 54120, a BillingPeriodName 54124, a BillingStartDate 54128, a CorrespondenceStatusCode 54132, a CorrespondenceStatusName 54136, an InboundCorrespondenceDueDate 54140, an InboundCorrespondenceReceivedDate 54144, an InboundCorrespondenceDeferralDate 54148, a BillingEndDate 54152, a ClearingReasonCode 54156, a ClearingReasonName 54160, an Amount 54164, a CurrencyCode 54168, a CurrencyName 54172 and a CorrespondingTaxReturnID 54176.

The @actionCode 54108 attribute is an ActionCode 54110 data type. The InboundCorrespondenceCategoryCode 54112 attribute is a Code 54114 data type. A code is a character string of letters, numbers, special characters (except escape sequences), and symbols. A code represents a definitive value, a method, or a property description in an abbreviated or language-independent form. InboundCorrespondenceCategoryCode is a code for an inbound correspondence category. The InboundCorrespondenceCategoryName 54116 attribute is a MEDIUM_Name 54118 data type. MEDIUM_Description is a restriction on GDT Description to specify a uniform length for descriptions of medium length. MEDIUM_Description contains the variable “MEDIUM_”, which gets replaced by one or more qualifiers. InboundCorrespondenceCategoryName is a name for an inbound correspondence category.

The BillingPeriodID 54120 attribute is a BillingPeriodID 54122 data type. BillingPeriodID is a key for a period assignment. The BillingPeriodName 54124 attribute is a MEDIUM_Name 54126 data type. MEDIUM_Description is a restriction on GDT Description to specify a uniform length for descriptions of medium length. MEDIUM_Description contains the variable “MEDIUM_”, which gets replaced by one or more qualifiers. The BillingStartDate 54128 attribute is a Date 54130 data type. A Date is the specification of an exact day in the Gregorian calendar. BillingStartDate is a lower limit of a settlement period, and may be used for frequent filers. The start and end date may be derived from the period key. In some implementations, if different periods are used (e.g., if a company is allowed to file slightly differently), BillingStartDate may be stored on a contract object, more than one start date for a given period may exist, and one of the start dates may be specified.

The CorrespondenceStatusCode 54132 attribute is a Code 54134 data type. A code is a character string of letters, numbers, special characters (except escape sequences), and symbols. A code represents a definitive value, a method, or a property description in an abbreviated or language-independent form. CorrespondenceStatusCode is a code for a correspondence status. The CorrespondenceStatusName 54136 attribute is a MEDIUM_Name 54138 data type. MEDIUM_Description is a restriction on GDT Description to specify a uniform length for descriptions of medium length. MEDIUM_Description contains the variable "MEDIUM_", which gets replaced by one or more qualifiers.

The InboundCorrespondenceDueDate 54140 attribute is a Date 54142 data type. A Date is a specification of an exact day in the Gregorian calendar. InboundCorrespondenceDueDate is a due date for an inbound correspondence. The InboundCorrespondenceReceivedDate 54144 attribute is a Date 54146 data type. A Date is a specification of an exact day in the Gregorian calendar. InboundCorrespondenceReceivedDate is a date of receipt for an inbound correspondence. The InboundCorrespondenceDeferralDate 54148 attribute is a Date 54150 data type. A Date is a specification of an exact day in the Gregorian calendar. InboundCorrespondenceDeferralDate is a date of a deferral of an inbound correspondence. The BillingEndDate 54152 attribute is a Date 54154 data type. A Date is a specification of an exact day in the Gregorian calendar. BillingEndDate is an upper limit of a calculation period.

The ClearingReasonCode 54156 attribute is a Code 54158 data type. A code is a character string of letters, numbers, special characters (except escape sequences), and symbols. A code represents a definitive value, a method, or a property description in an abbreviated or language-independent form. ClearingReasonCode is a code for a clearing reason of an inbound correspondence. The ClearingReasonName 54160 attribute is a MEDIUM_Name 54162 data type. MEDIUM_Description is a restriction on GDT Description to specify a uniform length for descriptions of medium length. MEDIUM_Description contains the variable "MEDIUM_", which gets replaced by one or more qualifiers.

The Amount 54164 attribute is an Amount 54166 data type. Amount is an amount with a corresponding currency unit. An Amount may be an amount in local currency with plus and minus signs. Amount may be derived in an event, if not specified directly. The CurrencyCode 54168 attribute is a CurrencyCode 54170 data type. CurrencyCode is a coded representation of a currency. The CurrencyName 54172 attribute is a MEDIUM_Name 54174 data type. MEDIUM_Description is a restriction on GDT Description to specify a uniform length for descriptions of medium length. MEDIUM_Description contains the variable "MEDIUM_", which gets replaced by one or more qualifiers. CurrentName is a name of a currency key. The CorrespondingTaxReturnID 54176 attribute is an Identifier 54178 data type. CorrespondingTaxReturnID is a unique identifier of a corresponding tax return.

The FilingRule 54180 package is a TxOblgnFilngRule 54184 data type. The FilingRule 54180 package includes a FilingRule 54182 entity. The FilingRule 54180 package includes a Periodicity 54218 package. The FilingRule 54182 entity includes various attributes, namely an @deviatingPeriodListCompleteTransmissionIndicator 54186, an @standardPeriodListCompleteTransmissionIndicator 54190, an @actionCode 54194, an InboundCorrespondenceCategoryCode 54198, an InboundCorrespondenceFirstBillingPeriodID 54202, a GenerationStatusCode 54206, a GenerationStatusName 54210 and an InboundCorrespondenceLastBillingPeriodID 54214.

The @deviatingPeriodListCompleteTransmissionIndicator 54186 attribute is an Indicator 54188 data type. The @standardPeriodListCompleteTransmissionIndicator 54190 attribute is an Indicator 54192 data type. The @actionCode 54194 attribute is an ActionCode 54196 data type. A code is a character string of letters, numbers, special characters (except escape sequences), and symbols. A code represents a definitive value, a method, or a property description in an abbreviated or language-independent form. The InboundCorrespondenceCategoryCode 54198 attribute is a Code 54200 data type. A code is a character string of letters, numbers, special characters (except escape sequences), and symbols. A code represents a definitive value, a method, or a property description in an abbreviated or language-independent form. InboundCorrespondenceCategoryCode is a code for an inbound correspondence category.

The InboundCorrespondenceFirstBillingPeriodID 54202 attribute is a BillingPeriodID 54204 data type. A code is a character string of letters, numbers, special characters (except escape sequences), and symbols. A code represents a definitive value, a method, or a property description in an abbreviated or language-independent form. The GenerationStatusCode 54206 attribute is a Code 54208 data type. A code is a character string of letters, numbers, special characters (except escape sequences), and symbols. A code represents a definitive value, a method, or a property description in an abbreviated or language-independent form.

The GenerationStatusName 54210 attribute is a MEDIUM_Name 54212 data type. MEDIUM_Description is a restriction on GDT Description to specify a uniform length for descriptions of medium length. MEDIUM_Description contains the variable "MEDIUM_", which gets replaced by one or more qualifiers. The InboundCorrespondenceLastBillingPeriodID 54214 attribute is a BillingPeriodID 54216 data type. InboundCorrespondenceLastBillingPeriodID is a unique identifier of a last billing period associated with an inbound correspondence.

The Periodicity 54218 package is a TxOblgnFilngRuleDevtngPer 54222 data type. The Periodicity 54218 package includes various entities, namely a DeviatingPeriod 54220 and a StandardPeriod 54248. The DeviatingPeriod 54220 entity includes various attributes, namely an @actionCode 54224, a StartDate 54228, an EndDate 54232, a DueDate 54236, a BillingPeriodID 54240 and a BillingPeriodName 54244.

The @actionCode 54224 attribute is an ActionCode 54226 data type. The StartDate 54228 attribute is a Date 54230 data type. A Date is a specification of an exact day in the Gregorian calendar. The EndDate 54232 attribute is a Date 54234 data type. A Date is a specification of an exact day in the Gregorian calendar. The DueDate 54236 attribute is a Date 54238 data type. A Date is a specification of an exact day in the Gregorian calendar.

The BillingPeriodID 54240 attribute is a BillingPeriodID 54242 data type. The BillingPeriodName 54244 attribute is a MEDIUM_Name 54246 data type. BillingPeriodName is a MEDIUM_Name. The StandardPeriod 54248 entity includes various attributes, namely an @actionCode 54252, a StartDate 54256, an EndDate 54260, a DueDate 54264, a BillingPeriodID 54268 and a BillingPeriodName 54272. The @actionCode 54252 attribute is an ActionCode 54254 data type. The StartDate 54256 attribute is a Date 54258 data type. A Date is a specification of an exact day in the Gregorian calendar.

The EndDate 54260 attribute is a Date 54262 data type. A Date is a specification of an exact day in the Gregorian calendar. The DueDate 54264 attribute is a Date 54266 data type. A Date is a specification of an exact day in the Gregorian calendar. The BillingPeriodID 54268 attribute is a BillingPeriodID 54270 data type. The BillingPeriodName 54272 attribute is a MEDIUM_Name 54274 data type. BillingPeriodName is a MEDIUM_Name.

The FilingExemption 54276 package is a TxOblgnFilngExmp 54280 data type. The FilingExemption 54276 package includes a FilingExemption 54278 entity. The FilingExemption 54278 entity includes various attributes, namely an @actionCode 54282, a StartDay 54286, a StartMonth 54290, an EndDay 54294 and an EndMonth 54298.

The @actionCode 54282 attribute is an ActionCode 54284 data type. The StartDay 54286 attribute is a DayOfMonth 54288 data type. Numeric is a decimal value. StartDay is an exception period start date. The StartMonth 54290 attribute is a Month 54292 data type. Numeric is a decimal value. StartMonth is an exception period start month. The EndDay 54294 attribute is a DayOfMonth 54296 data type. Numeric is a decimal value. EndDay is an exception period end day. The EndMonth 54298 attribute is a Month 54300 data type. Numeric is a decimal value. EndMonth is an exception period end month.

The InvoicingTerms 54302 package is a TxOblgnInvcgTrms 54306 data type. The InvoicingTerms 54302 package includes an InvoicingTerms 54304 entity. The InvoicingTerms 54304 entity includes various attributes, namely a ContractAccountContractReferenceID 54308 and a ChargePercent 54312.

The ContractAccountContractReferenceID 54308 attribute is a Numeric 54310 data type. Numeric is a decimal value. The ChargePercent 54312 attribute is a Percent 54314 data type. Quantity is a non-monetary numerical specification of an amount in a unit of measurement.

The RegistrationForm 54316 package is a TxOblgnRegistnForm 54320 data type. The RegistrationForm 54316 package includes a RegistrationForm 54318 entity. The RegistrationForm 54316 package includes a PropertyValuation 54338 package. There may be multiple registration forms for one tax obligation. Depending on the type of business, data may be provided on one 'form', but the one 'form' may include other 'forms' as well. For example, registration of a petrol station may involve a usual registration form and an additional form for licensing.

The RegistrationForm 54318 entity includes various attributes, namely an @actionCode 54322, a FormTemplateID 54326, a FormVersionID 54330 and a FormStatusCode 54334. The @actionCode 54322 attribute is an ActionCode 54324 data type. The FormTemplateID 54326 attribute is an Identifier 54328 data type. FormTemplateID is a key for a scenario and is an internal service request template. The FormVersionID 54330 attribute is an Identifier 54332 data type.

The FormStatusCode 54334 attribute is a Code 54336 data type. Code is a character string of letters, numbers, special characters (except escape sequences), and symbols. Code represents a definitive value, a method, or a property description in an abbreviated or language-independent form. The PropertyValuation 54338 package is a TxOblgnRegistnFormProptyValn 54342 data type. The PropertyValuation 54338 package includes a PropertyValuation 54340 entity. The PropertyValuation 54340 entity includes a PropertyValuation 54344 attribute. The PropertyValuation 54344 attribute is a PropertyValuation 54346 data type.

The ProcessingConditions 54348 package is a QueryProcessingConditions 54352 data type. The ProcessingConditions 54348 package includes various entities, namely a QueryProcessingConditions 54350 and a ResponseProcessingConditions 54354.

The Log 54358 package is a Log 54362 data type. The Log 54358 package includes a Log 54360 entity. Log is a sequence of messages that result when an application executes a task.

In further detail, FIGS. 55-1 through 55-7 illustrate an example configuration of an Element Structure that includes a TaxObligationERPChangeRequestMessage_Sync 55000 package. The TaxObligationERPChangeRequestMessage_Sync 55000 package includes a TaxObligationERPChangeRequestMessage_Sync 55002 entity. The TaxObligationERPChangeRequestMessage_Sync 55000 package includes various packages, namely a MessageHeader 55004 and a TaxObligation 55010.

The MessageHeader 55004 package includes a MessageHeader 55006 entity. The MessageHeader 55006 entity has a cardinality of 1 55008 meaning that for each instance of the MessageHeader 55004 package there is one MessageHeader 55006 entity.

The TaxObligation 55010 package includes a TaxObligation 55012 entity. The TaxObligation 55010 package includes various packages, namely a FilingRule 55048, a FilingExemption 55104, an InvoicingTerms 55130 and a RegistrationForm 55144.

The TaxObligation 55012 entity has a cardinality of 1 55014 meaning that for each instance of the TaxObligation 55010 package there is one TaxObligation 55012 entity. The TaxObligation 55012 entity includes various attributes, namely an @filingRuleListCompleteTransmissionIndicator 55016, an @filingExemptionListCompleteTransmissionIndicator 55020, an @registrationFormListCompleteTransmissionIndicator 55024, a TaxObligationID 55028, a RegistrationStatusName 55032, a ContactPartyID 55036, an ElectronicFilingCode 55040 and an EmailReminderIndicator 55044. The @filingRuleListCompleteTransmissionIndicator 55016 attribute has a cardinality of 1 55018 meaning that for each instance of the TaxObligation 55012 entity there is one @filingRuleListCompleteTransmissionIndicator 55016 attribute. The @filingExemptionListCompleteTransmissionIndicator 55020 attribute has a cardinality of 1 55022 meaning that for each instance of the TaxObligation 55012 entity there is one @filingExemptionListCompleteTransmissionIndicator 55020 attribute. The @registrationFormListCompleteTransmissionIndicator 55024 attribute has a cardinality of 1 55026 meaning that for each instance of the TaxObligation 55012 entity there is one @registrationFormListCompleteTransmissionIndicator 55024 attribute. The TaxObligationID 55028 attribute has a cardinality of 1 55030 meaning that for each instance of the TaxObligation 55012 entity there is one TaxObligationID 55028 attribute. The RegistrationStatusName 55032 attribute has a cardinality of 0 . . . 1 55034 meaning that for each instance of the TaxObligation 55012 entity there may be one RegistrationStatusName 55032 attribute. The ContactPartyID 55036 attribute has a cardinality of 0 . . . n 55038 meaning that for each instance of the TaxObligation 55012 entity there may be one or more ContactPartyID 55036 attributes. The ElectronicFilingCode 55040 attribute has a cardinality of 0 . . . 1 55042 meaning that for each instance of the TaxObligation 55012 entity there may be one ElectronicFilingCode 55040 attribute. The EmailReminderIndicator 55044 attribute has a cardinality of 0 . . . 1 55046 meaning that for each instance of the TaxObligation 55012 entity there may be one EmailReminderIndicator 55044 attribute.

The FilingRule 55048 package includes a FilingRule 55050 entity. The FilingRule 55048 package includes a Periodicity 55078 package. The FilingRule 55050 entity has a cardinality of 0 . . . n 55052 meaning that for each instance of the FilingRule 55048 package there may be one or more FilingRule 55050 entities. The FilingRule 55050 entity includes various attributes, namely an @deviatingPeriodListCompleteTransmissionIndicator 55054, an @actionCode 55058, an InboundCorrespondenceCategoryCode 55062, an InboundCorrespondenceFirstBillingPeriodID 55066, a GenerationStatusCode 55070 and an InboundCorrespondenceLastBillingPeriodID 55074. The @deviatingPeriodListCompleteTransmissionIndicator 55054 attribute has a cardinality of 1 55056 meaning that for each instance of the FilingRule 55050 entity there is one @deviatingPeriodListCompleteTransmissionIndicator 55054 attribute. The @actionCode 55058 attribute has a cardinality of 1 55060 meaning that for each instance of the FilingRule 55050 entity there is one @actionCode 55058 attribute. The InboundCorrespondenceCategoryCode 55062 attribute has a cardinality of 1 55064 meaning that for each instance of the FilingRule 55050 entity there is one InboundCorrespondenceCategoryCode 55062 attribute. The InboundCorrespondenceFirstBillingPeriodID 55066 attribute has a cardinality of 1 55068 meaning that for each instance of the FilingRule 55050 entity there is one InboundCorrespondenceFirstBillingPeriodID 55066 attribute. The GenerationStatusCode 55070 attribute has a cardinality of 0 . . . 1 55072 meaning that for each instance of the FilingRule 55050 entity there may be one GenerationStatusCode 55070 attribute. The InboundCorrespondenceLastBillingPeriodID 55074 attribute has a cardinality of 0 . . . 1 55076 meaning that for each instance of the FilingRule 55050 entity there may be one InboundCorrespondenceLastBillingPeriodID 55074 attribute.

The Periodicity 55078 package includes a DeviatingPeriod 55080 entity. The DeviatingPeriod 55080 entity has a cardinality of 0 . . . n 55082 meaning that for each instance of the Periodicity 55078 package there may be one or more DeviatingPeriod 55080 entities. The DeviatingPeriod 55080 entity includes various attributes, namely an @actionCode 55084, a StartDate 55088, an EndDate 55092, a DueDate 55096 and a BillingPeriodID 55100. The @actionCode 55084 attribute has a cardinality of 1 55086 meaning that for each instance of the DeviatingPeriod 55080 entity there is one @actionCode 55084 attribute. The StartDate 55088 attribute has a cardinality of 1 55090 meaning that for each instance of the DeviatingPeriod 55080 entity there is one StartDate 55088 attribute. The EndDate 55092 attribute has a cardinality of 0 . . . 1 55094 meaning that for each instance of the DeviatingPeriod 55080 entity there may be one EndDate 55092 attribute. The DueDate 55096 attribute has a cardinality of 0 . . . 1 55098 meaning that for each instance of the DeviatingPeriod 55080 entity there may be one DueDate 55096 attribute. The BillingPeriodID 55100 attribute has a cardinality of 1 55102 meaning that for each instance of the DeviatingPeriod 55080 entity there is one BillingPeriodID 55100 attribute.

The FilingExemption 55104 package includes a FilingExemption 55106 entity. The FilingExemption 55106 entity has a cardinality of 0 . . . n 55108 meaning that for each instance of the FilingExemption 55104 package there may be one or more FilingExemption 55106 entities. The FilingExemption 55106 entity includes various attributes, namely an @actionCode 55110, a StartDay 55114, a StartMonth 55118, an EndDay 55122 and an EndMonth 55126. The @actionCode 55110 attribute has a cardinality of 1 55112 meaning that for each instance of the FilingExemption 55106 entity there is one @actionCode 55110 attribute. The StartDay 55114 attribute has a cardinality of 1 55116 meaning that for each instance of the FilingExemption 55106 entity there is one StartDay 55114 attribute. The StartMonth 55118 attribute has a cardinality of 1 55120 meaning that for each instance of the FilingExemption 55106 entity there is one StartMonth 55118 attribute. The EndDay 55122 attribute has a cardinality of 1 55124 meaning that for each instance of the FilingExemption 55106 entity there is one EndDay 55122 attribute. The EndMonth 55126 attribute has a cardinality of 1 55128 meaning that for each instance of the FilingExemption 55106 entity there is one EndMonth 55126 attribute.

The InvoicingTerms 55130 package includes an InvoicingTerms 55132 entity.

The InvoicingTerms 55132 entity has a cardinality of 0 . . . 1 55134 meaning that for each instance of the InvoicingTerms 55130 package there may be one InvoicingTerms 55132 entity. The InvoicingTerms 55132 entity includes various attributes, namely a ContractAccountContractReferenceID 55136 and a ChargePercent 55140. The ContractAccountContractReferenceID 55136 attribute has a cardinality of 0 . . . 1 55138 meaning that for each instance of the InvoicingTerms 55132 entity there may be one ContractAccountContractReferenceID 55136 attribute. The ChargePercent 55140 attribute has a cardinality of 1 55142 meaning that for each instance of the InvoicingTerms 55132 entity there is one ChargePercent 55140 attribute.

The RegistrationForm 55144 package includes a RegistrationForm 55146 entity. The RegistrationForm 55144 package includes a PropertyValuation 55166 package. The RegistrationForm 55146 entity has a cardinality of 0 . . . n 55148 meaning that for each instance of the RegistrationForm 55144 package there may be one or more RegistrationForm 55146 entities. The RegistrationForm 55146 entity includes various attributes, namely an @actionCode 55150, a FormTemplateID 55154, a FormVersionID 55158 and a FormStatusCode 55162. The @actionCode 55150 attribute has a cardinality of 1 55152 meaning that for each instance of the RegistrationForm 55146 entity there is one @actionCode 55150 attribute. The FormTemplateID 55154 attribute has a cardinality of 1 55156 meaning that for each instance of the RegistrationForm 55146 entity there is one FormTemplateID 55154 attribute. The FormVersionID 55158 attribute has a cardinality of 1 55160 meaning that for each instance of the RegistrationForm 55146 entity there is one FormVersionID 55158 attribute. The FormStatusCode 55162 attribute has a cardinality of 0 . . . 1 55164 meaning that for each instance of the RegistrationForm 55146 entity there may be one FormStatusCode 55162 attribute.

The PropertyValuation 55166 package includes a PropertyValuation 55168 entity. The PropertyValuation 55168 entity has a cardinality of 1 . . . n 55170 meaning that for each instance of the PropertyValuation 55166 package there are one or more PropertyValuation 55168 entities. The PropertyValuation 55168 entity includes a PropertyValuation 55172 attribute. The PropertyValuation 55172 attribute has a cardinality of 0 . . . 1 55174 meaning that for each instance of the PropertyValuation 55168 entity there may be one PropertyValuation 55172 attribute.

The data types of the various packages, entities, and attributes are described with respect to FIG. 54.

In further detail, FIGS. 56-1 through 56-9 illustrate an example configuration of an Element Structure that includes a TaxObligationERPChangeConfirmationMessage_Sync 56000 package. The TaxObligationERPChangeConfirmationMessage_Sync 56000 package includes a TaxObligationERPChangeConfirmationMessage_Sync 56002 entity.

The TaxObligationERPChangeConfirmationMessage_Sync 56000 package includes various packages, namely a MessageHeader 56004, a TaxObligation 56010 and a Log 56220.

The MessageHeader 56004 package includes a MessageHeader 56006 entity. The MessageHeader 56006 entity has a cardinality of 1 56008 meaning that for each instance of the MessageHeader 56004 package there is one MessageHeader 56006 entity.

The TaxObligation 56010 package includes a TaxObligation 56012 entity. The TaxObligation 56010 package includes various packages, namely a FilingRule 56080, a FilingExemption 56156, an InvoicingTerms 56178 and a RegistrationForm 56192.

The TaxObligation 56012 entity has a cardinality of 0 . . . 1 56014 meaning that for each instance of the TaxObligation 56010 package there may be one TaxObligation 56012 entity. The TaxObligation 56012 entity includes various attributes, namely a TaxObligationID 56016, a TaxPayerPartyID 56020, a LevyTypeCode 56024, a LevyTypeName 56028, a StartBillingPeriodID 56032, a StartBillingPeriodName 56036, an EndBillingPeriodID 56040, an EndBillingPeriodName 56044, a ValidityStartDate 56048, a ValidityEndDate 56052, a ContractAccountID 56056, a RegistrationStatusCode 56060, a RegistrationStatusName 56064, a ContactPartyID 56068, an ElectronicFilingCode 56072 and an EmailReminderIndicator 56076. The TaxObligationID 56016 attribute has a cardinality of 1 56018 meaning that for each instance of the TaxObligation 56012 entity there is one TaxObligationID 56016 attribute. The TaxPayerPartyID 56020 attribute has a cardinality of 1 56022 meaning that for each instance of the TaxObligation 56012 entity there is one TaxPayerPartyID 56020 attribute. The LevyTypeCode 56024 attribute has a cardinality of 1 56026 meaning that for each instance of the TaxObligation 56012 entity there is one LevyTypeCode 56024 attribute. The LevyTypeName 56028 attribute has a cardinality of 0 . . . 1 56030 meaning that for each instance of the TaxObligation 56012 entity there may be one LevyTypeName 56028 attribute. The StartBillingPeriodID 56032 attribute has a cardinality of 1 56034 meaning that for each instance of the TaxObligation 56012 entity there is one StartBillingPeriodID 56032 attribute. The StartBillingPeriodName 56036 attribute has a cardinality of 0 . . . 1 56038 meaning that for each instance of the TaxObligation 56012 entity there may be one StartBillingPeriodName 56036 attribute. The EndBillingPeriodID 56040 attribute has a cardinality of 0 . . . 1 56042 meaning that for each instance of the TaxObligation 56012 entity there may be one EndBillingPeriodID 56040 attribute. The EndBillingPeriodName 56044 attribute has a cardinality of 0 . . . 1 56046 meaning that for each instance of the TaxObligation 56012 entity there may be one EndBillingPeriodName 56044 attribute. The ValidityStartDate 56048 attribute has a cardinality of 0 . . . 1 56050 meaning that for each instance of the TaxObligation 56012 entity there may be one ValidityStartDate 56048 attribute.

The ValidityEndDate 56052 attribute has a cardinality of 0 . . . 1 56054 meaning that for each instance of the TaxObligation 56012 entity there may be one ValidityEndDate 56052 attribute. The ContractAccountID 56056 attribute has a cardinality of 1 56058 meaning that for each instance of the TaxObligation 56012 entity there is one ContractAccountID 56056 attribute. The RegistrationStatusCode 56060 attribute has a cardinality of 1 56062 meaning that for each instance of the TaxObligation 56012 entity there is one RegistrationStatusCode 56060 attribute. The RegistrationStatusName 56064 attribute has a cardinality of 0 . . . 1 56066 meaning that for each instance of the TaxObligation 56012 entity there may be one RegistrationStatusName 56064 attribute. The ContactPartyID 56068 attribute has a cardinality of 0 . . . n 56070 meaning that for each instance of the TaxObligation 56012 entity there may be one or more ContactPartyID 56068 attributes. The ElectronicFilingCode 56072 attribute has a cardinality of 0 . . . 1 56074 meaning that for each instance of the TaxObligation 56012 entity there may be one ElectronicFilingCode 56072 attribute. The EmailReminderIndicator 56076 attribute has a cardinality of 1 56078 meaning that for each instance of the TaxObligation 56012 entity there is one EmailReminderIndicator 56076 attribute.

The FilingRule 56080 package includes a FilingRule 56082 entity. The FilingRule 56080 package includes a Periodicity 56106 package.

The FilingRule 56082 entity has a cardinality of 0 . . . n 56084 meaning that for each instance of the FilingRule 56080 package there may be one or more FilingRule 56082 entities. The FilingRule 56082 entity includes various attributes, namely an InboundCorrespondenceCategoryCode 56086, an InboundCorrespondenceFirstBillingPeriodID 56090, a GenerationStatusCode 56094, a GenerationStatusName 56098 and an InboundCorrespondenceLastBillingPeriodID 56102. The InboundCorrespondenceCategoryCode 56086 attribute has a cardinality of 1 56088 meaning that for each instance of the FilingRule 56082 entity there is one InboundCorrespondenceCategoryCode 56086 attribute. The InboundCorrespondenceFirstBillingPeriodID 56090 attribute has a cardinality of 1 56092 meaning that for each instance of the FilingRule 56082 entity there is one InboundCorrespondenceFirstBillingPeriodID 56090 attribute. The GenerationStatusCode 56094 attribute has a cardinality of 1 56096 meaning that for each instance of the FilingRule 56082 entity there is one GenerationStatusCode 56094 attribute. The GenerationStatusName 56098 attribute has a cardinality of 0 . . . 1 56100 meaning that for each instance of the FilingRule 56082 entity there may be one GenerationStatusName 56098 attribute. The InboundCorrespondenceLastBillingPeriodID 56102 attribute has a cardinality of 0 . . . 1 56104 meaning that for each instance of the FilingRule 56082 entity there may be one InboundCorrespondenceLastBillingPeriodID 56102 attribute.

The Periodicity 56106 package includes various entities, namely a DeviatingPeriod 56108 and a StandardPeriod 56132. The DeviatingPeriod 56108 entity has a cardinality of 0 . . . n 56110 meaning that for each instance of the Periodicity 56106 package there may be one or more DeviatingPeriod 56108 entities. The DeviatingPeriod 56108 entity includes various attributes, namely a StartDate 56112, an EndDate 56116, a DueDate 56120, a BillingPeriodID 56124 and a BillingPeriodName 56128. The StartDate 56112 attribute has a cardinality of 1 56114 meaning that for each instance of the DeviatingPeriod 56108 entity there is one StartDate 56112 attribute. The EndDate 56116 attribute has a cardinality of 1 56118 meaning that for each instance of the DeviatingPeriod 56108 entity there is one EndDate 56116 attribute. The DueDate 56120 attribute has a cardinality of 0 . . . 1 56122 meaning that for each instance of the DeviatingPeriod 56108 entity there may be one DueDate 56120 attribute. The BillingPeriodID 56124 attribute has a cardinality of 1 56126 meaning that for each instance of the DeviatingPeriod 56108 entity there is one BillingPeriodID 56124 attribute. The BillingPeriodName 56128 attribute has a cardinality of 0 . . . 1 56130 meaning that for each instance of the DeviatingPeriod 56108 entity there may be one BillingPeriodName 56128 attribute.

The StandardPeriod 56132 entity has a cardinality of 1 . . . n 56134 meaning that for each instance of the Periodicity 56106 package there are one or more StandardPeriod 56132 entities. The StandardPeriod 56132 entity includes various attributes, namely a StartDate 56136, an EndDate 56140, a DueDate 56144, a BillingPeriodID 56148 and a BillingPeriodName 56152. The StartDate 56136 attribute has a cardinality of 1 56138 meaning that for each instance of the StandardPeriod 56132 entity there is one StartDate 56136 attribute. The EndDate 56140 attribute has a cardinality of 1 56142 meaning that for each instance of the StandardPeriod 56132 entity there is one EndDate 56140 attribute. The DueDate 56144 attribute has a cardinality of 0 . . . 1 56146 meaning that for each instance of the StandardPeriod 56132 entity there may be one DueDate 56144 attribute. The BillingPeriodID 56148 attribute has a cardinality of 1 56150 meaning that for each instance of the StandardPeriod 56132 entity there is one BillingPeriodID 56148 attribute. The BillingPeriodName 56152 attribute has a cardinality of 0 . . . 1 56154 meaning that for each instance of the StandardPeriod 56132 entity there may be one BillingPeriodName 56152 attribute.

The FilingExemption 56156 package includes a FilingExemption 56158 entity. The FilingExemption 56158 entity has a cardinality of 0 . . . n 56160 meaning that for each instance of the FilingExemption 56156 package there may be one or more FilingExemption 56158 entities. The FilingExemption 56158 entity includes various attributes, namely a StartDay 56162, a StartMonth 56166, an EndDay 56170 and an EndMonth 56174. The StartDay 56162 attribute has a cardinality of 1 56164 meaning that for each instance of the FilingExemption 56158 entity there is one StartDay 56162 attribute. The StartMonth 56166 attribute has a cardinality of 1 56168 meaning that for each instance of the FilingExemption 56158 entity there is one StartMonth 56166 attribute. The EndDay 56170 attribute has a cardinality of 1 56172 meaning that for each instance of the FilingExemption 56158 entity there is one EndDay 56170 attribute. The EndMonth 56174 attribute has a cardinality of 1 56176 meaning that for each instance of the FilingExemption 56158 entity there is one EndMonth 56174 attribute.

The InvoicingTerms 56178 package includes an InvoicingTerms 56180 entity. The InvoicingTerms 56180 entity has a cardinality of 1 56182 meaning that for each instance of the InvoicingTerms 56178 package there is one InvoicingTerms 56180 entity. The InvoicingTerms 56180 entity includes various attributes, namely a ContractAccountContractReferenceID 56184 and a ChargePercent 56188. The ContractAccountContractReferenceID 56184 attribute has a cardinality of 0 . . . 1 56186 meaning that for each instance of the InvoicingTerms 56180 entity there may be one ContractAccountContractReferenceID 56184 attribute. The ChargePercent 56188 attribute has a cardinality of 1 56190 meaning that for each instance of the InvoicingTerms 56180 entity there is one ChargePercent 56188 attribute.

The RegistrationForm 56192 package includes a RegistrationForm 56194 entity. The RegistrationForm 56192 package includes a PropertyValuation 56210 package. The RegistrationForm 56194 entity has a cardinality of 0 . . . n 56196 meaning that for each instance of the RegistrationForm 56192 package there may be one or more RegistrationForm 56194 entities. The RegistrationForm 56194 entity includes various attributes, namely a FormTemplateID 56198, a FormVersionID 56202 and a FormStatusCode 56206. The FormTemplateID 56198 attribute has a cardinality of 1 56200 meaning that for each instance of the RegistrationForm 56194 entity there is one FormTemplateID 56198 attribute. The FormVersionID 56202 attribute has a cardinality of 1 56204 meaning that for each instance of the RegistrationForm 56194 entity there is one FormVersionID 56202 attribute. The FormStatusCode 56206 attribute has a cardinality of 0 . . . 1 56208 meaning that for each instance of the RegistrationForm 56194 entity there may be one FormStatusCode 56206 attribute.

The PropertyValuation 56210 package includes a PropertyValuation 56212 entity. The PropertyValuation 56212 entity has a cardinality of 1 n 56214 meaning that for each instance of the PropertyValuation 56210 package there are one or more PropertyValuation 56212 entities. The PropertyValuation 56212 entity includes a PropertyValuation 56216 attribute. The PropertyValuation 56216 attribute has a cardinality of 0 . . . 1 56218 meaning that for each instance of the PropertyValuation 56212 entity there may be one PropertyValuation 56216 attribute.

The Log 56220 package includes a Log 56222 entity. The Log 56222 entity has a cardinality of 1 56224 meaning that for each instance of the Log 56220 package there is one Log 56222 entity. The data types of the various packages, entities, and attributes are described with respect to FIG. 54.

In further detail, FIGS. 57-1 through 57-3 illustrate an example configuration of an Element Structure that includes a TaxObligationERPFilingObligationChangeRequestMessage_Sync 57000 package. The TaxObligationERPFilingObligationChangeRequestMessage_Sync 57000 package includes a TaxObligationERPFilingObligationChangeRequestMessage_Sync 57002 entity. The TaxObligationERPFilingObligationChangeRequestMessage_Sync 57000 package includes various packages, namely a MessageHeader 57004 and a TaxObligation 57010.

The MessageHeader 57004 package includes a MessageHeader 57006 entity. The MessageHeader 57006 entity has a cardinality of 1 57008 meaning that for each instance of the MessageHeader 57004 package there is one MessageHeader 57006 entity.

The TaxObligation 57010 package includes a TaxObligation 57012 entity. The TaxObligation 57010 package includes a FilingObligation 57024 package. The TaxObligation 57012 entity has a cardinality of 1 57014 meaning that for each instance of the TaxObligation 57010 package there is one TaxObligation 57012 entity. The TaxObligation 57012 entity includes various attributes, namely an @filingObligationListCompleteTransmissionIndicator 57016 and a TaxObligationID 57020. The @filingObligationListCompleteTransmissionIndicator 57016 attribute has a cardinality of 1 57018 meaning that for each instance of the TaxObligation 57012 entity there is one @filingObligationListCompleteTransmissionIndicator 57016 attribute. The TaxObligationID 57020 attribute has a cardinality of 1 57022 meaning that for each instance of the TaxObligation 57012 entity there is one TaxObligationID 57020 attribute.

The FilingObligation 57024 package includes a FilingObligation 57026 entity. The FilingObligation 57026 entity has a cardinality of 0 . . . n 57028 meaning that for each instance of the FilingObligation 57024 package there may be one or more FilingObligation 57026 entities. The FilingObligation 57026 entity includes various attributes, namely an @actionCode 57030, an InboundCorrespondenceCategoryCode 57034, a BillingPeriodID 57038, a BillingStartDate 57042, a CorrespondenceStatusCode 57046, an InboundCorrespondenceDueDate 57050, an InboundCorrespondenceReceivedDate 57054, an InboundCorrespondenceDeferralDate 57058, a ClearingReasonCode 57062, an Amount 57066, a CurrencyCode 57070 and a CorrespondingTaxReturnID 57074. The @actionCode 57030 attribute has a cardinality of 1 57032 meaning that for each instance of the FilingObligation 57026 entity there is one @actionCode 57030 attribute.

The InboundCorrespondenceCategoryCode 57034 attribute has a cardinality of 1 57036 meaning that for each instance of the FilingObligation 57026 entity there is one InboundCorrespondenceCategoryCode 57034 attribute. The BillingPeriodID 57038 attribute has a cardinality of 1 57040 meaning that for each instance of the FilingObligation 57026 entity there is one BillingPeriodID 57038 attribute.

The BillingStartDate 57042 attribute has a cardinality of 1 57044 meaning that for each instance of the FilingObligation 57026 entity there is one BillingStartDate 57042 attribute. The CorrespondenceStatusCode 57046 attribute has a cardinality of 0 . . . 1 57048 meaning that for each instance of the FilingObligation 57026 entity there may be one CorrespondenceStatusCode 57046 attribute. The InboundCorrespondenceDueDate 57050 attribute has a cardinality of 0 . . . 1 57052 meaning that for each instance of the FilingObligation 57026 entity there may be one InboundCorrespondenceDueDate 57050 attribute. The InboundCorrespondenceReceivedDate 57054 attribute has a cardinality of 0 . . . 1 57056 meaning that for each instance of the FilingObligation 57026 entity there may be one InboundCorrespondenceReceivedDate 57054 attribute. The InboundCorrespondenceDeferralDate 57058 attribute has a cardinality of 0 . . . 1 57060 meaning that for each instance of the FilingObligation 57026 entity there may be one InboundCorrespondenceDeferralDate 57058 attribute. The ClearingReasonCode 57062 attribute has a cardinality of 0 . . . 1 57064 meaning that for each instance of the FilingObligation 57026 entity there may be one ClearingReasonCode 57062 attribute. The Amount 57066 attribute has a cardinality of 0 . . . 1 57068 meaning that for each instance of the FilingObligation 57026 entity there may be one Amount 57066 attribute. The CurrencyCode 57070 attribute has a cardinality of 0 . . . 1 57072 meaning that for each instance of the FilingObligation 57026 entity there may be one CurrencyCode 57070 attribute. The CorrespondingTaxReturnID 57074 attribute has a cardinality of 0 . . . 1 57076 meaning that for each instance of the FilingObligation 57026 entity there may be one CorrespondingTaxReturnID 57074 attribute. The data types of the various packages, entities, and attributes are described with respect to FIG. 54.

In further detail, FIGS. 58-1 through 58-5 illustrate an example configuration of an Element Structure that includes a TaxObligationERPFilingObligationChangeConfirmationMessage_Sync 58000 package. The TaxObligationERPFilingObligationChangeConfirmationMessage_Sync 58000 package includes a TaxObligationERPFilingObligationChangeConfirmationMessage_Sync 58002 entity. The TaxObligationERPFilingObligationChangeConfirmationMessage_Sync 58000 package includes various packages, namely a MessageHeader 58004, a TaxObligation 58010 and a Log 58122.

The MessageHeader 58004 package includes a MessageHeader 58006 entity. The MessageHeader 58006 entity has a cardinality of 1 58008 meaning that for each instance of the MessageHeader 58004 package there is one MessageHeader 58006 entity.

The TaxObligation 58010 package includes a TaxObligation 58012 entity. The TaxObligation 58010 package includes a FilingObligation 58048 package.

The TaxObligation 58012 entity has a cardinality of 0 . . . 1 58014 meaning that for each instance of the TaxObligation 58010 package there may be one TaxObligation 58012 entity. The TaxObligation 58012 entity includes various attributes, namely a TaxObligationID 58016, a TaxPayerPartyID 58020, a LevyTypeCode 58024, a LevyTypeName 58028, a StartBillingPeriodID 58032, a StartBillingPeriodName 58036, an EndBillingPeriodID 58040 and an EndBillingPeriodName 58044. The TaxObligationID 58016 attribute has a cardinality of 1 58018 meaning that for each instance of the TaxObligation 58012 entity there is one TaxObligationID 58016 attribute. The TaxPayerPartyID 58020 attribute has a cardinality of 1 58022 meaning that for each instance of the TaxObligation 58012 entity there is one TaxPayerPartyID 58020 attribute.

The LevyTypeCode 58024 attribute has a cardinality of 1 58026 meaning that for each instance of the TaxObligation 58012 entity there is one LevyTypeCode 58024 attribute. The LevyTypeName 58028 attribute has a cardinality of 0 . . . 1 58030 meaning that for each instance of the TaxObligation 58012 entity there may be one LevyTypeName 58028 attribute. The StartBillingPeriodID 58032 attribute has a cardinality of 1 58034 meaning that for each instance of the TaxObligation 58012 entity there is one StartBillingPeriodID 58032 attribute. The StartBillingPeriodName 58036 attribute has a cardinality of 0 . . . 1 58038 meaning that for each instance of the TaxObligation 58012 entity there may be one StartBillingPeriodName 58036 attribute. The EndBillingPeriodID 58040 attribute has a cardinality of 0 . . . 1 58042 meaning that for each instance of the TaxObligation 58012 entity there may be one EndBillingPeriodID 58040 attribute. The EndBillingPeriodName 58044 attribute has a cardinality of 0 . . . 1 58046 meaning that for each instance of the TaxObligation 58012 entity there may be one EndBillingPeriodName 58044 attribute.

The FilingObligation 58048 package includes a FilingObligation 58050 entity. The FilingObligation 58050 entity has a cardinality of 0 . . . n 58052 meaning that for each instance of the FilingObligation 58048 package there may be one or more FilingObligation 58050 entities. The FilingObligation 58050 entity includes various attributes, namely an InboundCorrespondenceCategoryCode 58054, an InboundCorrespondenceCategoryName 58058, a BillingPeriodID 58062, a BillingPeriodName 58066, a BillingStartDate 58070, a CorrespondenceStatusCode 58074, a CorrespondenceStatusName 58078, an InboundCorrespondenceDueDate 58082, an InboundCorrespondenceReceivedDate 58086, an InboundCorrespondenceDeferralDate 58090, a BillingEndDate 58094, a ClearingReasonCode 58098, a ClearingReasonName 58102, an Amount 58106, a CurrencyCode 58110, a CurrencyName 58114 and a CorrespondingTaxReturnID 58118. The InboundCorrespondenceCategoryCode 58054 attribute has a cardinality of 1 58056 meaning that for each instance of the FilingObligation 58050 entity there is one InboundCorrespondenceCategoryCode 58054 attribute.

The InboundCorrespondenceCategoryName 58058 attribute has a cardinality of 0 . . . 1 58060 meaning that for each instance of the FilingObligation 58050 entity there may be one InboundCorrespondenceCategoryName 58058 attribute. The BillingPeriodID 58062 attribute has a cardinality of 1 58064 meaning that for each instance of the FilingObligation 58050 entity there is one BillingPeriodID 58062 attribute. The BillingPeriodName 58066 attribute has a cardinality of 0 . . . 1 58068 meaning that for each instance of the FilingObligation 58050 entity there may be one BillingPeriodName 58066 attribute. The BillingStartDate 58070 attribute has a cardinality of 1 58072 meaning that for each instance of the FilingObligation 58050 entity there is one BillingStartDate 58070 attribute. The CorrespondenceStatusCode 58074 attribute has a cardinality of 0 . . . 1 58076 meaning that for each instance of the FilingObligation 58050 entity there may be one CorrespondenceStatusCode 58074 attribute. The CorrespondenceStatusName 58078 attribute has a cardinality of 0 . . . 1 58080 meaning that for each instance of the FilingObligation 58050 entity there may be one CorrespondenceStatusName 58078 attribute.

The InboundCorrespondenceDueDate 58082 attribute has a cardinality of 1 58084 meaning that for each instance of the FilingObligation 58050 entity there is one InboundCorrespondenceDueDate 58082 attribute. The InboundCorrespondenceReceivedDate 58086 attribute has a cardinality of 0 . . . 1 58088 meaning that for each instance of the FilingObligation 58050 entity there may be one InboundCorrespondenceReceivedDate 58086 attribute. The InboundCorrespondenceDeferralDate 58090 attribute has a cardinality of 0 . . . 1 58092 meaning that for each instance of the FilingObligation 58050 entity there may be one InboundCorrespondenceDeferralDate 58090 attribute. The BillingEndDate 58094 attribute has a cardinality of 0 . . . 1 58096 meaning that for each instance of the FilingObligation 58050 entity there may be one BillingEndDate 58094 attribute. The ClearingReasonCode 58098 attribute has a cardinality of 0 . . . 1 58100 meaning that for each instance of the FilingObligation 58050 entity there may be one ClearingReasonCode 58098 attribute.

The ClearingReasonName 58102 attribute has a cardinality of 0 . . . 1 58104 meaning that for each instance of the FilingObligation 58050 entity there may be one ClearingReasonName 58102 attribute. The Amount 58106 attribute has a cardinality of 1 58108 meaning that for each instance of the FilingObligation 58050 entity there is one Amount 58106 attribute. The CurrencyCode 58110 attribute has a cardinality of 1 58112 meaning that for each instance of the FilingObligation 58050 entity there is one CurrencyCode 58110 attribute. The CurrencyName 58114 attribute has a cardinality of 0 . . . 1 58116 meaning that for each instance of the FilingObligation 58050 entity there may be one CurrencyName 58114 attribute. The CorrespondingTaxReturnID 58118 attribute has a cardinality of 0 . . . 1 58120 meaning that for each instance of the FilingObligation 58050 entity there may be one CorrespondingTaxReturnID 58118 attribute.

The Log 58122 package includes a Log 58124 entity. The Log 58124 entity has a cardinality of 1 58126 meaning that for each instance of the Log 58122 package there is one Log 58124 entity. The data types of the various packages, entities, and attributes are described with respect to FIG. 54.

In further detail, FIGS. 59-1 through 59-7 illustrate an example configuration of an Element Structure that includes a TaxObligationERPCheckQueryMessage_Sync 59000 package. The TaxObligationERPCheckQueryMessage_Sync 59000 package includes a TaxObligationERPCheckQueryMessage_Sync 59002 entity. The TaxObligationERPCheckQueryMessage_Sync 59000 package includes various packages, namely a MessageHeader 59004 and a TaxObligation 59010.

The MessageHeader 59004 package includes a MessageHeader 59006 entity. The MessageHeader 59006 entity has a cardinality of 1 59008 meaning that for each instance of the MessageHeader 59004 package there is one MessageHeader 59006 entity.

The TaxObligation 59010 package includes a TaxObligation 59012 entity. The TaxObligation 59010 package includes various packages, namely a FilingRule 59060, a FilingExemption 59104, an InvoicingTerms 59126 and a RegistrationForm 59140.

The TaxObligation 59012 entity has a cardinality of 1 59014 meaning that for each instance of the TaxObligation 59010 package there is one TaxObligation 59012 entity. The TaxObligation 59012 entity includes various attributes, namely a TaxObligationID 59016, a TaxPayerPartyID 59020, a LevyTypeCode 59024, a StartBillingPeriodID 59028, an EndBillingPeriodID 59032, a TaxObjectID 59036, a ContractAccountID 59040, a RegistrationStatusCode 59044, a ContactPartyID 59048, an ElectronicFilingCode 59052 and an EmailReminderIndicator 59056. The TaxObligationID 59016 attribute has a cardinality of 0 . . . 1 59018 meaning that for each instance of the TaxObligation 59012 entity there may be one TaxObligationID 59016 attribute. The TaxPayerPartyID 59020 attribute has a cardinality of 0 . . . 1 59022 meaning that for each instance of the TaxObligation 59012 entity there may be one TaxPayerPartyID 59020 attribute. The LevyTypeCode 59024 attribute has a cardinality of 0 . . . 1 59026 meaning that for each instance of the TaxObligation 59012 entity there may be one LevyTypeCode 59024 attribute.

The StartBillingPeriodID 59028 attribute has a cardinality of 0 . . . 1 59030 meaning that for each instance of the TaxObligation 59012 entity there may be one StartBillingPeriodID 59028 attribute. The EndBillingPeriodID 59032 attribute has a cardinality of 0 . . . 1 59034 meaning that for each instance of the TaxObligation 59012 entity there may be one EndBillingPeriodID 59032 attribute. The TaxObjectID 59036 attribute has a cardinality of 0 . . . 1 59038 meaning that for each instance of the TaxObligation 59012 entity there may be one TaxObjectID 59036 attribute. The ContractAccountID 59040 attribute has a cardinality of 0 . . . 1 59042 meaning that for each instance of the TaxObligation 59012 entity there may be one ContractAccountID 59040 attribute. The RegistrationStatusCode 59044 attribute has a cardinality of 0 . . . 1 59046 meaning that for each instance of the TaxObligation 59012 entity there may be one RegistrationStatusCode 59044 attribute. The ContactPartyID 59048 attribute has a cardinality of 0 . . . n 59050 meaning that for each instance of the TaxObligation 59012 entity there may be one or more ContactPartyID 59048 attributes. The ElectronicFilingCode 59052 attribute has a cardinality of 0 . . . 1 59054 meaning that for each instance of the TaxObligation 59012 entity there may be one ElectronicFilingCode 59052 attribute. The EmailReminderIndicator 59056 attribute has a cardinality of 0 . . . 1 59058 meaning that for each instance of the TaxObligation 59012 entity there may be one EmailReminderIndicator 59056 attribute.

The FilingRule 59060 package includes a FilingRule 59062 entity. The FilingRule 59060 package includes a Periodicity 59082 package.

The FilingRule 59062 entity has a cardinality of 0 . . . n 59064 meaning that for each instance of the FilingRule 59060 package there may be one or more FilingRule 59062 entities. The FilingRule 59062 entity includes various attributes, namely an InboundCorrespondenceCategoryCode 59066, an InboundCorrespondenceFirstBillingPeriodID 59070, a GenerationStatusCode 59074 and an InboundCorrespondenceLastBillingPeriodID 59078. The InboundCorrespondenceCategoryCode 59066 attribute has a cardinality of 1 59068 meaning that for each instance of the FilingRule 59062 entity there is one InboundCorrespondenceCategoryCode 59066 attribute. The InboundCorrespondenceFirstBillingPeriodID 59070 attribute has a cardinality of 1 59072 meaning that for each instance of the FilingRule 59062 entity there is one InboundCorrespondenceFirstBillingPeriodID 59070 attribute. The GenerationStatusCode 59074 attribute has a cardinality of 0 . . . 1 59076 meaning that for each instance of the FilingRule 59062 entity there may be one GenerationStatusCode 59074 attribute. The InboundCorrespondenceLastBillingPeriodID 59078 attribute has a cardinality of 0 . . . 1 59080 meaning that for each instance of the FilingRule 59062 entity there may be one InboundCorrespondenceLastBillingPeriodID 59078 attribute.

The Periodicity 59082 package includes a DeviatingPeriod 59084 entity. The DeviatingPeriod 59084 entity has a cardinality of 0 . . . n 59086 meaning that for each instance of the Periodicity 59082 package there may be one or more DeviatingPeriod 59084 entities. The DeviatingPeriod 59084 entity includes various attributes, namely a StartDate 59088, an EndDate 59092, a DueDate 59096 and a BillingPeriodID 59100. The StartDate 59088 attribute has a cardinality of 1 59090 meaning that for each instance of the DeviatingPeriod 59084 entity there is one StartDate 59088 attribute. The EndDate 59092 attribute has a cardinality of 0 . . . 1 59094 meaning that for each instance of the DeviatingPeriod 59084 entity there may be one EndDate 59092 attribute. The DueDate 59096 attribute has a cardinality of 0 . . . 1 59098 meaning that for each instance of the DeviatingPeriod 59084 entity there may be one DueDate 59096 attribute. The BillingPeriodID 59100 attribute has a cardinality of 1 59102 meaning that for each instance of the DeviatingPeriod 59084 entity there is one BillingPeriodID 59100 attribute.

The FilingExemption 59104 package includes a FilingExemption 59106 entity. The FilingExemption 59106 entity has a cardinality of 0 . . . n 59108 meaning that for each instance of the FilingExemption 59104 package there may be one or more FilingExemption 59106 entities. The FilingExemption 59106 entity includes various attributes, namely a StartDay 59110, a StartMonth 59114, an EndDay 59118 and an EndMonth 59122. The StartDay 59110 attribute has a cardinality of 1 59112 meaning that for each instance of the FilingExemption 59106 entity there is one StartDay 59110 attribute. The StartMonth 59114 attribute has a cardinality of 1 59116 meaning that for each instance of the FilingExemption 59106 entity there is one StartMonth 59114 attribute. The EndDay 59118 attribute has a cardinality of 1 59120 meaning that for each instance of the FilingExemption 59106 entity there is one EndDay 59118 attribute. The EndMonth 59122 attribute has a cardinality of 1 59124 meaning that for each instance of the FilingExemption 59106 entity there is one EndMonth 59122 attribute.

The InvoicingTerms 59126 package includes an InvoicingTerms 59128 entity. The InvoicingTerms 59128 entity has a cardinality of 0 . . . 1 59130 meaning that for each instance of the InvoicingTerms 59126 package there may be one InvoicingTerms 59128 entity. The InvoicingTerms 59128 entity includes various attributes, namely a ContractAccountContractReferenceID 59132 and a ChargePercent 59136. The ContractAccountContractReferenceID 59132 attribute has a cardinality of 0 . . . 1 59134 meaning that for each instance of the InvoicingTerms 59128 entity there may be one ContractAccountContractReferenceID 59132 attribute. The ChargePercent 59136 attribute has a cardinality of 1 59138 meaning that for each instance of the InvoicingTerms 59128 entity there is one ChargePercent 59136 attribute.

The RegistrationForm 59140 package includes a RegistrationForm 59142 entity. The RegistrationForm 59140 package includes a PropertyValuation 59158 package.

The RegistrationForm 59142 entity has a cardinality of 0 . . . n 59144 meaning that for each instance of the RegistrationForm 59140 package there may be one or more RegistrationForm 59142 entities. The RegistrationForm 59142 entity includes various attributes, namely a FormTemplateID 59146, a FormVersionID 59150 and a FormStatusCode 59154. The FormTemplateID 59146 attribute has a cardinality of 1 59148 meaning that for each instance of the RegistrationForm 59142 entity there is one FormTemplateID 59146 attribute. The FormVersionID 59150 attribute has a cardinality of 1 59152 meaning that for each instance of the RegistrationForm 59142 entity there is one FormVersionID 59150 attribute. The FormStatusCode 59154 attribute has a cardinality of 0 . . . 1 59156 meaning that for each instance of the RegistrationForm 59142 entity there may be one FormStatusCode 59154 attribute.

The PropertyValuation 59158 package includes a PropertyValuation 59160 entity. The PropertyValuation 59160 entity has a cardinality of 1 . . . n 59162 meaning that for each instance of the PropertyValuation 59158 package there are one or more PropertyValuation 59160 entities. The PropertyValuation 59160 entity includes a PropertyValuation 59164 attribute. The PropertyValuation 59164 attribute has a cardinality of 0 . . . 1 59166 meaning that for each instance of the PropertyValuation 59160 entity there may be one PropertyValuation 59164 attribute.

The data types of the various packages, entities, and attributes are described with respect to FIG. 54.

In further detail, FIGS. 60-1 through 60-9 illustrate an example configuration of an Element Structure that includes a TaxObligationERPCheckResponseMessage 60000 package. The TaxObligationERPCheckResponseMessage 60000 package includes a TaxObligationERPCheckResponseMessage 60002 entity. The TaxObligationERPCheckResponseMessage 60000 package includes various packages, namely a MessageHeader 60004, a TaxObligation 60010 and a Log 60220.

The MessageHeader 60004 package includes a MessageHeader 60006 entity. The MessageHeader 60006 entity has a cardinality of 1 60008 meaning that for each instance of the MessageHeader 60004 package there is one MessageHeader 60006 entity.

The TaxObligation 60010 package includes a TaxObligation 60012 entity. The TaxObligation 60010 package includes various packages, namely a FilingRule 60080, a FilingExemption 60156, an InvoicingTerms 60178 and a RegistrationForm 60192.

The TaxObligation 60012 entity has a cardinality of 0 . . . 1 60014 meaning that for each instance of the TaxObligation 60010 package there may be one TaxObligation 60012 entity. The TaxObligation 60012 entity includes various attributes, namely a TaxObligationID 60016, a TaxPayerPartyID 60020, a LevyTypeCode 60024, a LevyTypeName 60028, a StartBillingPeriodID 60032, a StartBillingPeriodName 60036, an EndBillingPeriodID 60040, an EndBillingPeriodName 60044, a ValidityStartDate 60048, a ValidityEndDate 60052, a ContractAccountID 60056, a RegistrationStatusCode 60060, a RegistrationStatusName 60064, a ContactPartyID 60068, an ElectronicFilingCode 60072 and an EmailReminderIndicator 60076. The TaxObligationID 60016 attribute has a cardinality of 0 . . . 1 60018 meaning that for each instance of the TaxObligation 60012 entity there may be one TaxObligationID 60016 attribute. The TaxPayerPartyID 60020 attribute has a cardinality of 1 60022 meaning that for each instance of the TaxObligation 60012 entity there is one TaxPayerPartyID 60020 attribute.

The LevyTypeCode 60024 attribute has a cardinality of 1 60026 meaning that for each instance of the TaxObligation 60012 entity there is one LevyTypeCode 60024 attribute. The LevyTypeName 60028 attribute has a cardinality of 0 . . . 1 60030 meaning that for each instance of the TaxObligation 60012 entity there may be one LevyTypeName 60028 attribute. The StartBillingPeriodID 60032 attribute has a cardinality of 1 60034 meaning that for each instance of the TaxObligation 60012 entity there is one StartBillingPeriodID 60032 attribute. The StartBillingPeriodName 60036 attribute has a cardinality of 0 . . . 1 60038 meaning that for each instance of the TaxObligation 60012 entity there may be one StartBillingPeriodName 60036 attribute. The EndBillingPeriodID 60040 attribute has a cardinality of 0 . . . 1 60042 meaning that for each instance of the TaxObligation 60012 entity there may be one EndBillingPeriodID 60040 attribute. The EndBillingPeriodName 60044 attribute has a cardinality of 0 . . . 1 60046 meaning that for each instance of the TaxObligation 60012 entity there may be one EndBillingPeriodName 60044 attribute.

The ValidityStartDate 60048 attribute has a cardinality of 0 . . . 1 60050 meaning that for each instance of the TaxObligation 60012 entity there may be one ValidityStartDate 60048 attribute. The ValidityEndDate 60052 attribute has a cardinality of 0 . . . 1 60054 meaning that for each instance of the TaxObligation 60012 entity there may be one ValidityEndDate 60052 attribute. The ContractAccountID 60056 attribute has a cardinality of 1 60058 meaning that for each instance of the TaxObligation 60012 entity there is one ContractAccountID 60056 attribute. The RegistrationStatusCode 60060 attribute has a cardinality of 0 . . . 1 60062 meaning that for each instance of the TaxObligation 60012 entity there may be one RegistrationStatusCode 60060 attribute. The RegistrationStatusName 60064 attribute has a cardinality of 0 . . . 1 60066 meaning that for each instance of the TaxObligation 60012 entity there may be one RegistrationStatusName 60064 attribute. The ContactPartyID 60068 attribute has a cardinality of 0 . . . n 60070 meaning that for each instance of the TaxObligation 60012 entity there may be one or more ContactPartyID 60068 attributes. The ElectronicFilingCode 60072 attribute has a cardinality of 0 . . . 1 60074 meaning that for each instance of the TaxObligation 60012 entity there may be one ElectronicFilingCode 60072 attribute. The EmailReminderIndicator 60076 attribute has a cardinality of 1 60078 meaning that for each instance of the TaxObligation 60012 entity there is one EmailReminderIndicator 60076 attribute.

The FilingRule 60080 package includes a FilingRule 60082 entity. The FilingRule 60080 package includes a Periodicity 60106 package.

The FilingRule 60082 entity has a cardinality of 0 . . . n 60084 meaning that for each instance of the FilingRule 60080 package there may be one or more FilingRule 60082 entities. The FilingRule 60082 entity includes various attributes, namely an InboundCorrespondenceCategoryCode 60086, an InboundCorrespondenceFirstBillingPeriodID 60090, a GenerationStatusCode 60094, a GenerationStatusName 60098 and an InboundCorrespondenceLastBillingPeriodID 60102. The InboundCorrespondenceCategoryCode 60086 attribute has a cardinality of 1 60088 meaning that for each instance of the FilingRule 60082 entity there is one InboundCorrespondenceCategoryCode 60086 attribute. The InboundCorrespondenceFirstBillingPeriodID 60090 attribute has a cardinality of 1 60092 meaning that for each instance of the FilingRule 60082 entity there is one InboundCorrespondenceFirstBillingPeriodID 60090 attribute. The GenerationStatusCode 60094 attribute has a cardinality of 1 60096 meaning that for each instance of the FilingRule 60082 entity there is one GenerationStatusCode 60094 attribute. The GenerationStatusName 60098 attribute has a cardinality of 0 . . . 1 60100 meaning that for each instance of the FilingRule 60082 entity there may be one GenerationStatusName 60098 attribute. The InboundCorrespondenceLastBillingPeriodID 60102 attribute has a cardinality of 0 . . . 1 60104 meaning that for each instance of the FilingRule 60082 entity there may be one InboundCorrespondenceLastBillingPeriodID 60102 attribute.

The Periodicity 60106 package includes various entities, namely a DeviatingPeriod 60108 and a StandardPeriod 60132. The DeviatingPeriod 60108 entity has a cardinality of 0 . . . n 60110 meaning that for each instance of the Periodicity 60106 package there may be one or more DeviatingPeriod 60108 entities. The DeviatingPeriod 60108 entity includes various attributes, namely a StartDate 60112, an EndDate 60116, a DueDate 60120, a BillingPeriodID 60124 and a BillingPeriodName 60128. The StartDate 60112 attribute has a cardinality of 1 60114 meaning that for each instance of the DeviatingPeriod 60108 entity there is one StartDate 60112 attribute. The EndDate 60116 attribute has a cardinality of 1 60118 meaning that for each instance of the DeviatingPeriod 60108 entity there is one EndDate 60116 attribute. The DueDate 60120 attribute has a cardinality of 0 . . . 1 60122 meaning that for each instance of the DeviatingPeriod 60108 entity there may be one DueDate 60120 attribute. The BillingPeriodID 60124 attribute has a cardinality of 1 60126 meaning that for each instance of the DeviatingPeriod 60108 entity there is one BillingPeriodID 60124 attribute. The BillingPeriodName 60128 attribute has a cardinality of 0 . . . 1 60130 meaning that for each instance of the DeviatingPeriod 60108 entity there may be one BillingPeriodName 60128 attribute.

The StandardPeriod 60132 entity has a cardinality of 0 . . . n 60134 meaning that for each instance of the Periodicity 60106 package there may be one or more StandardPeriod 60132 entities. The StandardPeriod 60132 entity includes various attributes, namely a StartDate 60136, an EndDate 60140, a DueDate 60144, a BillingPeriodID 60148 and a BillingPeriodName 60152. The StartDate 60136 attribute has a cardinality of 1 60138 meaning that for each instance of the StandardPeriod 60132 entity there is one StartDate 60136 attribute. The EndDate 60140 attribute has a cardinality of 1 60142 meaning that for each instance of the StandardPeriod 60132 entity there is one EndDate 60140 attribute. The DueDate 60144 attribute has a cardinality of 0 . . . 1 60146 meaning that for each instance of the StandardPeriod 60132 entity there may be one DueDate 60144 attribute. The BillingPeriodID 60148 attribute has a cardinality of 1 60150 meaning that for each instance of the StandardPeriod 60132 entity there is one BillingPeriodID 60148 attribute. The BillingPeriodName 60152 attribute has a cardinality of 0 . . . 1 60154 meaning that for each instance of the StandardPeriod 60132 entity there may be one BillingPeriodName 60152 attribute.

The FilingExemption 60156 package includes a FilingExemption 60158 entity. The FilingExemption 60158 entity has a cardinality of 0 . . . n 60160 meaning that for each instance of the FilingExemption 60156 package there may be one or more FilingExemption 60158 entities. The FilingExemption 60158 entity includes various attributes, namely a StartDay 60162, a StartMonth 60166, an EndDay 60170 and an EndMonth 60174. The StartDay 60162 attribute has a cardinality of 1 60164 meaning that for each instance of the FilingExemption 60158 entity there is one StartDay 60162 attribute. The StartMonth 60166 attribute has a cardinality of 1 60168 meaning that for each instance of the FilingExemption 60158 entity there is one StartMonth 60166 attribute. The EndDay 60170 attribute has a cardinality of 1 60172 meaning that for each instance of the FilingExemption 60158 entity there is one EndDay 60170 attribute. The EndMonth 60174 attribute has a cardinality of 1 60176 meaning that for each instance of the FilingExemption 60158 entity there is one EndMonth 60174 attribute.

The InvoicingTerms 60178 package includes an InvoicingTerms 60180 entity. The InvoicingTerms 60180 entity has a cardinality of 1 60182 meaning that for each instance of the InvoicingTerms 60178 package there is one InvoicingTerms 60180 entity. The InvoicingTerms 60180 entity includes various attributes, namely a ContractAccountContractReferenceID 60184 and a ChargePercent 60188. The ContractAccountContractReferenceID 60184 attribute has a cardinality of 0 . . . 1 60186 meaning that for each instance of the InvoicingTerms 60180 entity there may be one ContractAccountContractReferenceID 60184 attribute. The ChargePercent 60188 attribute has a cardinality of 1 60190 meaning that for each instance of the InvoicingTerms 60180 entity there is one ChargePercent 60188 attribute.

The RegistrationForm 60192 package includes a RegistrationForm 60194 entity. The RegistrationForm 60192 package includes a PropertyValuation 60210 package.

The RegistrationForm 60194 entity has a cardinality of 0 . . . n 60196 meaning that for each instance of the RegistrationForm 60192 package there may be one or more RegistrationForm 60194 entities. The RegistrationForm 60194 entity includes various attributes, namely a FormTemplateID 60198, a FormVersionID 60202 and a FormStatusCode 60206. The FormTemplateID 60198 attribute has a cardinality of 1 60200 meaning that for each instance of the RegistrationForm 60194 entity there is one FormTemplateID 60198 attribute. The FormVersionID 60202 attribute has a cardinality of 1 60204 meaning that for each instance of the RegistrationForm 60194 entity there is one FormVersionID 60202 attribute. The FormStatusCode 60206 attribute has a cardinality of 0 . . . 1 60208 meaning that for each instance of the RegistrationForm 60194 entity there may be one FormStatusCode 60206 attribute.

The PropertyValuation 60210 package includes a PropertyValuation 60212 entity. The PropertyValuation 60212 entity has a cardinality of 1 . . . n 60214 meaning that for each instance of the PropertyValuation 60210 package there are one or more PropertyValuation 60212 entities. The PropertyValuation 60212 entity includes a PropertyValuation 60216 attribute. The PropertyValuation 60216 attribute has a cardinality of 0 . . . 1 60218 meaning that for each instance of the PropertyValuation 60212 entity there may be one PropertyValuation 60216 attribute.

The Log 60220 package includes a Log 60222 entity. The Log 60222 entity has a cardinality of 1 60224 meaning that for each instance of the Log 60220 package there is one Log 60222 entity. The data types of the various packages, entities, and attributes are described with respect to FIG. 54.

In further detail, FIGS. 61-1 through 61-3 illustrate an example configuration of an Element Structure that includes a TaxObligationERPFilingObligationCheckQueryMessage_Sync 61000 package. The TaxObligationERPFilingObligationCheckQueryMessage_Sync 61000 package includes a TaxObligationERPFilingObligationCheckQueryMessage_Sync 61002 entity. The TaxObligationERPFilingObligationCheckQueryMessage_Sync 61000 package includes various packages, namely a MessageHeader 61004 and a TaxObligation 61010.

The MessageHeader 61004 package includes a MessageHeader 61006 entity. The MessageHeader 61006 entity has a cardinality of 1 61008 meaning that for each instance of the MessageHeader 61004 package there is one MessageHeader 61006 entity.

The TaxObligation 61010 package includes a TaxObligation 61012 entity. The TaxObligation 61010 package includes a FilingObligation 61020 package.

The TaxObligation 61012 entity has a cardinality of 1 61014 meaning that for each instance of the TaxObligation 61010 package there is one TaxObligation 61012 entity. The TaxObligation 61012 entity includes a TaxObligationID 61016 attribute. The TaxObligationID 61016 attribute has a cardinality of 1 61018 meaning that for each instance of the TaxObligation 61012 entity there is one TaxObligationID 61016 attribute.

The FilingObligation 61020 package includes a FilingObligation 61022 entity. The FilingObligation 61022 entity has a cardinality of 0 . . . n 61024 meaning that for each instance of the FilingObligation 61020 package there may be one or more FilingObligation 61022 entities. The FilingObligation 61022 entity includes various attributes, namely an InboundCorrespondenceCategoryCode 61026, a BillingPeriodID 61030, a BillingStartDate 61034, a CorrespondenceStatusCode 61038, an InboundCorrespondenceDueDate 61042, an InboundCorrespondenceReceivedDate 61046, an InboundCorrespondenceDeferralDate 61050, a ClearingReasonCode 61054, an Amount 61058, a CurrencyCode 61062 and a CorrespondingTaxReturnID 61066. The InboundCorrespondenceCategoryCode 61026 attribute has a cardinality of 1 61028 meaning that for each instance of the FilingObligation 61022 entity there is one InboundCorrespondenceCategoryCode 61026 attribute. The BillingPeriodID 61030 attribute has a cardinality of 1 61032 meaning that for each instance of the FilingObligation 61022 entity there is one BillingPeriodID 61030 attribute.

The BillingStartDate 61034 attribute has a cardinality of 1 61036 meaning that for each instance of the FilingObligation 61022 entity there is one BillingStartDate 61034 attribute. The CorrespondenceStatusCode 61038 attribute has a cardinality of 0 . . . 1 61040 meaning that for each instance of the FilingObligation 61022 entity there may be one CorrespondenceStatusCode 61038 attribute. The InboundCorrespondenceDueDate 61042 attribute has a cardinality of 0 . . . 1 61044 meaning that for each instance of the FilingObligation 61022 entity there may be one InboundCorrespondenceDueDate 61042 attribute. The InboundCorrespondenceReceivedDate 61046 attribute has a cardinality of 0 . . . 1 61048 meaning that for each instance of the FilingObligation 61022 entity there may be one InboundCorrespondenceReceivedDate 61046 attribute. The InboundCorrespondenceDeferralDate 61050 attribute has a cardinality of 0 . . . 1 61052 meaning that for each instance of the FilingObligation 61022 entity there may be one InboundCorrespondenceDeferralDate 61050 attribute. The ClearingReasonCode 61054 attribute has a cardinality of 0 . . . 1 61056 meaning that for each instance of the FilingObligation 61022 entity there may be one ClearingReasonCode 61054 attribute. The Amount 61058 attribute has a cardinality of 0 . . . 1 61060 meaning that for each instance of the FilingObligation 61022 entity there may be one Amount 61058 attribute. The CurrencyCode 61062 attribute has a cardinality of 0 . . . 1 61064 meaning that for each instance of the FilingObligation 61022 entity there may be one CurrencyCode 61062 attribute. The CorrespondingTaxReturnID 61066 attribute has a cardinality of 0 . . . 1 61068 meaning that for each instance of the FilingObligation 61022 entity there may be one CorrespondingTaxReturnID 61066 attribute. The data types of the various packages, entities, and attributes are described with respect to FIG. 54.

In further detail, FIGS. 62-1 through 62-5 illustrate an example configuration of an Element Structure that includes a TaxObligationERPFilingObligationCheckResponseMessage_Sync 62000 package. The TaxObligationERPFilingObligationCheckResponseMessage_Sync 62000 package includes a TaxObligationERPFilingObligationCheckResponseMessage_Sync 62002 entity. The TaxObligationERPFilingObligationCheckResponseMessage_Sync 62000 package includes various packages, namely a MessageHeader 62004, a TaxObligation 62010 and a Log 62122.

The MessageHeader 62004 package includes a MessageHeader 62006 entity. The MessageHeader 62006 entity has a cardinality of 1 62008 meaning that for each instance of the MessageHeader 62004 package there is one MessageHeader 62006 entity.

The TaxObligation 62010 package includes a TaxObligation 62012 entity. The TaxObligation 62010 package includes a FilingObligation 62048 package.

The TaxObligation 62012 entity has a cardinality of 0 . . . 1 62014 meaning that for each instance of the TaxObligation 62010 package there may be one TaxObligation 62012 entity. The TaxObligation 62012 entity includes various attributes, namely a TaxObligationID 62016, a TaxPayerPartyID 62020, a LevyTypeCode 62024, a LevyTypeName 62028, a StartBillingPeriodID 62032, a StartBillingPeriodName 62036, an EndBillingPeriodID 62040 and an EndBillingPeriodName 62044. The TaxObligationID 62016 attribute has a cardinality of 1 62018 meaning that for each instance of the TaxObligation 62012 entity there is one TaxObligationID 62016 attribute. The TaxPayerPartyID 62020 attribute has a cardinality of 1 62022 meaning that for each instance of the TaxObligation 62012 entity there is one TaxPayerPartyID 62020 attribute. The LevyTypeCode 62024 attribute has a cardinality of 1 62026 meaning that for each instance of the TaxObligation 62012 entity there is one LevyTypeCode 62024 attribute. The LevyTypeName 62028 attribute has a cardinality of 0 . . . 1 62030 meaning that for each instance of the TaxObligation 62012 entity there may be one LevyTypeName 62028 attribute. The StartBillingPeriodID 62032 attribute has a cardinality of 1 62034 meaning that for each instance of the TaxObligation 62012 entity there is one StartBillingPeriodID 62032 attribute. The StartBillingPeriodName 62036 attribute has a cardinality of 0 . . . 1 62038 meaning that for each instance of the TaxObligation 62012 entity there may be one StartBillingPeriodName 62036 attribute. The EndBillingPeriodID 62040 attribute has a cardinality of 0 . . . 1 62042 meaning that for each instance of the TaxObligation 62012 entity there may be one EndBillingPeriodID 62040 attribute. The EndBillingPeriodName 62044 attribute has a cardinality of 0 . . . 1 62046 meaning that for each instance of the TaxObligation 62012 entity there may be one EndBillingPeriodName 62044 attribute.

The FilingObligation 62048 package includes a FilingObligation 62050 entity. The FilingObligation 62050 entity has a cardinality of 0 . . . n 62052 meaning that for each instance of the FilingObligation 62048 package there may be one or more FilingObligation 62050 entities. The FilingObligation 62050 entity includes various attributes, namely an InboundCorrespondenceCategoryCode 62054, an InboundCorrespondenceCategoryName 62058, a BillingPeriodID 62062, a BillingPeriodName 62066, a BillingStartDate 62070, a CorrespondenceStatusCode 62074, a CorrespondenceStatusName 62078, an InboundCorrespondenceDueDate 62082, an InboundCorrespondenceReceivedDate 62086, an InboundCorrespondenceDeferralDate 62090, a BillingEndDate 62094, a ClearingReasonCode 62098, a ClearingReasonName 62102, an Amount 62106, a CurrencyCode 62110, a CurrencyName 62114 and a CorrespondingTaxReturnID 62118. The InboundCorrespondenceCategoryCode 62054 attribute has a cardinality of 1 62056 meaning that for each instance of the FilingObligation 62050 entity there is one InboundCorrespondenceCategoryCode 62054 attribute.

The InboundCorrespondenceCategoryName 62058 attribute has a cardinality of 0 . . . 1 62060 meaning that for each instance of the FilingObligation 62050 entity there may be one InboundCorrespondenceCategoryName 62058 attribute. The BillingPeriodID 62062 attribute has a cardinality of 1 62064 meaning that for each instance of the FilingObligation 62050 entity there is one BillingPeriodID 62062 attribute. The BillingPeriodName 62066 attribute has a cardinality of 0 . . . 1 62068 meaning that for each instance of the FilingObligation 62050 entity there may be one BillingPeriodName 62066 attribute. The BillingStartDate 62070 attribute has a cardinality of 1 62072 meaning that for each instance of the FilingObligation 62050 entity there is one BillingStartDate 62070 attribute. The CorrespondenceStatusCode 62074 attribute has a cardinality of 0 . . . 1 62076 meaning that for each instance of the FilingObligation 62050 entity there may be one CorrespondenceStatusCode 62074 attribute. The CorrespondenceStatusName 62078 attribute has a cardinality of 0 . . . 1 62080 meaning that for each instance of the FilingObligation 62050 entity there may be one CorrespondenceStatusName 62078 attribute. The InboundCorrespondenceDueDate 62082 attribute has a cardinality of 1 62084 meaning that for each instance of the FilingObligation 62050 entity there is one InboundCorrespondenceDueDate 62082 attribute.

The InboundCorrespondenceReceivedDate 62086 attribute has a cardinality of 0 . . . 1 62088 meaning that for each instance of the FilingObligation 62050 entity there may be one InboundCorrespondenceReceivedDate 62086 attribute. The InboundCorrespondenceDeferralDate 62090 attribute has a cardinality of 0 . . . 1 62092 meaning that for each instance of the FilingObligation 62050 entity there may be one InboundCorrespondenceDeferralDate 62090 attribute. The BillingEndDate 62094 attribute has a cardinality of 0 . . . 1 62096 meaning that for each instance of the FilingObligation 62050 entity there may be one BillingEndDate 62094 attribute. The ClearingReasonCode 62098 attribute has a cardinality of 0 . . . 1 62100 meaning that for each instance of the FilingObligation 62050 entity there may be one ClearingReasonCode 62098 attribute. The ClearingReasonName 62102 attribute has a cardinality of 0 . . . 1 62104 meaning that for each instance of the FilingObligation 62050 entity there may be one ClearingReasonName 62102 attribute. The Amount 62106 attribute has a cardinality of 1 62108 meaning that for each instance of the FilingObligation 62050 entity there is one Amount 62106 attribute. The CurrencyCode 62110 attribute has a cardinality of 1 62112 meaning that for each instance of the FilingObligation 62050 entity there is one CurrencyCode 62110 attribute. The CurrencyName 62114 attribute has a cardinality of 0 . . . 1 62116 meaning that for each instance of the FilingObligation 62050 entity there may be one CurrencyName 62114 attribute. The CorrespondingTaxReturnID 62118 attribute has a cardinality of 0 . . . 1 62120 meaning that for each instance of the FilingObligation 62050 entity there may be one CorrespondingTaxReturnID 62118 attribute.

The Log 62122 package includes a Log 62124 entity. The Log 62124 entity has a cardinality of 1 62126 meaning that for each instance of the Log 62122 package there is one Log 62124 entity. The data types of the various packages, entities, and attributes are described with respect to FIG. 54.

In further detail, FIGS. 63-1 through 63-6 illustrate an example configuration of an Element Structure that includes a TaxObligationERPCreateRequestMessage_Sync 63000 package. The TaxObligationERPCreateRequestMessage_Sync 63000 package includes a TaxObligationERPCreateRequestMessage_Sync 63002 entity. The TaxObligationERPCreateRequestMessage_Sync 63000 package includes various packages, namely a MessageHeader 63004 and a TaxObligation 63010.

The MessageHeader 63004 package includes a MessageHeader 63006 entity. The MessageHeader 63006 entity has a cardinality of 1 63008 meaning that for each instance of the MessageHeader 63004 package there is one MessageHeader 63006 entity.

The TaxObligation 63010 package includes a TaxObligation 63012 entity. The TaxObligation 63010 package includes various packages, namely a FilingRule 63052, a FilingExemption 63096, an InvoicingTerms 63118 and a RegistrationForm 63132.

The TaxObligation 63012 entity has a cardinality of 1 63014 meaning that for each instance of the TaxObligation 63010 package there is one TaxObligation 63012 entity. The TaxObligation 63012 entity includes various attributes, namely a TaxPayerPartyID 63016, a LevyTypeCode 63020, a StartBillingPeriodID 63024, an EndBillingPeriodID 63028, a TaxObjectID 63032, a ContractAccountID 63036, a ContactPartyID 63040, an ElectronicFilingCode 63044 and an EmailReminderIndicator 63048. The TaxPayerPartyID 63016 attribute has a cardinality of 1 63018 meaning that for each instance of the TaxObligation 63012 entity there is one TaxPayerPartyID 63016 attribute. The LevyTypeCode 63020 attribute has a cardinality of 1 63022 meaning that for each instance of the TaxObligation 63012 entity there is one LevyTypeCode 63020 attribute. The StartBillingPeriodID 63024 attribute has a cardinality of 1 63026 meaning that for each instance of the TaxObligation 63012 entity there is one StartBillingPeriodID 63024 attribute. The EndBillingPeriodID 63028 attribute has a cardinality of 0 . . . 1 63030 meaning that for each instance of the TaxObligation 63012 entity there may be one EndBillingPeriodID 63028 attribute. The TaxObjectID 63032 attribute has a cardinality of 0 . . . 1 63034 meaning that for each instance of the TaxObligation 63012 entity there may be one TaxObjectID 63032 attribute. The ContractAccountID 63036 attribute has a cardinality of 0 . . . 1 63038 meaning that for each instance of the TaxObligation 63012 entity there may be one ContractAccountID 63036 attribute. The ContactPartyID 63040 attribute has a cardinality of 0 . . . n 63042 meaning that for each instance of the TaxObligation 63012 entity there may be one or more ContactPartyID 63040 attributes. The ElectronicFilingCode 63044 attribute has a cardinality of 0 . . . 1 63046 meaning that for each instance of the TaxObligation 63012 entity there may be one ElectronicFilingCode 63044 attribute. The EmailReminderIndicator 63048 attribute has a cardinality of 0 . . . 1 63050 meaning that for each instance of the TaxObligation 63012 entity there may be one EmailReminderIndicator 63048 attribute.

The FilingRule 63052 package includes a FilingRule 63054 entity. The FilingRule 63052 package includes a Periodicity 63074 package.

The FilingRule 63054 entity has a cardinality of 0 . . . n 63056 meaning that for each instance of the FilingRule 63052 package there may be one or more FilingRule 63054 entities. The FilingRule 63054 entity includes various attributes, namely an InboundCorrespondenceCategoryCode 63058, an InboundCorrespondenceFirstBillingPeriodID 63062, a GenerationStatusCode 63066 and an InboundCorrespondenceLastBillingPeriodID 63070. The InboundCorrespondenceCategoryCode 63058 attribute has a cardinality of 1 63060 meaning that for each instance of the FilingRule 63054 entity there is one InboundCorrespondenceCategoryCode 63058 attribute. The InboundCorrespondenceFirstBillingPeriodID 63062 attribute has a cardinality of 1 63064 meaning that for each instance of the FilingRule 63054 entity there is one InboundCorrespondenceFirstBillingPeriodID 63062 attribute. The GenerationStatusCode 63066 attribute has a cardinality of 1 63068 meaning that for each instance of the FilingRule 63054 entity there is one GenerationStatusCode 63066 attribute. The InboundCorrespondenceLastBillingPeriodID 63070 attribute has a cardinality of 0 . . . 1 63072 meaning that for each instance of the FilingRule 63054 entity there may be one InboundCorrespondenceLastBillingPeriodID 63070 attribute.

The Periodicity 63074 package includes a DeviatingPeriod 63076 entity. The DeviatingPeriod 63076 entity has a cardinality of 0 . . . n 63078 meaning that for each instance of the Periodicity 63074 package there may be one or more DeviatingPeriod 63076 entities. The DeviatingPeriod 63076 entity includes various attributes, namely a StartDate 63080, an EndDate 63084, a DueDate 63088 and a BillingPeriodID 63092. The StartDate 63080 attribute has a cardinality of 1 63082 meaning that for each instance of the DeviatingPeriod 63076 entity there is one StartDate 63080 attribute. The EndDate 63084 attribute has a cardinality of 0 . . . 1 63086 meaning that for each instance of the DeviatingPeriod 63076 entity there may be one EndDate 63084 attribute. The DueDate 63088 attribute has a cardinality of 0 . . . 1 63090 meaning that for each instance of the DeviatingPeriod 63076 entity there may be one DueDate 63088 attribute. The BillingPeriodID 63092 attribute has a cardinality of 1 63094 meaning that for each instance of the DeviatingPeriod 63076 entity there is one BillingPeriodID 63092 attribute.

The FilingExemption 63096 package includes a FilingExemption 63098 entity. The FilingExemption 63098 entity has a cardinality of 0 . . . n 63100 meaning that for each instance of the FilingExemption 63096 package there may be one or more FilingExemption 63098 entities. The FilingExemption 63098 entity includes various attributes, namely a StartDay 63102, a StartMonth 63106, an EndDay 63110 and an EndMonth 63114. The StartDay 63102 attribute has a cardinality of 1 63104 meaning that for each instance of the FilingExemption 63098 entity there is one StartDay 63102 attribute. The StartMonth 63106 attribute has a cardinality of 1 63108 meaning that for each instance of the FilingExemption 63098 entity there is one StartMonth 63106 attribute. The EndDay 63110 attribute has a cardinality of 1 63112 meaning that for each instance of the FilingExemption 63098 entity there is one EndDay 63110 attribute. The EndMonth 63114 attribute has a cardinality of 1 63116 meaning that for each instance of the FilingExemption 63098 entity there is one EndMonth 63114 attribute.

The InvoicingTerms 63118 package includes an InvoicingTerms 63120 entity. The InvoicingTerms 63120 entity has a cardinality of 1 63122 meaning that for each instance of the InvoicingTerms 63118 package there is one InvoicingTerms 63120 entity. The InvoicingTerms 63120 entity includes various attributes, namely a ContractAccountContractReferenceID 63124 and a ChargePercent 63128. The ContractAccountContractReferenceID 63124 attribute has a cardinality of 0 . . . 1 63126 meaning that for each instance of the InvoicingTerms 63120 entity there may be one ContractAccountContractReferenceID 63124 attribute. The ChargePercent 63128 attribute has a cardinality of 1 63130 meaning that for each instance of the InvoicingTerms 63120 entity there is one ChargePercent 63128 attribute.

The RegistrationForm 63132 package includes a RegistrationForm 63134 entity. The RegistrationForm 63132 package includes a PropertyValuation 63150 package. The RegistrationForm 63134 entity has a cardinality of 0 . . . n 63136 meaning that for each instance of the RegistrationForm 63132 package there may be one or more RegistrationForm 63134 entities. The RegistrationForm 63134 entity includes various attributes, namely a FormTemplateID 63138, a FormVersionID 63142 and a FormStatusCode 63146. The FormTemplateID 63138 attribute has a cardinality of 1 63140 meaning that for each instance of the RegistrationForm 63134 entity there is one FormTemplateID 63138 attribute. The FormVersionID 63142 attribute has a cardinality of 1 63144 meaning that for each instance of the RegistrationForm 63134 entity there is one FormVersionID 63142 attribute. The FormStatusCode 63146 attribute has a cardinality of 0 . . . 1 63148 meaning that for each instance of the RegistrationForm 63134 entity there may be one FormStatusCode 63146 attribute.

The PropertyValuation 63150 package includes a PropertyValuation 63152 entity. The PropertyValuation 63152 entity has a cardinality of 1 . . . n 63154 meaning that for each instance of the PropertyValuation 63150 package there are one or more PropertyValuation 63152 entities. The PropertyValuation 63152 entity includes a PropertyValuation 63156 attribute. The PropertyValuation 63156 attribute has a cardinality of 0 . . . 1 63158 meaning that for each instance of the PropertyValuation 63152 entity there may be one PropertyValuation 63156 attribute. The data types of the various packages, entities, and attributes are described with respect to FIG. 54.

In further detail, FIGS. 64-1 through 64-9 illustrate an example configuration of an Element Structure that includes a TaxObligationERPCreateConfirmationMessage_Sync 64000 package. The TaxObligationERPCreateConfirmationMessage_Sync 64000 package includes a TaxObligationERPCreateConfirmationMessage_Sync 64002 entity. The TaxObligationERPCreateConfirmationMessage_Sync 64000 package includes various packages, namely a MessageHeader 64004, a TaxObligation 64010 and a Log 64220.

The MessageHeader 64004 package includes a MessageHeader 64006 entity. The MessageHeader 64006 entity has a cardinality of 1 64008 meaning that for each instance of the MessageHeader 64004 package there is one MessageHeader 64006 entity.

The TaxObligation 64010 package includes a TaxObligation 64012 entity. The TaxObligation 64010 package includes various packages, namely a FilingRule 64080, a FilingExemption 64156, an InvoicingTerms 64178 and a RegistrationForm 64192.

The TaxObligation 64012 entity has a cardinality of 1 64014 meaning that for each instance of the TaxObligation 64010 package there is one TaxObligation 64012 entity. The TaxObligation 64012 entity includes various attributes, namely a TaxObligationID 64016, a TaxPayerPartyID 64020, a LevyTypeCode 64024, a LevyTypeName 64028, a StartBillingPeriodID 64032, a StartBillingPeriodName 64036, an EndBillingPeriodID 64040, an EndBillingPeriodName 64044, a ValidityStartDate 64048, a ValidityEndDate 64052, a ContractAccountID 64056, a RegistrationStatusCode 64060, a RegistrationStatusName 64064, a ContactPartyID 64068, an ElectronicFilingCode 64072 and an EmailReminderIndicator 64076. The TaxObligationID 64016 attribute has a cardinality of 1 64018 meaning that for each instance of the TaxObligation 64012 entity there is one TaxObligationID 64016 attribute. The TaxPayerPartyID 64020 attribute has a cardinality of 1 64022 meaning that for each instance of the TaxObligation 64012 entity there is one TaxPayerPartyID 64020 attribute.

The LevyTypeCode 64024 attribute has a cardinality of 1 64026 meaning that for each instance of the TaxObligation 64012 entity there is one LevyTypeCode 64024 attribute. The LevyTypeName 64028 attribute has a cardinality of 0 . . . 1 64030 meaning that for each instance of the TaxObligation 64012 entity there may be one LevyTypeName 64028 attribute. The StartBillingPeriodID 64032 attribute has a cardinality of 1 64034 meaning that for each instance of the TaxObligation 64012 entity there is one StartBillingPeriodID 64032 attribute. The StartBillingPeriodName 64036 attribute has a cardinality of 0 . . . 1 64038 meaning that for each instance of the TaxObligation 64012 entity there may be one StartBillingPeriodName 64036 attribute. The EndBillingPeriodID 64040 attribute has a cardinality of 0 . . . 1 64042 meaning that for each instance of the TaxObligation 64012 entity there may be one EndBillingPeriodID 64040 attribute. The EndBillingPeriodName 64044 attribute has a cardinality of 0 . . . 1 64046 meaning that for each instance of the TaxObligation 64012 entity there may be one EndBillingPeriodName 64044 attribute. The ValidityStartDate 64048 attribute has a cardinality of 0 . . . 1 64050 meaning that for each instance of the TaxObligation 64012 entity there may be one ValidityStartDate 64048 attribute. The ValidityEndDate 64052 attribute has a cardinality of 0 . . . 1 64054 meaning that for each instance of the TaxObligation 64012 entity there may be one ValidityEndDate 64052 attribute.

The ContractAccountID 64056 attribute has a cardinality of 1 64058 meaning that for each instance of the TaxObligation 64012 entity there is one ContractAccountID 64056 attribute. The RegistrationStatusCode 64060 attribute has a cardinality of 1 64062 meaning that for each instance of the TaxObligation 64012 entity there is one RegistrationStatusCode 64060 attribute. The RegistrationStatusName 64064 attribute has a cardinality of 0 . . . 1 64066 meaning that for each instance of the TaxObligation 64012 entity there may be one RegistrationStatusName 64064 attribute. The ContactPartyID 64068 attribute has a cardinality of 0 . . . n 64070 meaning that for each instance of the TaxObligation 64012 entity there may be one or more ContactPartyID 64068 attributes. The ElectronicFilingCode 64072 attribute has a cardinality of 0 . . . 1 64074 meaning that for each instance of the TaxObligation 64012 entity there may be one ElectronicFilingCode 64072 attribute. The EmailReminderIndicator 64076 attribute has a cardinality of 1 64078 meaning that for each instance of the TaxObligation 64012 entity there is one EmailReminderIndicator 64076 attribute.

The FilingRule 64080 package includes a FilingRule 64082 entity. The FilingRule 64080 package includes a Periodicity 64106 package. The FilingRule 64082 entity has a cardinality of 0 . . . n 64084 meaning that for each instance of the FilingRule 64080 package there may be one or more FilingRule 64082 entities. The FilingRule 64082 entity includes various attributes, namely an InboundCorrespondenceCategoryCode 64086, an InboundCorrespondenceFirstBillingPeriodID 64090, a GenerationStatusCode 64094, a GenerationStatusName 64098 and an InboundCorrespondenceLastBillingPeriodID 64102. The InboundCorrespondenceCategoryCode 64086 attribute has a cardinality of 1 64088 meaning that for each instance of the FilingRule 64082 entity there is one InboundCorrespondenceCategoryCode 64086 attribute. The InboundCorrespondenceFirstBillingPeriodID 64090 attribute has a cardinality of 1 64092 meaning that for each instance of the FilingRule 64082 entity there is one InboundCorrespondenceFirstBillingPeriodID 64090 attribute. The GenerationStatusCode 64094 attribute has a cardinality of 1 64096 meaning that for each instance of the FilingRule 64082 entity there is one GenerationStatusCode 64094 attribute. The GenerationStatusName 64098 attribute has a cardinality of 0 . . . 1 64100 meaning that for each instance of the FilingRule 64082 entity there may be one GenerationStatusName 64098 attribute. The InboundCorrespondenceLastBillingPeriodID 64102 attribute has a cardinality of 0 . . . 1 64104 meaning that for each instance of the FilingRule 64082 entity there may be one InboundCorrespondenceLastBillingPeriodID 64102 attribute.

The Periodicity 64106 package includes various entities, namely a DeviatingPeriod 64108 and a StandardPeriod 64132. The DeviatingPeriod 64108 entity has a cardinality of 0 . . . n 64110 meaning that for each instance of the Periodicity 64106 package there may be one or more DeviatingPeriod 64108 entities. The DeviatingPeriod 64108 entity includes various attributes, namely a StartDate 64112, an EndDate 64116, a DueDate 64120, a BillingPeriodID 64124 and a BillingPeriodName 64128. The StartDate 64112 attribute has a cardinality of 1 64114 meaning that for each instance of the DeviatingPeriod 64108 entity there is one StartDate 64112 attribute. The EndDate 64116 attribute has a cardinality of 1 64118 meaning that for each instance of the DeviatingPeriod 64108 entity there is one EndDate 64116 attribute. The DueDate 64120 attribute has a cardinality of 0 . . . 1 64122 meaning that for each instance of the DeviatingPeriod 64108 entity there may be one DueDate 64120 attribute. The BillingPeriodID 64124 attribute has a cardinality of 1 64126 meaning that for each instance of the DeviatingPeriod 64108 entity there is one BillingPeriodID 64124 attribute. The BillingPeriodName 64128 attribute has a cardinality of 0 . . . 1 64130 meaning that for each instance of the DeviatingPeriod 64108 entity there may be one BillingPeriodName 64128 attribute.

The StandardPeriod 64132 entity has a cardinality of 1 . . . n 64134 meaning that for each instance of the Periodicity 64106 package there are one or more StandardPeriod 64132 entities. The StandardPeriod 64132 entity includes various attributes, namely a StartDate 64136, an EndDate 64140, a DueDate 64144, a BillingPeriodID 64148 and a BillingPeriodName 64152. The StartDate 64136 attribute has a cardinality of 1 64138 meaning that for each instance of the StandardPeriod 64132 entity there is one StartDate 64136 attribute. The EndDate 64140 attribute has a cardinality of 1 64142 meaning that for each instance of the StandardPeriod 64132 entity there is one EndDate 64140 attribute. The DueDate 64144 attribute has a cardinality of 0 . . . 1 64146 meaning that for each instance of the StandardPeriod 64132 entity there may be one DueDate 64144 attribute. The BillingPeriodID 64148 attribute has a cardinality of 1 64150 meaning that for each instance of the StandardPeriod 64132 entity there is one BillingPeriodID 64148 attribute. The BillingPeriodName 64152 attribute has a cardinality of 0 . . . 1 64154 meaning that for each instance of the StandardPeriod 64132 entity there may be one BillingPeriodName 64152 attribute.

The FilingExemption 64156 package includes a FilingExemption 64158 entity. The FilingExemption 64158 entity has a cardinality of 0 . . . n 64160 meaning that for each instance of the FilingExemption 64156 package there may be one or more FilingExemption 64158 entities. The FilingExemption 64158 entity includes various attributes, namely a StartDay 64162, a StartMonth 64166, an EndDay 64170 and an EndMonth 64174. The StartDay 64162 attribute has a cardinality of 1 64164 meaning that for each instance of the FilingExemption 64158 entity there is one StartDay 64162 attribute. The StartMonth 64166 attribute has a cardinality of 1 64168 meaning that for each instance of the FilingExemption 64158 entity there is one StartMonth 64166 attribute. The EndDay 64170 attribute has a cardinality of 1 64172 meaning that for each instance of the FilingExemption 64158 entity there is one EndDay 64170 attribute. The EndMonth 64174 attribute has a cardinality of 1 64176 meaning that for each instance of the FilingExemption 64158 entity there is one EndMonth 64174 attribute.

The InvoicingTerms 64178 package includes an InvoicingTerms 64180 entity. The InvoicingTerms 64180 entity has a cardinality of 1 64182 meaning that for each instance of the InvoicingTerms 64178 package there is one InvoicingTerms 64180 entity. The InvoicingTerms 64180 entity includes various attributes, namely a ContractAccountContractReferenceID 64184 and a ChargePercent 64188. The ContractAccountContractReferenceID 64184 attribute has a cardinality of 0 . . . 1 64186 meaning that for each instance of the InvoicingTerms 64180 entity there may be one ContractAccountContractReferenceID 64184 attribute. The ChargePercent 64188 attribute has a cardinality of 1 64190 meaning that for each instance of the InvoicingTerms 64180 entity there is one ChargePercent 64188 attribute.

The RegistrationForm 64192 package includes a RegistrationForm 64194 entity. The RegistrationForm 64192 package includes a PropertyValuation 64210 package. The RegistrationForm 64194 entity has a cardinality of 0 . . . n 64196 meaning that for each instance of the RegistrationForm 64192 package there may be one or more RegistrationForm 64194 entities. The RegistrationForm 64194 entity includes various attributes, namely a FormTemplateID 64198, a FormVersionID 64202 and a FormStatusCode 64206. The FormTemplateID 64198 attribute has a cardinality of 1 64200 meaning that for each instance of the RegistrationForm 64194 entity there is one FormTemplateID 64198 attribute. The FormVersionID 64202 attribute has a cardinality of 1 64204 meaning that for each instance of the RegistrationForm 64194 entity there is one FormVersionID 64202 attribute. The FormStatusCode 64206 attribute has a cardinality of 0 . . . 1 64208 meaning that for each instance of the RegistrationForm 64194 entity there may be one FormStatusCode 64206 attribute.

The PropertyValuation 64210 package includes a PropertyValuation 64212 entity. The PropertyValuation 64212 entity has a cardinality of 1 . . . n 64214 meaning that for each instance of the PropertyValuation 64210 package there are one or more PropertyValuation 64212 entities. The PropertyValuation 64212 entity includes a PropertyValuation 64216 attribute. The PropertyValuation 64216 attribute has a cardinality of 0 . . . 1 64218 meaning that for each instance of the PropertyValuation 64212 entity there may be one PropertyValuation 64216 attribute.

The Log 64220 package includes a Log 64222 entity. The Log 64222 entity has a cardinality of 1 64224 meaning that for each instance of the Log 64220 package there is one Log 64222 entity. The data types of the various packages, entities, and attributes are described with respect to FIG. 54.

In further detail, FIGS. 65-1 through 65-2 illustrate an example configuration of an Element Structure that includes a TaxObligationERPByBusinessPartnerQueryMessage_Sync 65000 package. The TaxObligationERPByBusinessPartnerQueryMessage_Sync 65000 package includes a TaxObligationERPByBusinessPartnerQueryMessage_Sync 65002 entity. The TaxObligationERPByBusinessPartnerQueryMessage_Sync 65000 package includes various packages, namely a MessageHeader 65004, a Selection 65010 and a ProcessingConditions 65038.

The MessageHeader 65004 package includes a MessageHeader 65006 entity. The MessageHeader 65006 entity has a cardinality of 1 65008 meaning that for each instance of the MessageHeader 65004 package there is one MessageHeader 65006 entity.

The Selection 65010 package includes a Selection 65012 entity. The Selection 65010 package includes a SelectionByTaxPayerPartyID 65016 package.

The Selection 65012 entity has a cardinality of 1 65014 meaning that for each instance of the Selection 65010 package there is one Selection 65012 entity. The SelectionByTaxPayerPartyID 65016 package includes a SelectionByTaxPayerPartyID 65018 entity. The SelectionByTaxPayerPartyID 65018 entity has a cardinality of 0 . . . n 65020 meaning that for each instance of the SelectionByTaxPayerPartyID 65016 package there may be one or more SelectionByTaxPayerPartyID 65018 entities. The SelectionByTaxPayerPartyID 65018 entity includes various attributes, namely an InclusionExclusionCode 65022, an IntervalBoundaryTypeCode 65026, a LowerBoundaryTaxPayerPartyID 65030 and an UpperBoundaryTaxPayerPartyID 65034. The InclusionExclusionCode 65022 attribute has a cardinality of 1 65024 meaning that for each instance of the SelectionByTaxPayerPartyID 65018 entity there is one InclusionExclusionCode 65022 attribute. The IntervalBoundaryTypeCode 65026 attribute has a cardinality of 1 65028 meaning that for each instance of the SelectionByTaxPayerPartyID 65018 entity there is one IntervalBoundaryTypeCode 65026 attribute. The LowerBoundaryTaxPayerPartyID 65030 attribute has a cardinality of 0 . . . 1 65032 meaning that for each instance of the SelectionByTaxPayerPartyID 65018 entity there may be one LowerBoundaryTaxPayerPartyID 65030 attribute. The UpperBoundaryTaxPayerPartyID 65034 attribute has a cardinality of 0 . . . 1 65036 meaning that for each instance of the SelectionByTaxPayerPartyID 65018 entity there may be one UpperBoundaryTaxPayerPartyID 65034 attribute.

The ProcessingConditions 65038 package includes a QueryProcessingConditions 65040 entity. The QueryProcessingConditions 65040 entity has a cardinality of 0 . . . 1 65042 meaning that for each instance of the ProcessingConditions 65038 package there may be one QueryProcessingConditions 65040 entity. The data types of the various packages, entities, and attributes are described with respect to FIG. 54.

In further detail, FIGS. 66-1 through 66-8 illustrate an example configuration of an Element Structure that includes a TaxObligationERPByBusinessPartnerResponseMessage_Sync 66000 package. The TaxObligationERPByBusinessPartnerResponseMessage_Sync 66000 package includes a TaxObligationERPByBusinessPartnerResponseMessage_Sync 66002 entity. The TaxObligationERPByBusinessPartnerResponseMessage_Sync 66000 package includes various packages, namely a MessageHeader 66004, a TaxObligation 66010, a ProcessingConditions 66188 and a Log 66194.

The MessageHeader 66004 package includes a MessageHeader 66006 entity. The MessageHeader 66006 entity has a cardinality of 1 66008 meaning that for each instance of the MessageHeader 66004 package there is one MessageHeader 66006 entity.

The TaxObligation 66010 package includes a TaxObligation 66012 entity. The TaxObligation 66010 package includes various packages, namely a FilingObligation 66080 and a FilingExemption 66166.

The TaxObligation 66012 entity has a cardinality of 0 . . . n 66014 meaning that for each instance of the TaxObligation 66010 package there may be one or more TaxObligation 66012 entities. The TaxObligation 66012 entity includes various attributes, namely a TaxObligationID 66016, a TaxPayerPartyID 66020, a LevyTypeCode 66024, a LevyTypeName 66028, a StartBillingPeriodID 66032, a StartBillingPeriodName 66036, an EndBillingPeriodID 66040, an EndBillingPeriodName 66044, a ValidityStartDate 66048, a ValidityEndDate 66052, a ContractAccountID 66056, a RegistrationStatusCode 66060, a RegistrationStatusName 66064, a ContactPartyID 66068, an ElectronicFilingCode 66072 and an EmailReminderIndicator 66076. The TaxObligationID 66016 attribute has a cardinality of 1 66018 meaning that for each instance of the TaxObligation 66012 entity there is one TaxObligationID 66016 attribute. The TaxPayerPartyID 66020 attribute has a cardinality of 1 66022 meaning that for each instance of the TaxObligation 66012 entity there is one TaxPayerPartyID 66020 attribute. The LevyTypeCode 66024 attribute has a cardinality of 1 66026 meaning that for each instance of the TaxObligation 66012 entity there is one LevyTypeCode 66024 attribute.

The LevyTypeName 66028 attribute has a cardinality of 0 . . . 1 66030 meaning that for each instance of the TaxObligation 66012 entity there may be one LevyTypeName 66028 attribute. The StartBillingPeriodID 66032 attribute has a cardinality of 1 66034 meaning that for each instance of the TaxObligation 66012 entity there is one StartBillingPeriodID 66032 attribute. The StartBillingPeriodName 66036 attribute has a cardinality of 0 . . . 1 66038 meaning that for each instance of the TaxObligation 66012 entity there may be one StartBillingPeriodName 66036 attribute. The EndBillingPeriodID 66040 attribute has a cardinality of 0 . . . 1 66042 meaning that for each instance of the TaxObligation 66012 entity there may be one EndBillingPeriodID 66040 attribute. The EndBillingPeriodName 66044 attribute has a cardinality of 0 . . . 1 66046 meaning that for each instance of the TaxObligation 66012 entity there may be one EndBillingPeriodName 66044 attribute. The ValidityStartDate 66048 attribute has a cardinality of 0 . . . 1 66050 meaning that for each instance of the TaxObligation 66012 entity there may be one ValidityStartDate 66048 attribute. The ValidityEndDate 66052 attribute has a cardinality of 0 . . . 1 66054 meaning that for each instance of the TaxObligation 66012 entity there may be one ValidityEndDate 66052 attribute. The ContractAccountID 66056 attribute has a cardinality of 1 66058 meaning that for each instance of the TaxObligation 66012 entity there is one ContractAccountID 66056 attribute.

The RegistrationStatusCode 66060 attribute has a cardinality of 1 66062 meaning that for each instance of the TaxObligation 66012 entity there is one RegistrationStatusCode 66060 attribute. The RegistrationStatusName 66064 attribute has a cardinality of 0 . . . 1 66066 meaning that for each instance of the TaxObligation 66012 entity there may be one RegistrationStatusName 66064 attribute. The ContactPartyID 66068 attribute has a cardinality of 0 . . . n 66070 meaning that for each instance of the TaxObligation 66012 entity there may be one or more ContactPartyID 66068 attributes. The ElectronicFilingCode 66072 attribute has a cardinality of 0 . . . 1 66074 meaning that for each instance of the TaxObligation 66012 entity there may be one ElectronicFilingCode 66072 attribute. The EmailReminderIndicator 66076 attribute has a cardinality of 1 66078 meaning that for each instance of the TaxObligation 66012 entity there is one EmailReminderIndicator 66076 attribute.

The FilingObligation 66080 package includes a FilingObligation 66082 entity. The FilingObligation 66082 entity has a cardinality of 0 . . . n 66084 meaning that for each instance of the FilingObligation 66080 package there may be one or more FilingObligation 66082 entities. The FilingObligation 66082 entity includes various attributes, namely a FilingObligationUUID 66086, an InboundCorrespondenceCategoryCode 66090, an InboundCorrespondenceCategoryName 66094, a BillingPeriodID 66098, a BillingPeriodName 66102, a BillingStartDate 66106, a CorrespondenceStatusCode 66110, a CorrespondenceStatusName 66114, an InboundCorrespondenceDueDate 66118, an InboundCorrespondenceReceivedDate 66122, an InboundCorrespondenceDeferralDate 66126, a BillingEndDate 66130, a ClearingReasonCode 66134, a ClearingReasonName 66138, a LeadingObjectID 66142, a ConsolidationStatusCode 66146, a ConsolidationStatusName 66150, an Amount 66154, a CurrencyCode 66158 and a CurrencyName 66162.

The FilingObligationUUID 66086 attribute has a cardinality of 1 66088 meaning that for each instance of the FilingObligation 66082 entity there is one FilingObligationUUID 66086 attribute. The InboundCorrespondenceCategoryCode 66090 attribute has a cardinality of 1 66092 meaning that for each instance of the FilingObligation 66082 entity there is one InboundCorrespondenceCategoryCode 66090 attribute. The InboundCorrespondenceCategoryName 66094 attribute has a cardinality of 0 . . . 1 66096 meaning that for each instance of the FilingObligation 66082 entity there may be one InboundCorrespondenceCategoryName 66094 attribute. The BillingPeriodID 66098 attribute has a cardinality of 1 66100 meaning that for each instance of the FilingObligation 66082 entity there is one BillingPeriodID 66098 attribute. The BillingPeriodName 66102 attribute has a cardinality of 0 . . . 1 66104 meaning that for each instance of the FilingObligation 66082 entity there may be one BillingPeriodName 66102 attribute. The BillingStartDate 66106 attribute has a cardinality of 1 66108 meaning that for each instance of the FilingObligation 66082 entity there is one BillingStartDate 66106 attribute. The CorrespondenceStatusCode 66110 attribute has a cardinality of 0 . . . 1 66112 meaning that for each instance of the FilingObligation 66082 entity there may be one CorrespondenceStatusCode 66110 attribute.

The CorrespondenceStatusName 66114 attribute has a cardinality of 0 . . . 1 66116 meaning that for each instance of the FilingObligation 66082 entity there may be one CorrespondenceStatusName 66114 attribute. The InboundCorrespondenceDueDate 66118 attribute has a cardinality of 1 66120 meaning that for each instance of the FilingObligation 66082 entity there is one InboundCorrespondenceDueDate 66118 attribute. The InboundCorrespondenceReceivedDate 66122 attribute has a cardinality of 0 . . . 1 66124 meaning that for each instance of the FilingObligation 66082 entity there may be one InboundCorrespondenceReceivedDate 66122 attribute. The InboundCorrespondenceDeferralDate 66126 attribute has a cardinality of 0 . . . 1 66128 meaning that for each instance of the FilingObligation 66082 entity there may be one InboundCorrespondenceDeferralDate 66126 attribute. The BillingEndDate 66130 attribute has a cardinality of 1 66132 meaning that for each instance of the FilingObligation 66082 entity there is one BillingEndDate 66130 attribute. The ClearingReasonCode 66134 attribute has a cardinality of 0 . . . 1 66136 meaning that for each instance of the FilingObligation 66082 entity there may be one ClearingReasonCode 66134 attribute. The ClearingReasonName 66138 attribute has a cardinality of 0 . . . 1 66140 meaning that for each instance of the FilingObligation 66082 entity there may be one ClearingReasonName 66138 attribute.

The LeadingObjectID 66142 attribute has a cardinality of 0 . . . 1 66144 meaning that for each instance of the FilingObligation 66082 entity there may be one LeadingObjectID 66142 attribute. The ConsolidationStatusCode 66146 attribute has a cardinality of 0 . . . 1 66148 meaning that for each instance of the FilingObligation 66082 entity there may be one ConsolidationStatusCode 66146 attribute. The ConsolidationStatusName 66150 attribute has a cardinality of 0 . . . 1 66152 meaning that for each instance of the FilingObligation 66082 entity there may be one ConsolidationStatusName 66150 attribute. The Amount 66154 attribute has a cardinality of 0 . . . 1 66156 meaning that for each instance of the FilingObligation 66082 entity there may be one Amount 66154 attribute. The CurrencyCode 66158 attribute has a cardinality of 0 . . . 1 66160 meaning that for each instance of the FilingObligation 66082 entity there may be one CurrencyCode 66158 attribute. The CurrencyName 66162 attribute has a cardinality of 0 . . . 1 66164 meaning that for each instance of the FilingObligation 66082 entity there may be one CurrencyName 66162 attribute.

The FilingExemption 66166 package includes a FilingExemption 66168 entity. The FilingExemption 66168 entity has a cardinality of 0 . . . n 66170 meaning that for each instance of the FilingExemption 66166 package there may be one or more FilingExemption 66168 entities. The FilingExemption 66168 entity includes various attributes, namely a StartDay 66172, a StartMonth 66176, an EndDay 66180 and an EndMonth 66184. The StartDay 66172 attribute has a cardinality of 1 66174 meaning that for each instance of the FilingExemption 66168 entity there is one StartDay 66172 attribute. The StartMonth 66176 attribute has a cardinality of 1 66178 meaning that for each instance of the FilingExemption 66168 entity there is one StartMonth 66176 attribute. The EndDay 66180 attribute has a cardinality of 1 66182 meaning that for each instance of the FilingExemption 66168 entity there is one EndDay 66180 attribute. The EndMonth 66184 attribute has a cardinality of 1 66186 meaning that for each instance of the FilingExemption 66168 entity there is one EndMonth 66184 attribute.

The ProcessingConditions 66188 package includes a ResponseProcessingConditions 66190 entity. The ResponseProcessingConditions 66190 entity has a cardinality of 1 66192 meaning that for each instance of the ProcessingConditions 66188 package there is one ResponseProcessingConditions 66190 entity.

The Log 66194 package includes a Log 66196 entity. The Log 66196 entity has a cardinality of 1 66198 meaning that for each instance of the Log 66194 package there is one Log 66196 entity. The data types of the various packages, entities, and attributes are described with respect to FIG. 54.

In further detail, FIGS. 67-1 through 67-2 illustrate an example configuration of an Element Structure that includes a TaxObligationERPLevyTypeByBusinessPartnerQueryMessage_Sync 67000 package. The TaxObligationERPLevyTypeByBusinessPartnerQueryMessage_Sync 67000 package includes a TaxObligationERPLevyTypeByBusinessPartnerQueryMessage_Sync 67002 entity. The TaxObligationERPLevyTypeByBusinessPartnerQueryMessage_Sync 67000 package includes various packages, namely a MessageHeader 67004, a Selection 67010 and a ProcessingConditions 67038.

The MessageHeader 67004 package includes a MessageHeader 67006 entity. The MessageHeader 67006 entity has a cardinality of 1 67008 meaning that for each instance of the MessageHeader 67004 package there is one MessageHeader 67006 entity.

The Selection 67010 package includes a TaxObligationLevyTypeSelectionByBusinessPartner 67012 entity. The Selection 67010 package includes a SelectionByTaxPayerPartyID 67016 package.

The TaxObligationLevyTypeSelectionByBusinessPartner 67012 entity has a cardinality of 1 67014 meaning that for each instance of the Selection 67010 package there is one TaxObligationLevyTypeSelectionByBusinessPartner 67012 entity. The SelectionByTaxPayerPartyID 67016 package includes a SelectionByTaxPayerPartyID 67018 entity. The SelectionByTaxPayerPartyID 67018 entity has a cardinality of 0 . . . n 67020 meaning that for each instance of the SelectionByTaxPayerPartyID 67016 package there may be one or more SelectionByTaxPayerPartyID 67018 entities.

The SelectionByTaxPayerPartyID 67018 entity includes various attributes, namely an InclusionExclusionCode 67022, an IntervalBoundaryTypeCode 67026, a LowerBoundaryTaxPayerPartyID 67030 and an UpperBoundaryTaxPayerPartyID 67034. The InclusionExclusionCode 67022 attribute has a cardinality of 1 67024 meaning that for each instance of the SelectionByTaxPayerPartyID 67018 entity there is one InclusionExclusionCode 67022 attribute. The IntervalBoundaryTypeCode 67026 attribute has a cardinality of 1 67028 meaning that for each instance of the SelectionByTaxPayerPartyID 67018 entity there is one IntervalBoundaryTypeCode 67026 attribute. The LowerBoundaryTaxPayerPartyID 67030 attribute has a cardinality of 0 . . . 1 67032 meaning that for each instance of the SelectionByTaxPayerPartyID 67018 entity there may be one LowerBoundaryTaxPayerPartyID 67030 attribute. The UpperBoundaryTaxPayerPartyID 67034 attribute has a cardinality of 0 . . . 1 67036 meaning that for each instance of the SelectionByTaxPayerPartyID 67018 entity there may be one UpperBoundaryTaxPayerPartyID 67034 attribute.

The ProcessingConditions 67038 package includes a QueryProcessingConditions 67040 entity. The QueryProcessingConditions 67040 entity has a cardinality of 0 . . . 1 67042 meaning that for each instance of the ProcessingConditions 67038 package there may be one QueryProcessingConditions 67040 entity. The data types of the various packages, entities, and attributes are described with respect to FIG. 54.

In further detail, FIGS. 68-1 through 68-2 illustrate an example configuration of an Element Structure that includes a TaxObligationERPLevyTypeByBusinessPartnerResponseMessage_Sync 68000 package. The TaxObligationERPLevyTypeByBusinessPartnerResponseMessage_Sync 68000 package includes a TaxObligationERPLevyTypeByBusinessPartnerResponseMessage_Sync 68002 entity. The TaxObligationERPLevyTypeByBusinessPartnerResponseMessage_Sync 68000 package includes various packages, namely a MessageHeader 68004, a TaxObligation 68010, a ProcessingConditions 68040 and a Log 68046.

The MessageHeader 68004 package includes a MessageHeader 68006 entity. The MessageHeader 68006 entity has a cardinality of 1 68008 meaning that for each instance of the MessageHeader 68004 package there is one MessageHeader 68006 entity.

The TaxObligation 68010 package includes a TaxObligation 68012 entity. The TaxObligation 68012 entity has a cardinality of 0 . . . n 68014 meaning that for each instance of the TaxObligation 68010 package there may be one or more TaxObligation 68012 entities. The TaxObligation 68012 entity includes various attributes, namely a TaxObligationID 68016, a TaxPayerPartyID 68020, a LevyTypeCode 68024, a LevyTypeName 68028, a StartBillingPeriodID 68032 and a StartBillingPeriodName 68036. The TaxObligationID 68016 attribute has a cardinality of 1 68018 meaning that for each instance of the TaxObligation 68012 entity there is one TaxObligationID 68016 attribute. The TaxPayerPartyID 68020 attribute has a cardinality of 1 68022 meaning that for each instance of the TaxObligation 68012 entity there is one TaxPayerPartyID 68020 attribute. The LevyTypeCode 68024 attribute has a cardinality of 1 68026 meaning that for each instance of the TaxObligation 68012 entity there is one LevyTypeCode 68024 attribute. The LevyTypeName 68028 attribute has a cardinality of 0 . . . 1 68030 meaning that for each instance of the TaxObligation 68012 entity there may be one LevyTypeName 68028 attribute. The StartBillingPeriodID 68032 attribute has a cardinality of 1 68034 meaning that for each instance of the TaxObligation 68012 entity there is one StartBillingPeriodID 68032 attribute. The StartBillingPeriodName 68036 attribute has a cardinality of 0 . . . 1 68038 meaning that for each instance of the TaxObligation 68012 entity there may be one StartBillingPeriodName 68036 attribute.

The ProcessingConditions 68040 package includes a ResponseProcessingConditions 68042 entity. The ResponseProcessingConditions 68042 entity has a cardinality of 1 68044 meaning that for each instance of the ProcessingConditions 68040 package there is one ResponseProcessingConditions 68042 entity.

The Log 68046 package includes a Log 68048 entity. The Log 68048 entity has a cardinality of 1 68050 meaning that for each instance of the Log 68046 package there is one Log 68048 entity. The data types of the various packages, entities, and attributes are described with respect to FIG. 54.

In further detail, FIG. 69 illustrates an example configuration of an Element Structure that includes a TaxObligationERPRegistrationFormByIdQueryMessage_Sync 69000 package. The TaxObligationERPRegistrationFormByIdQueryMessage_Sync 69000 package includes a TaxObligationERPRegistrationFormByIdQueryMessage_Sync 69002 entity. The TaxObligationERPRegistrationFormByIdQueryMessage_Sync 69000 package includes various packages, namely a MessageHeader 69004 and a Selection 69010.

The MessageHeader 69004 package includes a MessageHeader 69006 entity. The MessageHeader 69006 entity has a cardinality of 1 69008 meaning that for each instance of the MessageHeader 69004 package there is one MessageHeader 69006 entity.

The Selection 69010 package includes a TaxObligationRegistrationFormSelectionById 69012 entity. The TaxObligationRegistrationFormSelectionById 69012 entity has a cardinality of 1 69014 meaning that for each instance of the Selection 69010 package there is one TaxObligationRegistrationFormSelectionById 69012 entity. The TaxObligationRegistrationFormSelectionById 69012 entity includes a TaxObligationID 69016 attribute. The TaxObligationID 69016 attribute has a cardinality of 1 69018 meaning that for each instance of the TaxObligationRegistrationFormSelectionById 69012 entity there is one TaxObligationID 69016 attribute. The data types of the various packages, entities, and attributes are described with respect to FIG. 54.

In further detail, FIGS. 70-1 through 70-3 illustrate an example configuration of an Element Structure that includes a TaxObligationERPRegistrationFormByIdResponseMessage_Sync 70000 package. The TaxObligationERPRegistrationFormByIdResponseMessage_Sync 70000 package includes a TaxObligationERPRegistrationFormByIdResponseMessage_Sync 70002 entity. The TaxObligationERPRegistrationFormByIdResponseMessage_Sync 70000 package includes various packages, namely a MessageHeader 70004, a TaxObligation 70010 and a Log 70068.

The MessageHeader 70004 package includes a MessageHeader 70006 entity. The MessageHeader 70006 entity has a cardinality of 1 70008 meaning that for each instance of the MessageHeader 70004 package there is one MessageHeader 70006 entity.

The TaxObligation 70010 package includes a TaxObligation 70012 entity. The TaxObligation 70010 package includes a RegistrationForm 70040 package.

The TaxObligation 70012 entity has a cardinality of 0 . . . 1 70014 meaning that for each instance of the TaxObligation 70010 package there may be one TaxObligation 70012 entity. The TaxObligation 70012 entity includes various attributes, namely a TaxObligationID 70016, a TaxPayerPartyID 70020, a LevyTypeCode 70024, a LevyTypeName 70028, a StartBillingPeriodID 70032 and a StartBillingPeriodName 70036. The TaxObligationID 70016 attribute has a cardinality of 1 70018 meaning that for each instance of the TaxObligation 70012 entity there is one TaxObligationID 70016 attribute. The TaxPayerPartyID 70020 attribute has a cardinality of 1 70022 meaning that for each instance of the TaxObligation 70012 entity there is one TaxPayerPartyID 70020 attribute. The LevyTypeCode 70024 attribute has a cardinality of 1 70026 meaning that for each instance of the TaxObligation 70012 entity there is one LevyTypeCode 70024 attribute. The LevyTypeName 70028 attribute has a cardinality of 0 . . . 1 70030 meaning that for each instance of the TaxObligation 70012 entity there may be one LevyTypeName 70028 attribute. The StartBillingPeriodID 70032 attribute has a cardinality of 1 70034 meaning that for each instance of the TaxObligation 70012 entity there is one StartBillingPeriodID 70032 attribute. The StartBillingPeriodName 70036 attribute has a cardinality of 0 . . . 1 70038 meaning that for each instance of the TaxObligation 70012 entity there may be one StartBillingPeriodName 70036 attribute.

The RegistrationForm 70040 package includes a RegistrationForm 70042 entity. The RegistrationForm 70040 package includes a PropertyValuation 70058 package.

The RegistrationForm 70042 entity has a cardinality of 0 . . . n 70044 meaning that for each instance of the RegistrationForm 70040 package there may be one or more RegistrationForm 70042 entities. The RegistrationForm 70042 entity includes various attributes, namely a FormTemplateID 70046, a FormVersionID 70050 and a FormStatusCode 70054. The FormTemplateID 70046 attribute has a cardinality of 1 70048 meaning that for each instance of the RegistrationForm 70042 entity there is one FormTemplateID 70046 attribute. The FormVersionID 70050 attribute has a cardinality of 1 70052 meaning that for each instance of the RegistrationForm 70042 entity there is one FormVersionID 70050 attribute. The FormStatusCode 70054 attribute has a cardinality of 0 . . . 1 70056 meaning that for each instance of the RegistrationForm 70042 entity there may be one FormStatusCode 70054 attribute.

The PropertyValuation 70058 package includes a PropertyValuation 70060 entity. The PropertyValuation 70060 entity has a cardinality of 0 . . . 1 70062 meaning that for each instance of the PropertyValuation 70058 package there may be one PropertyValuation 70060 entity. The PropertyValuation 70060 entity includes a PropertyValuation 70064 attribute. The PropertyValuation 70064 attribute has a cardinality of 0 . . . 1 70066 meaning that for each instance of the PropertyValuation 70060 entity there may be one PropertyValuation 70064 attribute.

The Log 70068 package includes a Log 70070 entity. The Log 70070 entity has a cardinality of 1 70072 meaning that for each instance of the Log 70068 package there is one Log 70070 entity. The data types of the various packages, entities, and attributes are described with respect to FIG. 54.

In further detail, FIG. 71 illustrates an example configuration of an Element Structure that includes a TaxObligationERPFilingObligationByIdQueryMessage_Sync 71000 package. The TaxObligationERPFilingObligationByIdQueryMessage_Sync 71000 package includes a TaxObligationERPFilingObligationByIdQueryMessage_Sync 71002 entity. The TaxObligationERPFilingObligationByIdQueryMessage_Sync 71000 package includes various packages, namely a MessageHeader 71004 and a Selection 71010.

The MessageHeader 71004 package includes a MessageHeader 71006 entity. The MessageHeader 71006 entity has a cardinality of 1 71008 meaning that for each instance of the MessageHeader 71004 package there is one MessageHeader 71006 entity.

The Selection 71010 package includes a TaxObligationFilingObligationById 71012 entity. The TaxObligationFilingObligationById 71012 entity has a cardinality of 1 71014 meaning that for each instance of the Selection 71010 package there is one TaxObligationFilingObligationById 71012 entity. The TaxObligationFilingObligationById 71012 entity includes a TaxObligationID 71016 attribute. The TaxObligationID 71016 attribute has a cardinality of 1 71018 meaning that for each instance of the TaxObligationFilingObligationById 71012 entity there is one TaxObligationID 71016 attribute. The data types of the various packages, entities, and attributes are described with respect to FIG. 54.

In further detail, FIGS. 72-1 through 72-5 illustrate an example configuration of an Element Structure that includes a TaxObligationERPFilingObligationByIdResponseMessage_Sync 72000 package. The TaxObligationERPFilingObligationByIdResponseMessage_Sync 72000 package includes a TaxObligationERPFilingObligationByIdResponseMessage_Sync 72002 entity. The TaxObligationERPFilingObligationByIdResponseMessage_Sync 72000 package includes various packages, namely a MessageHeader 72004, a TaxObligation 72010 and a Log 72110.

The MessageHeader 72004 package includes a MessageHeader 72006 entity. The MessageHeader 72006 entity has a cardinality of 1 72008 meaning that for each instance of the MessageHeader 72004 package there is one MessageHeader 72006 entity.

The TaxObligation 72010 package includes a TaxObligation 72012 entity. The TaxObligation 72010 package includes a FilingObligation 72036 package. The TaxObligation 72012 entity has a cardinality of 0 . . . 1 72014 meaning that for each instance of the TaxObligation 72010 package there may be one TaxObligation 72012 entity. The TaxObligation 72012 entity includes various attributes, namely a TaxObligationID 72016, a LevyTypeCode 72020, a LevyTypeName 72024, a StartBillingPeriodID 72028 and a StartBillingPeriodName 72032. The TaxObligationID 72016 attribute has a cardinality of 1 72018 meaning that for each instance of the TaxObligation 72012 entity there is one TaxObligationID 72016 attribute. The LevyTypeCode 72020 attribute has a cardinality of 1 72022 meaning that for each instance of the TaxObligation 72012 entity there is one LevyTypeCode 72020 attribute. The LevyTypeName 72024 attribute has a cardinality of 0 . . . 1 72026 meaning that for each instance of the TaxObligation 72012 entity there may be one LevyTypeName 72024 attribute. The StartBillingPeriodID 72028 attribute has a cardinality of 1 72030 meaning that for each instance of the TaxObligation 72012 entity there is one StartBillingPeriodID 72028 attribute. The StartBillingPeriodName 72032 attribute has a cardinality of 0 . . . 1 72034 meaning that for each instance of the TaxObligation 72012 entity there may be one StartBillingPeriodName 72032 attribute.

The FilingObligation 72036 package includes a FilingObligation 72038 entity. The FilingObligation 72038 entity has a cardinality of 0 . . . n 72040 meaning that for each instance of the FilingObligation 72036 package there may be one or more FilingObligation 72038 entities. The FilingObligation 72038 entity includes various attributes, namely a FilingObligationUUID 72042, an InboundCorrespondenceCategoryCode 72046, an InboundCorrespondenceCategoryName 72050, a BillingPeriodID 72054, a BillingPeriodName 72058, a BillingStartDate 72062, a CorrespondenceStatusCode 72066, a CorrespondenceStatusName 72070, an InboundCorrespondenceDueDate 72074, an InboundCorrespondenceReceivedDate 72078, an InboundCorrespondenceDeferralDate 72082, a BillingEndDate 72086, a ClearingReasonCode 72090, a ClearingReasonName 72094, an Amount 72098, a CurrencyCode 72102 and a CurrencyName 72106. The FilingObligationUUID 72042 attribute has a cardinality of 0 . . . 1 72044 meaning that for each instance of the FilingObligation 72038 entity there may be one FilingObligationUUID 72042 attribute. The InboundCorrespondenceCategoryCode 72046 attribute has a cardinality of 0 . . . 1 72048 meaning that for each instance of the FilingObligation 72038 entity there may be one InboundCorrespondenceCategoryCode 72046 attribute.

The InboundCorrespondenceCategoryName 72050 attribute has a cardinality of 0 . . . 1 72052 meaning that for each instance of the FilingObligation 72038 entity there may be one InboundCorrespondenceCategoryName 72050 attribute. The BillingPeriodID 72054 attribute has a cardinality of 0 . . . 1 72056 meaning that for each instance of the FilingObligation 72038 entity there may be one BillingPeriodID 72054 attribute. The BillingPeriodName 72058 attribute has a cardinality of 0 . . . 1 72060 meaning that for each instance of the FilingObligation 72038 entity there may be one BillingPeriodName 72058 attribute. The BillingStartDate 72062 attribute has a cardinality of 0 . . . 1 72064 meaning that for each instance of the FilingObligation 72038 entity there may be one BillingStartDate 72062 attribute. The CorrespondenceStatusCode 72066 attribute has a cardinality of 0 . . . 1 72068 meaning that for each instance of the FilingObligation 72038 entity there may be one CorrespondenceStatusCode 72066 attribute. The CorrespondenceStatusName 72070 attribute has a cardinality of 0 . . . 1 72072 meaning that for each instance of the FilingObligation 72038 entity there may be one CorrespondenceStatusName 72070 attribute. The InboundCorrespondenceDueDate 72074 attribute has a cardinality of 1 72076 meaning that for each instance of the FilingObligation 72038 entity there is one InboundCorrespondenceDueDate 72074 attribute.

The InboundCorrespondenceReceivedDate 72078 attribute has a cardinality of 0 . . . 1 72080 meaning that for each instance of the FilingObligation 72038 entity there may be one InboundCorrespondenceReceivedDate 72078 attribute. The InboundCorrespondenceDeferralDate 72082 attribute has a cardinality of 0 . . . 1 72084 meaning that for each instance of the FilingObligation 72038 entity there may be one InboundCorrespondenceDeferralDate 72082 attribute. The BillingEndDate 72086 attribute has a cardinality of 0 . . . 1 72088 meaning that for each instance of the FilingObligation 72038 entity there may be one BillingEndDate 72086 attribute. The ClearingReasonCode 72090 attribute has a cardinality of 0 . . . 1 72092 meaning that for each instance of the FilingObligation 72038 entity there may be one ClearingReasonCode 72090 attribute. The ClearingReasonName 72094 attribute has a cardinality of 0 . . . 1 72096 meaning that for each instance of the FilingObligation 72038 entity there may be one ClearingReasonName 72094 attribute. The Amount 72098 attribute has a cardinality of 1 72100 meaning that for each instance of the FilingObligation 72038 entity there is one Amount 72098 attribute. The CurrencyCode 72102 attribute has a cardinality of 1 72104 meaning that for each instance of the FilingObligation 72038 entity there is one CurrencyCode 72102 attribute. The CurrencyName 72106 attribute has a cardinality of 0 . . . 1 72108 meaning that for each instance of the FilingObligation 72038 entity there may be one CurrencyName 72106 attribute.

The Log 72110 package includes a Log 72112 entity. The Log 72112 entity has a cardinality of 1 72114 meaning that for each instance of the Log 72110 package there is one Log 72112 entity. The data types of the various packages, entities, and attributes are described with respect to FIG. 54.

In further detail, FIG. 73 illustrates an example configuration of an Element Structure that includes a TaxObligationERPByIdQueryMessage_Sync 73000 package. The TaxObligationERPByIdQueryMessage_Sync 73000 package includes a TaxObligationERPByIdQueryMessage_Sync 73002 entity. The TaxObligationERPByIdQueryMessage_Sync 73000 package includes various packages, namely a MessageHeader 73004 and a Selection 73010.

The MessageHeader 73004 package includes a MessageHeader 73006 entity. The MessageHeader 73006 entity has a cardinality of 1 73008 meaning that for each instance of the MessageHeader 73004 package there is one MessageHeader 73006 entity.

The Selection 73010 package includes a TaxObligationSelectionById 73012 entity. The TaxObligationSelectionById 73012 entity has a cardinality of 1 73014 meaning that for each instance of the Selection 73010 package there is one TaxObligationSelectionById 73012 entity. The TaxObligationSelectionById 73012 entity includes a TaxObligationID 73016 attribute. The TaxObligationID 73016 attribute has a cardinality of 1 73018 meaning that for each instance of the TaxObligationSelectionById 73012 entity there is one TaxObligationID 73016 attribute. The data types of the various packages, entities, and attributes are described with respect to FIG. 54.

In further detail, FIGS. 74-1 through 74-12 illustrate an example configuration of an Element Structure that includes a TaxObligationERPByIdResponseMessage_Sync 74000 package. The TaxObligationERPByIdResponseMessage_Sync 74000 package includes a TaxObligationERPByIdResponseMessage_Sync 74002 entity. The TaxObligationERPByIdResponseMessage_Sync 74000 package includes various packages, namely a MessageHeader 74004, a TaxObligation 74010 and a Log 74290.

The MessageHeader 74004 package includes a MessageHeader 74006 entity. The MessageHeader 74006 entity has a cardinality of 1 74008 meaning that for each instance of the MessageHeader 74004 package there is one MessageHeader 74006 entity.

The TaxObligation 74010 package includes a TaxObligation 74012 entity. The TaxObligation 74010 package includes various packages, namely a FilingObligation 74080, a FilingRule 74154, a FilingExemption 74226, an InvoicingTerms 74248 and a RegistrationForm 74262.

The TaxObligation 74012 entity has a cardinality of 0 . . . 1 74014 meaning that for each instance of the TaxObligation 74010 package there may be one TaxObligation 74012 entity. The TaxObligation 74012 entity includes various attributes, namely a TaxObligationID 74016, a TaxPayerPartyID 74020, a LevyTypeCode 74024, a LevyTypeName 74028, a ContractAccountID 74032, a RegistrationStatusCode 74036, a RegistrationStatusName 74040, a StartBillingPeriodID 74044, a StartBillingPeriodName 74048, an EndBillingPeriodID 74052, an EndBillingPeriodName 74056, a ValidityStartDate 74060, a ValidityEndDate 74064, a ContactPartyID 74068, an ElectronicFilingCode 74072 and an EmailReminderIndicator 74076. The TaxObligationID 74016 attribute has a cardinality of 1 74018 meaning that for each instance of the TaxObligation 74012 entity there is one TaxObligationID 74016 attribute. The TaxPayerPartyID 74020 attribute has a cardinality of 1 74022 meaning that for each instance of the TaxObligation 74012 entity there is one TaxPayerPartyID 74020 attribute. The LevyTypeCode 74024 attribute has a cardinality of 1 74026 meaning that for each instance of the TaxObligation 74012 entity there is one LevyTypeCode 74024 attribute.

The LevyTypeName 74028 attribute has a cardinality of 0 . . . 1 74030 meaning that for each instance of the TaxObligation 74012 entity there may be one LevyTypeName 74028 attribute. The ContractAccountID 74032 attribute has a cardinality of 1 74034 meaning that for each instance of the TaxObligation 74012 entity there is one ContractAccountID 74032 attribute. The RegistrationStatusCode 74036 attribute has a cardinality of 1 74038 meaning that for each instance of the TaxObligation 74012 entity there is one RegistrationStatusCode 74036 attribute. The RegistrationStatusName 74040 attribute has a cardinality of 0 . . . 1 74042 meaning that for each instance of the TaxObligation 74012 entity there may be one RegistrationStatusName 74040 attribute. The StartBillingPeriodID 74044 attribute has a cardinality of 1 74046 meaning that for each instance of the TaxObligation 74012 entity there is one StartBillingPeriodID 74044 attribute. The StartBillingPeriodName 74048 attribute has a cardinality of 0 . . . 1 74050 meaning that for each instance of the TaxObligation 74012 entity there may be one StartBillingPeriodName 74048 attribute. The EndBillingPeriodID 74052 attribute has a cardinality of 0 . . . 1 74054 meaning that for each instance of the TaxObligation 74012 entity there may be one EndBillingPeriodID 74052 attribute.

The EndBillingPeriodName 74056 attribute has a cardinality of 0 . . . 1 74058 meaning that for each instance of the TaxObligation 74012 entity there may be one EndBillingPeriodName 74056 attribute. The ValidityStartDate 74060 attribute has a cardinality of 0 . . . 1 74062 meaning that for each instance of the TaxObligation 74012 entity there may be one ValidityStartDate 74060 attribute. The ValidityEndDate 74064 attribute has a cardinality of 0 . . . 1 74066 meaning that for each instance of the TaxObligation 74012 entity there may be one ValidityEndDate 74064 attribute. The ContactPartyID 74068 attribute has a cardinality of 0 . . . n 74070 meaning that for each instance of the TaxObligation 74012 entity there may be one or more ContactPartyID 74068 attributes. The ElectronicFilingCode 74072 attribute has a cardinality of 0 . . . 1 74074 meaning that for each instance of the TaxObligation 74012 entity there may be one ElectronicFilingCode 74072 attribute. The EmailReminderIndicator 74076 attribute has a cardinality of 1 74078 meaning that for each instance of the TaxObligation 74012 entity there is one EmailReminderIndicator 74076 attribute.

The FilingObligation 74080 package includes a FilingObligation 74082 entity. The FilingObligation 74082 entity has a cardinality of 0 . . . n 74084 meaning that for each instance of the FilingObligation 74080 package there may be one or more FilingObligation 74082 entities. The FilingObligation 74082 entity includes various attributes, namely a FilingObligationUUID 74086, an InboundCorrespondenceCategoryCode 74090, an InboundCorrespondenceCategoryName 74094, a BillingPeriodID 74098, a BillingPeriodName 74102, a BillingStartDate 74106, a CorrespondenceStatusCode 74110, a CorrespondenceStatusName 74114, an InboundCorrespondenceDueDate 74118, an InboundCorrespondenceReceivedDate 74122, an InboundCorrespondenceDeferralDate 74126, a BillingEndDate 74130, a ClearingReasonCode 74134, a ClearingReasonName 74138, an Amount 74142, a CurrencyCode 74146 and a CurrencyName 74150. The FilingObligationUUID 74086 attribute has a cardinality of 1 74088 meaning that for each instance of the FilingObligation 74082 entity there is one FilingObligationUUID 74086 attribute. The InboundCorrespondenceCategoryCode 74090 attribute has a cardinality of 1 74092 meaning that for each instance of the FilingObligation 74082 entity there is one InboundCorrespondenceCategoryCode 74090 attribute.

The InboundCorrespondenceCategoryName 74094 attribute has a cardinality of 0 . . . 1 74096 meaning that for each instance of the FilingObligation 74082 entity there may be one InboundCorrespondenceCategoryName 74094 attribute. The BillingPeriodID 74098 attribute has a cardinality of 1 74100 meaning that for each instance of the FilingObligation 74082 entity there is one BillingPeriodID 74098 attribute. The BillingPeriodName 74102 attribute has a cardinality of 0 . . . 1 74104 meaning that for each instance of the FilingObligation 74082 entity there may be one BillingPeriodName 74102 attribute. The BillingStartDate 74106 attribute has a cardinality of 1 74108 meaning that for each instance of the FilingObligation 74082 entity there is one BillingStartDate 74106 attribute. The CorrespondenceStatusCode 74110 attribute has a cardinality of 0 . . . 1 74112 meaning that for each instance of the FilingObligation 74082 entity there may be one CorrespondenceStatusCode 74110 attribute. The CorrespondenceStatusName 74114 attribute has a cardinality of 0 . . . 1 74116 meaning that for each instance of the FilingObligation 74082 entity there may be one CorrespondenceStatusName 74114 attribute. The InboundCorrespondenceDueDate 74118 attribute has a cardinality of 1 74120 meaning that for each instance of the FilingObligation 74082 entity there is one InboundCorrespondenceDueDate 74118 attribute.

The InboundCorrespondenceReceivedDate 74122 attribute has a cardinality of 0 . . . 1 74124 meaning that for each instance of the FilingObligation 74082 entity there may be one InboundCorrespondenceReceivedDate 74122 attribute. The InboundCorrespondenceDeferralDate 74126 attribute has a cardinality of 0 . . . 1 74128 meaning that for each instance of the FilingObligation 74082 entity there may be one InboundCorrespondenceDeferralDate 74126 attribute. The BillingEndDate 74130 attribute has a cardinality of 1 74132 meaning that for each instance of the FilingObligation 74082 entity there is one BillingEndDate 74130 attribute. The ClearingReasonCode 74134 attribute has a cardinality of 0 . . . 1 74136 meaning that for each instance of the FilingObligation 74082 entity there may be one ClearingReasonCode 74134 attribute. The ClearingReasonName 74138 attribute has a cardinality of 0 . . . 1 74140 meaning that for each instance of the FilingObligation 74082 entity there may be one ClearingReasonName 74138 attribute. The Amount 74142 attribute has a cardinality of 0 . . . 1 74144 meaning that for each instance of the FilingObligation 74082 entity there may be one Amount 74142 attribute. The CurrencyCode 74146 attribute has a cardinality of 0 . . . 1 74148 meaning that for each instance of the FilingObligation 74082 entity there may be one CurrencyCode 74146 attribute. The CurrencyName 74150 attribute has a cardinality of 0 . . . 1 74152 meaning that for each instance of the FilingObligation 74082 entity there may be one CurrencyName 74150 attribute.

The FilingRule 74154 package includes a FilingRule 74156 entity. The FilingRule 74154 package includes a Periodicity 74176 package.

The FilingRule 74156 entity has a cardinality of 0 . . . n 74158 meaning that for each instance of the FilingRule 74154 package there may be one or more FilingRule 74156 entities.

The FilingRule 74156 entity includes various attributes, namely an InboundCorrespondenceCategoryCode 74160, an InboundCorrespondenceFirstBillingPeriodID 74164, a GenerationMode 74168 and an InboundCorrespondenceLastBillingPeriodID 74172. The InboundCorrespondenceCategoryCode 74160 attribute has a cardinality of 1 74162 meaning that for each instance of the FilingRule 74156 entity there is one InboundCorrespondenceCategoryCode 74160 attribute. The InboundCorrespondenceFirstBillingPeriodID 74164 attribute has a cardinality of 1 74166 meaning that for each instance of the FilingRule 74156 entity there is one InboundCorrespondenceFirstBillingPeriodID 74164 attribute. The GenerationMode 74168 attribute has a cardinality of 1 74170 meaning that for each instance of the FilingRule 74156 entity there is one GenerationMode 74168 attribute. The InboundCorrespondenceLastBillingPeriodID 74172 attribute has a cardinality of 0 . . . 1 74174 meaning that for each instance of the FilingRule 74156 entity there may be one InboundCorrespondenceLastBillingPeriodID 74172 attribute.

The Periodicity 74176 package includes various entities, namely a DeviatingPeriod 74178 and a StandardPeriod 74202. The DeviatingPeriod 74178 entity has a cardinality of 0 . . . n 74180 meaning that for each instance of the Periodicity 74176 package there may be one or more DeviatingPeriod 74178 entities. The DeviatingPeriod 74178 entity includes various attributes, namely a StartDate 74182, an EndDate 74186, a DueDate 74190, a BillingPeriodID 74194 and a BillingPeriodName 74198. The StartDate 74182 attribute has a cardinality of 1 74184 meaning that for each instance of the DeviatingPeriod 74178 entity there is one StartDate 74182 attribute. The EndDate 74186 attribute has a cardinality of 1 74188 meaning that for each instance of the DeviatingPeriod 74178 entity there is one EndDate 74186 attribute. The DueDate 74190 attribute has a cardinality of 0 . . . 1 74192 meaning that for each instance of the DeviatingPeriod 74178 entity there may be one DueDate 74190 attribute. The BillingPeriodID 74194 attribute has a cardinality of 1 74196 meaning that for each instance of the DeviatingPeriod 74178 entity there is one BillingPeriodID 74194 attribute. The BillingPeriodName 74198 attribute has a cardinality of 0 . . . 1 74200 meaning that for each instance of the DeviatingPeriod 74178 entity there may be one BillingPeriodName 74198 attribute.

The StandardPeriod 74202 entity has a cardinality of 1 . . . n 74204 meaning that for each instance of the Periodicity 74176 package there are one or more StandardPeriod 74202 entities. The StandardPeriod 74202 entity includes various attributes, namely a StartDate 74206, an EndDate 74210, a DueDate 74214, a BillingPeriodID 74218 and a BillingPeriodName 74222. The StartDate 74206 attribute has a cardinality of 1 74208 meaning that for each instance of the StandardPeriod 74202 entity there is one StartDate 74206 attribute. The EndDate 74210 attribute has a cardinality of 1 74212 meaning that for each instance of the StandardPeriod 74202 entity there is one EndDate 74210 attribute. The DueDate 74214 attribute has a cardinality of 0 . . . 1 74216 meaning that for each instance of the StandardPeriod 74202 entity there may be one DueDate 74214 attribute. The BillingPeriodID 74218 attribute has a cardinality of 1 74220 meaning that for each instance of the StandardPeriod 74202 entity there is one BillingPeriodID 74218 attribute. The BillingPeriodName 74222 attribute has a cardinality of 0 . . . 1 74224 meaning that for each instance of the StandardPeriod 74202 entity there may be one BillingPeriodName 74222 attribute.

The FilingExemption 74226 package includes a FilingExemption 74228 entity. The FilingExemption 74228 entity has a cardinality of 0 . . . n 74230 meaning that for each instance of the FilingExemption 74226 package there may be one or more FilingExemption 74228 entities. The FilingExemption 74228 entity includes various attributes, namely a StartDay 74232, a StartMonth 74236, an EndDay 74240 and an EndMonth 74244. The StartDay 74232 attribute has a cardinality of 1 74234 meaning that for each instance of the FilingExemption 74228 entity there is one StartDay 74232 attribute. The StartMonth 74236 attribute has a cardinality of 1 74238 meaning that for each instance of the FilingExemption 74228 entity there is one StartMonth 74236 attribute. The EndDay 74240 attribute has a cardinality of 1 74242 meaning that for each instance of the FilingExemption 74228 entity there is one EndDay 74240 attribute. The EndMonth 74244 attribute has a cardinality of 1 74246 meaning that for each instance of the FilingExemption 74228 entity there is one EndMonth 74244 attribute.

The InvoicingTerms 74248 package includes an InvoicingTerms 74250 entity. The InvoicingTerms 74250 entity has a cardinality of 1 74252 meaning that for each instance of the InvoicingTerms 74248 package there is one InvoicingTerms 74250 entity. The InvoicingTerms 74250 entity includes various attributes, namely a ContractAccountContractReferenceID 74254 and a ChargePercent 74258. The ContractAccountContractReferenceID 74254 attribute has a cardinality of 0 . . . 1 74256 meaning that for each instance of the InvoicingTerms 74250 entity there may be one ContractAccountContractReferenceID 74254 attribute. The ChargePercent 74258 attribute has a cardinality of 1 74260 meaning that for each instance of the InvoicingTerms 74250 entity there is one ChargePercent 74258 attribute.

The RegistrationForm 74262 package includes a RegistrationForm 74264 entity. The RegistrationForm 74262 package includes a PropertyValuation 74280 package. The RegistrationForm 74264 entity has a cardinality of 0 . . . n 74266 meaning that for each instance of the RegistrationForm 74262 package there may be one or more RegistrationForm 74264 entities. The RegistrationForm 74264 entity includes various attributes, namely a FormTemplateID 74268, a FormVersionID 74272 and a FormStatus 74276. The FormTemplateID 74268 attribute has a cardinality of 1 74270 meaning that for each instance of the RegistrationForm 74264 entity there is one FormTemplateID 74268 attribute. The FormVersionID 74272 attribute has a cardinality of 1 74274 meaning that for each instance of the RegistrationForm 74264 entity there is one FormVersionID 74272 attribute. The FormStatus 74276 attribute has a cardinality of 0 . . . 1 74278 meaning that for each instance of the RegistrationForm 74264 entity there may be one FormStatus 74276 attribute.

The PropertyValuation 74280 package includes a PropertyValuation 74282 entity. The PropertyValuation 74282 entity has a cardinality of 1 . . . n 74284 meaning that for each instance of the PropertyValuation 74280 package there are one or more PropertyValuation 74282 entities. The PropertyValuation 74282 entity includes a PropertyValuation 74286 attribute. The PropertyValuation 74286 attribute has a cardinality of 0 . . . 1 74288 meaning that for each instance of the PropertyValuation 74282 entity there may be one PropertyValuation 74286 attribute.

The Log 74290 package includes a Log 74292 entity. The Log 74292 entity has a cardinality of 1 74294 meaning that for each instance of the Log 74290 package there is one Log 74292 entity. The data types of the various packages, entities, and attributes are described with respect to FIG. 54.

TaxReturn Interfaces

A tax return includes a person's, company's or organization's tax details, which taxpayers, or their legal representatives may complete and send to a tax authority. Tax returns are generally prepared using forms prescribed by a tax authority.

The TaxReturn interface performs various operations, namely a TaxReturnERPByBusinessPartnerQueryResponse_In, a TaxReturnERPByIdQueryResponse_In, a TaxReturnERPCreateRequestConfirmation_In, a TaxReturnERPValidateRequestConfirmation_In, and a TaxReturnERPChangeRequestConfirmation_In.

The TaxReturnERPByBusinessPartnerQueryResponse_In operation can find incoming tax returns by revenue type and tax assessment periods. The TaxReturnERPByBusinessPartnerQueryResponse_In operation includes various message types, namely a TaxReturnERPByBusinessPartnerQuery_sync and a TaxReturnERPByBusinessPartnerResponse_sync. The structure of the TaxReturnERPByBusinessPartnerQuery_sync message type is specified by a TaxReturnERPByBusinessPartnerQueryMessage_sync message data type. The structure of the TaxReturnERPByBusinessPartnerResponse_sync message type is specified by a TaxReturnERPByBusinessPartnerResponseMessage_sync message data type.

The TaxReturnERPByIdQueryResponse_In operation can read incoming tax returns. The TaxReturnERPByIdQueryResponse_In operation includes various message types, namely a TaxReturnERPByIdQuery_sync and a TaxReturnERPByIdResponse_sync. The structure of the TaxReturnERPByIdQuery_sync message type is specified by a TaxReturnERPByIdQueryMessage_sync message data type. The structure of the TaxReturnERPByIdResponse_sync message type is specified by a TaxReturnERPByIdResponseMessage_sync message data type.

The TaxReturnERPCreateRequestConfirmation_In operation can create tax return. The TaxReturnERPCreateRequestConfirmation_In operation includes various message types, namely a TaxReturnERPCreateRequest_sync and a TaxReturnERPCreateConfirmation_sync. The structure of the TaxReturnERPCreateRequest_sync message type is specified by a TaxReturnERPCreateRequestMessage_sync message data type. The structure of the TaxReturnERPCreateConfirmation_sync message type is specified by a TaxReturnERPCreateConfirmationMessage_sync message data type.

The TaxReturnERPValidateRequestConfirmation_In operation can check if the data on the incoming tax declaration is valid and/or consistent. The TaxReturnERPValidateRequestConfirmation_In operation includes various message types, namely a TaxReturnERPRequestConfirmation_sync and a TaxReturnERPRequestConfirmation_sync. The structure of the TaxReturnERPRequestConfirmation_sync message type is specified by a TaxReturnERPValidateRequestMessage_sync message data type. The structure of the TaxReturnERPRequestConfirmation_sync message type is specified by a TaxReturnERPValidateConfirmationMessage_sync message data type.

The TaxReturnERPChangeRequestConfirmation_In operation can change on or more tax returns. The TaxReturnERPChangeRequestConfirmation_In operation includes various message types, namely a TaxReturnERPChangeRequest_sync and a TaxReturnERPChangeConfirmation_sync. The structure of the TaxReturnERPChangeRequest_sync message type is specified by a TaxReturnERPChangeRequestMessage_sync message data type. The structure of the TaxReturnERPChangeConfirmation_sync message type is specified by a TaxReturnERPChangeConfirmationMessage_sync message data type.

Figure 75:
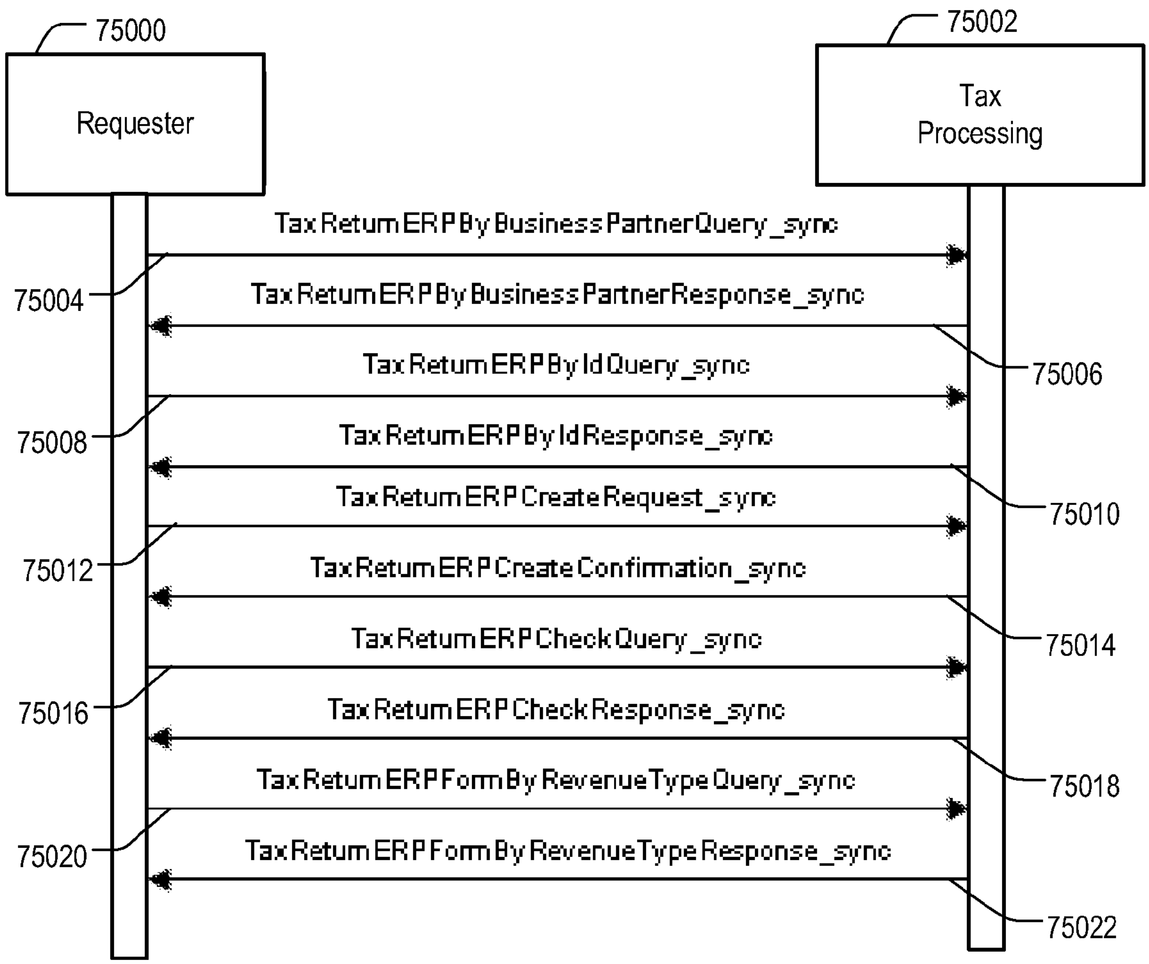
FIG. 75 illustrates an exemplary TaxReturn Message Choreography.

The message choreography of FIG. 75 describes a possible logical sequence of messages that can be used to realize a Tax Return business scenario. A "Requester" system 75000 can query tax return ERP information by business partner from a "Tax Processing" system 75002 using a TaxReturnERPByBusinessPartnerQuery_sync message 75004 as shown, for example, in FIG. 75. The "Tax Processing" system 75002 can respond to the query using a TaxReturnERPByBusinessPartnerResponse_sync 75006 as shown, for example, in FIG. 75.

The "Requester" system 75000 can query tax return ERP information by ID in the "Tax Processing" system 75002 using a TaxReturnERPByIDQuery_sync message 75008 as shown, for example, in FIG. 75. The "Tax Processing" system 75002 can respond to the query using a TaxReturnERPByIDResponse_sync 75010 as shown, for example, in FIG. 75.

The "Requester" system 75000 can request to create tax return ERP information in the "Tax Processing" system 75002 using a TaxReturnERPCreateRequest_sync message 75012 as shown, for example, in FIG. 75. The "Tax Processing" system 75002 can confirm the request using a TaxReturnERPCreateConfirmation_sync 75014 as shown, for example, in FIG. 75.

The "Requester" system 75000 can query tax return ERP check information in the "Tax Processing" system 75002 using a TaxReturnERPCheckQuery_sync message 75016 as shown, for example, in FIG. 75. The "Tax Processing" system 75002 can confirm the query using a TaxReturnERPCheckResponse_sync 75018 as shown, for example, in FIG. 75.

The "Requester" system 75000 can query tax return ERP forms information by revenue type in the "Tax Processing" system 75002 using a TaxReturnERPFormsByRevenueTypeQuery_sync message 75020 as shown, for example, in FIG. 75. The "Tax Processing" system 75002 can confirm the query using a TaxReturnERPFormsByRevenueTypeResponse_sync 75022 as shown, for example, in FIG. 75.

FIGS. 76-1 through 76-12 illustrate one example logical configuration of TaxReturnERPMessage_Sync element structure 76000. Specifically, these figures depict the arrangement and hierarchy of various components such as one or more levels of packages, entities, and datatypes, shown here as 76000 through 76282. As described above, packages may be used to represent hierarchy levels. Entities are discrete business elements that are used during a business transaction. Data types are used to type object entities and interfaces with a structure. For example, TaxReturnERPMessage_Sync element structure 76000 includes, among other things, MessageHeader 76006. Accordingly, heterogeneous applications may communicate using this consistent message configured as such.

Additionally, FIGS. 77-1 through 77-9 illustrate one example logical configuration of TaxReturnERPByBusinessPartnerQueryMessage_Sync element structure 77000. Specifically, these figures depict the arrangement and hierarchy of various components such as one or more levels of packages, entities, and datatypes, shown here as 77000 through 77222. As described above, packages may be used to represent hierarchy levels. Entities are discrete business elements that are used during a business transaction. Data types are used to type object entities and interfaces with a structure. For example, TaxReturnERPByBusinessPartnerQueryMessage_Sync element structure 77000 includes, among other things, MessageHeader 77006. Accordingly, heterogeneous applications may communicate using this consistent message configured as such.

Additionally, FIGS. 78-1 through 78-3 illustrate one example logical configuration of TaxReturnERPByBusinessPartnerResponseMessage_Sync element structure 78000. Specifically, these figures depict the arrangement and hierarchy of various components such as one or more levels of packages, entities, and datatypes, shown here as 78000 through 78078. As described above, packages may be used to represent hierarchy levels. Entities are discrete business elements that are used during a business transaction. Data types are used to type object entities and interfaces with a structure. For example, TaxReturnERPByBusinessPartnerResponseMessage_Sync element structure 78000 includes, among other things, MessageHeader 78006. Accordingly, heterogeneous applications may communicate using this consistent message configured as such.

Additionally, FIG. 79 illustrates one example logical configuration of TaxReturnERPByIdQueryMessage_Sync element structure 79000. Specifically, this figure depicts the arrangement and hierarchy of various components such as one or more levels of packages, entities, and datatypes, shown here as 79000 through 79018. As described above, packages may be used to represent hierarchy levels. Entities are discrete business elements that are used during a business transaction. Data types are used to type object entities and interfaces with a structure. For example, TaxReturnERPByIdQueryMessage_Sync element structure 79000 includes, among other things, MessageHeader 79006. Accordingly, heterogeneous applications may communicate using this consistent message configured as such.

Additionally, FIGS. 80-1 through 80-10 illustrate one example logical configuration of TaxReturnERPByIdResponseMessage_Sync element structure 80000. Specifically, these figures depict the arrangement and hierarchy of various components such as one or more levels of packages, entities, and datatypes, shown here as 80000 through 80248. As described above, packages may be used to represent hierarchy levels. Entities are discrete business elements that are used during a business transaction. Data types are used to type object entities and interfaces with a structure. For example, TaxReturnERPByIdResponseMessage_Sync element structure 80000 includes, among other things, MessageHeader 80006. Accordingly, heterogeneous applications may communicate using this consistent message configured as such.

Additionally, FIGS. 81-1 through 81-4 illustrate one example logical configuration of TaxReturnERPCreateRequestMessage_Sync element structure 81000. Specifically, these figures depict the arrangement and hierarchy of various components such as one or more levels of packages, entities, and datatypes, shown here as 81000 through 81092. As described above, packages may be used to represent hierarchy levels. Entities are discrete business elements that are used during a business transaction. Data types are used to type object entities and interfaces with a structure. For example, TaxReturnERPCreateRequestMessage_Sync element structure 81000 includes, among other things, MessageHeader 81006. Accordingly, heterogeneous applications may communicate using this consistent message configured as such.

Additionally, FIGS. 82-1 through 82-10 illustrate one example logical configuration of TaxReturnERPCreateConfirmationMessage_Sync element structure 82000. Specifically, these figures depict the arrangement and hierarchy of various components such as one or more levels of packages, entities, and datatypes, shown here as 82000 through 82254. As described above, packages may be used to represent hierarchy levels. Entities are discrete business elements that are used during a business transaction. Data types are used to type object entities and interfaces with a structure. For example, TaxReturnERPCreateConfirmationMessage_Sync element structure 82000 includes, among other things, MessageHeader 82006. Accordingly, heterogeneous applications may communicate using this consistent message configured as such.

Additionally, FIGS. 83-1 through 83-3 illustrate one example logical configuration of TaxReturnERPValidateRequestMessage_Sync element structure 83000. Specifically, these figures depict the arrangement and hierarchy of various components such as one or more levels of packages, entities, and datatypes, shown here as 83000 through 83092. As described above, packages may be used to represent hierarchy levels. Entities are discrete business elements that are used during a business transaction. Data types are used to type object entities and interfaces with a structure. For example, TaxReturnERPValidateRequestMessage_Sync element structure 83000 includes, among other things, MessageHeader 83006. Accordingly, heterogeneous applications may communicate using this consistent message configured as such.

Additionally, FIGS. 84-1 through 84-10 illustrate one example logical configuration of TaxReturnERPValidateConfirmationMessage_Sync element structure 84000. Specifically, these figures depict the arrangement and hierarchy of various components such as one or more levels of packages, entities, and datatypes, shown here as 84000 through 84260. As described above, packages may be used to represent hierarchy levels. Entities are discrete business elements that are used during a business transaction. Data types are used to type object entities and interfaces with a structure. For example, TaxReturnERPValidateConfirmationMessage_Sync element structure 84000 includes, among other things, TaxReturn 84006. Accordingly, heterogeneous applications may communicate using this consistent message configured as such.

Additionally, FIGS. 85-1 through 85-4 illustrate one example logical configuration of TaxReturnERPChangeRequestMessage_Sync element structure 85000. Specifically, these figures depict the arrangement and hierarchy of various components such as one or more levels of packages, entities, and datatypes, shown here as 85000 through 85108. As described above, packages may be used to represent hierarchy levels. Entities are discrete business elements that are used during a business transaction. Data types are used to type object entities and interfaces with a structure. For example, TaxReturnERPChangeRequestMessage_Sync element structure 85000 includes, among other things, MessageHeader 85006. Accordingly, heterogeneous applications may communicate using this consistent message configured as such.

Additionally, FIGS. 86-1 through 86-10 illustrate one example logical configuration of TaxReturnERPChangeConfirmationMessage_Sync element structure 86000. Specifically, these figures depict the arrangement and hierarchy of various components such as one or more levels of packages, entities, and datatypes, shown here as 86000 through 86254. As described above, packages may be used to represent hierarchy levels. Entities are discrete business elements that are used during a business transaction. Data types are used to type object entities and interfaces with a structure. For example, TaxReturnERPChangeConfirmationMessage_Sync element structure 86000 includes, among other things, MessageHeader 86006. Accordingly, heterogeneous applications may communicate using this consistent message configured as such.

In further detail, FIGS. 76-1 through 76-12 illustrate an example configuration of an Element Structure that includes a TaxReturnERPMessage_Sync 76000 package. The TaxReturnERPMessage_Sync 76000 package is a TxRtrnERPMsg

76004 data type. The TaxReturnERPMessage_Sync 76000 package includes a TaxReturnERPMessage_Sync 76002 entity. The TaxReturnERPMessage_Sync 76000 package includes various packages, namely a MessageHeader 76006, a TaxReturn 76012, a ProcessingConditions 76268 and a Log 76278.

The MessageHeader 76006 package is a BasicBusinessDocumentMessageHeader 76010 data type. The MessageHeader 76006 package includes a MessageHeader 76008 entity.

The TaxReturn 76012 package is a TxRtrn 76016 data type. The TaxReturn 76012 package includes a TaxReturn 76014 entity. The TaxReturn 76012 package includes various packages, namely a Form 76098, a TaxPayer 76146, a TaxPreparer 76188 and a JointFiler 76230.

The TaxReturn 76014 entity includes various attributes, namely an @formListCompleteTransmissionIndicator 76018, a TaxReturnID 76022, a LevyTypeCode 76026, a LevyTypeCodeName 76030, a ContractAccountID 76034, a PeriodAssignmentCode 76038, a PeriodAssignmentCodeName 76042, a TaxObligationID 76046, a TaxAmount 76050, an InterestAmount 76054, an AdditionalReceivablesAmount 76058 and a DraftIndicator 76094. The TaxReturn 76014 entity includes various subordinate entities, namely a SystemStatus 76062 and a UserStatus 76084. The @formListCompleteTransmissionIndicator 76018 attribute is an Indicator 76020 data type. The TaxReturnID 76022 attribute is an Identifier 76024 data type. TaxReturnID is a technical key of a carrying object.

The LevyTypeCode 76026 attribute is a Code 76028 data type. Code is a character string of letters, numbers, special characters (except escape sequences), and symbols. Code represents a definitive value, a method, or a property description in an abbreviated or language-independent form. The LevyTypeCodeName 76030 attribute is a MEDIUM_Name 76032 data type. The ContractAccountID 76034 attribute is a ContractAccountID 76036 data type. A ContractAccountID is a unique identifier for a contract account. The PeriodAssignmentCode 76038 attribute is a Code 76040 data type. A code is a character string of letters, numbers, special characters (except escape sequences), and symbols. A code represents a definitive value, a method, or a property description in an abbreviated or language-independent form. PeriodAssignmentCode is a key for period assignment.

The PeriodAssignmentCodeName 76042 attribute is a MEDIUM_Name 76044 data type. MEDIUM_Description is a restriction on GDT Description to specify a uniform length for descriptions of medium length. MEDIUM_Description contains the variable "MEDIUM_", which gets replaced by one or more qualifiers. The TaxObligationID 76046 attribute is an Identifier 76048 data type. The TaxAmount 76050 attribute is an Amount 76052 data type. The InterestAmount 76054 attribute is an Amount 76056 data type. The AdditionalReceivablesAmount 76058 attribute is an Amount 76060 data type. The DraftIndicator 76094 attribute is an Indicator 76096 data type. The SystemStatus 76062 entity includes various attributes, namely a Code 76064, a CodeName 76068, an InactiveIndicator 76072, a ChangeTimePoint 76076 and a ProcessorPartyInternalID 76080.

The Code 76064 attribute is a Code 76066 data type. The CodeName 76068 attribute is a MEDIUM_Name 76070 data type. The InactiveIndicator 76072 attribute is an Indicator 76074 data type. The ChangeTimePoint 76076 attribute is a LOCALOFFSET_DateTime 76078 data type. The ProcessorPartyInternalID 76080 attribute is a PartyInternalID 76082 data type. The UserStatus 76084 entity includes various attributes, namely a Code 76086 and a Name 76090. The Code 76086 attribute is a Code 76088 data type. The Name 76090 attribute is a MEDIUM_Name 76092 data type. The Form 76098 package is a TxRtrnForm 76102 data type. The Form 76098 package includes a Form 76100 entity. The Form 76098 package includes a PropertyValuation 76136 package.

The Form 76100 entity includes various attributes, namely an @propertyGroupListCompleteTransmissionIndicator 76104, an @actionCode 76108, a FormUUID 76112, a VersionID 76116, a FormTemplateID 76120, a FormTemplateName 76124, a FormTypeCode 76128 and a FormTypeCodeName 76132. The @propertyGroupListCompleteTransmissionIndicator 76104 attribute is an Indicator 76106 data type. The @actionCode 76108 attribute is an ActionCode 76110 data type. The FormUUID 76112 attribute is an UUID 76114 data type. The VersionID 76116 attribute is a VersionID 76118 data type. The FormTemplateID 76120 attribute is an InternalServiceRequestTemplateID 76122 data type. InternalServiceRequestTemplateID is a unique identifier for an internal service request template.

The FormTemplateName 76124 attribute is a MEDIUM_Name 76126 data type. MEDIUM_Description is a restriction on GDT Description to specify a uniform length for descriptions of medium length. MEDIUM_Description includes the variable "MEDIUM_", which gets replaced by one (or more) qualifier. The FormTypeCode 76128 attribute is a Code 76130 data type. A Code is a character string of letters, numbers, special characters (except escape sequences), and symbols. A Code represents a definitive value, a method, or a property description in an abbreviated or language-independent form. FormTypeCode is a code for a form type. One form may be assigned to multiple form types.

The FormTypeCodeName 76132 attribute is a MEDIUM_Name 76134 data type. MEDIUM_Description is a restriction on GDT Description to specify a uniform length for descriptions of medium length. MEDIUM_Description includes the variable "MEDIUM_", which gets replaced by one or more qualifiers. The PropertyValuation 76136 package is a TxRtmFormPrptyValn 76140 data type. The PropertyValuation 76136 package includes a PropertyValuation 76138 entity. The PropertyValuation 76138 entity includes a PropertyValuation 76142 attribute.

The PropertyValuation 76142 attribute is a PropertyValuation 76144 data type. PropertyValuation is an assignment of one or more values to a simple or complex property. The TaxPayer 76146 package is a TxRtrnTxPyr 76150 data type. The TaxPayer 76146 package includes a TaxPayer 76148 entity. The TaxPayer 76148 entity includes a TaxPayerPartyID 76152 attribute. The TaxPayer 76148 entity includes an Identification 76156 subordinate entity. The TaxPayerPartyID 76152 attribute is a PartyInternalID 76154 data type.

The Identification 76156 entity includes various attributes, namely a PartyIdentifierTypeCode 76160, a PartyIdentifierID 76164, an IdentifierIssuingAgencyName 76168, an EntryDate 76172, an AreaOfValidityCountryCode 76176, an AreaOfValidityRegionCode 76180 and a ValidityPeriod 76184. The PartyIdentifierTypeCode 76160 attribute is a PartyIdentifierTypeCode 76162 data type. The PartyIdentifierID 76164 attribute is a PartyID 76166 data type. The IdentifierIssuingAgencyName 76168 attribute is a LANGUAGE-INDEPENDENT_MEDIUM Name 76170 data type. The EntryDate 76172 attribute is a Date 76174 data type. The AreaOfValidityCountryCode 76176 attribute is a CountryCode 76178 data type. The AreaOfValidityRegionCode 76180 attribute is a RegionCode 76182 data type.

The ValidityPeriod 76184 attribute is a CLOSED_DatePeriod 76186 data type. The TaxPreparer 76188 package is a TxRtrnTxPrpr 76192 data type. The TaxPreparer 76188 package includes a TaxPreparer 76190 entity. The TaxPreparer 76190 entity includes a TaxPreparerPartyID 76194 attribute. The TaxPreparer 76190 entity includes an Identification 76198 subordinate entity. The TaxPreparerPartyID 76194 attribute is a PartyInternalID 76196 data type. The Identification 76198 entity includes various attributes, namely a PartyIdentifierTypeCode 76202, a PartyIdentifierID 76206, an IdentifierIssuingAgencyName 76210, an EntryDate 76214, an AreaOfValidityCountryCode 76218, an AreaOfValidityRegionCode 76222 and a ValidityPeriod 76226.

The PartyIdentifierTypeCode 76202 attribute is a PartyIdentifierTypeCode 76204 data type. The PartyIdentifierID 76206 attribute is a PartyID 76208 data type. The IdentifierIssuingAgencyName 76210 attribute is a LANGUAGEINDEPENDENT_MEDIUM_Name 76212 data type. The EntryDate 76214 attribute is a Date 76216 data type. The AreaOfValidityCountryCode 76218 attribute is a CountryCode 76220 data type. The AreaOfValidityRegionCode 76222 attribute is a RegionCode 76224 data type. The ValidityPeriod 76226 attribute is a CLOSED_DatePeriod 76228 data type. The JointFiler 76230 package includes a JointFiler 76232 entity. The JointFiler 76232 entity includes a JointFilerPartyID 76234 attribute. The JointFiler 76232 entity includes an Identification 76238 subordinate entity. The JointFilerPartyID 76234 attribute is a PartyInternalID 76236 data type. A BusinessPartnerInternalID is a unique, proprietary identifier for a business partner.

The Identification 76238 entity includes various attributes, namely a PartyIdentifierTypeCode 76240, a PartyIdentifierID 76244, an IdentifierIssuingAgencyName 76248, an EntryDate 76252, an AreaOfValidityCountryCode 76256, an AreaOfValidityRegionCode 76260 and a ValidityPeriod 76264. The PartyIdentifierTypeCode 76240 attribute is a PartyIdentifierTypeCode 76242 data type. The PartyIdentifierID 76244 attribute is a PartyID 76246 data type. The IdentifierIssuingAgencyName 76248 attribute is a LANGUAGEINDEPENDENT_MEDIUM Name 76250 data type. The EntryDate 76252 attribute is a Date 76254 data type. The AreaOfValidityCountryCode 76256 attribute is a CountryCode 76258 data type. The AreaOfValidityRegionCode 76260 attribute is a RegionCode 76262 data type. The ValidityPeriod 76264 attribute is a CLOSED_DatePeriod 76266 data type.

The ProcessingConditions 76268 package is a QueryProcessingConditions 76272 data type. The ProcessingConditions 76268 package includes various entities, namely a QueryProcessingConditions 76270 and a ResponseProcessingConditions 76274.

The Log 76278 package is a Log 76282 data type. The Log 76278 package includes a Log 76280 entity.

In further detail, FIGS. 77-1 through 77-9 illustrate an example configuration of an Element Structure that includes a TaxReturnERPByBusinessPartnerQueryMessage_Sync 77000 package. The TaxReturnERPByBusinessPartnerQueryMessage_Sync 77000 package includes a TaxReturnERPByBusinessPartnerQueryMessage_Sync 77002 entity. The TaxReturnERPByBusinessPartnerQueryMessage_Sync 77000 package includes various packages, namely a MessageHeader 77004, a Selection 77010 and a ProcessingConditions 77218.

The MessageHeader 77004 package includes a MessageHeader 77006 entity. The MessageHeader 77006 entity has a cardinality of 1 77008 meaning that for each instance of the MessageHeader 77004 package there is one MessageHeader 77006 entity.

The Selection 77010 package includes a TaxReturnSelectionByBusinessPartnerID 77012 entity. The Selection 77010 package includes various packages, namely a SelectionByTaxPayerPartyID 77016, a SelectionByTaxPayerPartyIdentifierID 77038, a SelectionByTaxPreparerPartyID 77064, a SelectionByTaxPreparerPartyIdentifierID 77086, a SelectionByJointFilerPartyID 77112, a SelectionByJointFilerPartyIdentifierID 77134, a SelectionByBillingPeriodID 77160, a SelectionByLevyTypeCode 77182 and a SelectionByDate 77204.

The TaxReturnSelectionByBusinessPartnerID 77012 entity has a cardinality of 1 77014 meaning that for each instance of the Selection 77010 package there is one TaxReturnSelectionByBusinessPartnerID 77012 entity. The SelectionByTaxPayerPartyID 77016 package includes a SelectionByTaxPayerPartyID 77018 entity. The SelectionByTaxPayerPartyID 77018 entity has a cardinality of 0 . . . n 77020 meaning that for each instance of the SelectionByTaxPayerPartyID 77016 package there may be one or more SelectionByTaxPayerPartyID 77018 entities. The SelectionByTaxPayerPartyID 77018 entity includes various attributes, namely an InclusionExclusionCode 77022, an IntervalBoundaryTypeCode 77026, a LowerBoundaryTaxPayerPartyID 77030 and an UpperBoundaryTaxPayerPartyID 77034. The InclusionExclusionCode 77022 attribute has a cardinality of 1 77024 meaning that for each instance of the SelectionByTaxPayerPartyID 77018 entity there is one InclusionExclusionCode 77022 attribute. The IntervalBoundaryTypeCode 77026 attribute has a cardinality of 1 77028 meaning that for each instance of the SelectionByTaxPayerPartyID 77018 entity there is one IntervalBoundaryTypeCode 77026 attribute. The LowerBoundaryTaxPayerPartyID 77030 attribute has a cardinality of 0 . . . 1 77032 meaning that for each instance of the SelectionByTaxPayerPartyID 77018 entity there may be one LowerBoundaryTaxPayerPartyID 77030 attribute. The UpperBoundaryTaxPayerPartyID 77034 attribute has a cardinality of 0 . . . 1 77036 meaning that for each instance of the SelectionByTaxPayerPartyID 77018 entity there may be one UpperBoundaryTaxPayerPartyID 77034 attribute.

The SelectionByTaxPayerPartyIdentifierID 77038 package includes a SelectionByTaxPayerPartyIdentifierID 77040 entity. The SelectionByTaxPayerPartyIdentifierID 77040 entity has a cardinality of 0 . . . n 77042 meaning that for each instance of the SelectionByTaxPayerPartyIdentifierID 77038 package there may be one or more SelectionByTaxPayerPartyIdentifierID 77040 entities. The SelectionByTaxPayerPartyIdentifierID 77040 entity includes various attributes, namely an InclusionExclusionCode 77044, an IntervalBoundaryTypeCode 77048, a LowerBoundaryPartyIdentifierID 77052, an UpperBoundaryPartyIdentifierID 77056 and a PartyIdentifierTypeCode 77060. The InclusionExclusionCode 77044 attribute has a cardinality of 1 77046 meaning that for each instance of the SelectionByTaxPayerPartyIdentifierID 77040 entity there is one InclusionExclusionCode 77044 attribute. The IntervalBoundaryTypeCode 77048 attribute has a cardinality of 1 77050 meaning that for each instance of the SelectionByTaxPayerPartyIdentifierID 77040 entity there is one IntervalBoundaryTypeCode 77048 attribute. The LowerBoundaryPartyIdentifierID 77052 attribute has a cardinality of 0 . . . 1 77054 meaning that for each instance of the SelectionByTaxPayerPartyIdentifierID 77040 entity there may be one LowerBoundaryPartyIdentifierID 77052 attribute. The UpperBoundaryPartyIdentifierID 77056 attribute has a cardinality of 0 . . . 1 77058 meaning that for each instance of the SelectionByTaxPayerPartyIdentifierID 77040 entity there may be one UpperBoundaryPartyIdentifierID 77056 attribute. The PartyIdentifierTypeCode 77060 attribute has a cardinality of 1 77062 meaning that for each instance of the SelectionByTaxPayerPartyIdentifierID 77040 entity there is one PartyIdentifierTypeCode 77060 attribute.

The SelectionByTaxPreparerPartyID 77064 package includes a SelectionByTaxPreparerPartyID 77066 entity. The SelectionByTaxPreparerPartyID 77066 entity has a cardinality of 0 . . . n 77068 meaning that for each instance of the SelectionByTaxPreparerPartyID 77064 package there may be one or more SelectionByTaxPreparerPartyID 77066 entities. The SelectionByTaxPreparerPartyID 77066 entity includes various attributes, namely an InclusionExclusionCode 77070, an IntervalBoundaryTypeCode 77074, a LowerBoundaryTaxPreparerPartyID 77078 and an UpperBoundaryTaxPreparerPartyID 77082. The InclusionExclusionCode 77070 attribute has a cardinality of 1 77072 meaning that for each instance of the SelectionByTaxPreparerPartyID 77066 entity there is one InclusionExclusionCode 77070 attribute. The IntervalBoundaryTypeCode 77074 attribute has a cardinality of 1 77076 meaning that for each instance of the SelectionByTaxPreparerPartyID 77066 entity there is one IntervalBoundaryTypeCode 77074 attribute. The LowerBoundaryTaxPreparerPartyID 77078 attribute has a cardinality of 0 . . . 1 77080 meaning that for each instance of the SelectionByTaxPreparerPartyID 77066 entity there may be one LowerBoundaryTaxPreparerPartyID 77078 attribute. The UpperBoundaryTaxPreparerPartyID 77082 attribute has a cardinality of 0 . . . 1 77084 meaning that for each instance of the SelectionByTaxPreparerPartyID 77066 entity there may be one UpperBoundaryTaxPreparerPartyID 77082 attribute.

The SelectionByTaxPreparerPartyIdentifierID 77086 package includes a SelectionByTaxPreparerPartyIdentifierID 77088 entity. The SelectionByTaxPreparerPartyIdentifierID 77088 entity has a cardinality of 0 . . . n 77090 meaning that for each instance of the SelectionByTaxPreparerPartyIdentifierID 77086 package there may be one or more SelectionByTaxPreparerPartyIdentifierID 77088 entities. The SelectionByTaxPreparerPartyIdentifierID 77088 entity includes various attributes, namely an InclusionExclusionCode 77092, an IntervalBoundaryTypeCode 77096, a LowerBoundaryPartyIdentifierID 77100, an UpperBoundaryPartyIdentifierID 77104 and a PartyIdentifierTypeCode 77108. The InclusionExclusionCode 77092 attribute has a cardinality of 1 77094 meaning that for each instance of the SelectionByTaxPreparerPartyIdentifierID 77088 entity there is one InclusionExclusionCode 77092 attribute. The IntervalBoundaryTypeCode 77096 attribute has a cardinality of 1 77098 meaning that for each instance of the SelectionByTaxPreparerPartyIdentifierID 77088 entity there is one IntervalBoundaryTypeCode 77096 attribute.

The LowerBoundaryPartyIdentifierID 77100 attribute has a cardinality of 0 . . . 1 77102 meaning that for each instance of the SelectionByTaxPreparerPartyIdentifierID 77088 entity there may be one LowerBoundaryPartyIdentifierID 77100 attribute. The UpperBoundaryPartyIdentifierID 77104 attribute has a cardinality of 0 . . . 1 77106 meaning that for each instance of the SelectionByTaxPreparerPartyIdentifierID 77088 entity there may be one UpperBoundaryPartyIdentifierID 77104 attribute. The PartyIdentifierTypeCode 77108 attribute has a cardinality of 1 77110 meaning that for each instance of the SelectionByTaxPreparerPartyIdentifierID 77088 entity there is one PartyIdentifierTypeCode 77108 attribute.

The SelectionByJointFilerPartyID 77112 package includes a SelectionByJointFilerPartyID 77114 entity. The SelectionByJointFilerPartyID 77114 entity has a cardinality of 0 . . . n 77116 meaning that for each instance of the SelectionByJointFilerPartyID 77112 package there may be one or more SelectionByJointFilerPartyID 77114 entities. The SelectionByJointFilerPartyID 77114 entity includes various attributes, namely an InclusionExclusionCode 77118, an IntervalBoundaryTypeCode 77122, a LowerBoundaryJointFilerPartyID 77126 and an UpperBoundaryJointFilerPartyID 77130. The InclusionExclusionCode 77118 attribute has a cardinality of 1 77120 meaning that for each instance of the SelectionByJointFilerPartyID 77114 entity there is one InclusionExclusionCode 77118 attribute. The IntervalBoundaryTypeCode 77122 attribute has a cardinality of 1 77124 meaning that for each instance of the SelectionByJointFilerPartyID 77114 entity there is one IntervalBoundaryTypeCode 77122 attribute. The LowerBoundaryJointFilerPartyID 77126 attribute has a cardinality of 0 . . . 1 77128 meaning that for each instance of the SelectionByJointFilerPartyID 77114 entity there may be one LowerBoundaryJointFilerPartyID 77126 attribute. The UpperBoundaryJointFilerPartyID 77130 attribute has a cardinality of 0 . . . 1 77132 meaning that for each instance of the SelectionByJointFilerPartyID 77114 entity there may be one UpperBoundaryJointFilerPartyID 77130 attribute.

The SelectionByJointFilerPartyIdentifierID 77134 package includes a SelectionByJointFilerPartyIdentifierID 77136 entity. The SelectionByJointFilerPartyIdentifierID 77136 entity has a cardinality of 0 . . . n 77138 meaning that for each instance of the SelectionByJointFilerPartyIdentifierID 77134 package there may be one or more SelectionByJointFilerPartyIdentifierID 77136 entities. The SelectionByJointFilerPartyIdentifierID 77136 entity includes various attributes, namely an InclusionExclusionCode 77140, an IntervalBoundaryTypeCode 77144, a LowerBoundaryPartyIdentifierID 77148, an UpperBoundaryPartyIdentifierID 77152 and a PartyIdentifierTypeCode 77156. The InclusionExclusionCode 77140 attribute has a cardinality of 1 77142 meaning that for each instance of the SelectionByJointFilerPartyIdentifierID 77136 entity there is one InclusionExclusionCode 77140 attribute. The IntervalBoundaryTypeCode 77144 attribute has a cardinality of 1 77146 meaning that for each instance of the SelectionByJointFilerPartyIdentifierID 77136 entity there is one IntervalBoundaryTypeCode 77144 attribute. The LowerBoundaryPartyIdentifierID 77148 attribute has a cardinality of 0 . . . 1 77150 meaning that for each instance of the SelectionByJointFilerPartyIdentifierID 77136 entity there may be one LowerBoundaryPartyIdentifierID 77148 attribute. The UpperBoundaryPartyIdentifierID 77152 attribute has a cardinality of 0 . . . 1 77154 meaning that for each instance of the SelectionByJointFilerPartyIdentifierID 77136 entity there may be one UpperBoundaryPartyIdentifierID 77152 attribute. The PartyIdentifierTypeCode 77156 attribute has a cardinality of 1 77158 meaning that for each instance of the SelectionByJointFilerPartyIdentifierID 77136 entity there is one PartyIdentifierTypeCode 77156 attribute.

The SelectionByBillingPeriodID 77160 package includes a SelectionByBillingPeriodID 77162 entity. The SelectionByBillingPeriodID 77162 entity has a cardinality of 0 . . . n 77164 meaning that for each instance of the SelectionByBillingPeriodID 77160 package there may be one or more SelectionByBillingPeriodID 77162 entities. The SelectionByBillingPeriodID 77162 entity includes various attributes, namely an InclusionExclusionCode 77166, an IntervalBoundaryTypeCode 77170, a LowerBoundaryBillingPeriodID 77174 and an UpperBoundaryBillingPeriodID 77178. The InclusionExclusionCode 77166 attribute has a cardinality of 1

77168 meaning that for each instance of the SelectionByBillingPeriodID 77162 entity there is one InclusionExclusionCode 77166 attribute. The IntervalBoundaryTypeCode 77170 attribute has a cardinality of 1 77172 meaning that for each instance of the SelectionByBillingPeriodID 77162 entity there is one IntervalBoundaryTypeCode 77170 attribute. The LowerBoundaryBillingPeriodID 77174 attribute has a cardinality of 0 . . . 1 77176 meaning that for each instance of the SelectionByBillingPeriodID 77162 entity there may be one LowerBoundaryBillingPeriodID 77174 attribute. The UpperBoundaryBillingPeriodID 77178 attribute has a cardinality of 0 . . . 1 77180 meaning that for each instance of the SelectionByBillingPeriodID 77162 entity there may be one UpperBoundaryBillingPeriodID 77178 attribute.

The SelectionByLevyTypeCode 77182 package includes a SelectionByLevyTypeCode 77184 entity. The SelectionByLevyTypeCode 77184 entity has a cardinality of 0 . . . n 77186 meaning that for each instance of the SelectionByLevyTypeCode 77182 package there may be one or more SelectionByLevyTypeCode 77184 entities. The SelectionByLevyTypeCode 77184 entity includes various attributes, namely an InclusionExclusionCode 77188, an IntervalBoundaryTypeCode 77192, a LowerBoundaryLevyTypeCode 77196 and an UpperBoundaryLevyTypeCodeID 77200. The InclusionExclusionCode 77188 attribute has a cardinality of 1 77190 meaning that for each instance of the SelectionByLevyTypeCode 77184 entity there is one InclusionExclusionCode 77188 attribute. The IntervalBoundaryTypeCode 77192 attribute has a cardinality of 1 77194 meaning that for each instance of the SelectionByLevyTypeCode 77184 entity there is one IntervalBoundaryTypeCode 77192 attribute. The LowerBoundaryLevyTypeCode 77196 attribute has a cardinality of 0 . . . 1 77198 meaning that for each instance of the SelectionByLevyTypeCode 77184 entity there may be one LowerBoundaryLevyTypeCode 77196 attribute. The UpperBoundaryLevyTypeCodeID 77200 attribute has a cardinality of 0 . . . 1 77202 meaning that for each instance of the SelectionByLevyTypeCode 77184 entity there may be one UpperBoundaryLevyTypeCodeID 77200 attribute.

The SelectionByDate 77204 package includes a SelectionByDate 77206 entity. The SelectionByDate 77206 entity has a cardinality of 0 . . . 1 77208 meaning that for each instance of the SelectionByDate 77204 package there may be one SelectionByDate 77206 entity. The SelectionByDate 77206 entity includes various attributes, namely a LowerBoundaryDate 77210 and an UpperBoundaryDate 77214. The LowerBoundaryDate 77210 attribute has a cardinality of 1 77212 meaning that for each instance of the SelectionByDate 77206 entity there is one LowerBoundaryDate 77210 attribute. The UpperBoundaryDate 77214 attribute has a cardinality of 0 . . . 1 77216 meaning that for each instance of the SelectionByDate 77206 entity there may be one UpperBoundaryDate 77214 attribute.

The ProcessingConditions 77218 package includes a QueryProcessingConditions 77220 entity. The QueryProcessingConditions 77220 entity has a cardinality of 0 . . . 1 77222 meaning that for each instance of the ProcessingConditions 77218 package there may be one QueryProcessingConditions 77220 entity. The data types of the various packages, entities, and attributes are described with respect to FIG. 76.

In further detail, FIGS. 78-1 through 78-3 illustrate an example configuration of an Element Structure that includes a TaxReturnERPByBusinessPartnerResponseMessage_Sync 78000 package. The TaxReturnERPByBusinessPartnerResponseMessage_Sync 78000 package includes a TaxReturnERPByBusinessPartnerResponseMessage_Sync 78002 entity. The TaxReturnERPByBusinessPartnerResponseMessage_Sync 78000 package includes various packages, namely a TaxReturn 78004 and a Log 78074.

The TaxReturn 78004 package includes a TaxReturn 78006 entity. The TaxReturn 78006 entity has a cardinality of 0 . . . n 78008 meaning that for each instance of the TaxReturn 78004 package there may be one or more TaxReturn 78006 entities. The TaxReturn 78006 entity includes various attributes, namely a TaxReturnID 78010, a LevyTypeCode 78014, a LevyTypeCodeName 78018, a PeriodAssignmentCode 78022, a PeriodAssignmentCodeName 78026, a ReceiptDateTime 78030 and a DraftIndicator 78070. The TaxReturn 78006 entity includes various subordinate entities, namely a SystemStatus 78034 and a UserStatus 78058. The TaxReturnID 78010 attribute has a cardinality of 1 78012 meaning that for each instance of the TaxReturn 78006 entity there is one TaxReturnID 78010 attribute. The LevyTypeCode 78014 attribute has a cardinality of 1 78016 meaning that for each instance of the TaxReturn 78006 entity there is one LevyTypeCode 78014 attribute. The LevyTypeCodeName 78018 attribute has a cardinality of 0 . . . 1 78020 meaning that for each instance of the TaxReturn 78006 entity there may be one LevyTypeCodeName 78018 attribute. The PeriodAssignmentCode 78022 attribute has a cardinality of 1 78024 meaning that for each instance of the TaxReturn 78006 entity there is one PeriodAssignmentCode 78022 attribute. The PeriodAssignmentCodeName 78026 attribute has a cardinality of 0 . . . 1 78028 meaning that for each instance of the TaxReturn 78006 entity there may be one PeriodAssignmentCodeName 78026 attribute. The ReceiptDateTime 78030 attribute has a cardinality of 0 . . . 1 78032 meaning that for each instance of the TaxReturn 78006 entity there may be one ReceiptDateTime 78030 attribute. The DraftIndicator 78070 attribute has a cardinality of 1 78072 meaning that for each instance of the TaxReturn 78006 entity there is one DraftIndicator 78070 attribute.

The SystemStatus 78034 entity has a cardinality of 1 . . . n 78036 meaning that for each instance of the TaxReturn 78006 entity there are one or more SystemStatus 78034 entities. The SystemStatus 78034 entity includes various attributes, namely a Code 78038, a CodeName 78042, an InactiveIndicator 78046, a ChangeTimePoint 78050 and a ProcessorPartyInternalID 78054. The Code 78038 attribute has a cardinality of 1 78040 meaning that for each instance of the SystemStatus 78034 entity there is one Code 78038 attribute. The CodeName 78042 attribute has a cardinality of 0 . . . 1 78044 meaning that for each instance of the SystemStatus 78034 entity there may be one CodeName 78042 attribute. The InactiveIndicator 78046 attribute has a cardinality of 1 78048 meaning that for each instance of the SystemStatus 78034 entity there is one InactiveIndicator 78046 attribute. The ChangeTimePoint 78050 attribute has a cardinality of 1 78052 meaning that for each instance of the SystemStatus 78034 entity there is one ChangeTimePoint 78050 attribute. The ProcessorPartyInternalID 78054 attribute has a cardinality of 1 78056 meaning that for each instance of the SystemStatus 78034 entity there is one ProcessorPartyInternalID 78054 attribute.

The UserStatus 78058 entity has a cardinality of 0 . . . n 78060 meaning that for each instance of the TaxReturn 78006 entity there may be one or more UserStatus 78058 entities. The UserStatus 78058 entity includes various attributes, namely a Code 78062 and a Name 78066. The Code 78062 attribute has a cardinality of 1 78064 meaning that for each instance of the UserStatus 78058 entity there is one Code 78062 attribute. The Name 78066 attribute has a cardinality of 0 . . . 1 78068 meaning that for each instance of the UserStatus 78058 entity there may be one Name 78066 attribute.

The Log 78074 package includes a Log 78076 entity. The Log 78076 entity has a cardinality of 1 78078 meaning that for each instance of the Log 78074 package there is one Log 78076 entity. The data types of the various packages, entities, and attributes are described with respect to FIG. 76.

In further detail, FIG. 79 illustrates an example configuration of an Element Structure that includes a TaxReturnERPByIdQueryMessage_Sync 79000 package. The TaxReturnERPByIdQueryMessage_Sync 79000 package includes a TaxReturnERPByIdQueryMessage_Sync 79002 entity. The TaxReturnERPByIdQueryMessage_Sync 79000 package includes various packages, namely a MessageHeader 79004 and a Selection 79010.

The MessageHeader 79004 package includes a MessageHeader 79006 entity. The MessageHeader 79006 entity has a cardinality of 1 79008 meaning that for each instance of the MessageHeader 79004 package there is one MessageHeader 79006 entity.

The Selection 79010 package includes a TaxReturnSelectionById 79012 entity. The TaxReturnSelectionById 79012 entity has a cardinality of 1 79014 meaning that for each instance of the Selection 79010 package there is one TaxReturnSelectionById 79012 entity. The TaxReturnSelectionById 79012 entity includes a TaxReturnID 79016 attribute. The TaxReturnID 79016 attribute has a cardinality of 1 79018 meaning that for each instance of the TaxReturnSelectionById 79012 entity there is one TaxReturnID 79016 attribute. The data types of the various packages, entities, and attributes are described with respect to FIG. 76.

In further detail, FIGS. 80-1 through 80-10 illustrate an example configuration of an Element Structure that includes a TaxReturnERPByIdResponseMessage_Sync 80000 package. The TaxReturnERPByIdResponseMessage_Sync 80000 package includes a TaxReturnERPByIdResponseMessage_Sync 80002 entity. The TaxReturnERPByIdResponseMessage_Sync 80000 package includes various packages, namely a TaxReturn 80004 and a Log 80244.

The TaxReturn 80004 package includes a TaxReturn 80006 entity. The TaxReturn 80004 package includes various packages, namely a Form 80078, a TaxPayer 80118, a TaxPreparer 80160 and a JointFiler 80202.

The TaxReturn 80006 entity has a cardinality of 0 . . . 1 80008 meaning that for each instance of the TaxReturn 80004 package there may be one TaxReturn 80006 entity. The TaxReturn 80006 entity includes various attributes, namely a TaxReturnID 80010, a LevyTypeCode 80014, a LevyTypeCodeName 80018, a ContractAccountID 80022, a PeriodAssignmentCode 80026, a PeriodAssignmentCodeName 80030, a TaxObligationID 80034 and a DraftIndicator 80074. The TaxReturn 80006 entity includes various subordinate entities, namely a SystemStatus 80038 and a UserStatus 80062. The TaxReturnID 80010 attribute has a cardinality of 1 80012 meaning that for each instance of the TaxReturn 80006 entity there is one TaxReturnID 80010 attribute. The LevyTypeCode 80014 attribute has a cardinality of 1 80016 meaning that for each instance of the TaxReturn 80006 entity there is one LevyTypeCode 80014 attribute. The LevyTypeCodeName 80018 attribute has a cardinality of 0 . . . 1 80020 meaning that for each instance of the TaxReturn 80006 entity there may be one LevyTypeCodeName 80018 attribute. The ContractAccountID 80022 attribute has a cardinality of 0 . . . 1 80024 meaning that for each instance of the TaxReturn 80006 entity there may be one ContractAccountID 80022 attribute. The PeriodAssignmentCode 80026 attribute has a cardinality of 1 80028 meaning that for each instance of the TaxReturn 80006 entity there is one PeriodAssignmentCode 80026 attribute. The PeriodAssignmentCodeName 80030 attribute has a cardinality of 0 . . . 1 80032 meaning that for each instance of the TaxReturn 80006 entity there may be one PeriodAssignmentCodeName 80030 attribute. The TaxObligationID 80034 attribute has a cardinality of 1 80036 meaning that for each instance of the TaxReturn 80006 entity there is one TaxObligationID 80034 attribute. The DraftIndicator 80074 attribute has a cardinality of 1 80076 meaning that for each instance of the TaxReturn 80006 entity there is one DraftIndicator 80074 attribute.

The SystemStatus 80038 entity has a cardinality of 1 . . . n 80040 meaning that for each instance of the TaxReturn 80006 entity there are one or more SystemStatus 80038 entities. The SystemStatus 80038 entity includes various attributes, namely a Code 80042, a CodeName 80046, an InactiveIndicator 80050, a ChangeTimePoint 80054 and a ProcessorPartyInternalID 80058. The Code 80042 attribute has a cardinality of 1 80044 meaning that for each instance of the SystemStatus 80038 entity there is one Code 80042 attribute. The CodeName 80046 attribute has a cardinality of 0 . . . 1 80048 meaning that for each instance of the SystemStatus 80038 entity there may be one CodeName 80046 attribute. The InactiveIndicator 80050 attribute has a cardinality of 1 80052 meaning that for each instance of the SystemStatus 80038 entity there is one InactiveIndicator 80050 attribute. The ChangeTimePoint 80054 attribute has a cardinality of 1 80056 meaning that for each instance of the SystemStatus 80038 entity there is one ChangeTimePoint 80054 attribute. The ProcessorPartyInternalID 80058 attribute has a cardinality of 1 80060 meaning that for each instance of the SystemStatus 80038 entity there is one ProcessorPartyInternalID 80058 attribute.

The UserStatus 80062 entity has a cardinality of 0 . . . n 80064 meaning that for each instance of the TaxReturn 80006 entity there may be one or more UserStatus 80062 entities. The UserStatus 80062 entity includes various attributes, namely a Code 80066 and a Name 80070. The Code 80066 attribute has a cardinality of 1 80068 meaning that for each instance of the UserStatus 80062 entity there is one Code 80066 attribute. The Name 80070 attribute has a cardinality of 0 . . . 1 80072 meaning that for each instance of the UserStatus 80062 entity there may be one Name 80070 attribute.

The Form 80078 package includes a Form 80080 entity. The Form 80078 package includes a PropertyValuation 80108 package.

The Form 80080 entity has a cardinality of 1 . . . n 80082 meaning that for each instance of the Form 80078 package there are one or more Form 80080 entities. The Form 80080 entity includes various attributes, namely a FormUUID 80084, a FormTemplateID 80088, a FormTemplateName 80092, a FormVersionID 80096, a FormTypeCode 80100 and a FormTypeCodeName 80104. The FormUUID 80084 attribute has a cardinality of 1 80086 meaning that for each instance of the Form 80080 entity there is one FormUUID 80084 attribute. The FormTemplateID 80088 attribute has a cardinality of 1 80090 meaning that for each instance of the Form 80080 entity there is one FormTemplateID 80088 attribute. The FormTemplateName 80092 attribute has a cardinality of 0 . . . 1 80094 meaning that for each instance of the Form 80080 entity there may be one FormTemplateName 80092 attribute. The FormVersionID 80096 attribute has a cardinality of 1 80098 meaning that for each instance of the Form 80080 entity there is one FormVersionID 80096 attribute. The FormTypeCode 80100 attribute has a cardinality of 1 80102 meaning that for each instance of the Form 80080 entity there is one FormTypeCode 80100 attribute. The FormTypeCodeName 80104 attribute has a cardinality of 0 . . . 1 80106 meaning that for each instance of the Form 80080 entity there may be one FormTypeCodeName 80104 attribute.

The PropertyValuation 80108 package includes a PropertyValuation 80110 entity. The PropertyValuation 80110 entity has a cardinality of 0 . . . 1 80112 meaning that for each instance of the PropertyValuation 80108 package there may be one PropertyValuation 80110 entity. The PropertyValuation 80110 entity includes a PropertyValuation 80114 attribute. The PropertyValuation 80114 attribute has a cardinality of 1 . . . n 80116 meaning that for each instance of the PropertyValuation 80110 entity there are one or more PropertyValuation 80114 attributes.

The TaxPayer 80118 package includes a TaxPayer 80120 entity. The TaxPayer 80120 entity has a cardinality of 1 . . . 1 80122 meaning that for each instance of the TaxPayer 80118 package there is one instance of the TaxPayer 80120 entity. The TaxPayer 80120 entity includes a TaxPayerPartyID 80124 attribute. The TaxPayer 80120 entity includes an Identification 80128 subordinate entity. The TaxPayerPartyID 80124 attribute has a cardinality of 1 80126 meaning that for each instance of the TaxPayer 80120 entity there is one TaxPayerPartyID 80124 attribute.

The Identification 80128 entity has a cardinality of 0 . . . n 80130 meaning that for each instance of the TaxPayer 80120 entity there may be one or more Identification 80128 entities. The Identification 80128 entity includes various attributes, namely a PartyIdentifierTypeCode 80132, a PartyIdentifierID 80136, an IdentifierIssuingAgencyName 80140, an EntryDate 80144, an AreaOfValidityCountryCode 80148, an AreaOfValidityRegionCode 80152 and a ValidityPeriod 80156. The PartyIdentifierTypeCode 80132 attribute has a cardinality of 1 80134 meaning that for each instance of the Identification 80128 entity there is one PartyIdentifierTypeCode 80132 attribute. The PartyIdentifierID 80136 attribute has a cardinality of 1 80138 meaning that for each instance of the Identification 80128 entity there is one PartyIdentifierID 80136 attribute. The IdentifierIssuingAgencyName 80140 attribute has a cardinality of 0 . . . 1 80142 meaning that for each instance of the Identification 80128 entity there may be one IdentifierIssuingAgencyName 80140 attribute. The EntryDate 80144 attribute has a cardinality of 0 . . . 1 80146 meaning that for each instance of the Identification 80128 entity there may be one EntryDate 80144 attribute. The AreaOfValidityCountryCode 80148 attribute has a cardinality of 0 . . . 1 80150 meaning that for each instance of the Identification 80128 entity there may be one AreaOfValidityCountryCode 80148 attribute. The AreaOfValidityRegionCode 80152 attribute has a cardinality of 0 . . . 1 80154 meaning that for each instance of the Identification 80128 entity there may be one AreaOfValidityRegionCode 80152 attribute. The ValidityPeriod 80156 attribute has a cardinality of 0 . . . 1 80158 meaning that for each instance of the Identification 80128 entity there may be one ValidityPeriod 80156 attribute.

The TaxPreparer 80160 package includes a TaxPreparer 80162 entity. The TaxPreparer 80162 entity has a cardinality of 0 . . . 1 80164 meaning that for each instance of the TaxPreparer 80160 package there may be one TaxPreparer 80162 entity. The TaxPreparer 80162 entity includes a TaxPreparerPartyID 80166 attribute. The TaxPreparer 80162 entity includes an Identification 80170 subordinate entity. The TaxPreparerPartyID 80166 attribute has a cardinality of 1 80168 meaning that for each instance of the TaxPreparer 80162 entity there is one TaxPreparerPartyID 80166 attribute.

The Identification 80170 entity has a cardinality of 0 . . . n 80172 meaning that for each instance of the TaxPreparer 80162 entity there may be one or more Identification 80170 entities. The Identification 80170 entity includes various attributes, namely a PartyIdentifierTypeCode 80174, a PartyIdentifierID 80178, an IdentifierIssuingAgencyName 80182, an EntryDate 80186, an AreaOfValidityCountryCode 80190, an AreaOfValidityRegionCode 80194 and a ValidityPeriod 80198. The PartyIdentifierTypeCode 80174 attribute has a cardinality of 1 80176 meaning that for each instance of the Identification 80170 entity there is one PartyIdentifierTypeCode 80174 attribute. The PartyIdentifierID 80178 attribute has a cardinality of 1 80180 meaning that for each instance of the Identification 80170 entity there is one PartyIdentifierID 80178 attribute. The IdentifierIssuingAgencyName 80182 attribute has a cardinality of 0 . . . 1 80184 meaning that for each instance of the Identification 80170 entity there may be one IdentifierIssuingAgencyName 80182 attribute. The EntryDate 80186 attribute has a cardinality of 0 . . . 1 80188 meaning that for each instance of the Identification 80170 entity there may be one EntryDate 80186 attribute. The AreaOfValidityCountryCode 80190 attribute has a cardinality of 0 . . . 1 80192 meaning that for each instance of the Identification 80170 entity there may be one AreaOfValidityCountryCode 80190 attribute. The AreaOfValidityRegionCode 80194 attribute has a cardinality of 0 . . . 1 80196 meaning that for each instance of the Identification 80170 entity there may be one AreaOfValidityRegionCode 80194 attribute. The ValidityPeriod 80198 attribute has a cardinality of 0 . . . 1 80200 meaning that for each instance of the Identification 80170 entity there may be one ValidityPeriod 80198 attribute.

The JointFiler 80202 package includes a JointFiler 80204 entity. The JointFiler 80204 entity has a cardinality of 0 . . . 1 80206 meaning that for each instance of the JointFiler 80202 package there may be one JointFiler 80204 entity. The JointFiler 80204 entity includes a JointFilerPartyID 80208 attribute. The JointFiler 80204 entity includes an Identification 80212 subordinate entity. The JointFilerPartyID 80208 attribute has a cardinality of 1 80210 meaning that for each instance of the JointFiler 80204 entity there is one JointFilerPartyID 80208 attribute.

The Identification 80212 entity has a cardinality of 0 . . . n 80214 meaning that for each instance of the JointFiler 80204 entity there may be one or more Identification 80212 entities. The Identification 80212 entity includes various attributes, namely a PartyIdentifierTypeCode 80216, a PartyIdentifierID 80220, an IdentifierIssuingAgencyName 80224, an EntryDate 80228, an AreaOfValidityCountryCode 80232, an AreaOfValidityRegionCode 80236 and a ValidityPeriod 80240. The PartyIdentifierTypeCode 80216 attribute has a cardinality of 1 80218 meaning that for each instance of the Identification 80212 entity there is one PartyIdentifierTypeCode 80216 attribute. The PartyIdentifierID 80220 attribute has a cardinality of 1 80222 meaning that for each instance of the Identification 80212 entity there is one PartyIdentifierID 80220 attribute. The IdentifierIssuingAgencyName 80224 attribute has a cardinality of 0 . . . 1 80226 meaning that for each instance of the Identification 80212 entity there may be one IdentifierIssuingAgencyName 80224 attribute. The EntryDate 80228 attribute has a cardinality of 0 . . . 1 80230 meaning that for each instance of the Identification 80212 entity there may be one EntryDate 80228 attribute. The AreaOfValidityCountryCode 80232 attribute has a cardinality of 0 . . . 1 80234 meaning that for each instance of the Identification 80212 entity there may be one AreaOfValidityCountryCode 80232 attribute. The AreaOfValidityRegionCode 80236 attribute has a cardinality of 0 . . . 1 80238 meaning that for each instance of the Identification 80212 entity there may be one AreaOfValidityRegionCode 80236 attribute. The ValidityPeriod 80240 attribute has a cardinality of 0 . . . 1 80242 meaning that for each instance of the Identification 80212 entity there may be one ValidityPeriod 80240 attribute.

The Log 80244 package includes a Log 80246 entity. The Log 80246 entity has a cardinality of 1 80248 meaning that for each instance of the Log 80244 package there is one Log 80246 entity. The data types of the various packages, entities, and attributes are described with respect to FIG. 76.

In further detail, FIGS. 81-1 through 81-4 illustrate an example configuration of an Element Structure that includes a TaxReturnERPCreateRequestMessage_Sync 81000 package. The TaxReturnERPCreateRequestMessage_Sync 81000 package includes a TaxReturnERPCreateRequestMessage_Sync 81002 entity. The TaxReturnERPCreateRequestMessage_Sync 81000 package includes various packages, namely a MessageHeader 81004 and a TaxReturn 81010.

The MessageHeader 81004 package includes a MessageHeader 81006 entity. The MessageHeader 81006 entity has a cardinality of 1 81008 meaning that for each instance of the MessageHeader 81004 package there is one MessageHeader 81006 entity.

The TaxReturn 81010 package includes a TaxReturn 81012 entity. The TaxReturn 81010 package includes various packages, namely a Form 81036, a TaxPayer 81064, a TaxPreparer 81074 and a JointFiler 81084.

The TaxReturn 81012 entity has a cardinality of 1 81014 meaning that for each instance of the TaxReturn 81010 package there is one TaxReturn 81012 entity. The TaxReturn 81012 entity includes various attributes, namely a LevyTypeCode 81016, a ContractAccountID 81020, a PeriodAssignmentCode 81024, a TaxObligationID 81028 and a DraftIndicator 81032. The LevyTypeCode 81016 attribute has a cardinality of 1 81018 meaning that for each instance of the TaxReturn 81012 entity there is one LevyTypeCode 81016 attribute. The ContractAccountID 81020 attribute has a cardinality of 0 . . . 1 81022 meaning that for each instance of the TaxReturn 81012 entity there may be one ContractAccountID 81020 attribute. The PeriodAssignmentCode 81024 attribute has a cardinality of 1 81026 meaning that for each instance of the TaxReturn 81012 entity there is one PeriodAssignmentCode 81024 attribute. The TaxObligationID 81028 attribute has a cardinality of 1 81030 meaning that for each instance of the TaxReturn 81012 entity there is one TaxObligationID 81028 attribute. The DraftIndicator 81032 attribute has a cardinality of 0 . . . 1 81034 meaning that for each instance of the TaxReturn 81012 entity there may be one DraftIndicator 81032 attribute.

The Form 81036 package includes a Form 81038 entity. The Form 81036 package includes a PropertyValuation 81054 package.

The Form 81038 entity has a cardinality of 1 . . . n 81040 meaning that for each instance of the Form 81036 package there are one or more Form 81038 entities. The Form 81038 entity includes various attributes, namely a FormUUID 81042, a FormTemplateID 81046 and a FormVersionID 81050. The FormUUID 81042 attribute has a cardinality of 0 . . . 1 81044 meaning that for each instance of the Form 81038 entity there may be one FormUUID 81042 attribute. The FormTemplateID 81046 attribute has a cardinality of 1 81048 meaning that for each instance of the Form 81038 entity there is one FormTemplateID 81046 attribute. The FormVersionID 81050 attribute has a cardinality of 1 81052 meaning that for each instance of the Form 81038 entity there is one FormVersionID 81050 attribute.

The PropertyValuation 81054 package includes a PropertyValuation 81056 entity. The PropertyValuation 81056 entity has a cardinality of 0 . . . 1 81058 meaning that for each instance of the PropertyValuation 81054 package there may be one PropertyValuation 81056 entity. The PropertyValuation 81056 entity includes a PropertyValuation 81060 attribute. The PropertyValuation 81060 attribute has a cardinality of 1 . . . n 81062 meaning that for each instance of the PropertyValuation 81056 entity there are one or more PropertyValuation 81060 attributes.

The TaxPayer 81064 package includes a TaxPayer 81066 entity. The TaxPayer 81066 entity has a cardinality of 1 . . . 1 81068 meaning that for each instance of the TaxPayer 81064 package there is one TaxPayer 81066 entity. The TaxPayer 81066 entity includes a TaxPayerPartyID 81070 attribute. The TaxPayerPartyID 81070 attribute has a cardinality of 1 81072 meaning that for each instance of the TaxPayer 81066 entity there is one TaxPayerPartyID 81070 attribute.

The TaxPreparer 81074 package includes a TaxPreparer 81076 entity. The TaxPreparer 81076 entity has a cardinality of 0 . . . 1 81078 meaning that for each instance of the TaxPreparer 81074 package there may be one TaxPreparer 81076 entity. The TaxPreparer 81076 entity includes a TaxPreparerPartyID 81080 attribute. The TaxPreparerPartyID 81080 attribute has a cardinality of 1 81082 meaning that for each instance of the TaxPreparer 81076 entity there is one TaxPreparerPartyID 81080 attribute.

The JointFiler 81084 package includes a JointFiler 81086 entity. The JointFiler 81086 entity has a cardinality of 0 . . . 1 81088 meaning that for each instance of the JointFiler 81084 package there may be one JointFiler 81086 entity. The JointFiler 81086 entity includes a JointFilerPartyID 81090 attribute. The JointFilerPartyID 81090 attribute has a cardinality of 1 81092 meaning that for each instance of the JointFiler 81086 entity there is one JointFilerPartyID 81090 attribute. The data types of the various packages, entities, and attributes are described with respect to FIG. 76.

In further detail, FIGS. 82-1 through 82-10 illustrate an example configuration of an Element Structure that includes a TaxReturnERPCreateConfirmationMessage_Sync 82000 package. The TaxReturnERPCreateConfirmationMessage_Sync 82000 package includes a TaxReturnERPCreateConfirmationMessage_Sync 82002 entity. The TaxReturnERPCreateConfirmationMessage_Sync 82000 package includes various packages, namely a MessageHeader 82004, a TaxReturn 82010 and a Log 82250.

The MessageHeader 82004 package includes a MessageHeader 82006 entity. The MessageHeader 82006 entity has a cardinality of 0 . . . 1 82008 meaning that for each instance of the MessageHeader 82004 package there may be one MessageHeader 82006 entity.

The TaxReturn 82010 package includes a TaxReturn 82012 entity. The TaxReturn 82010 package includes various packages, namely a Form 82084, a TaxPayer 82124, a TaxPreparer 82166 and a JointFiler 82208.

The TaxReturn 82012 entity has a cardinality of 1 82014 meaning that for each instance of the TaxReturn 82010 package there is one TaxReturn 82012 entity. The TaxReturn 82012 entity includes various attributes, namely a TaxReturnID 82016, a LevyTypeCode 82020, a LevyTypeCodeName 82024, a ContractAccountID 82028, a PeriodAssignmentCode 82032, a PeriodAssignmentCodeName 82036, a TaxObligationID 82040 and a DraftIndicator 82080. The TaxReturn 82012 entity includes various subordinate entities, namely a SystemStatus 82044 and a UserStatus 82068. The TaxReturnID 82016 attribute has a cardinality of 1 82018 meaning that for each instance of the TaxReturn 82012 entity there is one TaxReturnID 82016 attribute. The LevyTypeCode 82020 attribute has a cardinality of 1 82022 meaning that for each instance of the TaxReturn 82012 entity there is one LevyTypeCode 82020 attribute. The LevyTypeCodeName 82024 attribute has a cardinality of 0 . . . 1 82026 meaning that for each instance of the TaxReturn 82012 entity there may be one LevyTypeCodeName 82024 attribute. The ContractAccountID 82028 attribute has a cardinality of 0 . . . 1 82030 meaning that for each instance of the TaxReturn 82012 entity there may be one ContractAccountID 82028 attribute. The PeriodAssignmentCode 82032 attribute has a cardinality of 1 82034 meaning that for each instance of the TaxReturn 82012 entity there is one PeriodAssignmentCode 82032 attribute. The PeriodAssignmentCodeName 82036 attribute has a cardinality of 0 . . . 1 82038 meaning that for each instance of the TaxReturn 82012 entity there may be one PeriodAssignmentCodeName 82036 attribute. The TaxObligationID 82040 attribute has a cardinality of 1 82042 meaning that for each instance of the TaxReturn 82012 entity there is one TaxObligationID 82040 attribute. The DraftIndicator 82080 attribute has a cardinality of 1 82082 meaning that for each instance of the TaxReturn 82012 entity there is one DraftIndicator 82080 attribute.

The SystemStatus 82044 entity has a cardinality of 1 . . . n 82046 meaning that for each instance of the TaxReturn 82012 entity there are one or more SystemStatus 82044 entities. The SystemStatus 82044 entity includes various attributes, namely a Code 82048, a Name 82052, an InactiveIndicator 82056, a ChangeTimePoint 82060 and a ProcessorPartyInternalID 82064. The Code 82048 attribute has a cardinality of 1 82050 meaning that for each instance of the SystemStatus 82044 entity there is one Code 82048 attribute. The Name 82052 attribute has a cardinality of 0 . . . 1 82054 meaning that for each instance of the SystemStatus 82044 entity there may be one Name 82052 attribute. The InactiveIndicator 82056 attribute has a cardinality of 1 82058 meaning that for each instance of the SystemStatus 82044 entity there is one InactiveIndicator 82056 attribute. The ChangeTimePoint 82060 attribute has a cardinality of 1 82062 meaning that for each instance of the SystemStatus 82044 entity there is one ChangeTimePoint 82060 attribute. The ProcessorPartyInternalID 82064 attribute has a cardinality of 1 82066 meaning that for each instance of the SystemStatus 82044 entity there is one ProcessorPartyInternalID 82064 attribute.

The UserStatus 82068 entity has a cardinality of 0 . . . n 82070 meaning that for each instance of the TaxReturn 82012 entity there may be one or more UserStatus 82068 entities. The UserStatus 82068 entity includes various attributes, namely a Code 82072 and a Name 82076. The Code 82072 attribute has a cardinality of 1 82074 meaning that for each instance of the UserStatus 82068 entity there is one Code 82072 attribute. The Name 82076 attribute has a cardinality of 0 . . . 1 82078 meaning that for each instance of the UserStatus 82068 entity there may be one Name 82076 attribute.

The Form 82084 package includes a Form 82086 entity. The Form 82084 package includes a PropertyValuation 82114 package.

The Form 82086 entity has a cardinality of 1 . . . n 82088 meaning that for each instance of the Form 82084 package there are one or more Form 82086 entities. The Form 82086 entity includes various attributes, namely a FormUUID 82090, a FormTemplateID 82094, a FormTemplateName 82098, a FormVersionID 82102, a FormTypeCode 82106 and a FormTypeCodeName 82110. The FormUUID 82090 attribute has a cardinality of 1 82092 meaning that for each instance of the Form 82086 entity there is one FormUUID 82090 attribute. The FormTemplateID 82094 attribute has a cardinality of 1 82096 meaning that for each instance of the Form 82086 entity there is one FormTemplateID 82094 attribute. The FormTemplateName 82098 attribute has a cardinality of 0 . . . 1 82100 meaning that for each instance of the Form 82086 entity there may be one FormTemplateName 82098 attribute. The FormVersionID 82102 attribute has a cardinality of 1 82104 meaning that for each instance of the Form 82086 entity there is one FormVersionID 82102 attribute. The FormTypeCode 82106 attribute has a cardinality of 1 82108 meaning that for each instance of the Form 82086 entity there is one FormTypeCode 82106 attribute. The FormTypeCodeName 82110 attribute has a cardinality of 0 . . . 1 82112 meaning that for each instance of the Form 82086 entity there may be one FormTypeCodeName 82110 attribute.

The PropertyValuation 82114 package includes a PropertyValuation 82116 entity. The PropertyValuation 82116 entity has a cardinality of 0 . . . 1 82118 meaning that for each instance of the PropertyValuation 82114 package there may be one PropertyValuation 82116 entity. The PropertyValuation 82116 entity includes a PropertyValuation 82120 attribute. The PropertyValuation 82120 attribute has a cardinality of 1 . . . n 82122 meaning that for each instance of the PropertyValuation 82116 entity there are one or more PropertyValuation 82120 attributes.

The TaxPayer 82124 package includes a TaxPayer 82126 entity. The TaxPayer 82126 entity has a cardinality of 1 . . . 1 82128 meaning that for each instance of the TaxPayer 82124 package there is one TaxPayer 82126 entity. The TaxPayer 82126 entity includes a TaxPayerPartyID 82130 attribute. The TaxPayer 82126 entity includes an Identification 82134 subordinate entity. The TaxPayerPartyID 82130 attribute has a cardinality of 1 82132 meaning that for each instance of the TaxPayer 82126 entity there is one TaxPayerPartyID 82130 attribute.

The Identification 82134 entity has a cardinality of 0 . . . n 82136 meaning that for each instance of the TaxPayer 82126 entity there may be one or more Identification 82134 entities. The Identification 82134 entity includes various attributes, namely a PartyIdentifierTypeCode 82138, a PartyIdentifierID 82142, an IdentifierIssuingAgencyName 82146, an EntryDate 82150, an AreaOfValidityCountryCode 82154, an AreaOfValidityRegionCode 82158 and a ValidityPeriod 82162. The PartyIdentifierTypeCode 82138 attribute has a cardinality of 1 82140 meaning that for each instance of the Identification 82134 entity there is one PartyIdentifierTypeCode 82138 attribute. The PartyIdentifierID 82142 attribute has a cardinality of 1 82144 meaning that for each instance of the Identification 82134 entity there is one PartyIdentifierID 82142 attribute. The IdentifierIssuingAgencyName 82146 attribute has a cardinality of 0 . . . 1 82148 meaning that for each instance of the Identification 82134 entity there may be one IdentifierIssuingAgencyName 82146 attribute. The EntryDate 82150 attribute has a cardinality of 0 . . . 1 82152 meaning that for each instance of the Identification 82134 entity there may be one EntryDate 82150 attribute. The AreaOfValidityCountryCode 82154 attribute has a cardinality of 0 . . . 1 82156 meaning that for each instance of the Identification 82134 entity there may be one AreaOfValidityCountryCode 82154 attribute. The AreaOfValidityRegionCode 82158 attribute has a cardinality of 0 . . . 1 82160 meaning that for each instance of the Identification 82134 entity there may be one AreaOfValidityRegionCode 82158 attribute. The ValidityPeriod 82162 attribute has a cardinality of 0 . . . 1 82164 meaning that for each instance of the Identification 82134 entity there may be one ValidityPeriod 82162 attribute.

The TaxPreparer 82166 package includes a TaxPreparer 82168 entity. The TaxPreparer 82168 entity has a cardinality of 0 . . . 1 82170 meaning that for each instance of the TaxPreparer 82166 package there may be one TaxPreparer 82168 entity. The TaxPreparer 82168 entity includes a TaxPreparerPartyID 82172 attribute. The TaxPreparer 82168 entity includes an Identification 82176 subordinate entity. The TaxPreparerPartyID 82172 attribute has a cardinality of 1 82174 meaning that for each instance of the TaxPreparer 82168 entity there is one TaxPreparerPartyID 82172 attribute.

The Identification 82176 entity has a cardinality of 0 . . . n 82178 meaning that for each instance of the TaxPreparer 82168 entity there may be one or more Identification 82176 entities. The Identification 82176 entity includes various attributes, namely a PartyIdentifierTypeCode 82180, a PartyIdentifierID 82184, an IdentifierIssuingAgencyName 82188, an EntryDate 82192, an AreaOfValidityCountryCode 82196, an AreaOfValidityRegionCode 82200 and a ValidityPeriod 82204. The PartyIdentifierTypeCode 82180 attribute has a cardinality of 1 82182 meaning that for each instance of the Identification 82176 entity there is one PartyIdentifierTypeCode 82180 attribute. The PartyIdentifierID 82184 attribute has a cardinality of 1 82186 meaning that for each instance of the Identification 82176 entity there is one PartyIdentifierID 82184 attribute. The IdentifierIssuingAgencyName 82188 attribute has a cardinality of 0 . . . 1 82190 meaning that for each instance of the Identification 82176 entity there may be one IdentifierIssuingAgencyName 82188 attribute. The EntryDate 82192 attribute has a cardinality of 0 . . . 1 82194 meaning that for each instance of the Identification 82176 entity there may be one EntryDate 82192 attribute. The AreaOfValidityCountryCode 82196 attribute has a cardinality of 0 . . . 1 82198 meaning that for each instance of the Identification 82176 entity there may be one AreaOfValidityCountryCode 82196 attribute. The AreaOfValidityRegionCode 82200 attribute has a cardinality of 0 . . . 1 82202 meaning that for each instance of the Identification 82176 entity there may be one AreaOfValidityRegionCode 82200 attribute. The ValidityPeriod 82204 attribute has a cardinality of 0 . . . 1 82206 meaning that for each instance of the Identification 82176 entity there may be one ValidityPeriod 82204 attribute.

The JointFiler 82208 package includes a JointFiler 82210 entity. The JointFiler 82210 entity has a cardinality of 0 . . . 1 82212 meaning that for each instance of the JointFiler 82208 package there may be one JointFiler 82210 entity. The JointFiler 82210 entity includes a JointFilerPartyID 82214 attribute. The JointFiler 82210 entity includes an Identification 82218 subordinate entity. The JointFilerPartyID 82214 attribute has a cardinality of 1 82216 meaning that for each instance of the JointFiler 82210 entity there is one JointFilerPartyID 82214 attribute.

The Identification 82218 entity has a cardinality of 0 . . . n 82220 meaning that for each instance of the JointFiler 82210 entity there may be one or more Identification 82218 entities. The Identification 82218 entity includes various attributes, namely a PartyIdentifierTypeCode 82222, a PartyIdentifierID 82226, an IdentifierIssuingAgencyName 82230, an EntryDate 82234, an AreaOfValidityCountryCode 82238, an AreaOfValidityRegionCode 82242 and a ValidityPeriod 82246. The PartyIdentifierTypeCode 82222 attribute has a cardinality of 1 82224 meaning that for each instance of the Identification 82218 entity there is one PartyIdentifierTypeCode 82222 attribute. The PartyIdentifierID 82226 attribute has a cardinality of 1 82228 meaning that for each instance of the Identification 82218 entity there is one PartyIdentifierID 82226 attribute. The IdentifierIssuingAgencyName 82230 attribute has a cardinality of 0 . . . 1 82232 meaning that for each instance of the Identification 82218 entity there may be one IdentifierIssuingAgencyName 82230 attribute. The EntryDate 82234 attribute has a cardinality of 0 . . . 1 82236 meaning that for each instance of the Identification 82218 entity there may be one EntryDate 82234 attribute. The AreaOfValidityCountryCode 82238 attribute has a cardinality of 0 . . . 1 82240 meaning that for each instance of the Identification 82218 entity there may be one AreaOfValidityCountryCode 82238 attribute. The AreaOfValidityRegionCode 82242 attribute has a cardinality of 0 . . . 1 82244 meaning that for each instance of the Identification 82218 entity there may be one AreaOfValidityRegionCode 82242 attribute. The ValidityPeriod 82246 attribute has a cardinality of 0 . . . 1 82248 meaning that for each instance of the Identification 82218 entity there may be one ValidityPeriod 82246 attribute.

The Log 82250 package includes a Log 82252 entity. The Log 82252 entity has a cardinality of 1 82254 meaning that for each instance of the Log 82250 package there is one Log 82252 entity. The data types of the various packages, entities, and attributes are described with respect to FIG. 76.

In further detail, FIGS. 83-1 through 83-3 illustrate an example configuration of an Element Structure that includes a TaxReturnERPValidateRequestMessage_Sync 83000 package. The TaxReturnERPValidateRequestMessage_Sync 83000 package includes a TaxReturnERPValidateRequestMessage_Sync 83002 entity. The TaxReturnERPValidateRequestMessage_Sync 83000 package includes various packages, namely a MessageHeader 83004 and a TaxReturn 83010.

The MessageHeader 83004 package includes a MessageHeader 83006 entity. The MessageHeader 83006 entity has a cardinality of 1 83008 meaning that for each instance of the MessageHeader 83004 package there is one MessageHeader 83006 entity.

The TaxReturn 83010 package includes a TaxReturn 83012 entity. The TaxReturn 83010 package includes various packages, namely a Form 83036, a TaxPayer 83064, a TaxPreparer 83074 and a JointFiler 83084.

The TaxReturn 83012 entity has a cardinality of 1 83014 meaning that for each instance of the TaxReturn 83010 package there is one TaxReturn 83012 entity. The TaxReturn 83012 entity includes various attributes, namely a TaxReturnID 83016, a LevyTypeCode 83020, a ContractAccountID 83024, a PeriodAssignmentCode 83028 and a TaxObligationID 83032. The TaxReturnID 83016 attribute has a cardinality of 0 . . . 1 83018 meaning that for each instance of the TaxReturn 83012 entity there may be one TaxReturnID 83016 attribute. The LevyTypeCode 83020 attribute has a cardinality of 1 83022 meaning that for each instance of the TaxReturn 83012 entity there is one LevyTypeCode 83020 attribute. The ContractAccountID 83024 attribute has a cardinality of 0 . . . 1 83026 meaning that for each instance of the TaxReturn 83012 entity there may be one ContractAccountID 83024 attribute. The PeriodAssignmentCode 83028 attribute has a cardinality of 0 . . . 1 83030 meaning that for each instance of the TaxReturn 83012 entity there may be one PeriodAssignmentCode 83028 attribute. The TaxObligationID 83032 attribute has a cardinality of 1 83034 meaning that for each instance of the TaxReturn 83012 entity there is one TaxObligationID 83032 attribute.

The Form 83036 package includes a Form 83038 entity. The Form 83036 package includes a PropertyValuation 83054 package.

The Form 83038 entity has a cardinality of 1 . . . n 83040 meaning that for each instance of the Form 83036 package there are one or more Form 83038 entities. The Form 83038 entity includes various attributes, namely a FormUUID 83042, a FormTemplateID 83046 and a FormVersionID 83050. The FormUUID 83042 attribute has a cardinality of 0 . . . 1 83044 meaning that for each instance of the Form 83038 entity there may be one FormUUID 83042 attribute. The FormTemplateID 83046 attribute has a cardinality of 1 83048 meaning that for each instance of the Form 83038 entity there is one FormTemplateID 83046 attribute. The FormVersionID 83050 attribute has a cardinality of 1 83052 meaning that for each instance of the Form 83038 entity there is one FormVersionID 83050 attribute.

The PropertyValuation 83054 package includes a PropertyValuation 83056 entity. The PropertyValuation 83056 entity has a cardinality of 0 . . . 1 83058 meaning that for each instance of the PropertyValuation 83054 package there may be one PropertyValuation 83056 entity. The PropertyValuation 83056 entity includes a PropertyValuation 83060 attribute. The PropertyValuation 83060 attribute has a cardinality of 1 . . . n 83062 meaning that for each instance of the PropertyValuation 83056 entity there are one or more PropertyValuation 83060 attributes.

The TaxPayer 83064 package includes a TaxPayer 83066 entity. The TaxPayer 83066 entity has a cardinality of 1 . . . 1 83068 meaning that for each instance of the TaxPayer 83064 package there is one TaxPayer 83066 entity and for each TaxPayer 83066 entity there is one TaxPayer 83064 package. The TaxPayer 83066 entity includes a TaxPayerPartyID 83070 attribute. The TaxPayerPartyID 83070 attribute has a cardinality of 1 83072 meaning that for each instance of the TaxPayer 83066 entity there is one TaxPayerPartyID 83070 attribute.

The TaxPreparer 83074 package includes a TaxPreparer 83076 entity. The TaxPreparer 83076 entity has a cardinality of 0 . . . 1 83078 meaning that for each instance of the TaxPreparer 83074 package there may be one TaxPreparer 83076 entity. The TaxPreparer 83076 entity includes a TaxPreparerPartyID 83080 attribute. The TaxPreparerPartyID 83080 attribute has a cardinality of 1 83082 meaning that for each instance of the TaxPreparer 83076 entity there is one TaxPreparerPartyID 83080 attribute.

The JointFiler 83084 package includes a JointFiler 83086 entity. The JointFiler 83086 entity has a cardinality of 0 . . . 1 83088 meaning that for each instance of the JointFiler 83084 package there may be one JointFiler 83086 entity. The JointFiler 83086 entity includes a JointFilerPartyID 83090 attribute. The JointFilerPartyID 83090 attribute has a cardinality of 1 83092 meaning that for each instance of the JointFiler 83086 entity there is one JointFilerPartyID 83090 attribute. The data types of the various packages, entities, and attributes are described with respect to FIG. 76.

In further detail, FIGS. 84-1 through 84-10 illustrate an example configuration of an Element Structure that includes a TaxReturnERPValidateConfirmationMessage_Sync 84000 package. The TaxReturnERPValidateConfirmationMessage_Sync 84000 package includes a TaxReturnERPValidateConfirmationMessage_Sync 84002 entity. The TaxReturnERPValidateConfirmationMessage_Sync 84000 package includes various packages, namely a TaxReturn 84004 and a Log 84256.

The TaxReturn 84004 package includes a TaxReturn 84006 entity. The TaxReturn 84004 package includes various packages, namely a Form 84090, a TaxPayer 84130, a TaxPreparer 84172 and a JointFiler 84214.

The TaxReturn 84006 entity has a cardinality of 0 . . . 1 84008 meaning that for each instance of the TaxReturn 84004 package there may be one TaxReturn 84006 entity. The TaxReturn 84006 entity includes various attributes, namely a TaxReturnID 84010, a LevyTypeCode 84014, a LevyTypeCodeName 84018, a ContractAccountID 84022, a PeriodAssignmentCode 84026, a PeriodAssignmentCodeName 84030, a TaxObligationID 84034, a TaxAmount 84038, an InterestAmount 84042, an AdditionalReceivablesAmount 84046 and a DraftIndicator 84086. The TaxReturn 84006 entity includes various subordinate entities, namely a SystemStatus 84050 and a UserStatus 84074. The TaxReturnID 84010 attribute has a cardinality of 0 . . . 1 84012 meaning that for each instance of the TaxReturn 84006 entity there may be one TaxReturnID 84010 attribute. The LevyTypeCode 84014 attribute has a cardinality of 1 84016 meaning that for each instance of the TaxReturn 84006 entity there is one LevyTypeCode 84014 attribute. The LevyTypeCodeName 84018 attribute has a cardinality of 0 . . . 1 84020 meaning that for each instance of the TaxReturn 84006 entity there may be one LevyTypeCodeName 84018 attribute.

The ContractAccountID 84022 attribute has a cardinality of 0 . . . 1 84024 meaning that for each instance of the TaxReturn 84006 entity there may be one ContractAccountID 84022 attribute. The PeriodAssignmentCode 84026 attribute has a cardinality of 0 . . . 1 84028 meaning that for each instance of the TaxReturn 84006 entity there may be one PeriodAssignmentCode 84026 attribute. The PeriodAssignmentCodeName 84030 attribute has a cardinality of 0 . . . 1 84032 meaning that for each instance of the TaxReturn 84006 entity there may be one PeriodAssignmentCodeName 84030 attribute. The TaxObligationID 84034 attribute has a cardinality of 1 84036 meaning that for each instance of the TaxReturn 84006 entity there is one TaxObligationID 84034 attribute. The TaxAmount 84038 attribute has a cardinality of 0 . . . 1 84040 meaning that for each instance of the TaxReturn 84006 entity there may be one TaxAmount 84038 attribute. The InterestAmount 84042 attribute has a cardinality of 0 . . . 1 84044 meaning that for each instance of the TaxReturn 84006 entity there may be one InterestAmount 84042 attribute. The AdditionalReceivablesAmount 84046 attribute has a cardinality of 0 . . . 1 84048 meaning that for each instance of the TaxReturn 84006 entity there may be one AdditionalReceivablesAmount 84046 attribute. The DraftIndicator 84086 attribute has a cardinality of 1 84088 meaning that for each instance of the TaxReturn 84006 entity there is one DraftIndicator 84086 attribute.

The SystemStatus 84050 entity has a cardinality of 1 . . . n 84052 meaning that for each instance of the TaxReturn 84006 entity there are one or more SystemStatus 84050 entities. The SystemStatus 84050 entity includes various attributes, namely a SystemStatusCode 84054, a SystemStatusCodeName 84058, an InactiveIndicator 84062, a ChangeTimePoint 84066 and a ProcessorPartyInternalID 84070. The SystemStatusCode 84054 attribute has a cardinality of 1 84056 meaning that for each instance of the SystemStatus 84050 entity there is one SystemStatusCode 84054 attribute. The SystemStatusCodeName 84058 attribute has a cardinality of 0 . . . 1 84060 meaning that for each instance of the SystemStatus 84050 entity there may be one SystemStatusCodeName 84058 attribute. The InactiveIndicator 84062 attribute has a cardinality of 1 84064 meaning that for each instance of the SystemStatus 84050 entity there is one InactiveIndicator 84062 attribute. The ChangeTimePoint 84066 attribute has a cardinality of 1 84068 meaning that for each instance of the SystemStatus 84050 entity there is one ChangeTimePoint 84066 attribute. The ProcessorPartyInternalID 84070 attribute has a cardinality of 1 84072 meaning that for each instance of the SystemStatus 84050 entity there is one ProcessorPartyInternalID 84070 attribute.

The UserStatus 84074 entity has a cardinality of 0 . . . n 84076 meaning that for each instance of the TaxReturn 84006 entity there may be one or more UserStatus 84074 entities. The UserStatus 84074 entity includes various attributes, namely a UserStatusCode 84078 and a UserStatusCodeName 84082. The UserStatusCode 84078 attribute has a cardinality of 1 84080 meaning that for each instance of the UserStatus 84074 entity there is one UserStatusCode 84078 attribute. The UserStatusCodeName 84082 attribute has a cardinality of 0 . . . 1 84084 meaning that for each instance of the UserStatus 84074 entity there may be one UserStatusCodeName 84082 attribute.

The Form 84090 package includes a Form 84092 entity. The Form 84090 package includes a PropertyValuation 84120 package.

The Form 84092 entity has a cardinality of 1 . . . n 84094 meaning that for each instance of the Form 84090 package there are one or more Form 84092 entities. The Form 84092 entity includes various attributes, namely a FormUUID 84096, a FormTemplateID 84100, a FormTemplateName 84104, a FormVersionID 84108, a FormTypeCode 84112 and a FormTypeCodeName 84116. The FormUUID 84096 attribute has a cardinality of 0 . . . 1 84098 meaning that for each instance of the Form 84092 entity there may be one FormUUID 84096 attribute. The FormTemplateID 84100 attribute has a cardinality of 1 84102 meaning that for each instance of the Form 84092 entity there is one FormTemplateID 84100 attribute. The FormTemplateName 84104 attribute has a cardinality of 0 . . . 1 84106 meaning that for each instance of the Form 84092 entity there may be one FormTemplateName 84104 attribute. The FormVersionID 84108 attribute has a cardinality of 1 84110 meaning that for each instance of the Form 84092 entity there is one FormVersionID 84108 attribute. The FormTypeCode 84112 attribute has a cardinality of 1 84114 meaning that for each instance of the Form 84092 entity there is one FormTypeCode 84112 attribute. The FormTypeCodeName 84116 attribute has a cardinality of 0 . . . 1 84118 meaning that for each instance of the Form 84092 entity there may be one FormTypeCodeName 84116 attribute.

The PropertyValuation 84120 package includes a PropertyValuation 84122 entity. The PropertyValuation 84122 entity has a cardinality of 0 . . . 1 84124 meaning that for each instance of the PropertyValuation 84120 package there may be one PropertyValuation 84122 entity. The PropertyValuation 84122 entity includes a PropertyValuation 84126 attribute. The PropertyValuation 84126 attribute has a cardinality of 1 . . . n 84128 meaning that for each instance of the PropertyValuation 84122 entity there are one or more PropertyValuation 84126 attributes.

The TaxPayer 84130 package includes a TaxPayer 84132 entity. The TaxPayer 84132 entity has a cardinality of 1 . . . 1 84134 meaning that for each instance of the TaxPayer 84130 package there is one TaxPayer 84132 entity. The TaxPayer 84132 entity includes a TaxPayerPartyID 84136 attribute. The TaxPayer 84132 entity includes an Identification 84140 subordinate entity. The TaxPayerPartyID 84136 attribute has a cardinality of 1 84138 meaning that for each instance of the TaxPayer 84132 entity there is one TaxPayerPartyID 84136 attribute.

The Identification 84140 entity has a cardinality of 0 . . . n 84142 meaning that for each instance of the TaxPayer 84132 entity there may be one or more Identification 84140 entities. The Identification 84140 entity includes various attributes, namely a PartyIdentifierTypeCode 84144, a PartyIdentifierID 84148, an IdentifierIssuingAgencyName 84152, an EntryDate 84156, an AreaOfValidityCountryCode 84160, an AreaOfValidityRegionCode 84164 and a ValidityPeriod 84168. The PartyIdentifierTypeCode 84144 attribute has a cardinality of 0 . . . 1 84146 meaning that for each instance of the Identification 84140 entity there may be one PartyIdentifierTypeCode 84144 attribute. The PartyIdentifierID 84148 attribute has a cardinality of 1 84150 meaning that for each instance of the Identification 84140 entity there is one PartyIdentifierID 84148 attribute. The IdentifierIssuingAgencyName 84152 attribute has a cardinality of 0 . . . 1 84154 meaning that for each instance of the Identification 84140 entity there may be one IdentifierIssuingAgencyName 84152 attribute. The EntryDate 84156 attribute has a cardinality of 0 . . . 1 84158 meaning that for each instance of the Identification 84140 entity there may be one EntryDate 84156 attribute. The AreaOfValidityCountryCode 84160 attribute has a cardinality of 0 . . . 1 84162 meaning that for each instance of the Identification 84140 entity there may be one AreaOfValidityCountryCode 84160 attribute. The AreaOfValidityRegionCode 84164 attribute has a cardinality of 0 . . . 1 84166 meaning that for each instance of the Identification 84140 entity there may be one AreaOfValidityRegionCode 84164 attribute. The ValidityPeriod 84168 attribute has a cardinality of 0 . . . 1 84170 meaning that for each instance of the Identification 84140 entity there may be one ValidityPeriod 84168 attribute.

The TaxPreparer 84172 package includes a TaxPreparer 84174 entity. The TaxPreparer 84174 entity has a cardinality of 0 . . . 1 84176 meaning that for each instance of the TaxPreparer 84172 package there may be one TaxPreparer 84174 entity. The TaxPreparer 84174 entity includes a TaxPreparerPartyID 84178 attribute. The TaxPreparer 84174 entity includes an Identification 84182 subordinate entity. The TaxPreparerPartyID 84178 attribute has a cardinality of 1 84180 meaning that for each instance of the TaxPreparer 84174 entity there is one TaxPreparerPartyID 84178 attribute.

The Identification 84182 entity has a cardinality of 0 . . . n 84184 meaning that for each instance of the TaxPreparer 84174 entity there may be one or more Identification 84182 entities. The Identification 84182 entity includes various attributes, namely a PartyIdentifierTypeCode 84186, a PartyIdentifierID 84190, an IdentifierIssuingAgencyName 84194, an EntryDate 84198, an AreaOfValidityCountryCode 84202, an AreaOfValidityRegionCode 84206 and a ValidityPeriod 84210. The PartyIdentifierTypeCode 84186 attribute has a cardinality of 0 . . . 1 84188 meaning that for each instance of the Identification 84182 entity there may be one PartyIdentifierTypeCode 84186 attribute. The PartyIdentifierID 84190 attribute has a cardinality of 1 84192 meaning that for each instance of the Identification 84182 entity there is one PartyIdentifierID 84190 attribute. The IdentifierIssuingAgencyName 84194 attribute has a cardinality of 0 . . . 1 84196 meaning that for each instance of the Identification 84182 entity there may be one IdentifierIssuingAgencyName 84194 attribute. The EntryDate 84198 attribute has a cardinality of 0 . . . 1 84200 meaning that for each instance of the Identification 84182 entity there may be one EntryDate 84198 attribute. The AreaOfValidityCountryCode 84202 attribute has a cardinality of 0 . . . 1 84204 meaning that for each instance of the Identification 84182 entity there may be one AreaOfValidityCountryCode 84202 attribute. The AreaOfValidityRegionCode 84206 attribute has a cardinality of 0 . . . 1 84208 meaning that for each instance of the Identification 84182 entity there may be one AreaOfValidityRegionCode 84206 attribute. The ValidityPeriod 84210 attribute has a cardinality of 0 . . . 1 84212 meaning that for each instance of the Identification 84182 entity there may be one ValidityPeriod 84210 attribute.

The JointFiler 84214 package includes a JointFiler 84216 entity. The JointFiler 84216 entity has a cardinality of 0 . . . 1 84218 meaning that for each instance of the JointFiler 84214 package there may be one JointFiler 84216 entity. The JointFiler 84216 entity includes a JointFilerPartyID 84220 attribute. The JointFiler 84216 entity includes an Identification 84224 subordinate entity. The JointFilerPartyID 84220 attribute has a cardinality of 1 84222 meaning that for each instance of the JointFiler 84216 entity there is one JointFilerPartyID 84220 attribute.

The Identification 84224 entity has a cardinality of 0 . . . n 84226 meaning that for each instance of the JointFiler 84216 entity there may be one or more Identification 84224 entities. The Identification 84224 entity includes various attributes, namely a PartyIdentifierTypeCode 84228, a PartyIdentifierID 84232, an IdentifierIssuingAgencyName 84236, an EntryDate 84240, an AreaOfValidityCountryCode 84244, an AreaOfValidityRegionCode 84248 and a ValidityPeriod 84252. The PartyIdentifierTypeCode 84228 attribute has a cardinality of 0 . . . 1 84230 meaning that for each instance of the Identification 84224 entity there may be one PartyIdentifierTypeCode 84228 attribute. The PartyIdentifierID 84232 attribute has a cardinality of 1 84234 meaning that for each instance of the Identification 84224 entity there is one PartyIdentifierID 84232 attribute. The IdentifierIssuingAgencyName 84236 attribute has a cardinality of 0 . . . 1 84238 meaning that for each instance of the Identification 84224 entity there may be one IdentifierIssuingAgencyName 84236 attribute. The EntryDate 84240 attribute has a cardinality of 0 . . . 1 84242 meaning that for each instance of the Identification 84224 entity there may be one EntryDate 84240 attribute. The AreaOfValidityCountryCode 84244 attribute has a cardinality of 0 . . . 1 84246 meaning that for each instance of the Identification 84224 entity there may be one AreaOfValidityCountryCode 84244 attribute. The AreaOfValidityRegionCode 84248 attribute has a cardinality of 0 . . . 1 84250 meaning that for each instance of the Identification 84224 entity there may be one AreaOfValidityRegionCode 84248 attribute. The ValidityPeriod 84252 attribute has a cardinality of 0 . . . 1 84254 meaning that for each instance of the Identification 84224 entity there may be one ValidityPeriod 84252 attribute.

The Log 84256 package includes a Log 84258 entity. The Log 84258 entity has a cardinality of 1 84260 meaning that for each instance of the Log 84256 package there is one Log 84258 entity. The data types of the various packages, entities, and attributes are described with respect to FIG. 76.

In further detail, FIGS. 85-1 through 85-4 illustrate an example configuration of an Element Structure that includes a TaxReturnERPChangeRequestMessage_Sync 85000 package. The TaxReturnERPChangeRequestMessage_Sync 85000 package includes a TaxReturnERPChangeRequestMessage_Sync 85002 entity. The TaxReturnERPChangeRequestMessage_Sync 85000 package includes various packages, namely a MessageHeader 85004 and a TaxReturn 85010.

The MessageHeader 85004 package includes a MessageHeader 85006 entity. The MessageHeader 85006 entity has a cardinality of 1 85008 meaning that for each instance of the MessageHeader 85004 package there is one MessageHeader 85006 entity.

The TaxReturn 85010 package includes a TaxReturn 85012 entity. The TaxReturn 85010 package includes various packages, namely a Form 85044, a TaxPayer 85080, a TaxPreparer 85090 and a JointFiler 85100.

The TaxReturn 85012 entity has a cardinality of 1 85014 meaning that for each instance of the TaxReturn 85010 package there is one TaxReturn 85012 entity. The TaxReturn 85012 entity includes various attributes, namely an @formListCompleteTransmissionIndicator 85016, a TaxReturnID 85020, a LevyTypeCode 85024, a ContractAccountID 85028, a PeriodAssignmentCode 85032, a TaxObligationID 85036 and a DraftIndicator 85040. The @formListCompleteTransmissionIndicator 85016 attribute has a cardinality of 0 . . . 1 85018 meaning that for each instance of the TaxReturn 85012 entity there may be one @formListCompleteTransmissionIndicator 85016 attribute. The TaxReturnID 85020 attribute has a cardinality of 1 85022 meaning that for each instance of the TaxReturn 85012 entity there is one TaxReturnID 85020 attribute. The LevyTypeCode 85024 attribute has a cardinality of 1 85026 meaning that for each instance of the TaxReturn 85012 entity there is one LevyTypeCode 85024 attribute. The ContractAccountID 85028 attribute has a cardinality of 0 . . . 1 85030 meaning that for each instance of the TaxReturn 85012 entity there may be one ContractAccountID 85028 attribute. The PeriodAssignmentCode 85032 attribute has a cardinality of 1 85034 meaning that for each instance of the TaxReturn 85012 entity there is one PeriodAssignmentCode 85032 attribute. The TaxObligationID 85036 attribute has a cardinality of 1 85038 meaning that for each instance of the TaxReturn 85012 entity there is one TaxObligationID 85036 attribute. The DraftIndicator 85040 attribute has a cardinality of 0 . . . 1 85042 meaning that for each instance of the TaxReturn 85012 entity there may be one DraftIndicator 85040 attribute.

The Form 85044 package includes a Form 85046 entity. The Form 85044 package includes a PropertyValuation 85070 package.

The Form 85046 entity has a cardinality of 1 . . . n 85048 meaning that for each instance of the Form 85044 package there are one or more Form 85046 entities. The Form 85046 entity includes various attributes, namely an @propertyGroupListCompleteTransmissionIndicator 85050, an @actionCode 85054, a FormUUID 85058, a FormTemplateID 85062 and a FormVersionID 85066. The @propertyGroupListCompleteTransmissionIndicator 85050 attribute has a cardinality of 0 . . . 1 85052 meaning that for each instance of the Form 85046 entity there may be one @propertyGroupListCompleteTransmissionIndicator 85050 attribute. The @actionCode 85054 attribute has a cardinality of 0 . . . 1 85056 meaning that for each instance of the Form 85046 entity there may be one @actionCode 85054 attribute. The FormUUID 85058 attribute has a cardinality of 0 . . . 1 85060 meaning that for each instance of the Form 85046 entity there may be one FormUUID 85058 attribute. The FormTemplateID 85062 attribute has a cardinality of 1 85064 meaning that for each instance of the Form 85046 entity there is one FormTemplateID 85062 attribute. The FormVersionID 85066 attribute has a cardinality of 1 85068 meaning that for each instance of the Form 85046 entity there is one FormVersionID 85066 attribute.

The PropertyValuation 85070 package includes a PropertyValuation 85072 entity. The PropertyValuation 85072 entity has a cardinality of 0 . . . 1 85074 meaning that for each instance of the PropertyValuation 85070 package there may be one PropertyValuation 85072 entity. The PropertyValuation 85072 entity includes a PropertyValuation 85076 attribute. The PropertyValuation 85076 attribute has a cardinality of 1 . . . n 85078 meaning that for each instance of the PropertyValuation 85072 entity there are one or more PropertyValuation 85076 attributes.

The TaxPayer 85080 package includes a TaxPayer 85082 entity. The TaxPayer 85082 entity has a cardinality of 1 . . . 1 85084 meaning that for each instance of the TaxPayer 85080 package there is one TaxPayer 85082 entity. The TaxPayer 85082 entity includes a TaxPayerPartyID 85086 attribute. The TaxPayerPartyID 85086 attribute has a cardinality of 1 85088 meaning that for each instance of the TaxPayer 85082 entity there is one TaxPayerPartyID 85086 attribute.

The TaxPreparer 85090 package includes a TaxPreparer 85092 entity. The TaxPreparer 85092 entity has a cardinality of 0 . . . 1 85094 meaning that for each instance of the TaxPreparer 85090 package there may be one TaxPreparer 85092 entity. The TaxPreparer 85092 entity includes a TaxPreparerPartyID 85096 attribute. The TaxPreparerPartyID 85096 attribute has a cardinality of 1 85098 meaning that for each instance of the TaxPreparer 85092 entity there is one TaxPreparerPartyID 85096 attribute.

The JointFiler 85100 package includes a JointFiler 85102 entity. The JointFiler 85102 entity has a cardinality of 0 . . . 1 85104 meaning that for each instance of the JointFiler 85100 package there may be one JointFiler 85102 entity. The JointFiler 85102 entity includes a JointFilerPartyID 85106 attribute. The JointFilerPartyID 85106 attribute has a cardinality of 1 85108 meaning that for each instance of the JointFiler 85102 entity there is one JointFilerPartyID 85106 attribute. The data types of the various packages, entities, and attributes are described with respect to FIG. 76.

In further detail, FIGS. 86-1 through 86-10 illustrate an example configuration of an Element Structure that includes a TaxReturnERPChangeConfirmationMessage_Sync 86000 package. The TaxReturnERPChangeConfirmationMessage_Sync 86000 package includes a TaxReturnERPChangeConfirmationMessage_Sync 86002 entity. The TaxReturnERPChangeConfirmationMessage_Sync 86000 package includes various packages, namely a MessageHeader 86004, a TaxReturn 86010 and a Log 86250.

The MessageHeader 86004 package includes a MessageHeader 86006 entity. The MessageHeader 86006 entity has a cardinality of 0 . . . 1 86008 meaning that for each instance of the MessageHeader 86004 package there may be one MessageHeader 86006 entity.

The TaxReturn 86010 package includes a TaxReturn 86012 entity. The TaxReturn 86010 package includes various packages, namely a Form 86084, a TaxPayer 86124, a TaxPreparer 86166 and a JointFiler 86208.

The TaxReturn 86012 entity has a cardinality of 1 86014 meaning that for each instance of the TaxReturn 86010 package there is one TaxReturn 86012 entity. The TaxReturn 86012 entity includes various attributes, namely a TaxReturnID 86016, a LevyTypeCode 86020, a LevyTypeCodeName 86024, a ContractAccountID 86028, a PeriodAssignmentCode 86032, a PeriodAssignmentCodeName 86036, a TaxObligationID 86040 and a DraftIndicator 86080. The TaxReturn 86012 entity includes various subordinate entities, namely a SystemStatus 86044 and a UserStatus 86068. The TaxReturnID 86016 attribute has a cardinality of 1 86018 meaning that for each instance of the TaxReturn 86012 entity there is one TaxReturnID 86016 attribute. The LevyTypeCode 86020 attribute has a cardinality of 1 86022 meaning that for each instance of the TaxReturn 86012 entity there is one LevyTypeCode 86020 attribute. The LevyTypeCodeName 86024 attribute has a cardinality of 0 . . . 1 86026 meaning that for each instance of the TaxReturn 86012 entity there may be one LevyTypeCodeName 86024 attribute. The ContractAccountID 86028 attribute has a cardinality of 0 . . . 1 86030 meaning that for each instance of the TaxReturn 86012 entity there may be one ContractAccountID 86028 attribute.

The PeriodAssignmentCode 86032 attribute has a cardinality of 1 86034 meaning that for each instance of the TaxReturn 86012 entity there is one PeriodAssignmentCode 86032 attribute. The PeriodAssignmentCodeName 86036 attribute has a cardinality of 0 . . . 1 86038 meaning that for each instance of the TaxReturn 86012 entity there may be one PeriodAssignmentCodeName 86036 attribute. The TaxObligationID 86040 attribute has a cardinality of 1 86042 meaning that for each instance of the TaxReturn 86012 entity there is one TaxObligationID 86040 attribute. The DraftIndicator 86080 attribute has a cardinality of 1 86082 meaning that for each instance of the TaxReturn 86012 entity there is one DraftIndicator 86080 attribute.

The SystemStatus 86044 entity has a cardinality of 1 . . . n 86046 meaning that for each instance of the TaxReturn 86012 entity there are one or more SystemStatus 86044 entities. The SystemStatus 86044 entity includes various attributes, namely a SystemStatusCode 86048, a SystemStatusCodeName 86052, an ActiveIndicator 86056, a ChangeTimePoint 86060 and a ProcessorPartyInternalID 86064. The SystemStatusCode 86048 attribute has a cardinality of 1 86050 meaning that for each instance of the SystemStatus 86044 entity there is one SystemStatusCode 86048 attribute. The SystemStatusCodeName 86052 attribute has a cardinality of 0 . . . 1 86054 meaning that for each instance of the SystemStatus 86044 entity there may be one SystemStatusCodeName 86052 attribute. The ActiveIndicator 86056 attribute has a cardinality of 1 86058 meaning that for each instance of the SystemStatus 86044 entity there is one ActiveIndicator 86056 attribute. The ChangeTimePoint 86060 attribute has a cardinality of 1 86062 meaning that for each instance of the SystemStatus 86044 entity there is one ChangeTimePoint 86060 attribute. The ProcessorPartyInternalID 86064 attribute has a cardinality of 1 86066 meaning that for each instance of the SystemStatus 86044 entity there is one ProcessorPartyInternalID 86064 attribute.

The UserStatus 86068 entity has a cardinality of 0 . . . n 86070 meaning that for each instance of the TaxReturn 86012 entity there may be one or more UserStatus 86068 entities. The UserStatus 86068 entity includes various attributes, namely a UserStatusCode 86072 and a UserStatusCodeName 86076. The UserStatusCode 86072 attribute has a cardinality of 1 86074 meaning that for each instance of the UserStatus 86068 entity there is one UserStatusCode 86072 attribute. The UserStatusCodeName 86076 attribute has a cardinality of 0 . . . 1 86078 meaning that for each instance of the UserStatus 86068 entity there may be one UserStatusCodeName 86076 attribute.

The Form 86084 package includes a Form 86086 entity. The Form 86084 package includes a PropertyValuation 86114 package.

The Form 86086 entity has a cardinality of 0 . . . n 86088 meaning that for each instance of the Form 86084 package there may be one or more Form 86086 entities. The Form 86086 entity includes various attributes, namely a FormUUID 86090, a FormTemplateID 86094, a FormTemplateName 86098, a FormVersionID 86102, a FormTypeCode 86106 and a FormTypeCodeName 86110. The FormUUID 86090 attribute has a cardinality of 1 86092 meaning that for each instance of the Form 86086 entity there is one FormUUID 86090 attribute. The FormTemplateID 86094 attribute has a cardinality of 1 86096 meaning that for each instance of the Form 86086 entity there is one FormTemplateID 86094 attribute. The FormTemplateName 86098 attribute has a cardinality of 0 . . . 1 86100 meaning that for each instance of the Form 86086 entity there may be one FormTemplateName 86098 attribute. The FormVersionID 86102 attribute has a cardinality of 1 86104 meaning that for each instance of the Form 86086 entity there is one FormVersionID 86102 attribute. The FormTypeCode 86106 attribute has a cardinality of 1 86108 meaning that for each instance of the Form 86086 entity there is one FormTypeCode 86106 attribute. The FormTypeCodeName 86110 attribute has a cardinality of 0 . . . 1 86112 meaning that for each instance of the Form 86086 entity there may be one FormTypeCodeName 86110 attribute.

The PropertyValuation 86114 package includes a PropertyValuation 86116 entity. The PropertyValuation 86116 entity has a cardinality of 0 . . . 1 86118 meaning that for each instance of the PropertyValuation 86114 package there may be one PropertyValuation 86116 entity. The PropertyValuation 86116 entity includes a PropertyValuation 86120 attribute. The PropertyValuation 86120 attribute has a cardinality of 1 . . . n 86122 meaning that for each instance of the PropertyValuation 86116 entity there are one or more PropertyValuation 86120 attributes.

The TaxPayer 86124 package includes a TaxPayer 86126 entity. The TaxPayer 86126 entity has a cardinality of 1 . . . 1 86128 meaning that for each instance of the TaxPayer 86124 package there is one TaxPayer 86126 entity. The TaxPayer 86126 entity includes a TaxPayerPartyID 86130 attribute. The TaxPayer 86126 entity includes an Identification 86134 subordinate entity. The TaxPayerPartyID 86130 attribute has a cardinality of 1 86132 meaning that for each instance of the TaxPayer 86126 entity there is one TaxPayerPartyID 86130 attribute.

The Identification 86134 entity has a cardinality of 0 . . . n 86136 meaning that for each instance of the TaxPayer 86126 entity there may be one or more Identification 86134 entities. The Identification 86134 entity includes various attributes, namely a PartyIdentifierTypeCode 86138, a PartyIdentifierID 86142, an IdentifierIssuingAgencyName 86146, an EntryDate 86150, an AreaOfValidityCountryCode 86154, an AreaOfValidityRegionCode 86158 and a ValidityPeriod 86162. The PartyIdentifierTypeCode 86138 attribute has a cardinality of 1 86140 meaning that for each instance of the Identification 86134 entity there is one PartyIdentifierTypeCode 86138 attribute. The PartyIdentifierID 86142 attribute has a cardinality of 1 86144 meaning that for each instance of the Identification 86134 entity there is one PartyIdentifierID 86142 attribute. The IdentifierIssuingAgencyName 86146 attribute has a cardinality of 0 . . . 1 86148 meaning that for each instance of the Identification 86134 entity there may be one IdentifierIssuingAgencyName 86146 attribute. The EntryDate 86150 attribute has a cardinality of 0 . . . 1 86152 meaning that for each instance of the Identification 86134 entity there may be one EntryDate 86150 attribute. The AreaOfValidityCountryCode 86154 attribute has a cardinality of 0 . . . 1 86156 meaning that for each instance of the Identification 86134 entity there may be one AreaOfValidityCountryCode 86154 attribute. The AreaOfValidityRegionCode 86158 attribute has a cardinality of 0 . . . 1 86160 meaning that for each instance of the Identification 86134 entity there may be one AreaOfValidityRegionCode 86158 attribute. The ValidityPeriod 86162 attribute has a cardinality of 0 . . . 1 86164 meaning that for each instance of the Identification 86134 entity there may be one ValidityPeriod 86162 attribute.

The TaxPreparer 86166 package includes a TaxPreparer 86168 entity. The TaxPreparer 86168 entity has a cardinality of 0 . . . 1 86170 meaning that for each instance of the TaxPreparer 86166 package there may be one TaxPreparer 86168 entity. The TaxPreparer 86168 entity includes a TaxPreparerPartyID 86172 attribute. The TaxPreparer 86168 entity includes an Identification 86176 subordinate entity. The TaxPreparerPartyID 86172 attribute has a cardinality of 1 86174 meaning that for each instance of the TaxPreparer 86168 entity there is one TaxPreparerPartyID 86172 attribute.

The Identification 86176 entity has a cardinality of 0 . . . n 86178 meaning that for each instance of the TaxPreparer 86168 entity there may be one or more Identification 86176 entities. The Identification 86176 entity includes various attributes, namely a PartyIdentifierTypeCode 86180, a PartyIdentifierID 86184, an IdentifierIssuingAgencyName 86188, an EntryDate 86192, an AreaOfValidityCountryCode 86196, an AreaOfValidityRegionCode 86200 and a ValidityPeriod 86204. The PartyIdentifierTypeCode 86180 attribute has a cardinality of 1 86182 meaning that for each instance of the Identification 86176 entity there is one PartyIdentifierTypeCode 86180 attribute. The PartyIdentifierID 86184 attribute has a cardinality of 1 86186 meaning that for each instance of the Identification 86176 entity there is one PartyIdentifierID 86184 attribute. The IdentifierIssuingAgencyName 86188 attribute has a cardinality of 0 . . . 1 86190 meaning that for each instance of the Identification 86176 entity there may be one IdentifierIssuingAgencyName 86188 attribute. The EntryDate 86192 attribute has a cardinality of 0 . . . 1 86194 meaning that for each instance of the Identification 86176 entity there may be one EntryDate 86192 attribute. The AreaOfValidityCountryCode 86196 attribute has a cardinality of 0 . . . 1 86198 meaning that for each instance of the Identification 86176 entity there may be one AreaOfValidityCountryCode 86196 attribute. The AreaOfValidityRegionCode 86200 attribute has a cardinality of 0 . . . 1 86202 meaning that for each instance of the Identification 86176 entity there may be one AreaOfValidityRegionCode 86200 attribute. The ValidityPeriod 86204 attribute has a cardinality of 0 . . . 1 86206 meaning that for each instance of the Identification 86176 entity there may be one ValidityPeriod 86204 attribute.

The JointFiler 86208 package includes a JointFiler 86210 entity. The JointFiler 86210 entity has a cardinality of 0 . . . 1 86212 meaning that for each instance of the JointFiler 86208 package there may be one JointFiler 86210 entity. The JointFiler 86210 entity includes a JointFilerPartyID 86214 attribute. The JointFiler 86210 entity includes an Identification 86218 subordinate entity. The JointFilerPartyID 86214 attribute has a cardinality of 1 86216 meaning that for each instance of the JointFiler 86210 entity there is one JointFilerPartyID 86214 attribute.

The Identification 86218 entity has a cardinality of 0 . . . n 86220 meaning that for each instance of the JointFiler 86210 entity there may be one or more Identification 86218 entities. The Identification 86218 entity includes various attributes, namely a PartyIdentifierTypeCode 86222, a PartyIdentifierID 86226, an IdentifierIssuingAgencyName 86230, an EntryDate 86234, an AreaOfValidityCountryCode 86238, an AreaOfValidityRegionCode 86242 and a ValidityPeriod 86246. The PartyIdentifierTypeCode 86222 attribute has a cardinality of 1 86224 meaning that for each instance of the Identification 86218 entity there is one PartyIdentifierTypeCode 86222 attribute. The PartyIdentifierID 86226 attribute has a cardinality of 1 86228 meaning that for each instance of the Identification 86218 entity there is one PartyIdentifierID 86226 attribute. The IdentifierIssuingAgencyName 86230 attribute has a cardinality of 0 . . . 1 86232 meaning that for each instance of the Identification 86218 entity there may be one IdentifierIssuingAgencyName 86230 attribute. The EntryDate 86234 attribute has a cardinality of 0 . . . 1 86236 meaning that for each instance of the Identification 86218 entity there may be one EntryDate 86234 attribute. The AreaOfValidityCountryCode 86238 attribute has a cardinality of 0 . . . 1 86240 meaning that for each instance of the Identification 86218 entity there may be one AreaOfValidityCountryCode 86238 attribute. The AreaOfValidityRegionCode 86242 attribute has a cardinality of 0 . . . 1 86244 meaning that for each instance of the Identification 86218 entity there may be one AreaOfValidityRegionCode 86242 attribute. The ValidityPeriod 86246 attribute has a cardinality of 0 . . . 1 86248 meaning that for each instance of the Identification 86218 entity there may be one ValidityPeriod 86246 attribute.

The Log 86250 package includes a Log 86252 entity. The Log 86252 entity has a cardinality of 1 86254 meaning that for each instance of the Log 86250 package there is one Log 86252 entity. The data types of the various packages, entities, and attributes are described with respect to FIG. 76.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for performing a tax form service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying a tax form by levy type, the tax form operable to be filled by a taxpayer or the taxpayer's representative, where a tax return or tax registration is comprised of a plurality of tax forms, the first message derived from the common business object model and including a first message package hierarchically organized as:

a tax form enterprise resource planning (ERP) by levy type query message entity; and a selection package, the selection package including a tax form selection by levy type entity, the tax form selection by levy type entity including a levy type code and a tax form usage code;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The medium of claim 1, wherein the tax form selection by levy type entity further includes a billing period ID.

3. The medium of claim 1, wherein the second message responsive to the first message comprises a response to the query, the second message including a second message package hierarchically organized as:

a tax form ERP by levy response message entity;

a tax form package and a log package, the tax form package including a tax form entity, where the tax form entity includes an ID, a template ID, a valid-from date, a valid-to date, and a binary object, and where the log package includes a log entity.

4. The medium of claim 3, wherein the tax form package further includes a usage data package and a property valuation package, where the usage data package includes a usage data entity, where the usage data entity includes a levy type code and a cover form indicator, and where the property valuation package includes a property valuation entity, where the property valuation entity including at least one property valuation.

5. A distributed system operating in a landscape of computer systems providing message-based services defined in a service registry, the system comprising:

at least one processor operable to execute computer readable instructions embodied on tangible media;

a graphical user interface comprising computer readable instructions, embedded on tangible media and executable by the at least one processor, for querying a tax form by levy type, the tax form operable to be filled by a taxpayer or the taxpayer's representative, where a tax return or tax registration is comprised of a plurality of tax forms, using a request;

a first memory storing a user interface controller for processing the request when executed by the at least one processor and involving a message including a message package derived from a common business object model, where the common business object model includes business objects having relationships that enable derivation of message-based service interfaces and message packages, the message package hierarchically organized as:

a tax form enterprise resource planning (ERP) by levy type query message entity; and a selection package, the selection package including a tax form selection by levy type entity, the tax form selection by levy type entity including a levy type code and a tax form usage code; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

6. The distributed system of claim 5, wherein the first memory is remote from the graphical user interface.

7. The distributed system of claim 5, wherein the first memory is remote from the second memory.

* * * * *